US009634386B2

(12) United States Patent
Dundorf et al.

(10) Patent No.: US 9,634,386 B2
(45) Date of Patent: Apr. 25, 2017

(54) APPARATUS FOR SAFELY SECURING RADIATION-TRANSPARENT PANELS COVERING THE ANTENNA SERVICE BAYS OF WIRELESS TELECOMMUNICATION TOWERS AND METHODS OF INSTALLING THE SAME

(71) Applicants: Christopher C. Dundorf, Barrington, NH (US); Patrick Melvin, Lee, NH (US); David M. Dundorf, Salem, CT (US)

(72) Inventors: Christopher C. Dundorf, Barrington, NH (US); Patrick Melvin, Lee, NH (US); David M. Dundorf, Salem, CT (US)

( * ) Notice: Subject to any disclaimer, the term of this patent is extended or adjusted under 35 U.S.C. 154(b) by 33 days.

(21) Appl. No.: 14/599,939

(22) Filed: Jan. 19, 2015

(65) Prior Publication Data

US 2016/0211574 A1    Jul. 21, 2016

(51) Int. Cl.
*H01Q 1/12* (2006.01)
*H01Q 1/42* (2006.01)
*F16B 2/08* (2006.01)

(52) U.S. Cl.
CPC ...... *H01Q 1/42* (2013.01); *F16B 2/08* (2013.01)

(58) Field of Classification Search
CPC .................................... F16B 2/08; H01Q 1/42
USPC ............... 343/872, 890, 891, 892; 52/23; 24/68 CD, 68 R
See application file for complete search history.

(56) References Cited

U.S. PATENT DOCUMENTS

| 1,447,967 A | 3/1923 | Frank |
| 1,547,972 A | 7/1925 | Spannaus |
| 1,657,190 A | 1/1928 | Ballou |
| 1,712,198 A | 5/1929 | Clapp |
| 1,724,424 A | 8/1929 | Sandholdt |
| 1,963,593 A | 6/1934 | Prindle |
| 2,147,706 A | 2/1939 | Kerr et al. |
| 2,271,133 A | 1/1942 | Thoresen |
| 2,304,911 A | 12/1942 | Harpold |
| 2,351,749 A | 6/1944 | Elmer |
| 2,363,138 A | 11/1944 | Moore |
| 2,372,967 A | 4/1945 | Martin |
| 2,442,266 A | 5/1948 | Davis |
| 2,540,887 A | 2/1951 | Hyatt |
| 2,579,975 A | 12/1951 | Scott |
| 2,638,314 A | 5/1953 | McFerren |

(Continued)

OTHER PUBLICATIONS

Installation and User Manual (P/N 2500069 Rev 02) entitled "Windband for Sectional and Cylindrical Shrouds" for Use With the Windband V2.3 Cell Tower Shroud & Halyard Protection System, made and sold by WindSwept Designs USA, Salem, Connecticut, published Dec. 2011, 26 Pages.

*Primary Examiner* — Tho G Phan
(74) *Attorney, Agent, or Firm* — Thomas J. Perkowski, Esq., PC

(57) ABSTRACT

Improved radio-transparent communication tower panel security devices that can be easily mounted to and strapped around the cover panels of communication towers, including flag-supporting cellular communication towers, so as to band and secure the cover panels thereto and prevent them from falling off in high winds and/or other adverse weather conditions, while preventing wear and tear of flags and their lanyards.

16 Claims, 111 Drawing Sheets

(56) References Cited

U.S. PATENT DOCUMENTS

| | | |
|---|---|---|
| 2,679,670 A | 6/1954 | Griswold |
| 2,715,008 A | 8/1955 | Huber |
| 2,833,343 A | 5/1958 | Benson |
| 2,874,431 A | 2/1959 | Elsner |
| 2,881,636 A | 4/1959 | Palmleaf |
| 2,889,136 A | 6/1959 | Prete, Jr. |
| 2,908,522 A | 10/1959 | Glave |
| 2,969,221 A | 1/1961 | Harmes |
| 2,993,680 A | 7/1961 | Davis |
| 2,998,625 A | 9/1961 | Huber |
| 3,006,670 A | 10/1961 | Schmidt |
| 3,099,486 A | 7/1963 | Scott |
| 3,100,484 A | 8/1963 | Berl |
| 3,141,345 A | 7/1964 | Hartmann |
| 3,154,330 A | 10/1964 | Clark |
| 3,180,623 A | 4/1965 | Huber |
| 3,303,506 A * | 2/1967 | Diebold ............ H01Q 1/1242 343/800 |
| 3,416,762 A | 12/1968 | Headrick |
| 3,718,315 A | 2/1973 | Huber |
| 3,718,934 A * | 2/1973 | Bogner ............ H01Q 21/205 343/770 |
| 3,749,366 A | 7/1973 | Brucker |
| 3,769,764 A | 11/1973 | Young |
| 3,897,778 A | 8/1975 | Forbes-Robinson |
| 3,949,527 A | 4/1976 | Double |
| 3,971,589 A | 7/1976 | Elrod |
| 3,994,108 A | 11/1976 | Johnson |
| 4,049,298 A | 9/1977 | Foti |
| 4,070,802 A | 1/1978 | Odom |
| 4,143,914 A | 3/1979 | Klich |
| 4,154,427 A | 5/1979 | Hofmann |
| 4,199,182 A | 4/1980 | Sunesson |
| 4,218,046 A | 8/1980 | Bathum et al. |
| 4,227,286 A | 10/1980 | Holmberg |
| 4,334,601 A | 6/1982 | Davis |
| 4,542,883 A | 9/1985 | Rutzki |
| 4,571,000 A | 2/1986 | Holder |
| 4,622,721 A | 11/1986 | Smetz |
| 4,666,106 A | 5/1987 | Kohout |
| 4,733,759 A | 3/1988 | Shih-Chen |
| 4,773,515 A | 9/1988 | Kotkins |
| 4,832,053 A | 5/1989 | McCarthy |
| 4,856,627 A | 8/1989 | Polatov |
| 5,072,553 A | 12/1991 | Bozetto |
| 5,088,010 A | 2/1992 | Wimmer |
| 5,103,536 A | 4/1992 | Kamper |
| 5,271,606 A | 12/1993 | Kamper |
| 5,285,603 A | 2/1994 | Richard |
| 5,319,896 A | 6/1994 | Winger |
| 5,320,398 A | 6/1994 | Popp |
| 5,355,640 A | 10/1994 | Frye |
| 5,522,184 A | 6/1996 | Oviedo-Reyes |
| 5,533,304 A * | 7/1996 | Noble ............ H01Q 1/125 343/880 |
| 5,579,794 A | 12/1996 | Sporta |
| 5,671,831 A | 9/1997 | Chiu |
| 5,687,512 A | 11/1997 | Spoozak |
| 5,722,266 A | 3/1998 | Yeager |
| 5,809,620 A | 9/1998 | Crowley et al. |
| 5,983,572 A | 11/1999 | Laboy |
| 5,999,145 A * | 12/1999 | Niekamp ............ H01Q 1/1242 343/800 |
| 6,015,072 A | 1/2000 | Young |
| 6,161,339 A | 12/2000 | Cornett |
| 6,219,973 B1 | 4/2001 | Lafferty |
| 6,220,411 B1 | 4/2001 | Scicluna et al. |
| 6,390,259 B1 | 5/2002 | Lu |
| 6,408,997 B1 | 6/2002 | Chen |
| 6,508,456 B2 | 1/2003 | Hulburd et al. |
| 6,591,950 B1 | 7/2003 | Scicluna |
| 6,619,708 B1 | 9/2003 | Naylor |
| 6,768,473 B2 * | 7/2004 | Harland ............ H01Q 1/1242 343/797 |
| 6,843,027 B2 | 1/2005 | Gaddie |
| 6,901,709 B2 | 6/2005 | Imus et al. |
| 6,940,469 B2 * | 9/2005 | Gottl ............ H01Q 1/42 343/872 |
| 6,999,042 B2 * | 2/2006 | Dearnley ............ H01Q 1/1207 343/853 |
| 7,249,790 B2 | 7/2007 | Potts et al. |
| 7,310,913 B2 | 12/2007 | Pierce |
| 7,325,281 B1 | 2/2008 | Willems |
| 7,422,476 B2 | 9/2008 | Marmaropoulos et al. |
| 7,641,030 B2 | 1/2010 | Selvi |
| 8,087,269 B2 | 1/2012 | Conti |
| 8,578,676 B2 | 11/2013 | Lu et al. |
| 8,593,370 B2 * | 11/2013 | Caldwell ............ H01Q 1/1242 343/879 |
| 8,662,544 B2 | 3/2014 | Broderick et al. |
| 8,763,755 B2 | 7/2014 | Hagberg |
| 8,833,554 B2 | 9/2014 | Busri |
| 2001/0037611 A1 | 11/2001 | Cornett |
| 2002/0185350 A1 | 12/2002 | Chang et al. |
| 2003/0000784 A1 | 1/2003 | Hsu |
| 2004/0035079 A1 | 2/2004 | Evjen |
| 2005/0098402 A1 | 5/2005 | Cohen |
| 2007/0209291 A1 | 9/2007 | Perez |
| 2008/0072498 A1 | 3/2008 | Rogers et al. |
| 2008/0180059 A1 | 7/2008 | Carrier et al. |
| 2008/0251623 A1 | 10/2008 | Goldstein et al. |

* cited by examiner

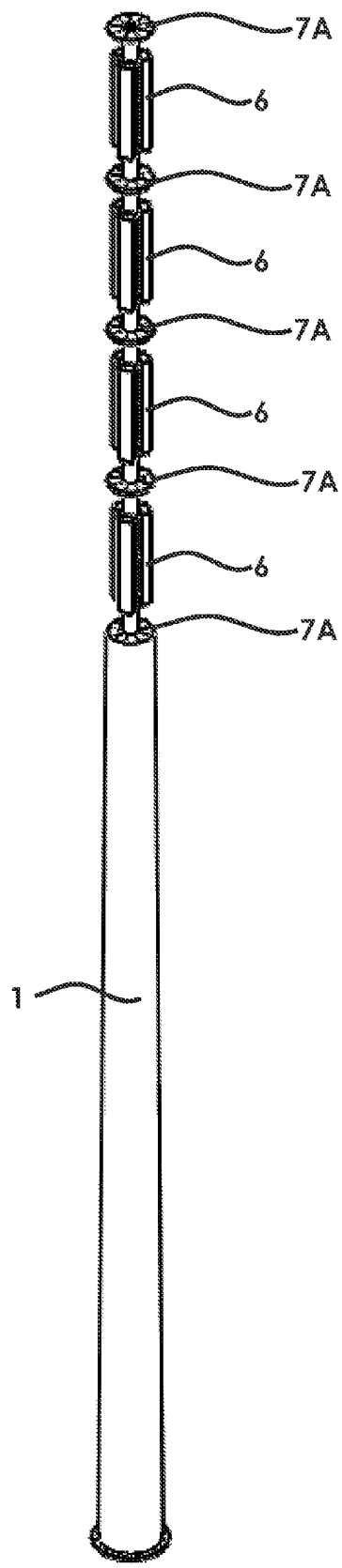
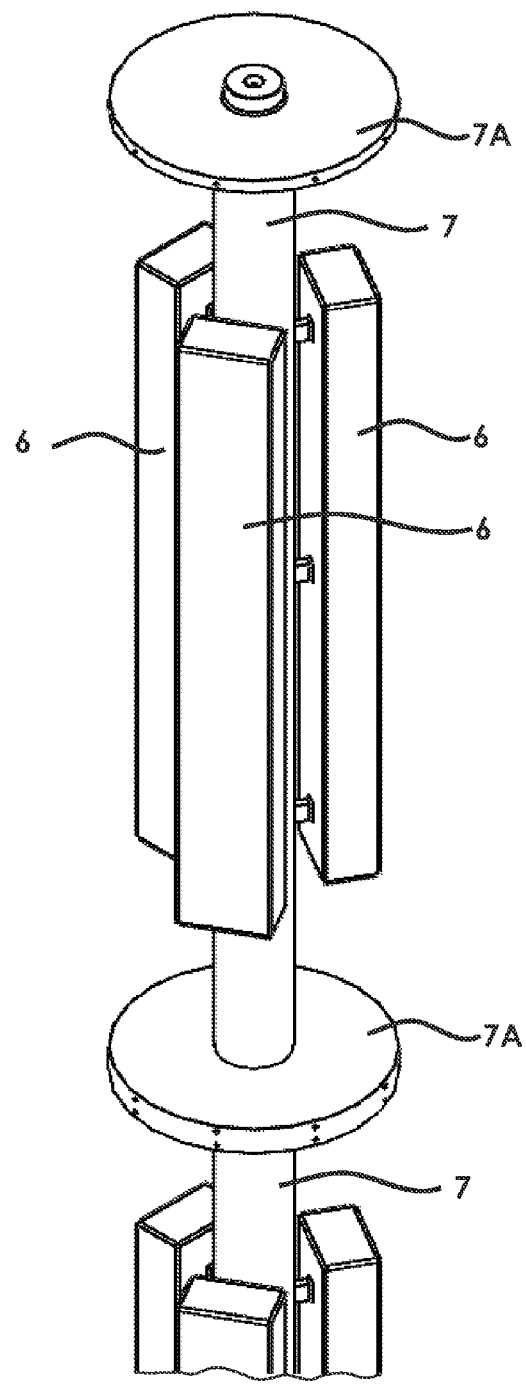
FIG. 2A (PRIOR ART)
FIG. 2B (PRIOR ART)

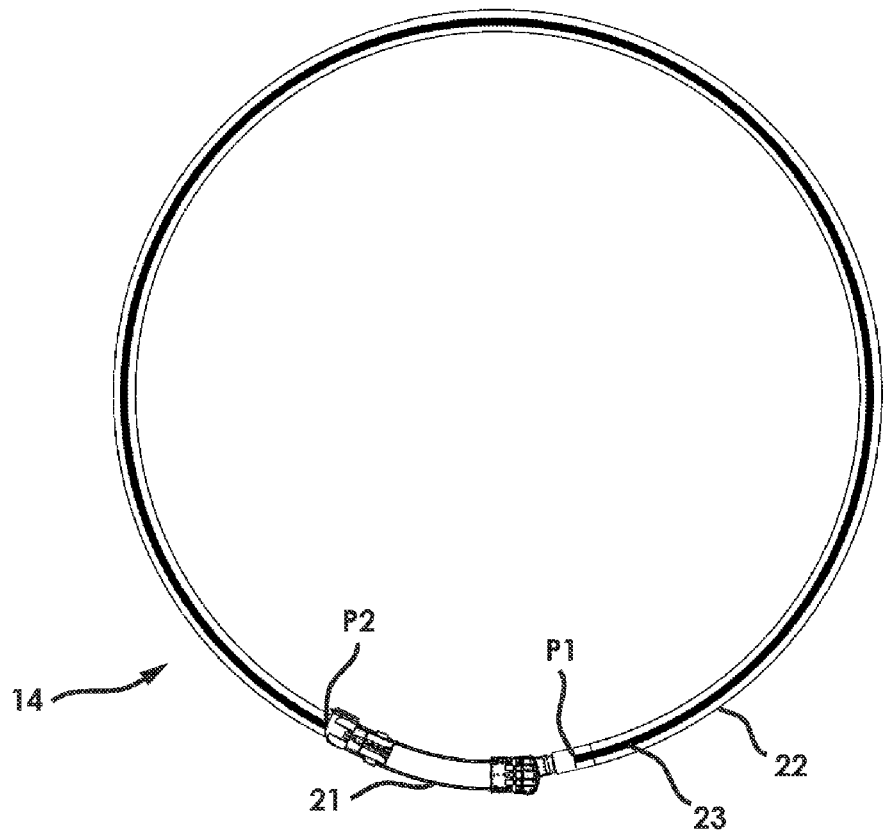
FIG. 15A
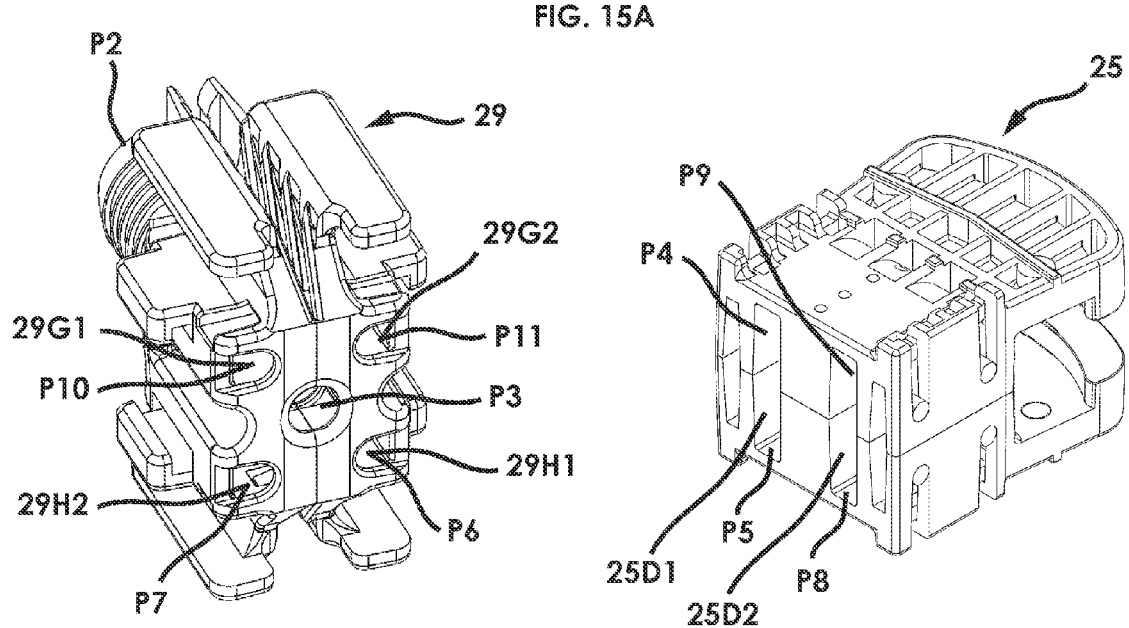
FIG. 15B
FIG. 15C

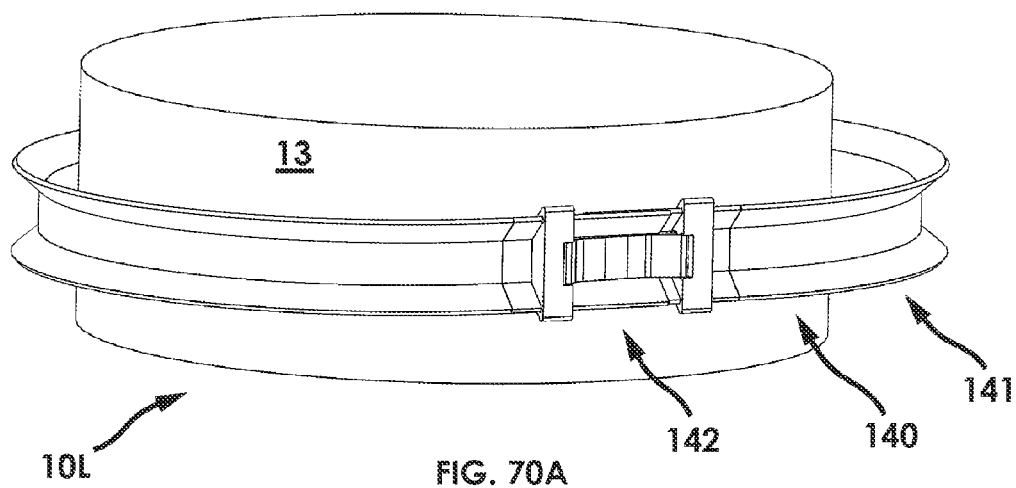
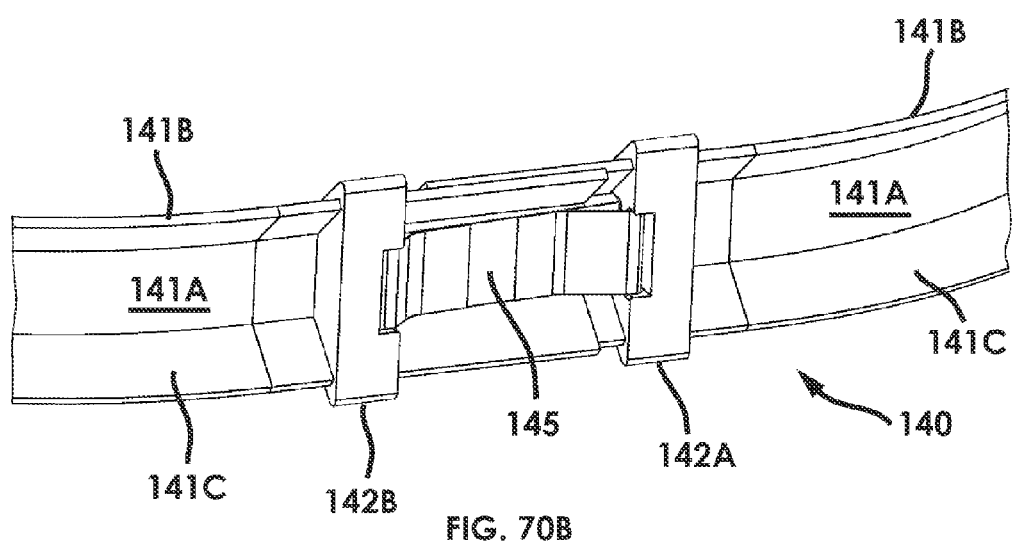
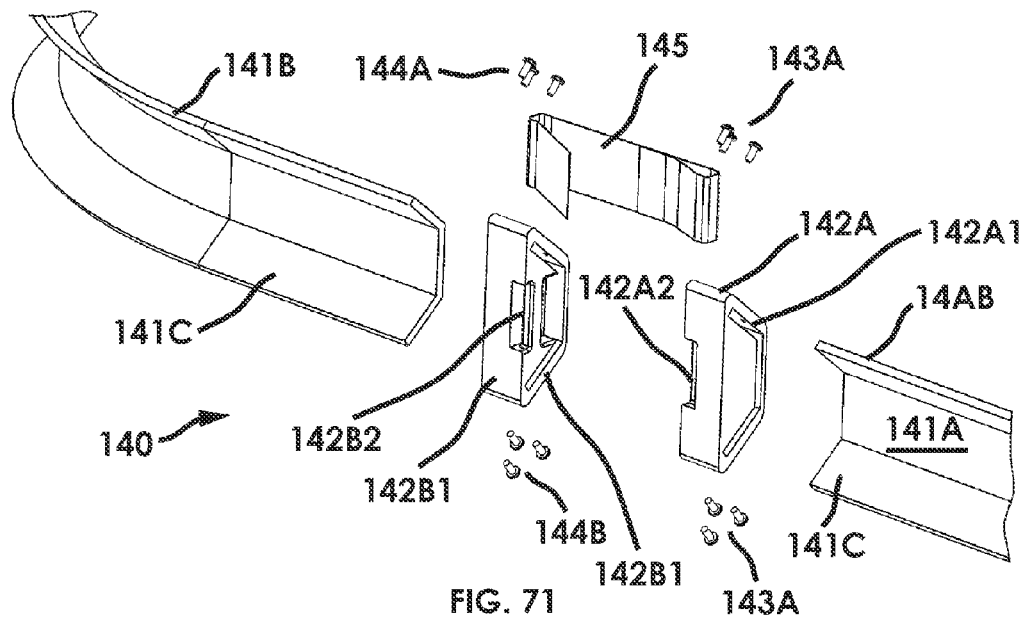

APPARATUS FOR SAFELY SECURING RADIATION-TRANSPARENT PANELS COVERING THE ANTENNA SERVICE BAYS OF WIRELESS TELECOMMUNICATION TOWERS AND METHODS OF INSTALLING THE SAME

BACKGROUND OF INVENTION

Field of Invention

The present invention relates to improvements in methods of and apparatus for securing cover panels or shrouds to the mast structures of ground-based wireless telecommunication towers, so as to conceal and protect electromagnetic signal transmitting and receiving antennas mounted therein as part of greater diverse wireless telecommunication networks which extend across the Earth.

Brief Description of the State of Knowledge in the Art

In recent times, more and more communication towers are being installed as cellular and other wireless communication networks extend their reach and coverage across the planet. At some cell tower sites, it is becoming increasingly popular for communication towers to support a flag. The advantages and benefits of such kinds of cell tower designs is that, in addition to mounting and directing radio antennas in specific directions to achieve required cellular radio coverage in the network, each such cell tower also functions as a flag pole structure capable of flying a large flag and promoting the spirit of patriotism across the land.

FIGS. 1A and 1B show a cell tower flag pole structure 1 employing a conventional system of spring-biased (i.e. spring-loaded) panel banding devices 2 that wrap around the circumference of the cell-tower flag pole structure 1 at different height locations, and secure the cover (i.e. shroud) panels in place against displacement in the presence of high winds and other foul weather conditions.

FIG. 2A shows the conventional cell tower flag pole structure of FIGS. 1A and 1B, with the flag 3 and its truck assembly 4, as well as the cover panels 5 covering the top three sections 6A, 6B and 6C, removed from the top of the flag pole structure, revealing antenna structures 7 and associated electronics.

FIG. 3A shows the cell tower flag pole structure 1 shown in FIGS. 1A and 1B, with a set of spring-biased panel banding devices 2 wrapped around the circumference of the cell-tower flag pole structure at different height locations, to secure the panels in place against displacement in the presence of high winds and other foul weather conditions.

FIG. 3B shows the cell tower flag pole structure 1 supporting a set of spring-biased panel banding devices 2, each being wrapped around the circumference of the cell-tower flag pole structure at different height locations, to secure the panels 5 in place (ii) using a metal strap 2A covered in rigid (i.e. non-compressible) protective plastic tubing 2B to prevent fraying, ripping or abrasion of a mounted flag, and (iii) connected together using a latched and spring-loaded strap connecting assembly.

FIGS. 4A and 4B show the topmost spring-loaded panel banding device 2 wrapped around the circumference of the cell-tower flag pole structure, in its closed/locked configuration, to secure the panels 5 in place against displacement in the presence of high winds and other foul weather conditions.

FIG. 4C shows the topmost spring-biased panel banding device 2 wrapped around the circumference of the cell-tower flag pole structure, arranged in its unlocked configuration, with the latching mechanism 2C, connected to the first end of the metal band 2A by way of a spring 2D and the second end of the metal band 2A by way of hook 2E. As shown, the metal band 2A passes through an aperture formed in the hinged cover structure 2F. As shown, the latching mechanism 2C securely mounted on base panel 2H, is arranged in its closed configuration with its spring 2D arranged under very high-tension in its extended/stretched state, while the metal band 2A firmly presses against the rigid protective tubing 2B and tower panels 5, to secure the tower panels 5 in position against the underlying tower framework (e.g. mast structure).

FIGS. 5A and 5B show the first step of mounting conventional spring-biased panel banding device 2 to the cover panel of the cell-tower flag pole structure, involving the passing of four self-tapping screws 2G through the four corner holes of the base portion 2H of the banding device into the cover panel section 5, to mount the panel banding device 2 to the cover panel section.

FIG. 5C shows the second step of mounting the spring-biased panel banding device 2 to the cover panel 5 of the cell-tower flag pole structure, involving the wrapping of the covered strap 2B around the tower 5, and connecting the hook fastener 2E to the free looped-end of the metal band 2A, as shown.

FIG. 5D shows the third step of mounting the spring-biased panel banding device 2 to the cover panel of the cell-tower flag pole structure, involving closing the latch mechanism 2C to tighten up the covered strap 2A extending around the panel sections 5 of the tower structure.

FIG. 5E shows the fourth step of mounting spring-biased panel banding device 2 to the cover panel of the cell-tower flag pole structure, involving closing the cover portion 2F over the base portion 2H, thereby expanding the spring within the panel-banding device, tightening the covered strap against the cover panel sections 5, and thereafter, inserting the retaining pins to secure the cover and base portions while arranged in the closed configuration.

While this prior art spring-biased panel-banding device 2 has helped to safely secure cover panels 5 to the framework of communication tower (CCT) structures, including cell-tower flag pole structures, even in terrible weather conditions, this prior art device is very complex, expensive to manufacture, and difficult to install under most circumstances.

In view of the above prior art communication tower (CCT) security device design described above, which has been in production and use for some time, Applicants have carefully observed a number of shortcomings and drawbacks which have necessitated significant improvements in the performance of such devices and communication tower safety, while advancing the state of the art in this technical field.

In particular, Applicants have observed the occurrence of shroud panel failure under extreme weather conditions when wind speeds can reach in the neighborhood of 50 MPH. Also, on flagpole adapted cell communication towers, halyards have experienced significant premature wear due to sharp external components (e.g. screw heads, edges, etc) on tower shrouds. Also, halyard rope frequently suffer from entanglement. These problems can significantly increase the cost of maintenance of flag pole subsystems supported on communication towers.

The above-described prior art communication tower panel security device can present potential RF interference problems due to its high use of metal content in product manufacture. It also has application to a limited range of tower diameters, and its range of tension is limited without the use of special tools. Also, the current method of installation can be difficult to practice consistently by others without the use of special tools, and there is a great need for simplification.

Thus, despite some improvements made by the prior art in securing cover panels on cell-towers, there is still a great need in the art for improved a method of and apparatus for safely securing cover/shroud panels on communication towers, including those supporting flag pole structures, while avoiding the shortcomings and drawbacks of prior art systems and methodologies.

OBJECTS AND SUMMARY OF INVENTION

Accordingly, a primary object of the present disclosure is to provide new and improved methods of and apparatus for safely securing cover panels on wireless communication tower structures, in diverse environments, while avoiding the shortcomings and drawbacks of prior art systems, apparatus and methodologies.

Another object is to provide such apparatus in the form of a new and improved communication tower cover panel banding device that easily mounts to and safely secures cover panels on the communication towers, and prevents them from falling off in high winds and/or other adverse weather conditions.

Another object of the present invention is to provide a new and improved communication tower cover panel security device that avoids premature wear and tear of halyards and flag pole cords mounted on communication tower shrouds (i.e. cover panels).

Another object of the present invention is to provide a new and improved communication tower cover panel security device that is totally transparent to the electromagnetic energy transmitted and received by the antennas which are covered by the cover panels that the device secures, so as to completely avoid any potential electromagnetic signal interference problems when installed about the cover panels mounted about the antenna service bays of wireless communication towers.

Another object of the present invention is to provide a new and improved communication tower cover panel security device has application over a very wide range of tower diameters, and is capable of generating a wide range of shroud banding tensions without the use of special tools.

Another object of the present invention is to provide a new and improved communication tower cover panel security device can be safely and consistently installed in simple manner, with faster installation times than when using prior art methods, and without the use of special tools.

Another object of the present invention is to provide a new and improved communication tower cover panel security device can be installed in the middle section of antenna service bays on communication towers.

Another object of the present invention is to provide a new and improved communication tower cover panel security device can offers a wide tightening range to significantly improve interchangeability between antenna services along a communication tower.

Another object of the present invention is to provide new and improved communication tower cover panel security devices that maintain significantly improved compression about the shroud panels on radio communication towers.

Another object of the present invention is to provide new and improved communication tower cover panel security devices that can withstand deterioration when expose to UV radiation and other environment elements and conditions, thereby offering improvements in operational lifetime.

Using the present invention, a new and improved communication tower is constructed and installed stationary relative to the Earth, comprising a mast structure mounted relative to the Earth, at least one antenna bay arranged about the mast structure and covered by radio-transparent shroud panels, concealing the at least one antenna structure supported on or about the mast structure and adapted for transmitting and/or receiving radiated energy over a specified portion of the electromagnetic spectrum. The communication tower includes a plurality of communication tower panel security devices, each being substantially transparent to radiated energy over the specified portion of the electromagnetic spectrum, and installed about one antenna bay. Each communication tower panel security device is tightly wrapped around the circumference of the communication tower at a different height location, to secure the radio-transparent cover panels against displacement in the presence of high winds and other foul weather conditions. The degree of tension along each communication tower panel security device can be manually adjusted without the use of tools.

In one illustrative embodiment, the communication tower panel security device of the present invention comprises a plastic banding assembly having first and second end portions and, having a length for wrapping around the circumference of said communication tower; a connecting/tensioning mechanism for connecting the first and second end portions, and generating tension along the plastic banding assembly; wherein the plastic banding assembly and the connecting/tensioning mechanism are substantially transparent to radiated energy over said specified portion of the electromagnetic spectrum; and wherein the connecting/tensioning mechanism allows the degree of tension along the communication tower panel security device to be manually adjusted without the use of tools.

In another illustrative embodiment of the present invention, the communication tower panel security device of the present invention comprises: a flexible plastic tubing and cord assembly, having first and second end portions, and adapted for wrapping around at least two radio-transparent cover panels for an antenna service bay arranged within a communication tower, wherein the flexible plastic tubing and cord assembly includes a length of flexible plastic tubing and a length of flexible cord; and a connecting/tensioning assembly for interconnecting the first and second ends of the flexible plastic tubing and cord assembly and wrapping around the circumference of the antenna service bay and securely retaining the radio-transparent cover panels in place under tension, during expected weather conditions; wherein the connecting/tensioning mechanism allows the degree of tension along the communication tower panel security device to be manually adjusted by tensioning the length of flexible cord, without the use of tools. In the case where a flag and its lanyards are mounted on the top portion of the communication tower using a truck assembly, the flexible plastic tubing and cord assembly prevents fraying, ripping or abrasion of the flag and its halyard.

In another illustrative embodiment of the present invention, the communication tower panel security device of the present invention comprises: a first end module having a connector channel, a first set of cord input and output ports, and containing a first set of pulleys; a second end module; a sliding module containing a second set of pulleys; a pair of flexible side panels; wherein the pair of flexible side panels are supported in a parallel relationship between the first end module and the second end module to form a connecting/tensioning framework, along which the sliding module is slidably mounted so as to freely slide between the first end module and the second end module; an end connector having a head portion which is adapted to slide into and be received by the connector channel formed in said first end module; a length of flexible cord encased in a length of flexible plastic tubing and having a first end that is connected to the end connector, and wrapping about the circumference of said communication tower, and passing through the sliding module and being routed through the first end module, about the first set of pulleys, and the sliding module and the second set of pulleys, to gain the mechanical advantage thereof when tensioning the flexible cord encased along the flexible plastic tubing; wherein the free end of the flexible cord is retained in a cord retaining mechanism provided on the sliding module. A first excess cord wind-up fixture is provided on the sliding module and a second excess cord windup fixture is provided on the second end module. Also, a second cord retaining mechanism is provided on the second end module for retaining the free end of the flexible cord after excess cord has been wound up around the first and second excess cord windup fixtures.

In another illustrative embodiment of the present invention, the communication tower panel security device of the present invention comprises: a length of flexible plastic tubing having a first end and a second end; a length of flexible cord passing through the flexible plastic tubing and having a first end and a second end; an end connector module having a head portion and a first connector portion for connecting to the first end of the length of flexible cord, and also the first end of the length of flexible plastic tubing, wherein the length of flexible cord and tubing are capable of surrounding the circumference of the antenna service bay of said communication tower; a pair of flexible side panels, wherein each flexible side panel has a first end and a second end; a first end module having (i) an exterior connection channel for releasably receiving the head portion of the end connector module, (ii) a first pair of side panel supports for supporting the first ends of the flexible side panels, (iii) a first cord input port in communication with a first cord output port, (iv) at least a first pulley, and (v) a first internal cord passageway extending between the first cord input port and the first cord output port and along which said at least first pulley is mounted; a second end module having (i) a central passageway for passage of the flexible plastic tubing, (ii) a second pair of side panel supports for supporting the second ends of the flexible side panels, (iii) a first cord retaining mechanism for retaining said flexible cord, and (iv) a first excess cord windup fixture for winding up excess cord; a sliding module having (i) an upper surface, (ii) a second connector portion for connecting to the second end of the length of flexible plastic tubing, (iii) a central bore formed through the second connector and extending through the sliding module and allowing for the passage of the free end of the flexible cord through the sliding module and exiting from a central output port aligned with the central bore, (iv) a second cord input port in communication with a second cord output port, (v) at least a second pulley, (vi) a cord retaining mechanism mounted on the upper surface for retaining the flexible cord, (vii) a pair of side panel supports for slidably supporting the sliding module between the pair of flexible side panels, (viii) a second internal cord passageway extending between the second cord input and output ports in the sliding module, and along which the at least a second pulley is mounted, and (ix) a second excess cord windup fixture for winding up excess cord after a selected portion of the cord is retained in the first cord retaining mechanism; wherein the free end of the flexible cord is passed through the central bore of said sliding module and into the first cord input port of the first end module and along the first internal cord passageway and about the at least a first pulley and then out the first output cord port of the first end module and into the second input port of the sliding module, and along the second internal cord passageway at about the at least a second pulley, and then out the second output port and releasably retained in the first cord retaining mechanism; and wherein any excess cord extending beyond the first cord retaining mechanism can be wrapped about the first and second cord excess windup fixtures and then the free end of the flexible cord securely retained in the second cord retaining mechanism supported on the first end module.

In the preferred embodiment, the at least a first pulley comprises a first set of pulleys including a first pulley and second pulley, and the at least a second pulley comprises a second set of pulleys including a third pulley and a fourth pulley; wherein the first end module further comprises a second input cord port and a second cord output port; and wherein the sliding module further comprises a second input cord port and second cord output port. Also, the panel support in said second end module, closest to said communication tower, allows the free end of the inner flexible side panel to freely slide in said panel support when said communication tower security device is being installed thereabout so that the pair of side panels can flex and adapt to the curvature of the communication tower. In the illustrative embodiment, the first end module has an exterior side wall surface provided with a slight degree of curvature so that the side wall surface can closely adapt and fit against the curved surfaces of the tower cover panels, against which the communication tower security device is mounted. The second end module comprises: a frame portion supporting the central passageway and allowing the passage of the plastic tubing and cord assembly to freely pass therethrough during normal operations; an upper surface for supporting the first excess cord windup fixture; and a narrow planar exterior mounting surface facing said tower cover panel, for mounting there against during installation; wherein the second pair of side panel supports comprise a second pair of side panel support channels for supporting the second ends of the flexible side panels, respectively, with the innermost end of the side panel to freely slide within its support channel so that the side panels can bend together, and adapt to the surface curvature of the cover panels, against which the communication tower security device is mounted; and wherein the cord retaining mechanism are realized by spaced apart clips between which the end of the wound up cord can be pressed by the installer and retained therein. The sliding module comprises: a frame portion; and a second barbed connector extending from said frame portion and having an outer surface with barbs for engaging with the free end of the length of plastic tubing; wherein the second pair of side panel supports support the inner flexible side panel and out side panel, and allow the sliding module to slide up and down the spaced apart parallel side panels during cord tensioning and un-tightening operations. Also, the end connector comprises: a body portion formed from first and second end connector halves, having an internal post structure, about which to tie one free end of the cord used in constructing the device; a barbed connector having barbed surface for securely receiving a free end of the plastic tubing once pushed and slid thereover, once the cord has been cut to the appropriate length during installation, and further secured using a clamping or like fastening device; a central bore for receiving the free end of the cord; wherein the head portion is disposed at the distal end of the end connector, and having substantially block-like geometry and fitting within the channel of the first end module; and a connector engaging channel disposed between the head portion and the barbed connector.

In another illustrative embodiment of the present invention, a communication tower panel security device of the present invention is provided, for securing cover panels covering an antenna service bay arranged within a communication tower having a supporting mast structure, and comprising: a flexible plastic tubing assembly including a length of plastic tubing with a first end and a second end, and adapted for wrapping around cover panels covering an antenna service bay arranged in a communication tower having a supporting mast structure; wherein the flexible plastic tubing assembly includes a connector module including a first end connector having a barbed portion for receiving the first end of the length of plastic tubing, and a tension band having an end portion; a connecting/tensioning assembly for interconnecting with the flexible plastic tubing assembly and generating and maintaining sufficient tension forces to ensure that the plastic tubing secures the cover panels in place to the supporting mast structure during expected weather conditions; wherein the connecting/tensioning assembly comprises a frame having (i) a central cavity within which a ratchet mechanism is mounted, (ii) a channel for receiving the end portion of the tension band, and (iii) a second end connector having a barbed portion for receiving the second end of the length of plastic tubing; and wherein the ratchet mechanism includes a sprocket wheel for engaging the end portion of the tension band, and generating and maintaining sufficient tension forces to ensure that the plastic tubing secures the cover panels in place to said supporting mast structure during expected weather conditions. In the preferred embodiment, the ratchet mechanism further comprises: a crank lever for rotating the sprocket wheel during tensioning operations; and a release lever pivotally mounted to the frame within said cavity for engaging spaced apart dents formed along the tension band. Also, the tension band has spaced apart apertures which are received in and engaged by the teeth of the sprocket wheel as the tension band is slid and advanced within the channel as the tension lever is cranked so as to tighten said flexible plastic tubing assembly about the tower communication to secure the cover panels.

In another illustrative embodiment of the present invention, a communication tower panel security device of the present invention is provided, for securing cover panels covering an antenna service bay arranged within a communication tower having a supporting mast structure, and comprising: a flexible plastic tubing assembly including a length of plastic tubing with a first end and a second end, and adapted for wrapping around the cover panels of the antenna service bay of a communication tower having a supporting mast structure; wherein the flexible plastic tubing assembly includes a connector module including a first end connector having a barbed portion for receiving the first end of said length of plastic tubing, and a tension band having an end portion; a connecting/tensioning assembly for interconnecting with the flexible plastic tubing assembly and generating and maintaining sufficient compression and tension forces to ensure that the plastic tubing secures the cover panels in place to the supporting mast structure during expected weather conditions; wherein the connecting/tensioning assembly comprises a frame having (i) a open channel for receiving the engaging end portion of the end connector, and an open cavity region within which a linear-type ratcheting mechanism is mounted; a handle pivotally mounted about a shaft that is supported along the frame; first and second apertured plates slid over the shaft and are fitted within cavities formed within the frame; and an engaging block hingedly connected to the proximal end of the handle, and also coupled to the first apertured plate; wherein when the handle is rotated, the handle translates the engaging block which, in turn, translates the first aperture plate which, in turn, advances the shaft in a tension-generating direction by an incremental amount during each handling cranking operation; wherein the function of the first apertured plate is for advancing the shaft along its axis during tensioning operations, whereas the second apertured plate is for locking the shaft in position during tensioning operations. In the preferred embodiment, with each increment of forward moment of the shaft, achieved by a cranked rotation of the handle in the clockwise direction, the second apertured plate locks into the grooves of the shaft, preventing the shaft from slipping backwards and maintaining the tension being created during the tensioning operations; and with each crank of the handle, greater tension is imparted to the plastic tubing about the cover panels, thereby security the cover panels in position. When tensioning operations are completed, the handle is pushed and locked in its closed downwardly configuration, wherein the end of the handle has projections that grip about and locked around the plastic tubing surrounding the barbed portion of the end connector.

In another illustrative embodiment of the present invention, a communication tower panel security device of the present invention is provided, for securing cover panels covering an antenna service bay arranged within a communication tower having a supporting mast structure, and comprising: a flexible plastic tubing and cord assembly including a length of flexible cord surrounded about by a length plastic tubing with a first end and a second end, and adapted for wrapping around the cover panels of an antenna service bay arranged within the communication tower; a connecting/tensioning assembly for interconnecting with the flexible plastic tubing and cord assembly and generating and maintaining sufficient compression and tension forces to ensure that the plastic tubing secures the cover panels in place to the supporting mast structure during expected weather conditions; wherein the flexible plastic tubing and cord assembly includes a connector module including (i) a base portion with an axial hole for passage and connecting the free end of the length of cord, (ii) a barbed connector portion extending from the base portion for connecting to the first end of a length of plastic tubing, and (iii) a tension strap connected to the base portion and having an end portion; wherein the connecting/tensioning assembly further comprises: a connecting/tensioning module having a frame with a central cavity within which a pulley-based ratchet-like mechanism is mounted; a barbed connector for connecting to the second end of the flexible plastic tubing and to which the other end of the flexible cord is securely fastened; and an external channel for slidably receiving the end portion of the tension strap and retaining the tension strap in the external channel during assembly and operation as the flexible cord is tensioned; wherein the pulley-based ratchet mechanism further includes (i) a pulley mounted about a post within the frame, and (ii) a sprocket wheel integrated with the pulley and having teeth that are engaged by a spring-based release lever pivotally mounted to the frame, and (iii) circumferential grooves, over and around which the flexible cord runs in a friction-fit manner with low slippage; wherein during installation, the length of flexible plastic tubing is wrapped about the cover panels of the communication tower, and then the end of the tension strap slid into and along the channel of the frame, and the flexible cord is passed over and through the pulley wheel; wherein the communication tower panel security device is tensioned by an installer pulling the flexible cord, and increasing the tension in the length of plastic tubing and the flexible cord while the pulley-based ratchet mechanism retains the advanced position of the pulley and the tension strap along the channel, thereby generating and maintaining sufficient tension forces to ensure that the length of plastic tubing secures the cover panels in place to the supporting mast structure during expected weather conditions; and wherein once the desired tension has been generated, any excess length of cord can be wrapped up about excess cord wind-up fixtures provided on the base portion and the frame. To release the tension in the pulley-based ratchet mechanism, the user presses the release lever to quickly release and allow the pulley to rotate and the flexible cord to loosen its tension.

In yet another illustrative embodiment of the present invention, a communication tower panel security device is provided for securing cover panels covering an antenna service bay arranged within a communication tower having a supporting mast structure, and comprising: a flexible plastic tubing assembly including a length of flexible plastic tubing with a first end and a second end, and adapted for wrapping around the cover panels covering said antenna service bay arranged within the communication tower; a connecting/tensioning assembly for interconnecting with the flexible plastic tubing assembly and generating and maintaining sufficient tension forces to ensure that the flexible plastic tubing secures the cover panels in place during expected weather conditions; wherein the flexible plastic tubing assembly includes a connector module including (i) a base portion having a barbed connector portion for connecting to the first end of the length of flexible plastic tubing, and (iii) a tension strap connected to the base portion and having an end portion and dents formed along its length in a spatially periodic manner; wherein the connecting/tensioning assembly further comprises: a connecting/tensioning module having (i) a frame with an external channel for slidably receiving the distal portion of tension strap and retaining the tension strap in the channel during assembly and operations, (ii) a barbed connector for connecting to the second end of the length of flexible plastic tubing, and (iii) an open cavity in communication with the external channel; and (iv) a double-lever mechanism mounted in the open cavity and comprising a first spring-loaded lever, rotatably-mounted within the open cavity, for advancing said tension strap along said external channel in an incremental manner each time the user manually rotates said spring-loaded lever in the counter-clockwise direction, and (v) a second spring-loaded lever rotatably mounted in said open cavity for preventing the tension strap from sliding backwards along the channel, and maintaining the position of the tension strap in the external channel, each time the tension strap is advanced forwardly in the external channel to increase the tension along the tension strap and around the flexible plastic tubing wrapped about the communication tower. To release the tension across the flexible plastic tubing assembly, the user rotates the release lever quickly releasing tension along the flexible plastic tubing assembly.

In yet another illustrative embodiment of the present invention, a communication tower panel security device is provided comprising: a flexible plastic banding assembly including a length of flexible plastic banding material having a first end and a second end, and adapted for wrapping around the cover panels of the antenna service bay of a communication tower having a supporting mast structure; a connecting/tensioning assembly for interconnecting with the flexible plastic banding assembly and generating and maintaining sufficient compression and tension forces to ensure that the flexible plastic banding secures the cover panels in place to the supporting mast structure during expected weather conditions; wherein the length of plastic strip material has (i) a planar portion; and (ii) a pair of angled flange portions integrally connected to the planar portion and extending outwardly at an acute angle from the plane of said planar portion; and wherein the connecting/tensioning module comprises: a frame with a cavity; a first connector channel for receiving the first end of the length of flexible plastic banding material and being secured in the first connector; and a pass-through channel for slidably receiving the second end of the length of flexible plastic banding material and allowing the material to slide therethrough during tensioning operations; and a spring-biased cam mechanism including a rotatable cam mounted about a shaft supported within said cavity, biased using a spring, and having (i) a first configuration in which the rotatable cam permits the flexible plastic banding material to slide freely in a forward tightening direction through the pass-though channel without restraint, and (ii) a second configuration in which a surface on the rotatable cam grips the flexible plastic banding material and prevents the flexible plastic strip material from sliding in a reverse un-tightening direction through the pass-through channel during tensioning operations so that tension can be generated along the flexible plastic banding material wrapped around the circumference of said communication tower, and the flexible plastic banding material securing the cover panels in place to the supporting mast structure during expected weather conditions. In the preferred embodiment, the spring-biased cam mechanism comprises: a first configuration in which the rotatable cam permits the flexible plastic banding material to slide freely in a forward tightening direction through the pass-though channel without restraint; and (ii) a second configuration in which a surface on the rotatable cam grips the flexible plastic banding material and prevents the flexible plastic strip material from sliding in a reverse un-tightening direction through the pass-through channel during tensioning operations; and a third configuration, where when a user rotates the rotatable cam in a certain arrangement, the flexible plastic banding material is able to slide freely over the rotatable cam and through the pass-through channel during un-tensioning operations.

In yet another illustrative embodiment, a communication tower panel security device is provided for securing cover panels covering an antenna service bay arranged within a communication tower having a supporting mast structure, and comprising: a flexible plastic banding assembly including a length of flexible plastic banding material having a first end and a second end, and adapted for wrapping around the cover panels of the antenna service bay of a communication tower having a supporting mast structure; a connecting/tensioning assembly for interconnecting with said flexible plastic banding assembly and generating and maintaining sufficient compression and tension forces to ensure that the flexible plastic banding secures the cover panels in place to the supporting mast structure during expected weather conditions; wherein the length of flexible plastic strip material has (i) a planar portion; (ii) a pair of angled flange portions integrally connected to the planar portion and extending outwardly at an acute angle from the plane of said planar portion, and (iii) a set of dents formed along surface of the planar portion; wherein said connecting/tensioning module comprises: a frame with a cavity; a first connector channel for receiving the first end of the length of flexible plastic banding material and being secured in said first connector; and a pass-through channel for slidably receiving the second end of the length of flexible plastic banding material and allowing the material to slide therethrough during tensioning operations; and a spring-biased ratchet mechanism including a rotatable ratchet mounted about a shaft supported within the cavity, and biased using a spring, so that (i) the rotatable ratchet permits the flexible plastic banding material to slide freely in a forward tightening direction through the pass-though channel without restraint, and (ii) said ratchet grips and engages with the detents formed the flexible plastic banding material and prevents the flexible plastic strip material from sliding in a reverse un-tightening direction through said pass-through channel during tensioning operations so that tension can be generated along the flexible plastic banding material wrapped around the circumference of the communication tower, and the flexible plastic banding material securing the cover panels in place to the supporting mast structure during expected weather conditions.

In yet another illustrative embodiment, a communication tower panel security device is provided comprising: a flexible plastic tubing assembly including a length of flexible plastic tubing having a first end and a second end, and adapted for wrapping around the cover panels of an antenna service bay arranged within a communication tower having a supporting mast structure; a connecting/tensioning assembly for interconnecting with the flexible plastic tubing assembly and generating and maintaining sufficient compression and tension forces to ensure that the flexible plastic tubing secures the cover panels in place to the supporting mast structure during expected weather conditions; and wherein the connecting/tensioning module comprises: (i) a first connector for securely connecting the first end of the length of flexible plastic tubing, and (ii) a pass-through channel for slidably receiving the second end of the length of flexible plastic tubing; wherein the pass-through channel has a first configuration and a second configuration; wherein when the connecting/tensioning module is arranged in the first configuration, the flexible plastic tubing is allowed to slide through the pass-through channel while being pushed in a forward tensioning direction during tensioning operations, and prevented from sliding in a reverse un-tensioning direction during tensioning operations; and wherein when the connecting/tensioning module is arranged in the second configuration, the flexible plastic tubing is allowed to slide through the pass-through channel while being pulled in the reverse un-tensioning direction during un-tensioning operations.

In yet another illustrative embodiment, the pass-through channel comprises: a first bore portion; a second bore portion aligned with the first bore portion; a compression-creating ring inserted into the first bore portion and having an external flange, and a narrow cylindrical sleeve portion from which extend a set of circumferentially disposed and radially-extending compression fingers; and a retaining washer, inserted into the second bore portion, for holding the compression-creating ring in place; wherein, when the connecting/tensioning module is arranged in the first configuration, the set of circumferentially disposed and radially-extending compression fingers allow the flexible plastic tubing is allowed to slide through the cylindrical sleeve portion in the forward tensioning direction when pushed in the forward tensioning direction during tensioning operations, and the set of circumferentially disposed and radially-extending compression fingers prevent the flexible plastic tubing from sliding in the reverse un-tensioning direction during tensioning operations; and wherein, when the connecting/tensioning module is arranged in the second configuration, the set of circumferentially disposed and radially-extending compression fingers allow the flexible plastic tubing to slide through the cylindrical sleeve portion in the reverse un-tensioning direction when the flexible plastic tubing is pulled during un-tensioning operations. In another illustrative embodiment, the second end of the flexible plastic tubing has a series of concentric grooves spaced spatial-periodically along its distal end for improved engagement with the concentrically disposed compression fingers within the connecting/tensioning module.

In yet another illustrative embodiment, a communication tower panel security device is provided for securing cover panels covering an antenna service bay arranged within a communication tower having a supporting mast structure, and comprising: a flexible plastic banding assembly including a length of flexible plastic banding having a first end and a second end, and adapted for wrapping around the cover panels of the antenna service bay of the communication tower having the supporting mast structure; a connecting/tensioning assembly for interconnecting with the flexible plastic banding assembly and generating and maintaining sufficient compression and tension forces to ensure that the flexible plastic banding secures the cover panels in place to the supporting mast structure during expected weather conditions; and wherein the connecting/tensioning assembly comprises: a first connector module for operably connected to the first end of the flexible plastic banding; a second connector module for operably connected to the second end of the flexible plastic banding; and a releasable fastening mechanism for use in coupling together the first and second connection modules under tension, while the first end and the second end of the flexible plastic banding are arranged in an overlapping relationship, so as to provide the desired degree of tension along the plastic banding assembly wrapped about the circumference of the communication tower.

In the illustrative embodiment, the fastener mechanism is a strap fastener; wherein the first connector block comprises: a first frame portion; a first pass-through channel allowing the first end of the flexible plastic banding to pass through the first pass-through channel and extend therethrough by a first predetermined amount and then be secured and locked into position by a first set of screws or like fasteners; and a first aperture through which one end of the strap fastener is passed and looped on its end to securely connect to the first connector module; wherein the second connector block comprises: a frame portion; a second pass-through channel allowing the second end of the flexible plastic banding to pass through the second pass-through channel, extend therethrough by a second predetermined amount, be disposed in an overlapping relationship with the second end of the flexible plastic banding assembly, and then be secured and fastened into position; and a second aperture through which the other end of the strap fastener is passed and looped on its end to securely connect to the second connector module; wherein the strap fastener couples together the first and second connection blocks under tension, while the first and second ends of the flexible plastic banding are arranged in an overlapping relationship, with the first and second connector blocks spaced apart by a distance, that ensures that the desired degree of tension is created along the plastic banding assembly wrapped about the circumference of the communication tower.

In yet another illustrative embodiment, a communication tower panel security device is provided for securing cover panels covering an antenna service bay arranged within a communication tower having a supporting mast structure, and comprising: a flexible plastic banding assembly including a length of flexible plastic banding having a first end and a second end, and adapted for wrapping around the cover panels of the antenna service bay of the communication tower having the supporting mast structure; wherein the length of flexible plastic banding comprises a length of plastic strip material having (i) a planar portion, (ii) a central track defined by a pair of spaced apart and raised tracks formed along the planar portion, and (iii) a pair of angled flange portions integrally connected to the planar portion and extending outwardly at an acute angle from the plane of the planar portion; a connecting/tensioning assembly for interconnecting with the flexible plastic banding assembly and generating and maintaining sufficient tension forces along the flexible plastic banding assembly to ensure that the flexible plastic banding secures the cover panels in place during expected weather conditions; and wherein said connecting/tensioning assembly comprises (i) a tension strap having first and second ends and being adapted to slide under and be retained within the central track of the flexible plastic banding during installation of said communication tower panel security device about said communication tower; and (ii) a coupling device for coupling together the first and second ends of the tension strap under tension, while the first end and the second end of the flexible plastic banding are arranged in an overlapping relationship, so as to provide a desired degree of tension along the plastic banding wrapped about the circumference of the communication tower. In the illustrative embodiment, the coupling device comprises a buckling device for use in coupling the first and second ends of said tension strap to provide the desired degree of tension when the flexible plastic banding is wrapped about the circumference of the communication tower. The tension along the flexible plastic banding is released by unbuckling the strap buckle and allowing the flexible plastic banding to return to a relaxed state, and thereafter the communication tower panel security device can be removed from the communication tower.

These and other objects will become apparent hereinafter and in the Claims to Invention appended hereto.

BRIEF DESCRIPTION OF THE DRAWINGS

In order to more fully understand the Objects, the following Detailed Description of the Illustrative Embodiments should be read in conjunction with the accompanying Drawings, wherein:

FIG. 2A shows a perspective view of the conventional cell tower flag pole structure of FIGS. 1A and 1B, with the flag and its truck assembly removed from the top of the flag pole structure, as well as the cover panels covering the top three sections of the cell tower structure, revealing antenna structures and associated electronics;

FIG. 2B shows a perspective view of the uppermost portion of the conventional cell tower flag pole structure shown in FIG. 2A;

FIG. 15L is a plan view of the connecting/tensioning module, showing the cord being routed from point P9 at the second end module to point P10 at the sliding module;

FIG. 18A-1 is a cross-sectional view of the connecting/tensioning module of the communication tower panel security device of the first illustrative embodiment shown in FIG. 18A;

FIG. 26B-1 is an elevated cross-sectional view of the connecting/tensioning assembly of the communication tower panel security device of the second illustrative embodiment of the present invention shown in FIG. 26B;

FIG. 26C-1 is a perspective partially fragmented view of the connecting/tensioning assembly of the communication tower panel security device of the second illustrative embodiment of the present invention shown in FIG. 26C;

FIG. 26C-2 is an elevated cross-sectional view of the connecting/tensioning assembly of the communication tower panel security device of the second illustrative embodiment of the present invention shown in FIG. 26C-1;

FIG. 29B is a perspective view of the communication tower panel security device of the third illustrative embodiment of the present invention, showing the tensioning handle lifted up and disposed in the crank and tighten position;

FIG. 29C is a first perspective view of the communication tower panel security device of the third illustrative embodiment of the present invention, showing with the tensioning handle arranged in the pushed down cord-tightened position;

FIG. 29D is a second perspective view of the communication tower panel security device of the third illustrative embodiment of the present invention, showing with the tensioning handle arranged in the pushed down cord-tightened position;

FIG. 29E is a cross-sectional view of the communication tower panel security device of the third illustrative embodiment of the present invention, shown with its tensioning handle arranged in the pushed down cord-tightened position, and the plastic casing removed from the connecting/tensioning assembly;

FIG. 30 is an elevated side view of a cellular communication tower (CCT) equipped with multiple communication tower panel security devices according to the fourth illustrative embodiment of the present invention, illustrated in FIGS. 31 through 34C;

FIG. 31 is a perspective view of the communication tower panel security device of the fourth illustrative embodiment that is fastened to an antenna bay of a communication tower shown in FIG. 30, and secured tightly thereabout;

FIG. 32 is an exploded view of the communication tower panel security device of the fourth illustrative embodiment of the present invention, shown in FIG. 31;

Figure 1B:
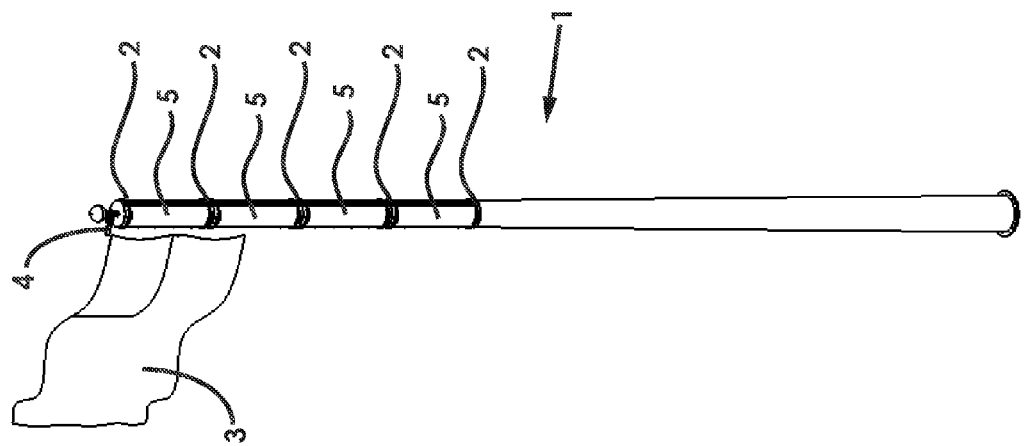
FIGS. 1A and 1B show two different perspective views of a cell tower flag pole structure, employing a conventional system of spring-biased (i.e. spring-loaded) panel banding devices that wrap around the circumference of the cell-tower flag pole structure at different height locations, and secure the panels in place against displacement in the presence of high winds and other foul weather conditions.
Figure 1A:
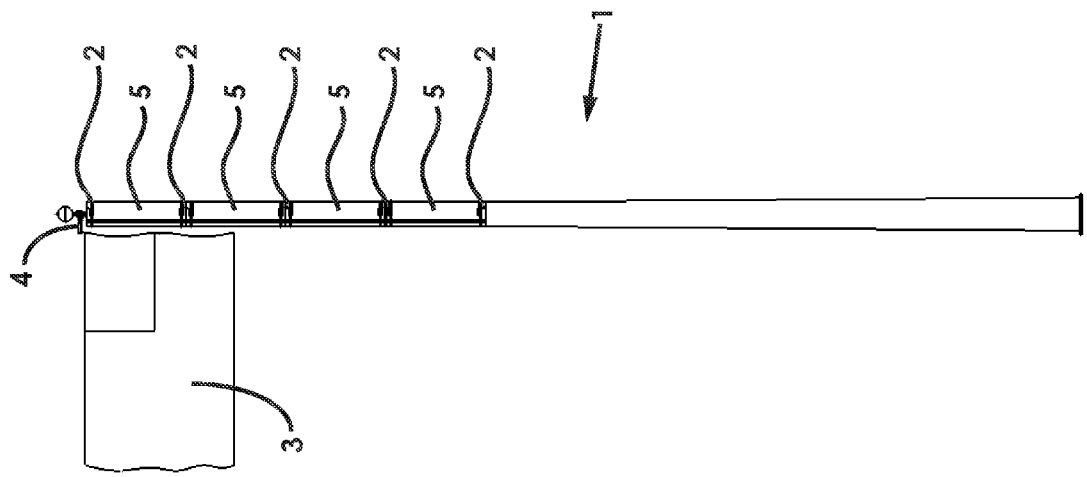
Figure 3A:
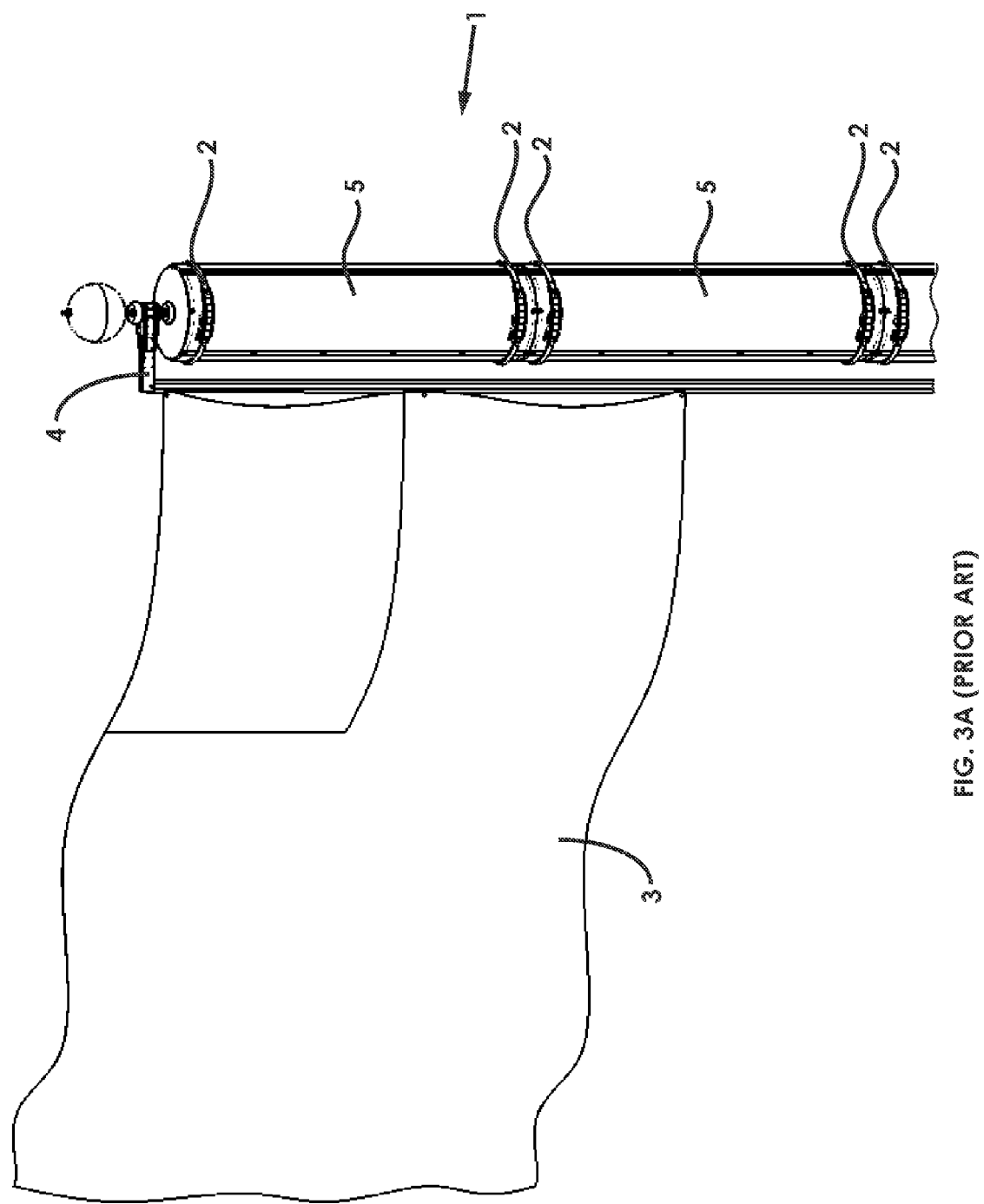
FIG. 3A shows a perspective view of the cell tower flag pole structure of FIGS. 1A and 1B, with a set of spring-biased panel banding devices wrapped around the circumference of the cell-tower flag pole structure at different height locations, to secure the panels in place against displacement in the presence of high winds and other foul weather conditions.
Figure 3B:
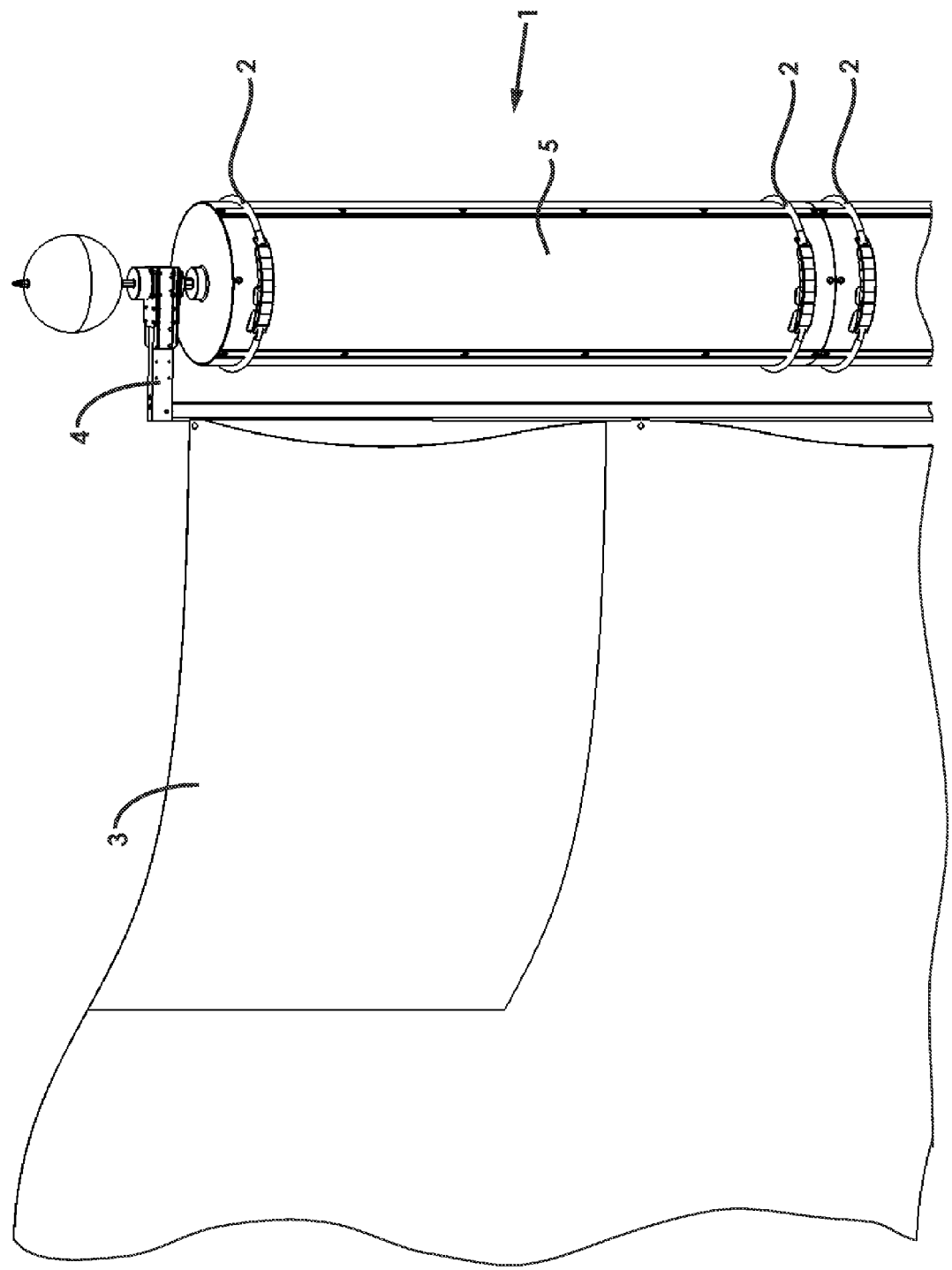
FIG. 3B an enlarged perspective view of the cell tower flag pole structure shown in FIG. 3A, showing a set of spring-biased panel banding devices, each being wrapped around the circumference of the cell-tower flag pole structure at different height locations, to secure the panels in place using a metal strap (ii) covered in rigid (i.e. non-compressible) protective plastic tubing to prevent fraying, ripping or abrasion of a mounted flag, and (ii) connected together using a latched and spring-loaded strap connecting assembly.
Figure 4A:
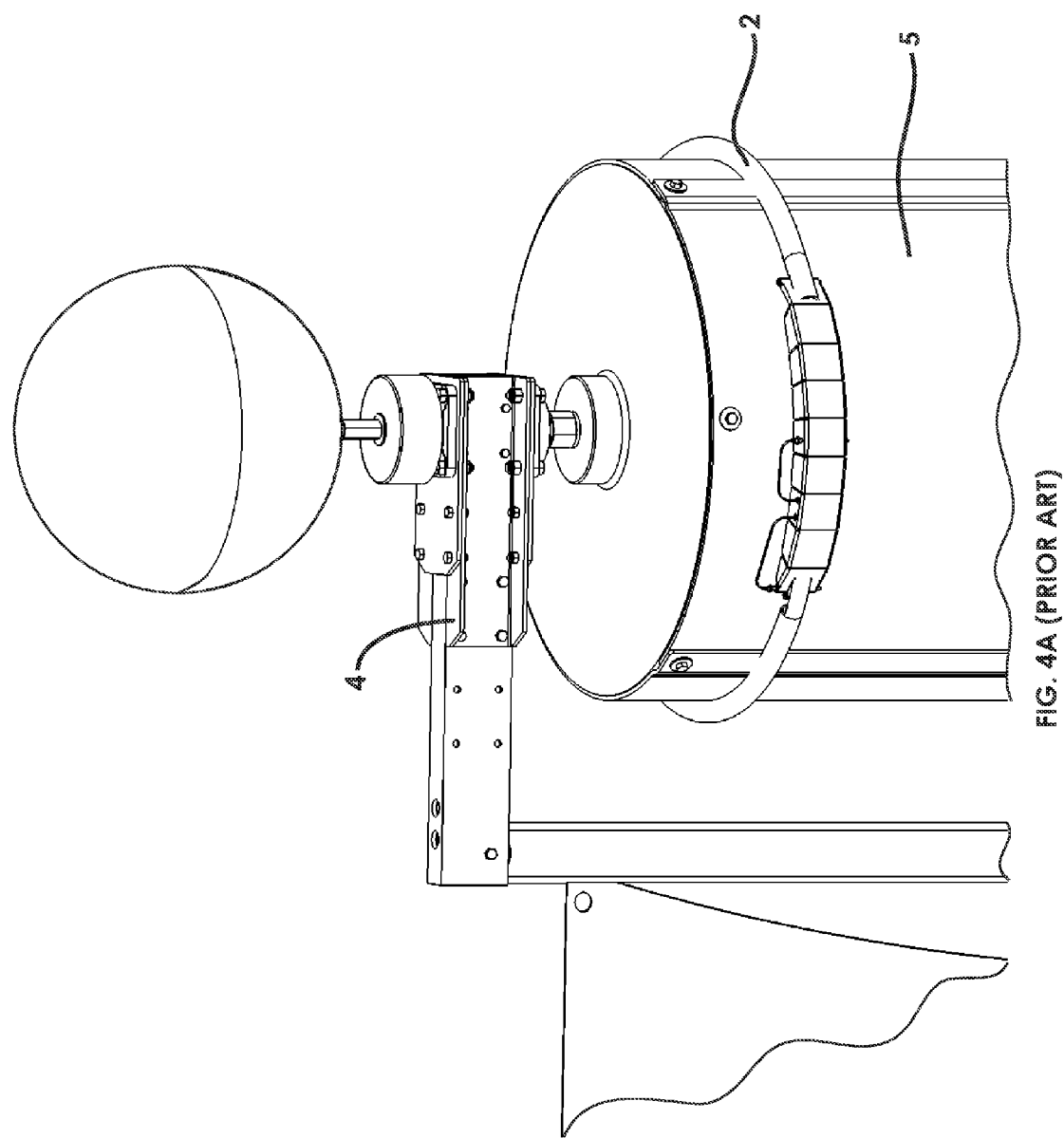
FIG. 4A is an enlarged perspective view of the top portion of the cell tower flag pole structure shown in FIGS. 3A and 3B, showing the topmost spring-loaded panel banding devices wrapped around the circumference of the cell-tower flag pole structure at different height locations, to secure the panels in place against displacement in the presence of high winds and other foul weather conditions.
Figure 4B:
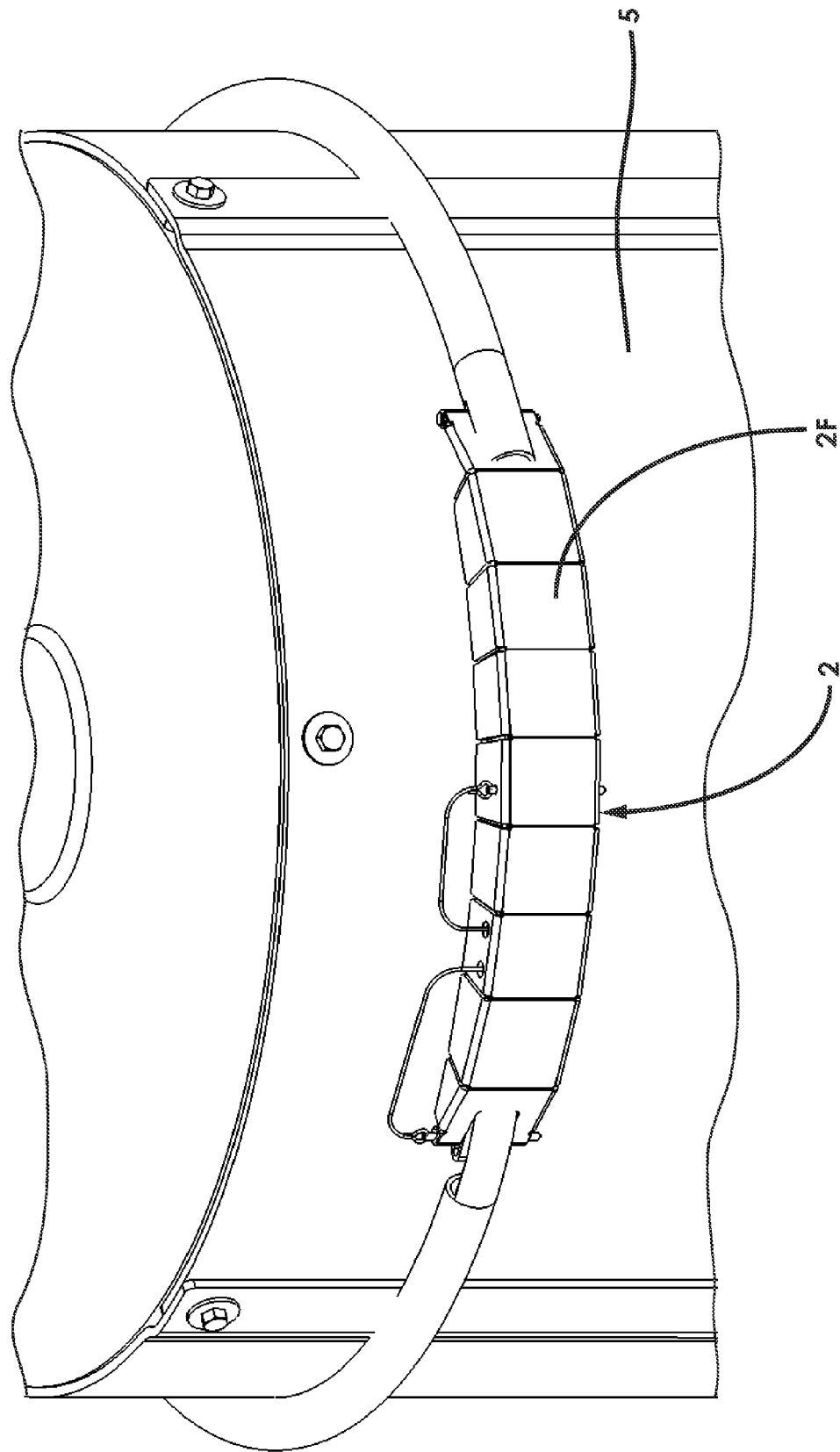
FIG. 4B is an enlarged perspective view of the top portion of the cell tower flag pole structure shown in FIGS. 3A and 3B, showing the top-most spring-biased panel banding device wrapped around the circumference of the cell-tower flag pole structure at topmost portion of the flag pole structure, arranged in its locked configuration, to secure the topmost panel in place against displacement in the presence of high winds and other foul weather conditions.
Figure 4C:
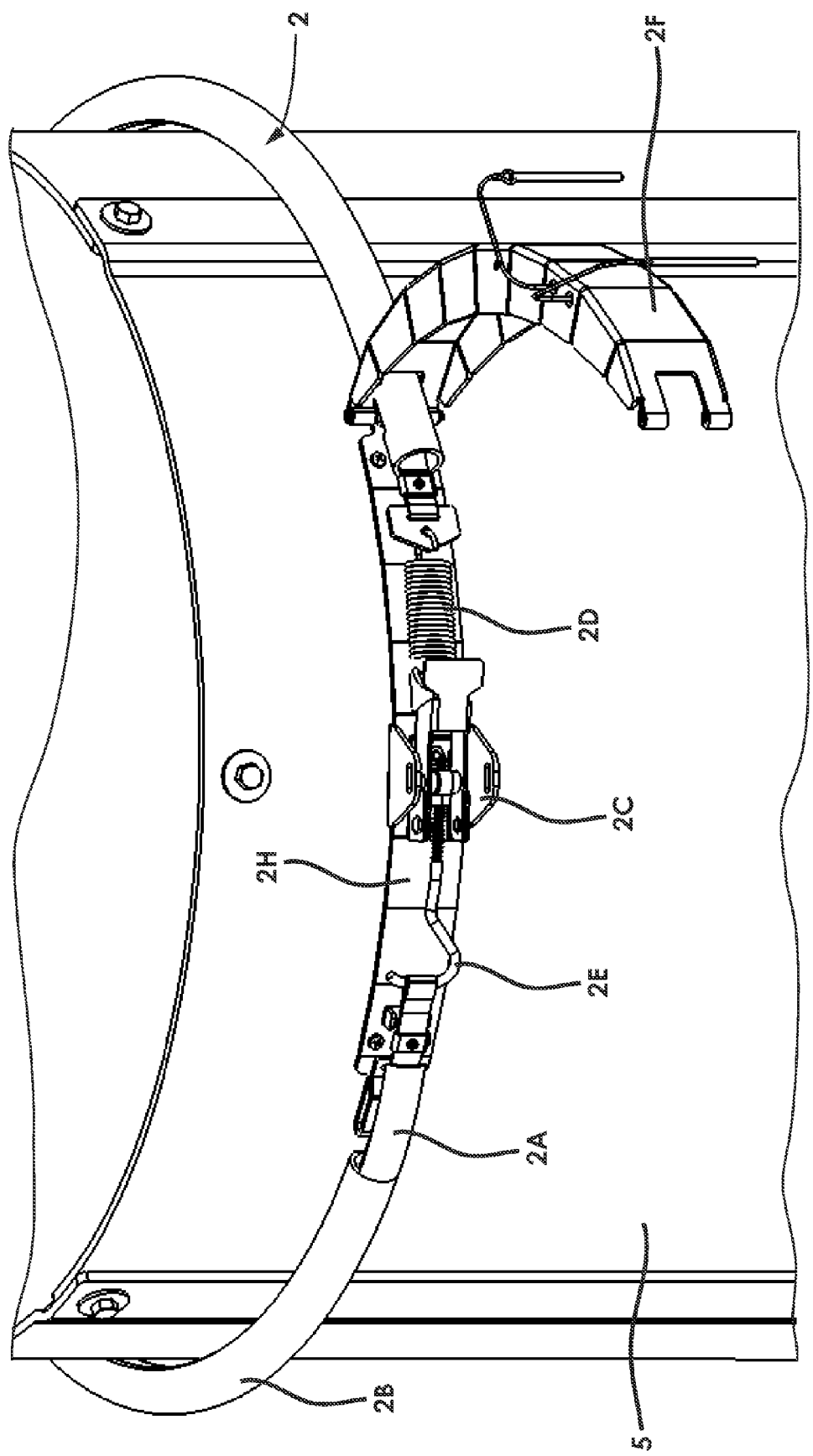
FIG. 4C is an enlarged perspective view of the top portion of the cell tower flag pole structure shown in FIGS. 3A and 3B, showing the topmost spring-biased panel banding device wrapped around the circumference of the cell-tower flag pole structure at topmost panel section of the flag pole structure, arranged in its unlocked configuration.
Figure 5A:
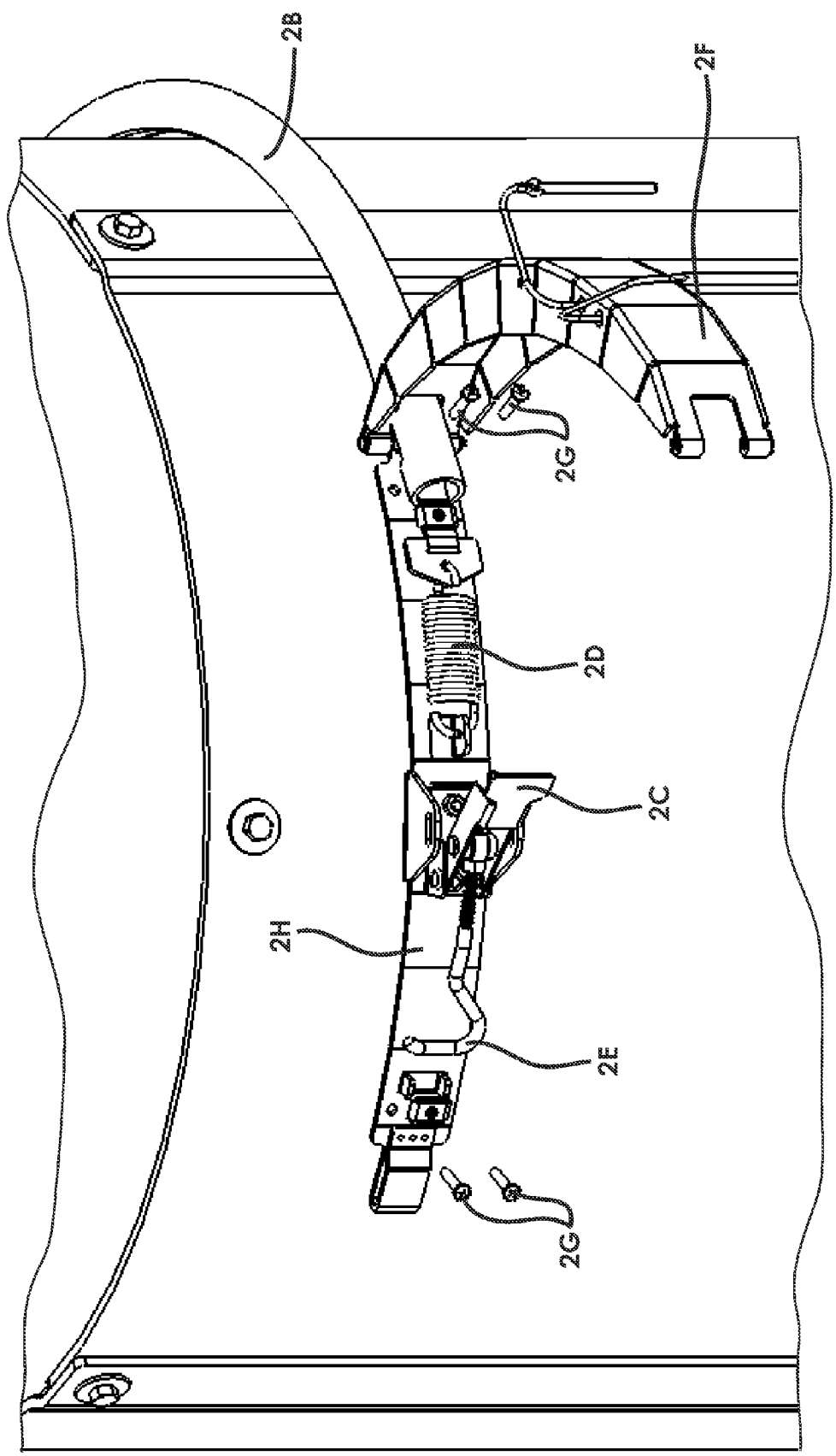
FIGS. 5A and 5B show the first step of mounting a conventional spring-biased panel banding device of FIGS. 3A and 3B to the cover panel of the cell-tower flag pole structure, involving the passing of four self-tapping screws through the four corners of the base portion of the banding device into the cover panel section, to mount the panel banding device to the cover panel section.
Figure 5B:
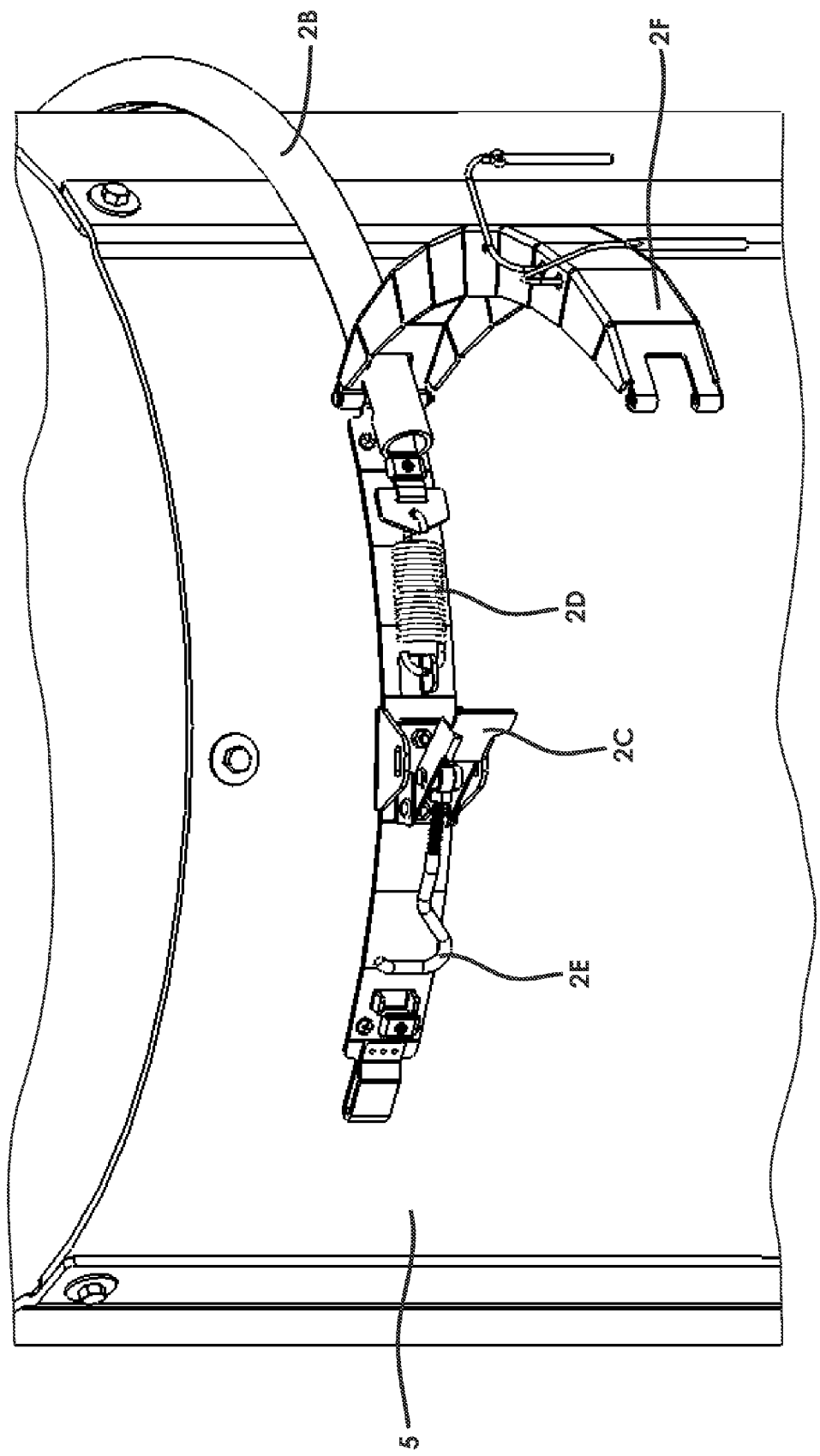
Figure 5C:
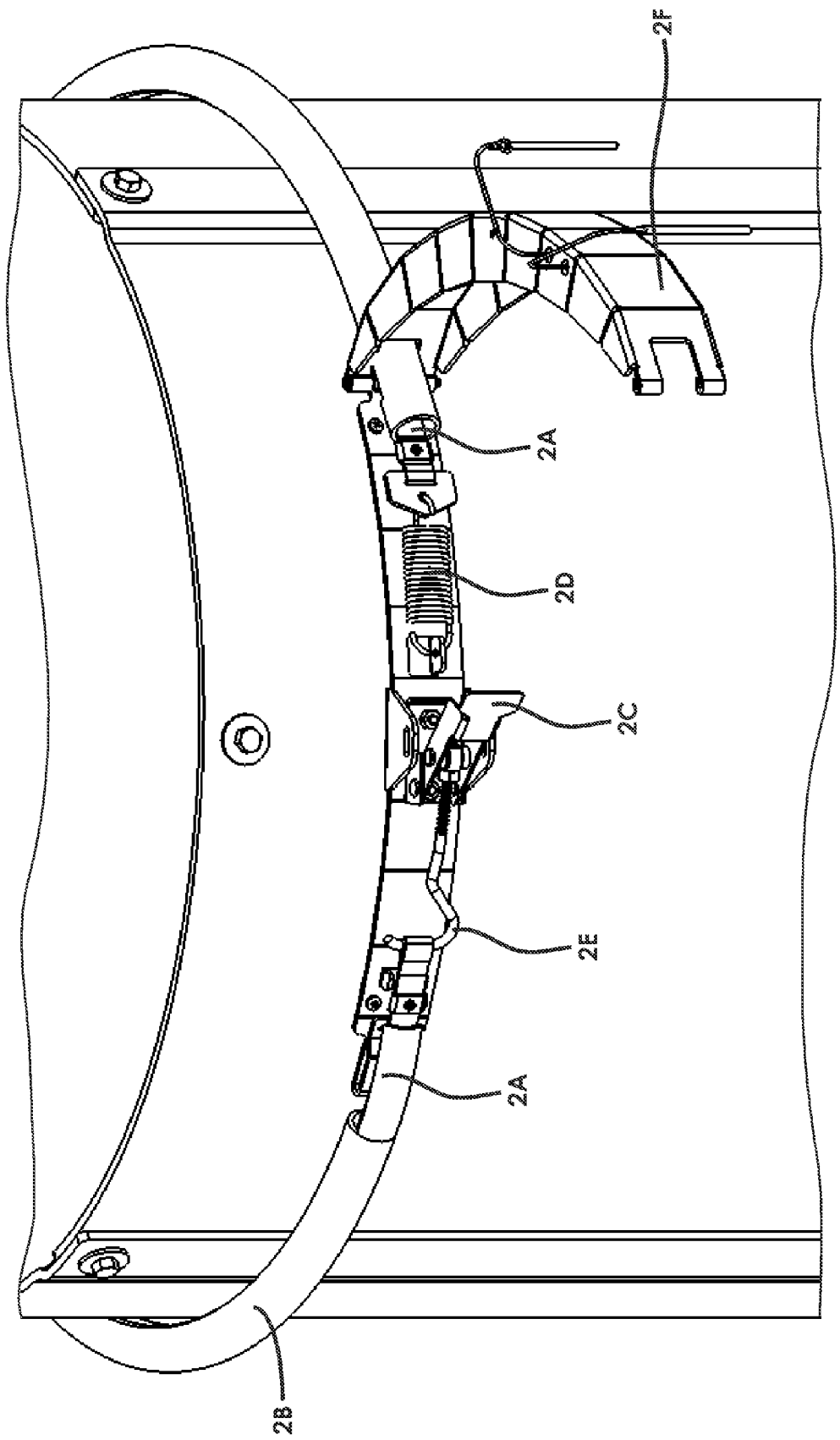
FIG. 5C shows the second step of mounting a conventional spring-biased panel banding device of FIGS. 3A and 3B to the cover panel of the cell-tower flag pole structure, involving the wrapping of the strap and strap cover around the tower, and connected to the hook fastener provided in the panel-banding device.
Figure 5D:
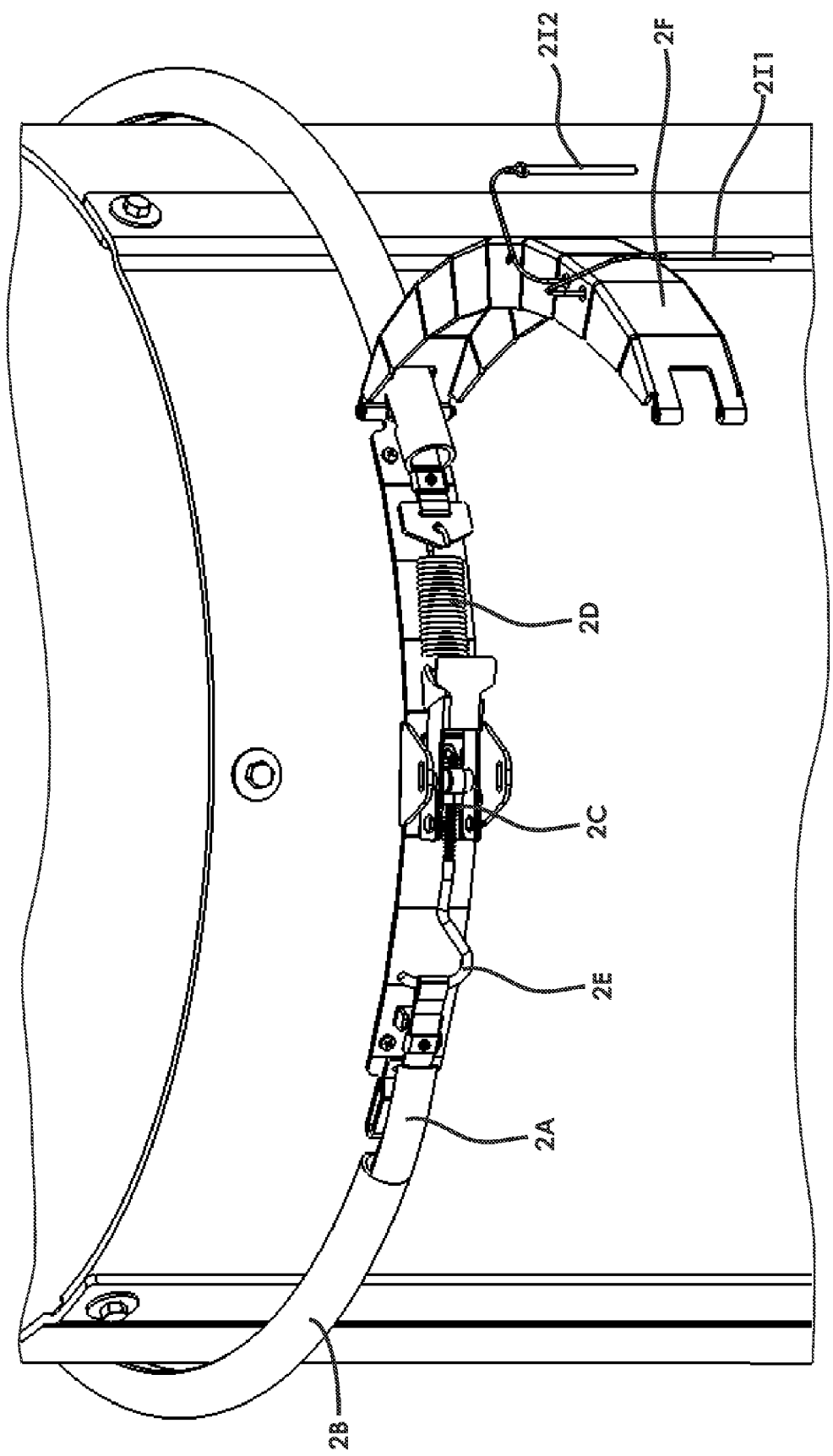
FIG. 5D shows the third step of mounting a conventional spring-biased panel banding device of FIGS. 3A and 3B to the cover panel of the cell-tower flag pole structure, involving closing the latch portion of the panel banding device to tightening up the covered strap extending around the panel sections of the tower structure.
Figure 5E:
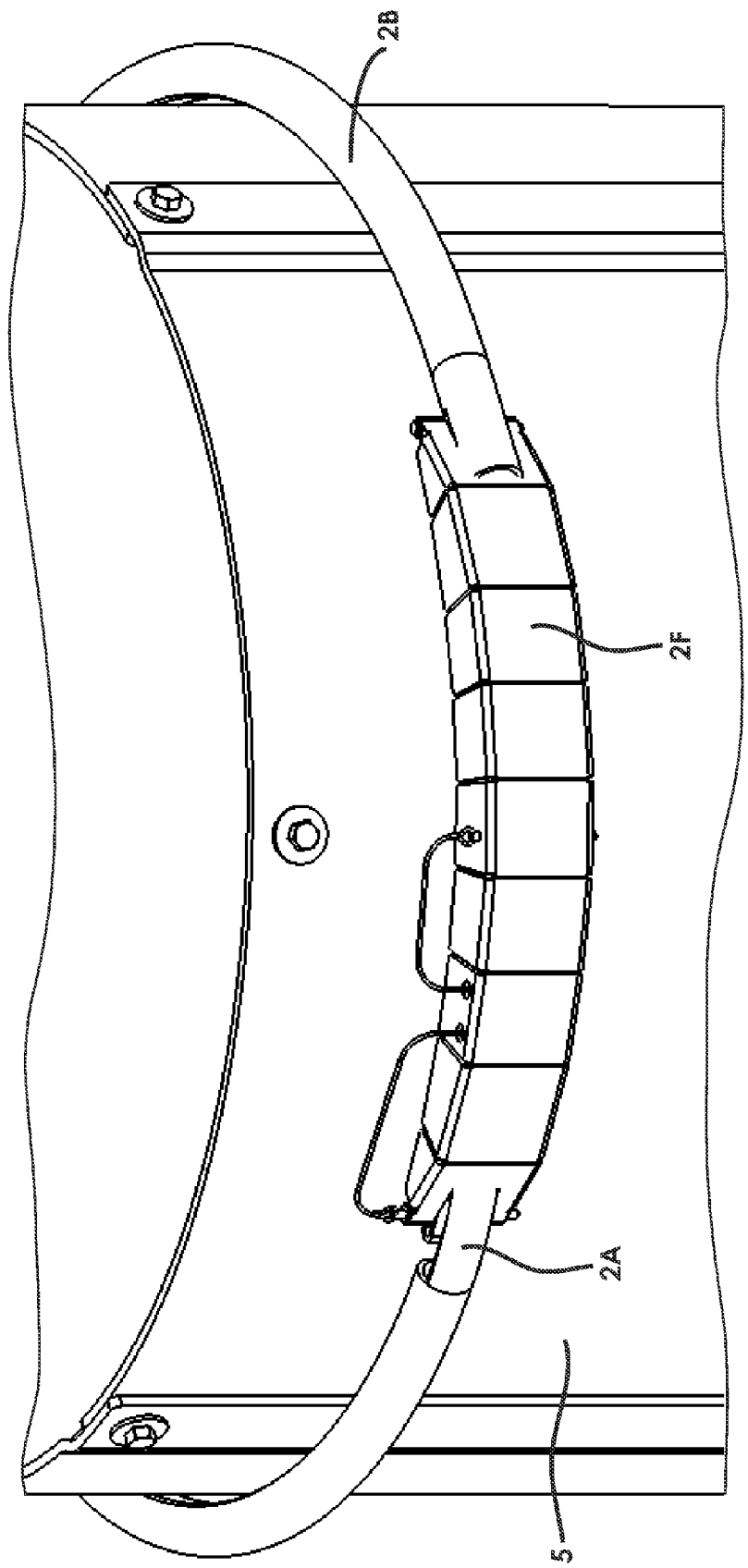
FIG. 5E shows the fourth step of mounting a conventional spring-biased panel banding device of FIGS. 3A and 3B to the cover panel of the cell-tower flag pole structure, involving closing the cover portion of the panel-banding device, thereby expanding the spring within the panel-banding device, tightening the covered strap against the cover panel sections of the tower structure, and thereafter, inserting the retaining pins to secure the cover and base portions while arranged in the closed configuration.
Figure 6:
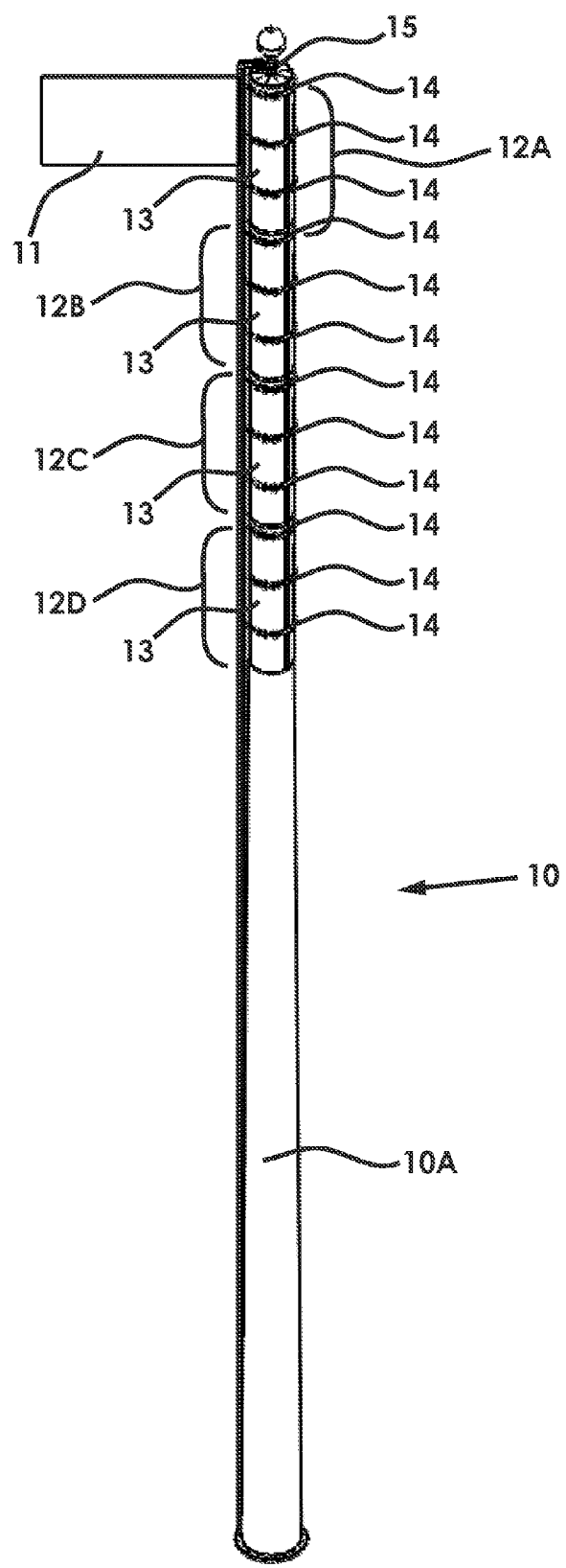
FIG. 6 shows a communication tower, adapted to support and a flag (e.g. The American Flag), and having multiple antenna service bays covered by radio-transparent antenna bay cover shroud (i.e. shroud) panels which are each secured by several cellar communication tower panel security devices of the first illustrative embodiment of the present invention illustrated in FIGS. 6I through 22E.
Figure 6A:
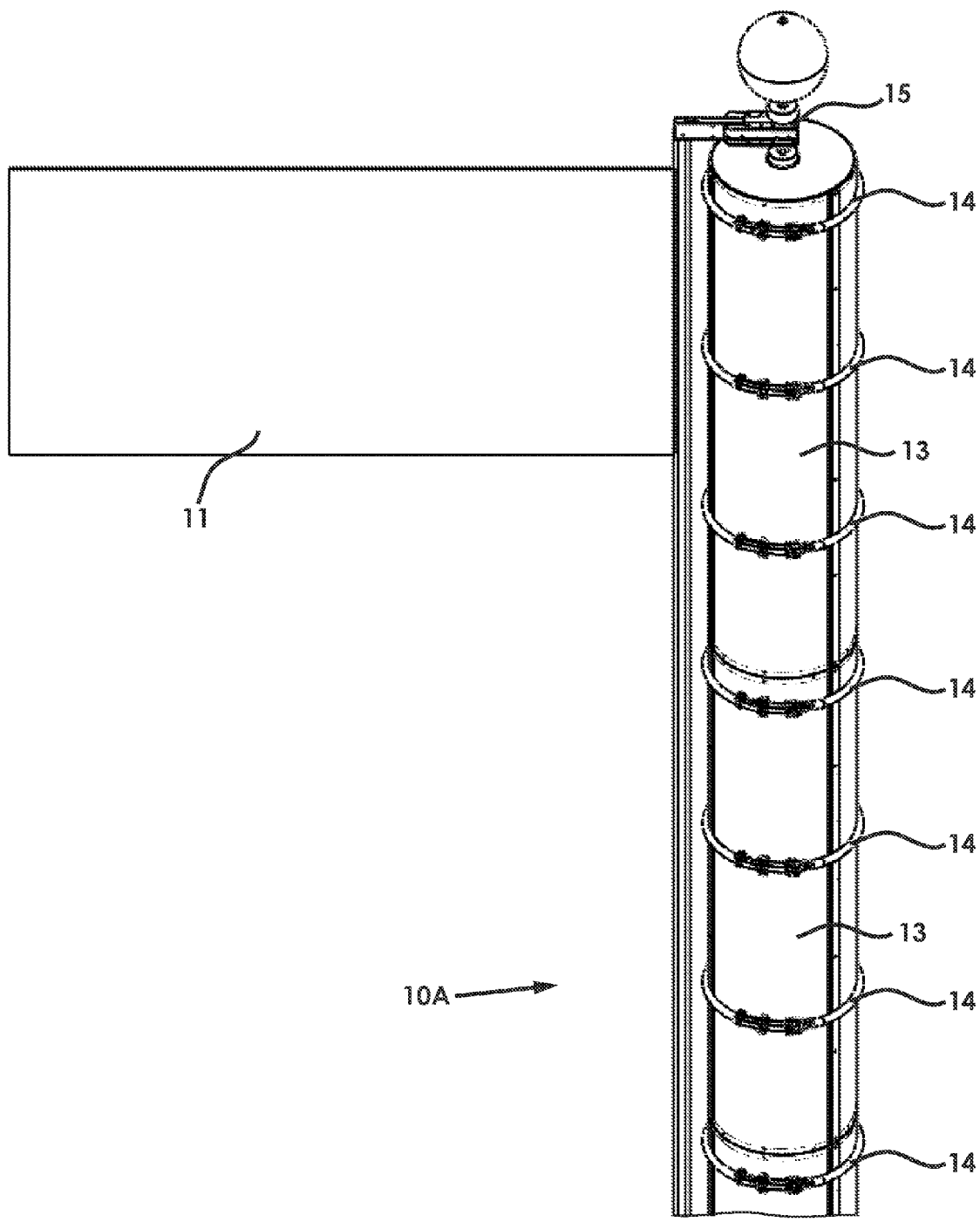
FIG. 6A shows a perspective enlarged view of the top portion of the communication tower illustrated in FIG. 6.
Figure 33A:
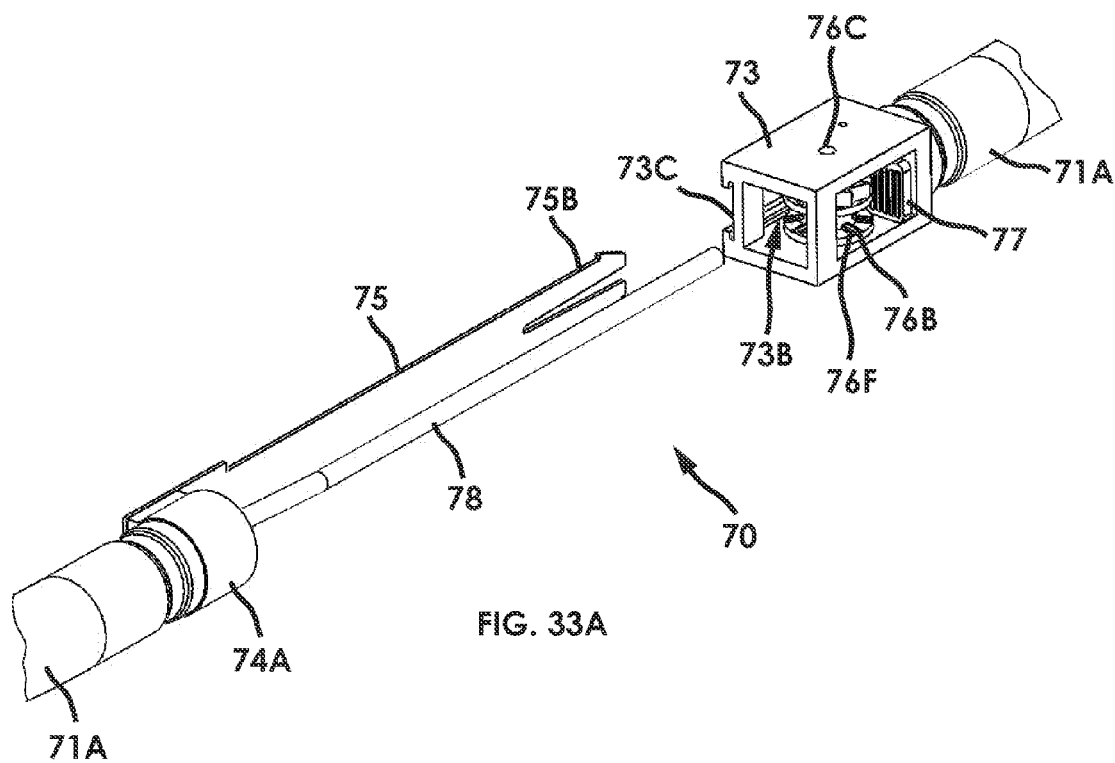
Figure 33B:
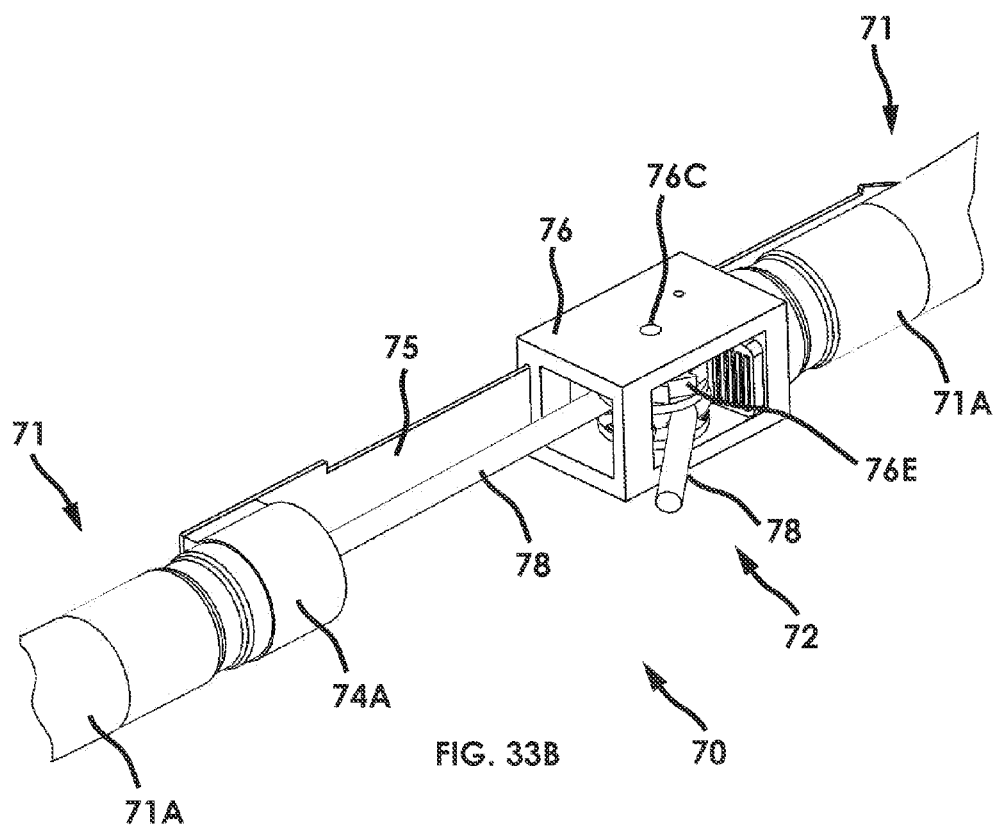
Figure 33C:
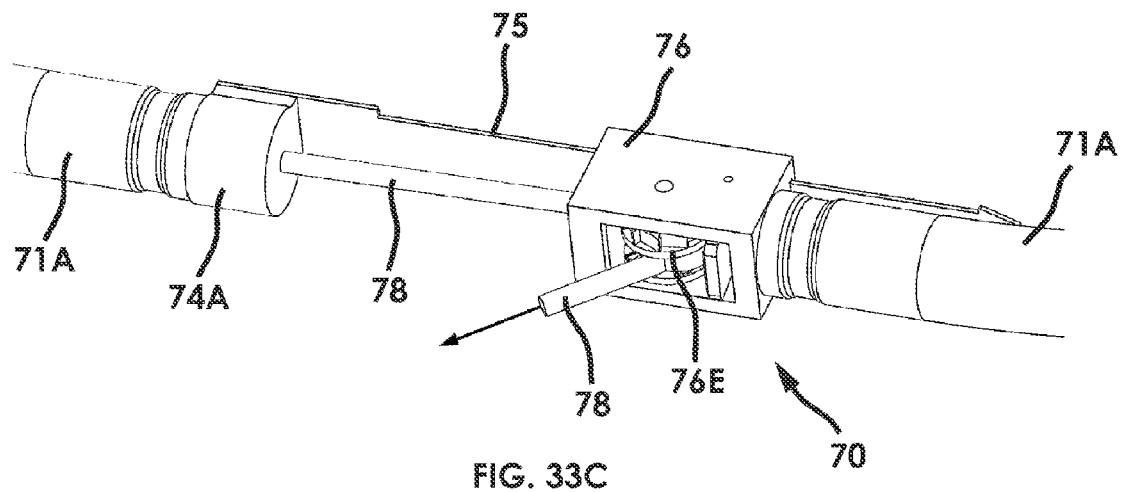
Figure 34:
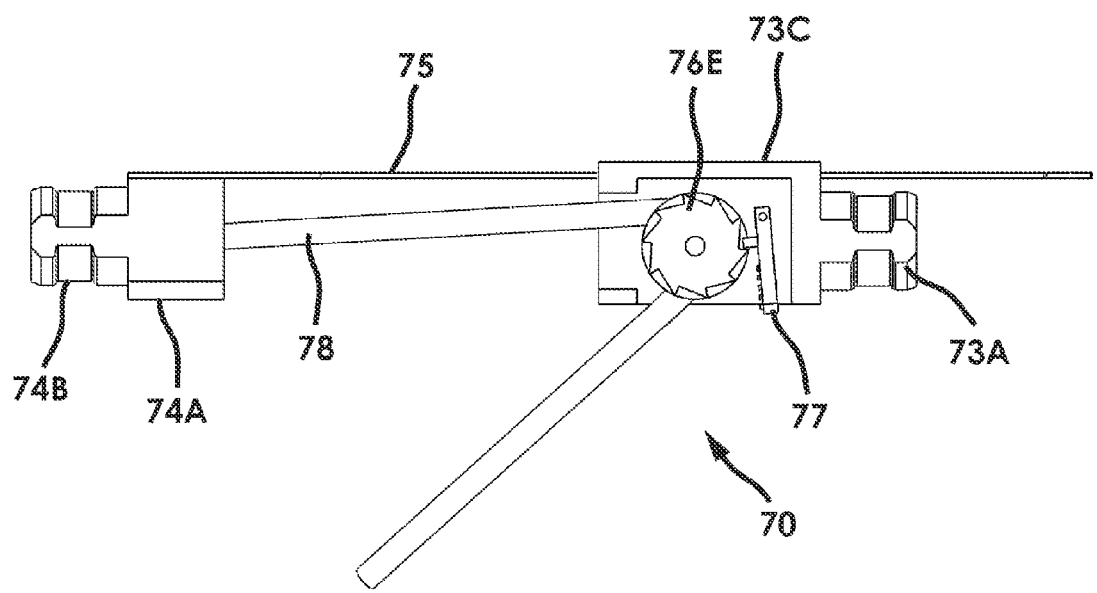
Figure 35:
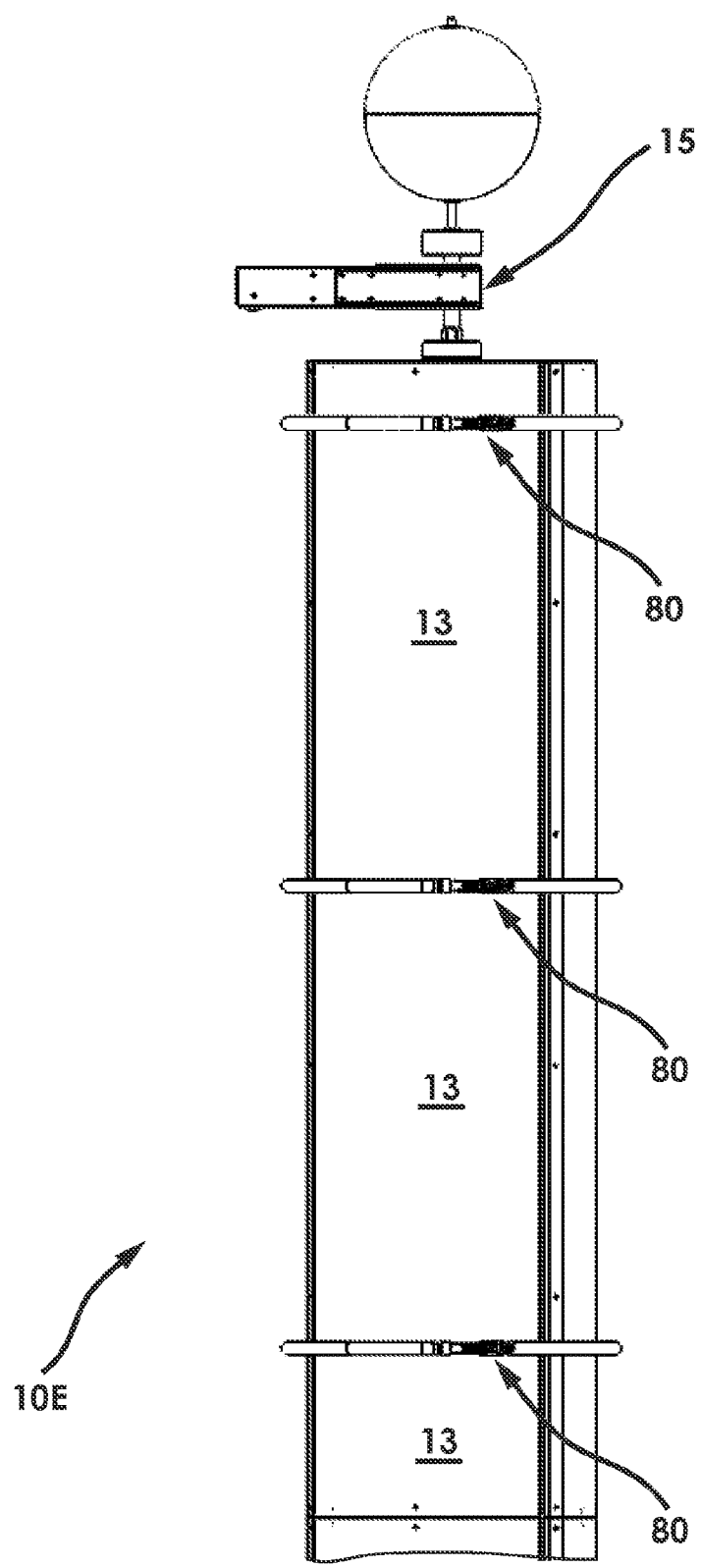
Figure 36:
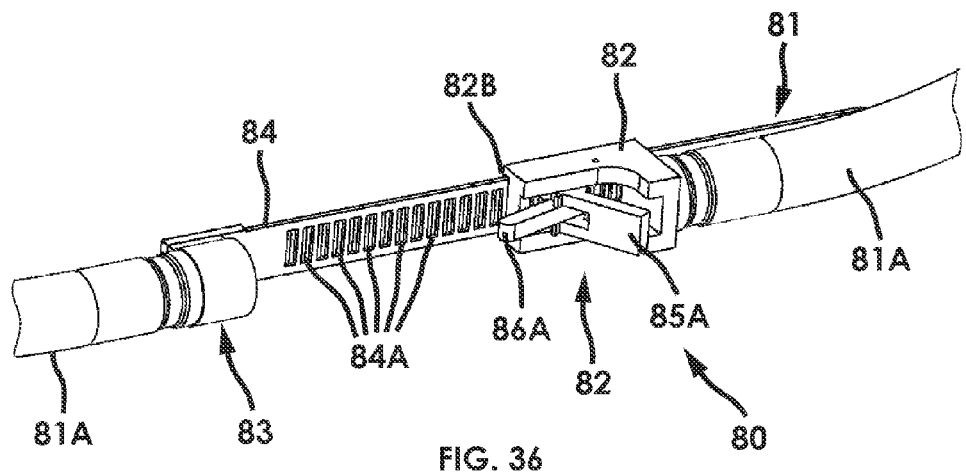
Figure 37:
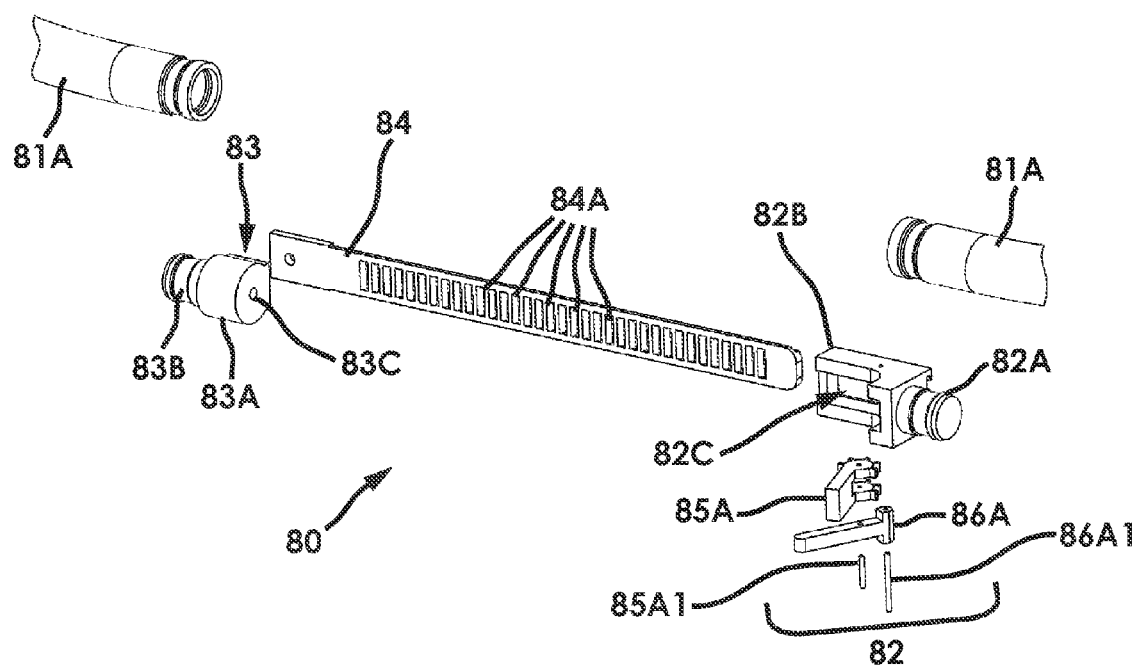
Figure 38A:
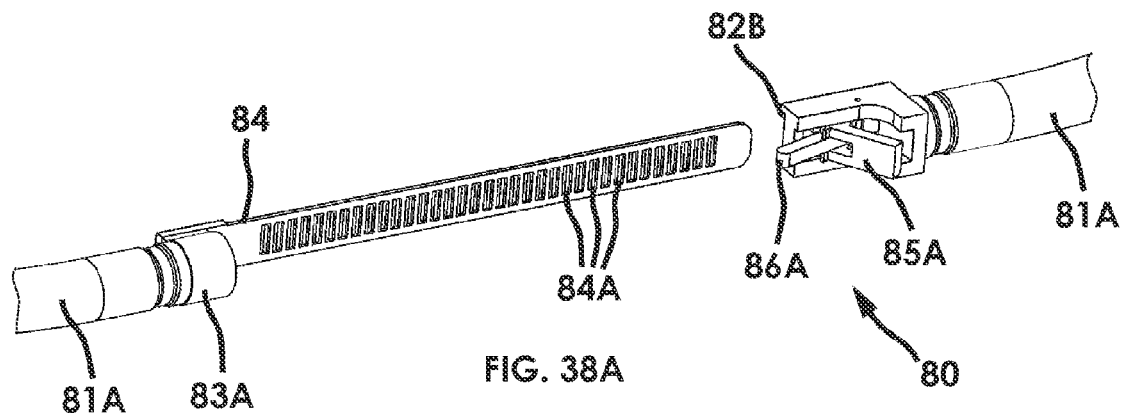
Figure 38B:
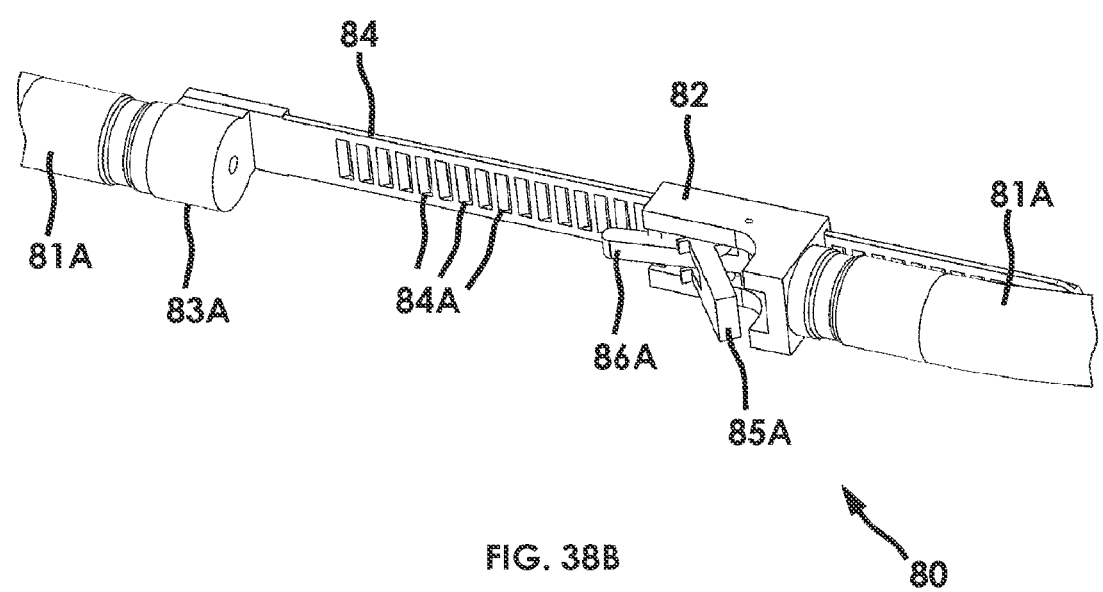
Figure 38C:
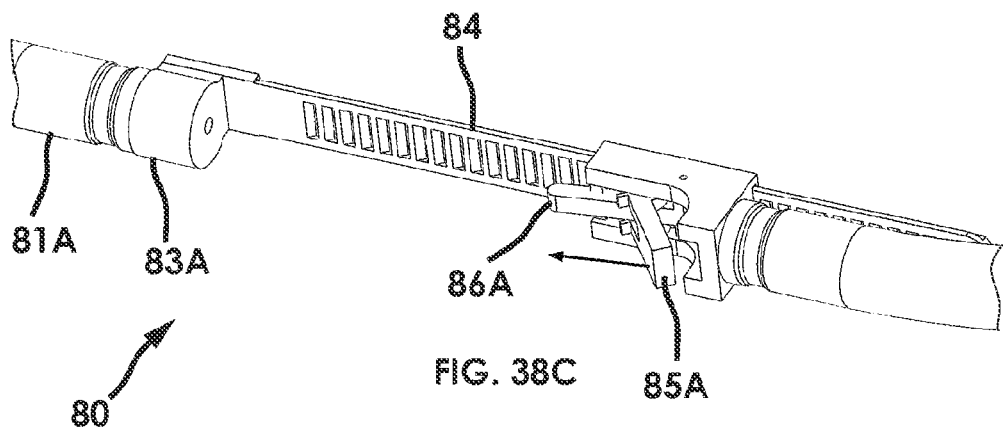
Figure 38D:
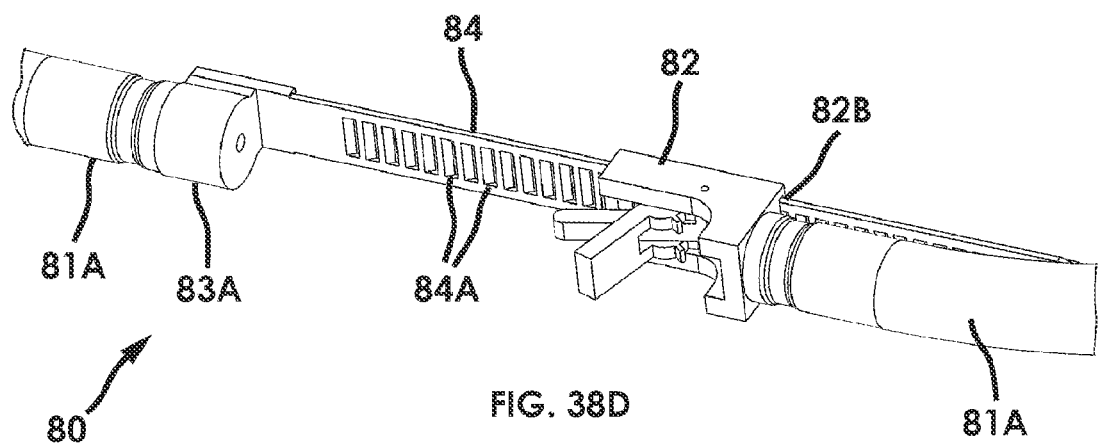
Figure 38E:
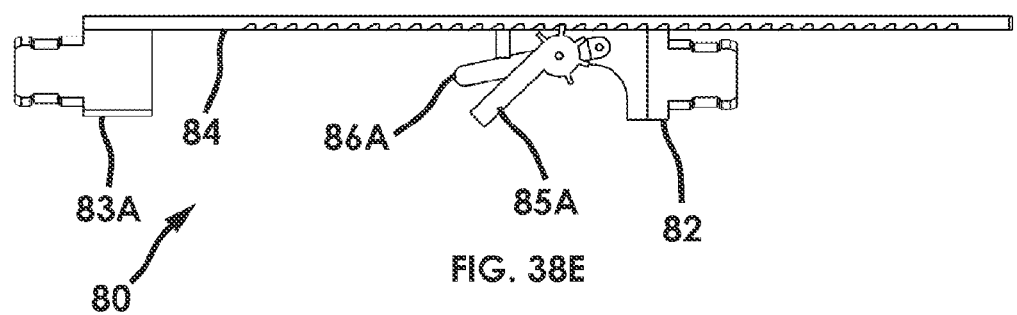
Figure 38F:
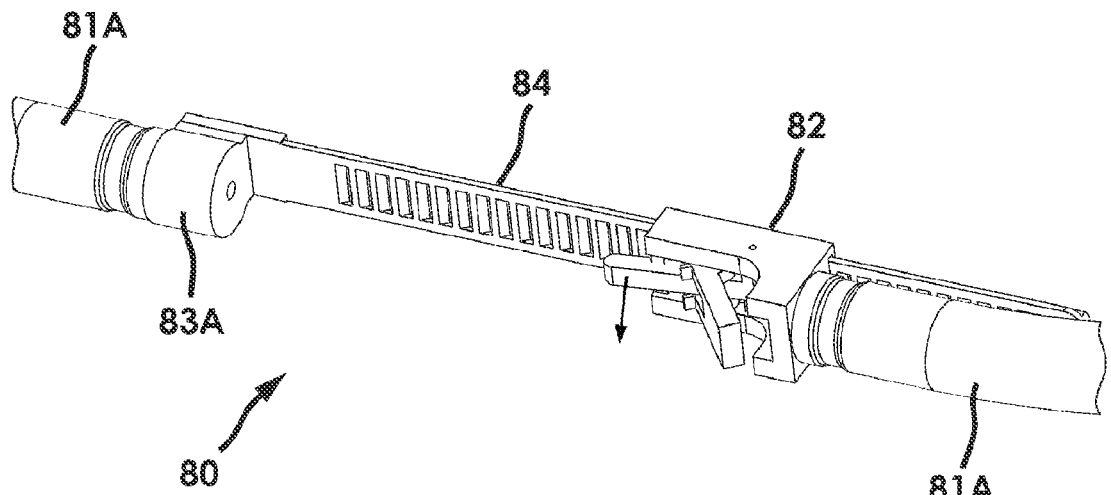
Figure 38G:
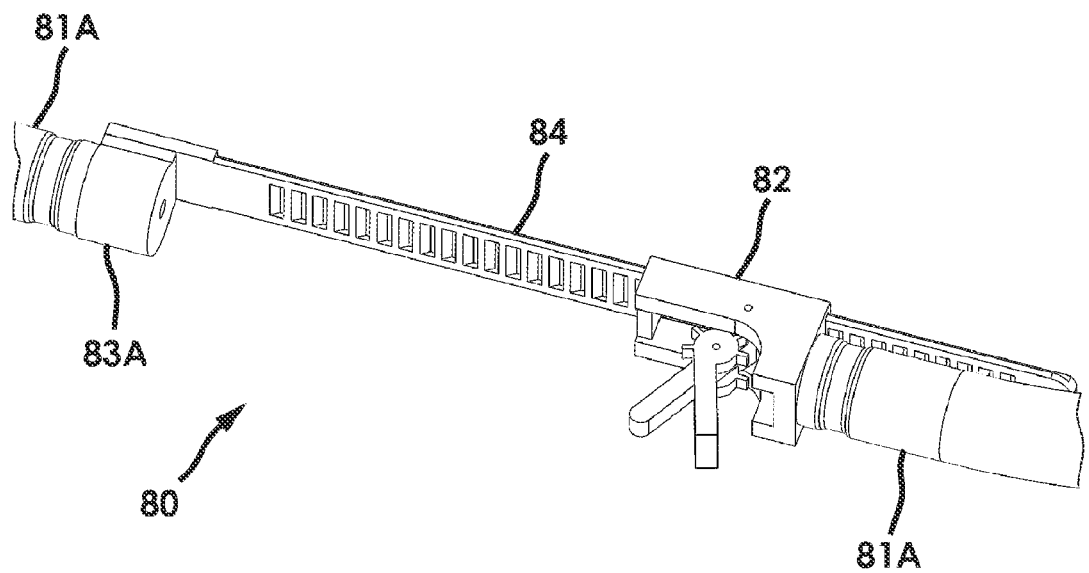
Figure 39:
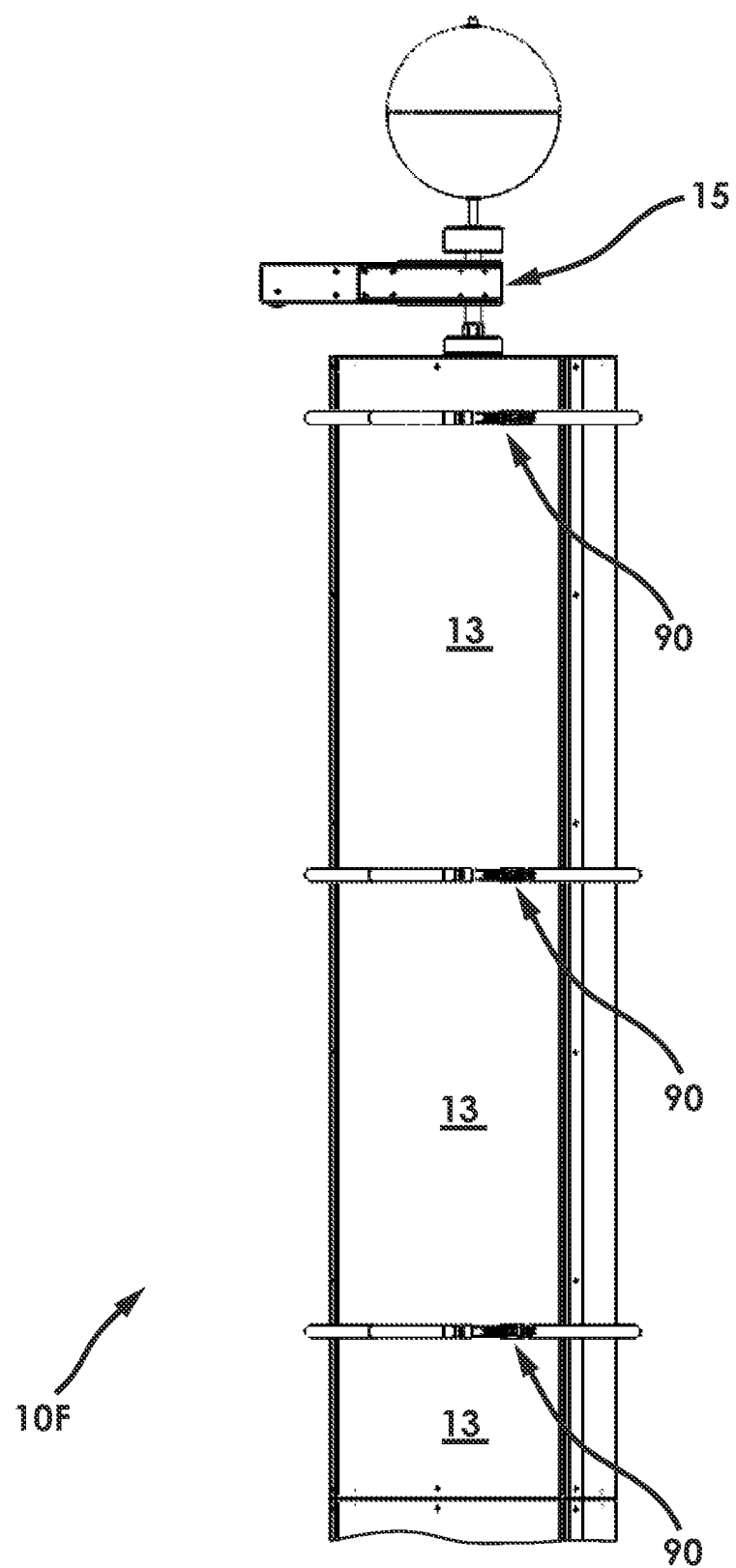
Figure 40A:
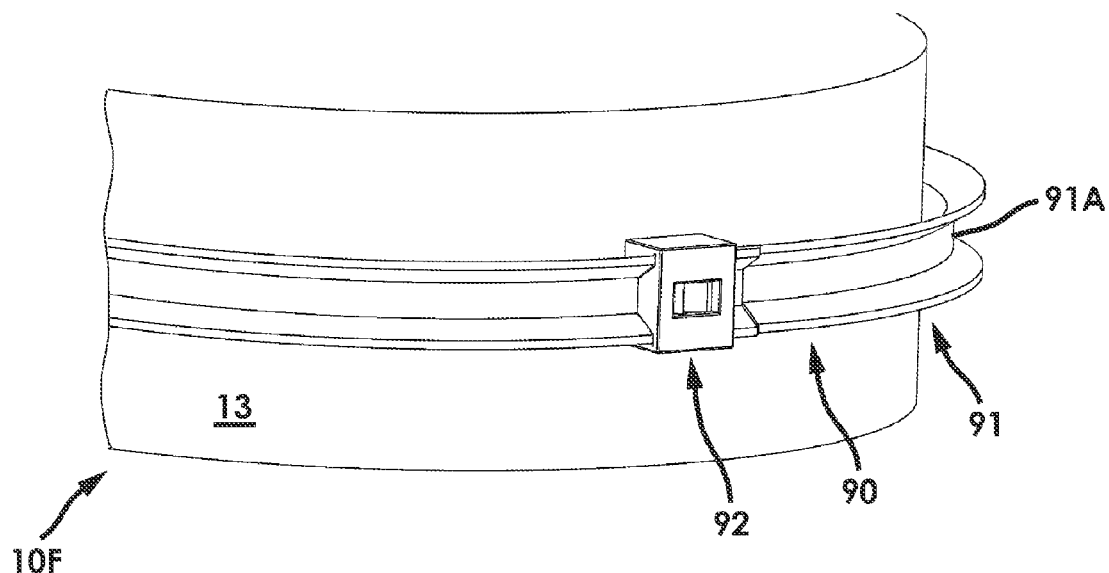
Figure 40B:
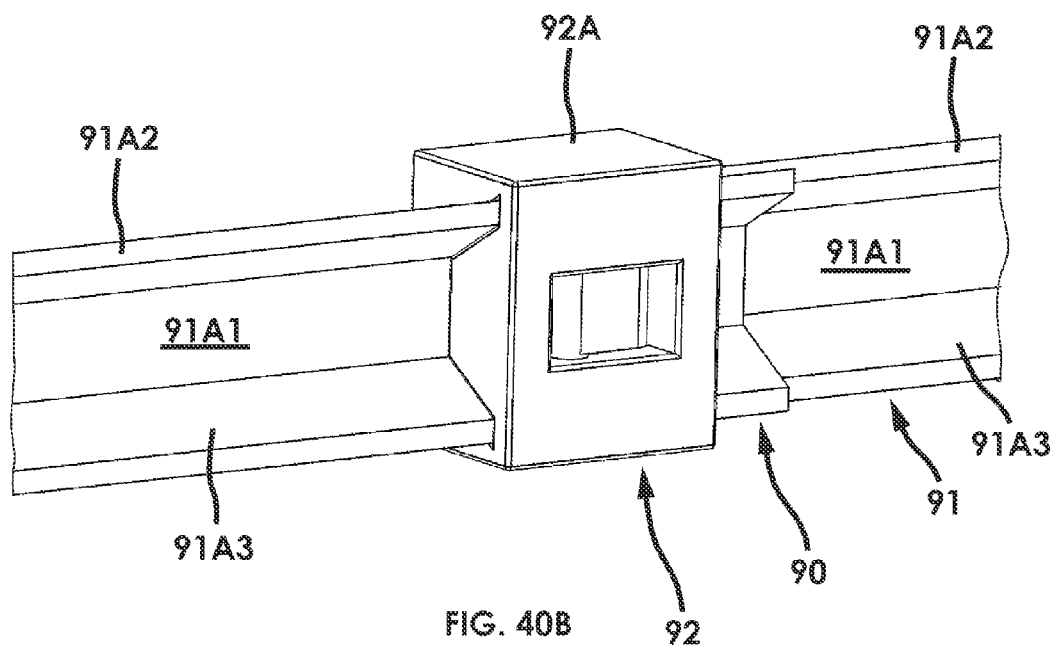
Figure 41:
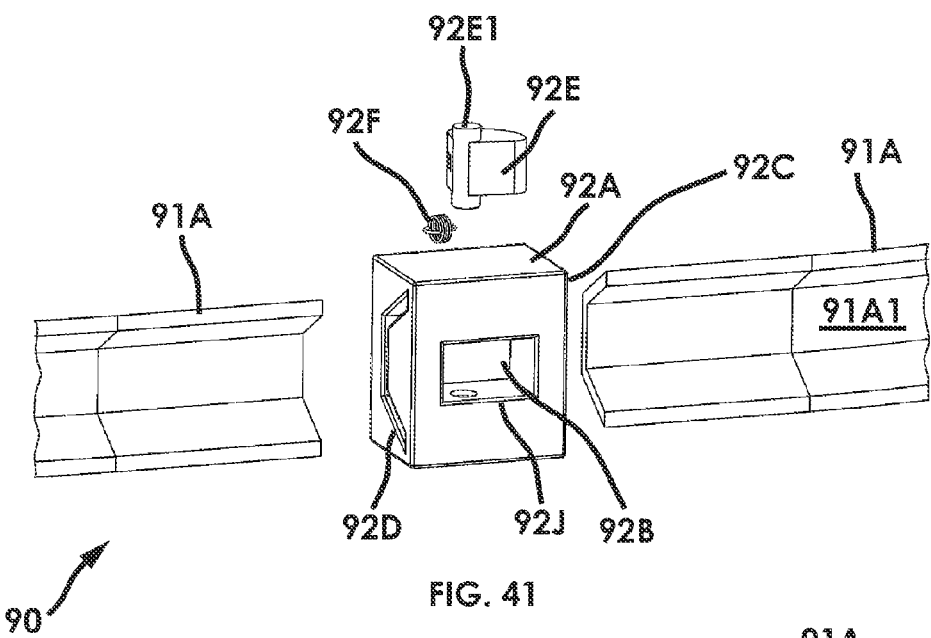
Figure 42A:
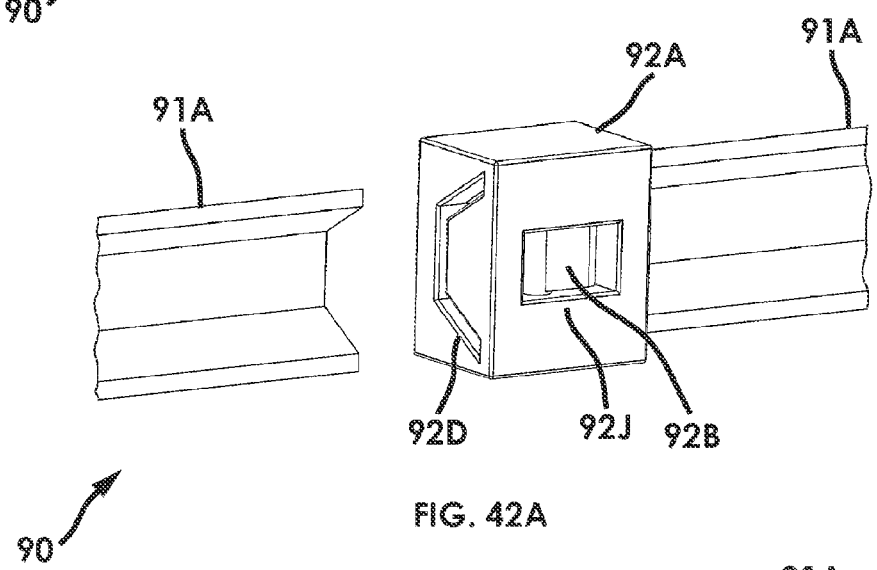
Figure 42B:
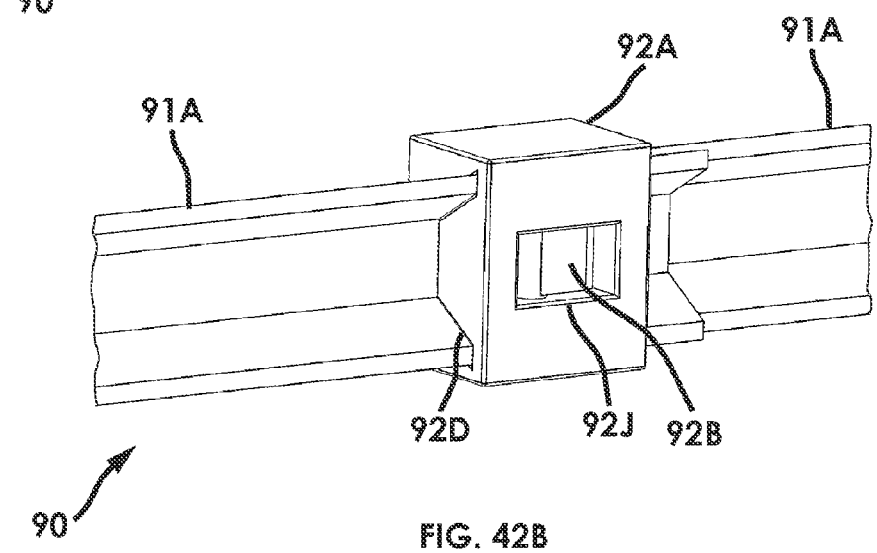
Figure 43A:
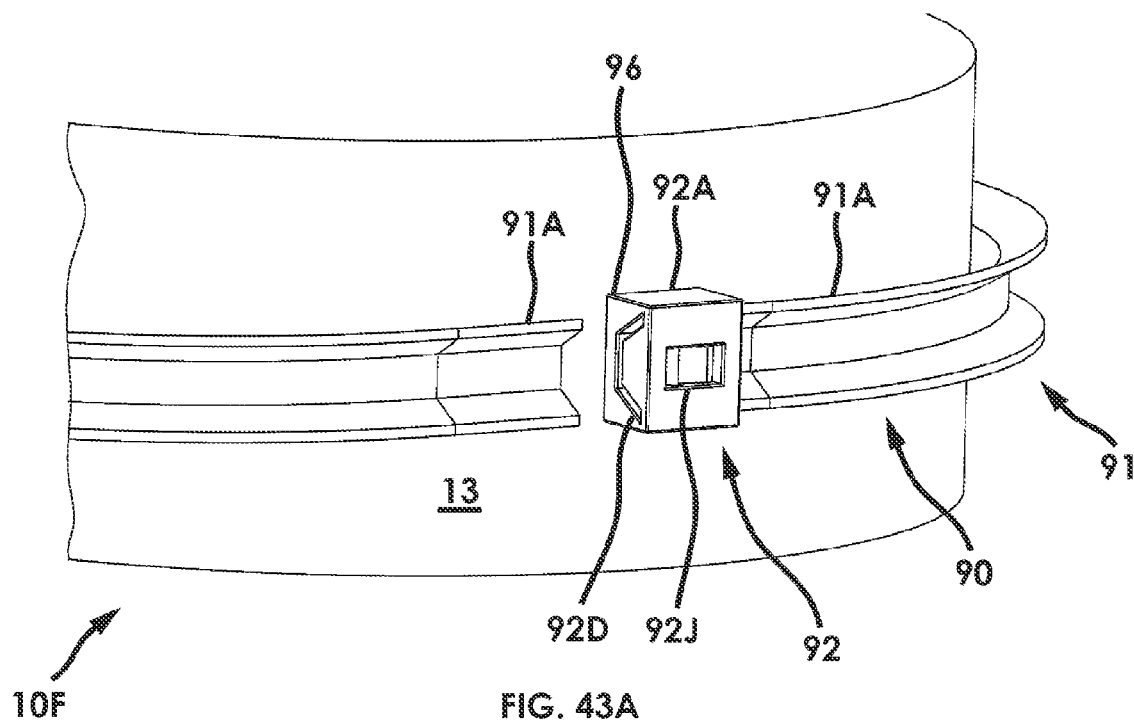
Figure 43B:
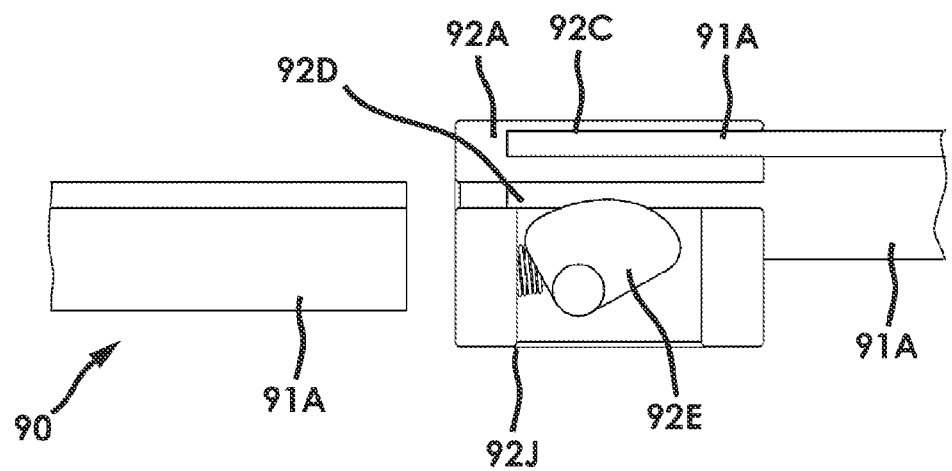
Figure 44A:
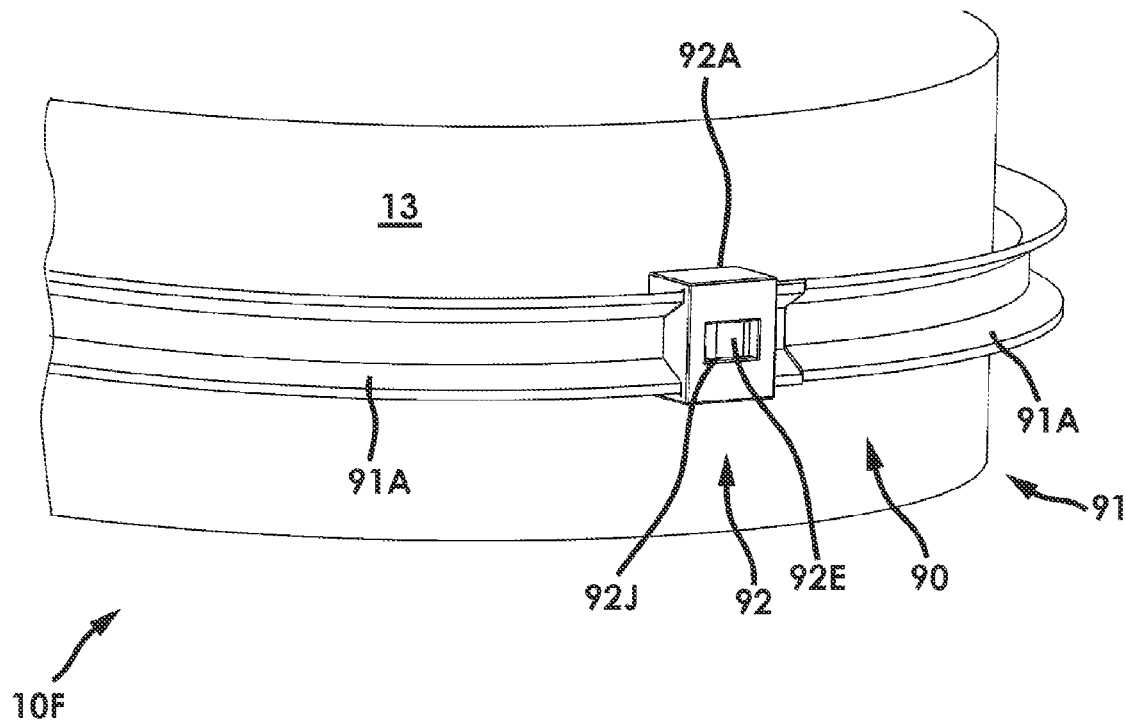
Figure 44B:
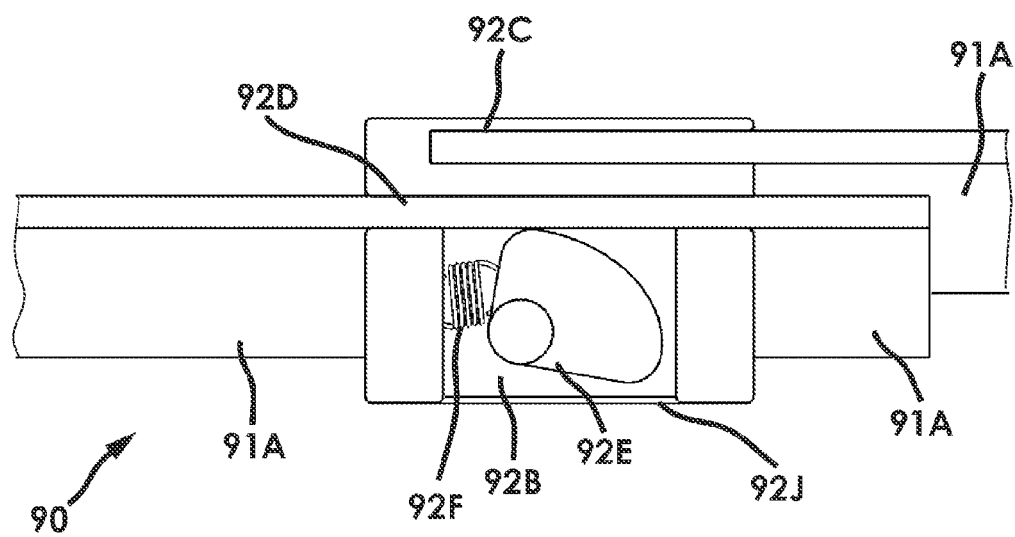
Figure 45:
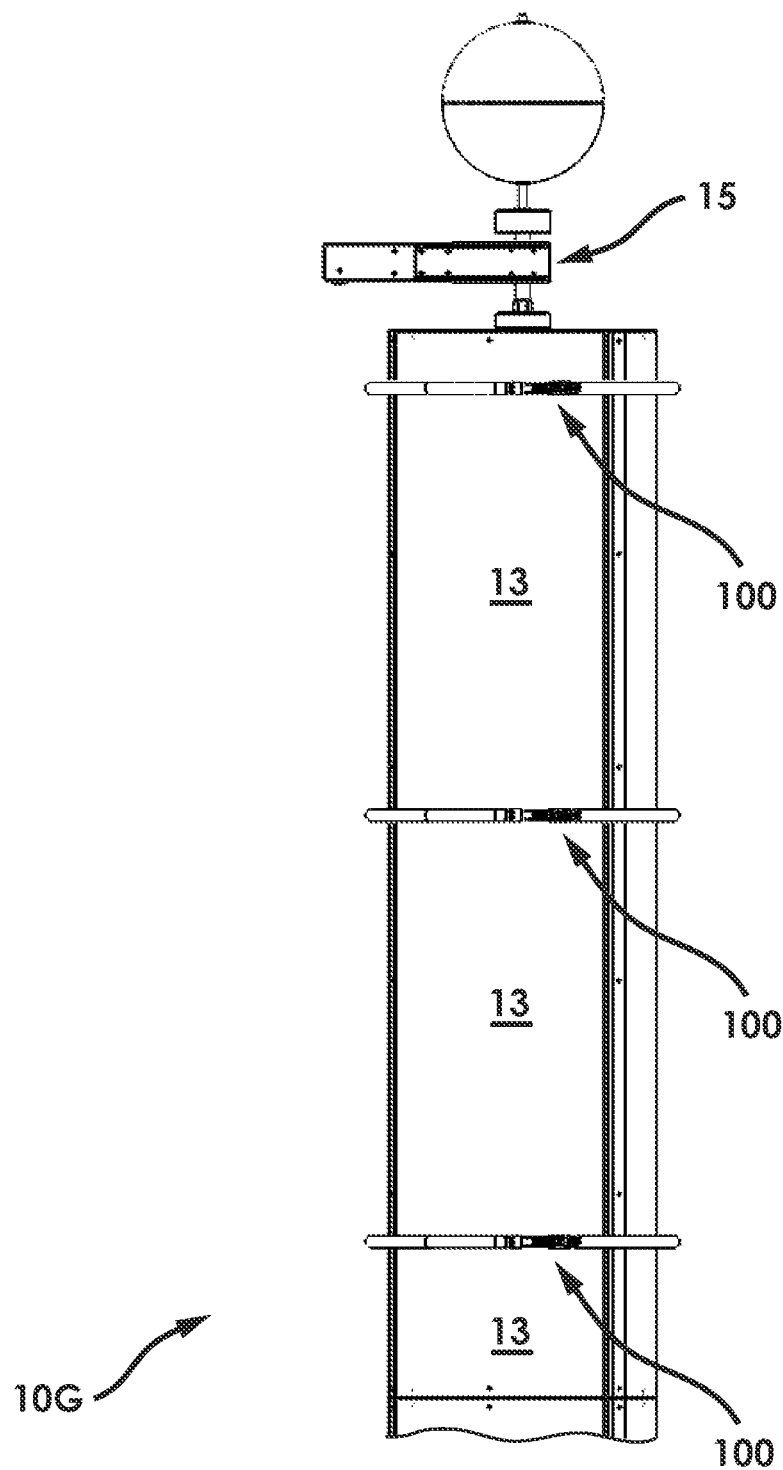
Figure 46A:
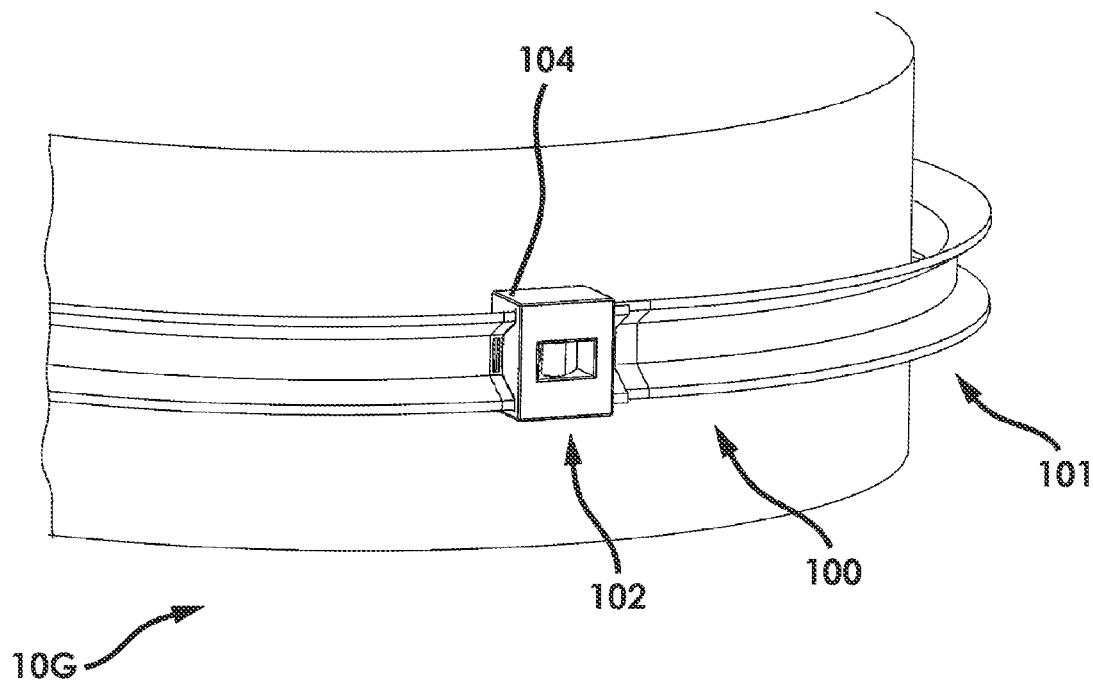
Figure 46B:
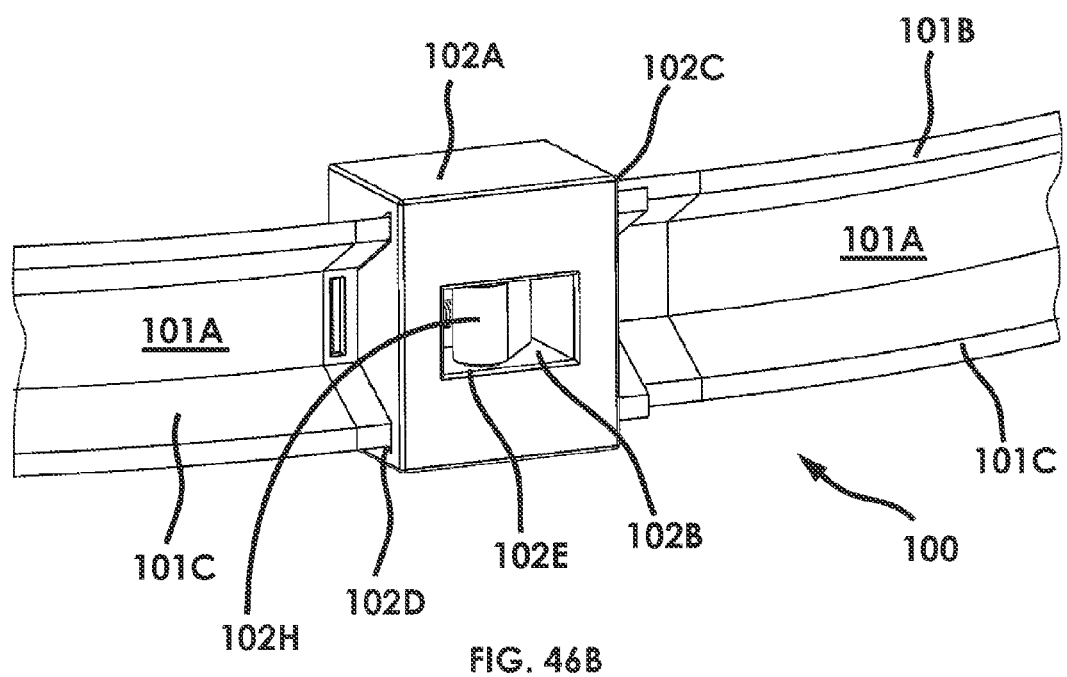
Figure 47:
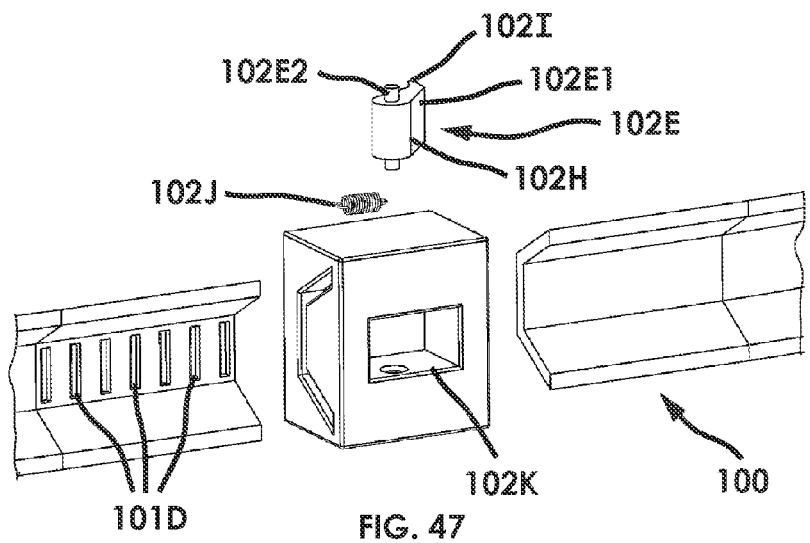
Figure 48A:
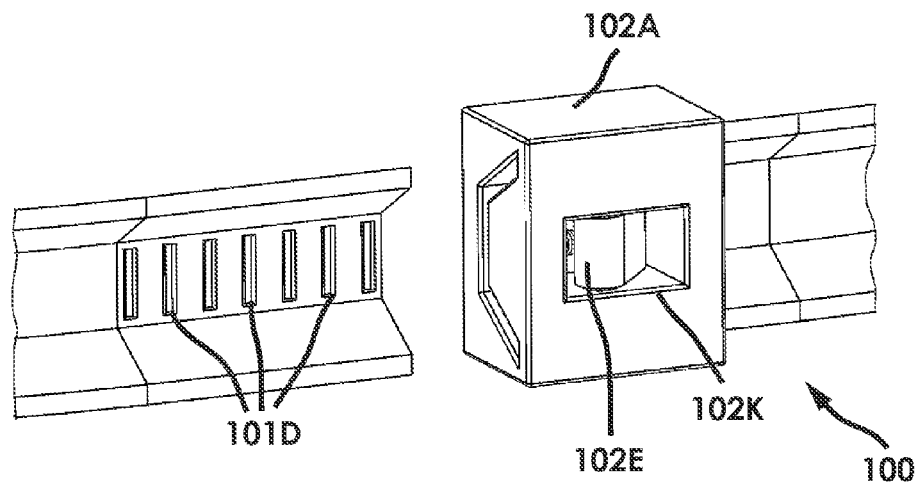
Figure 48B:
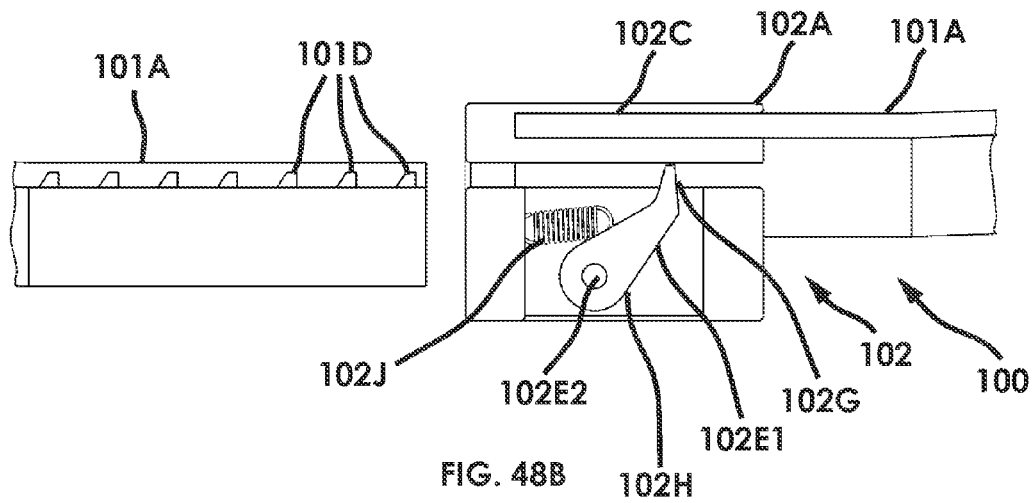
Figure 49A:
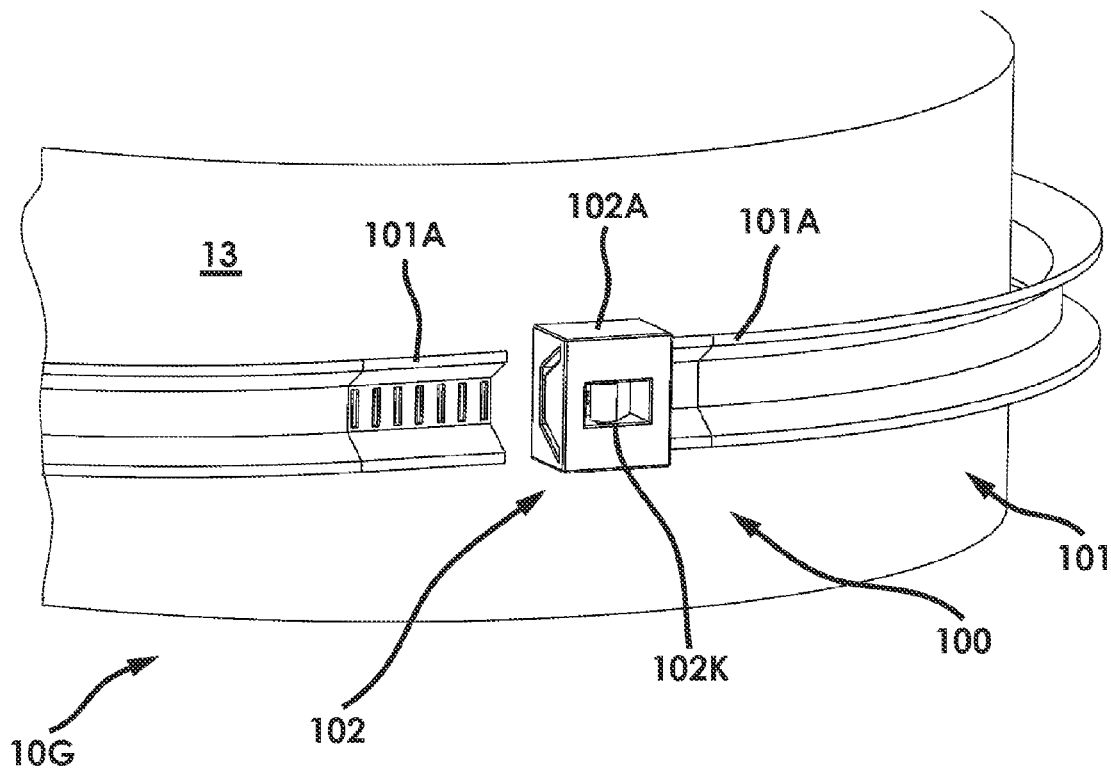
Figure 49B:
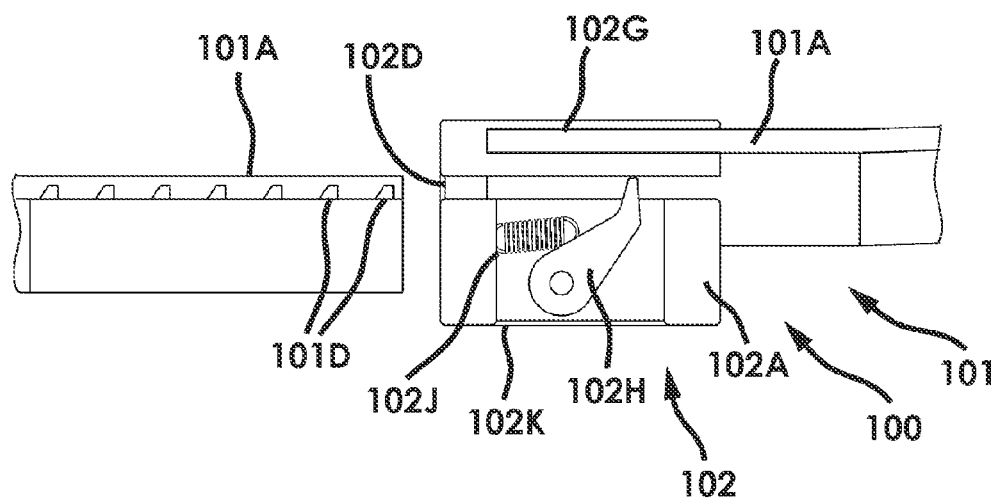
Figure 50A:
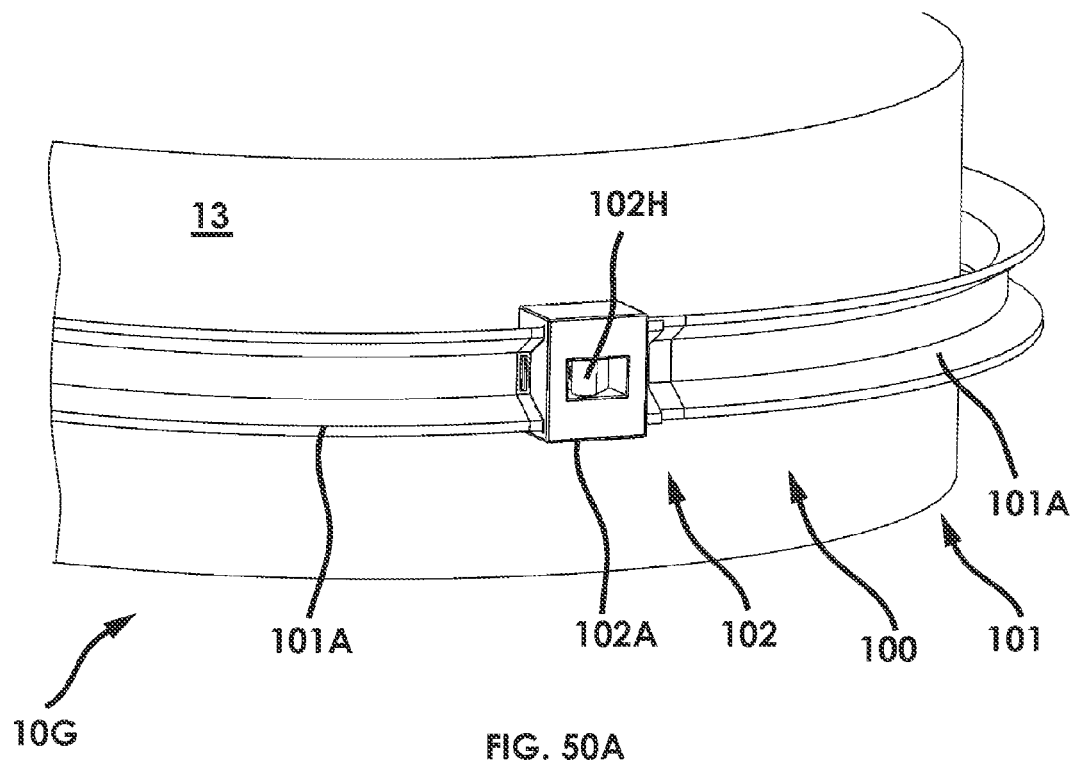
Figure 50B:
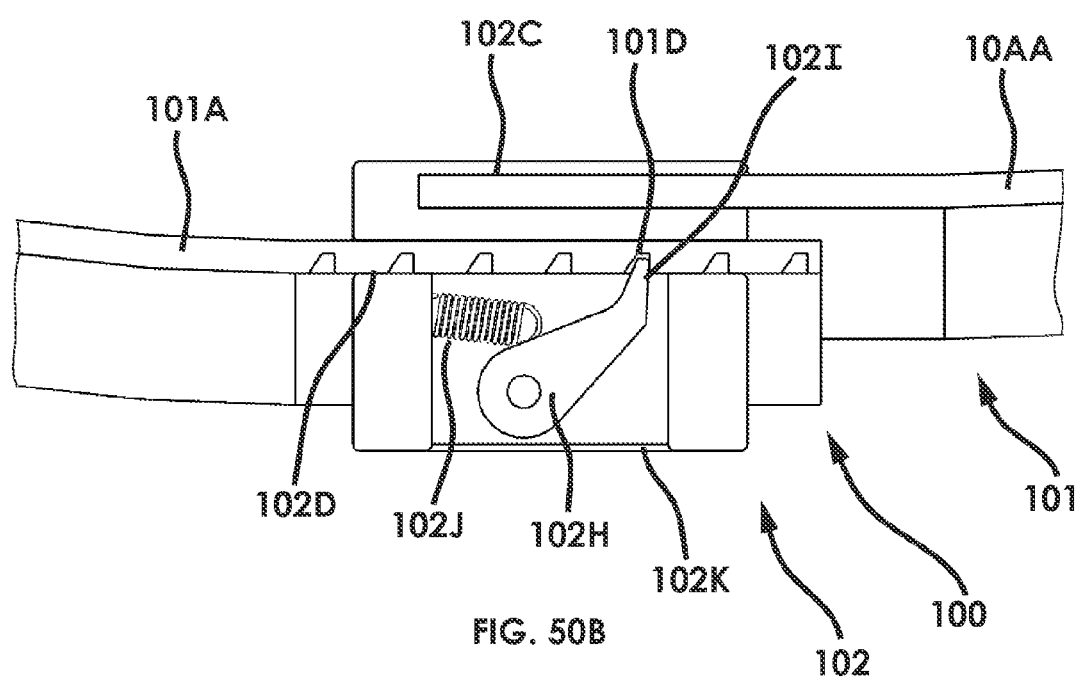
Figure 51:
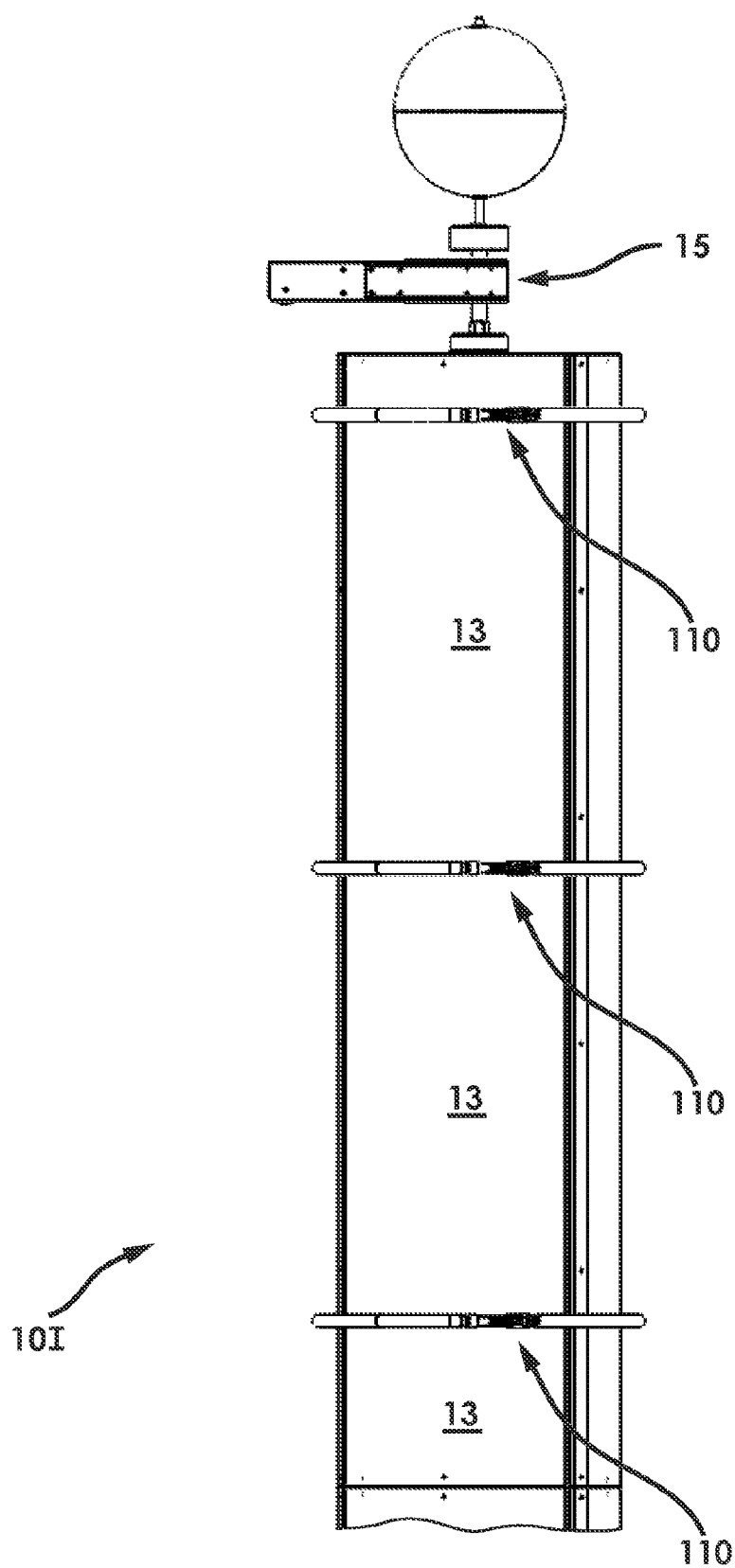
Figure 52A:
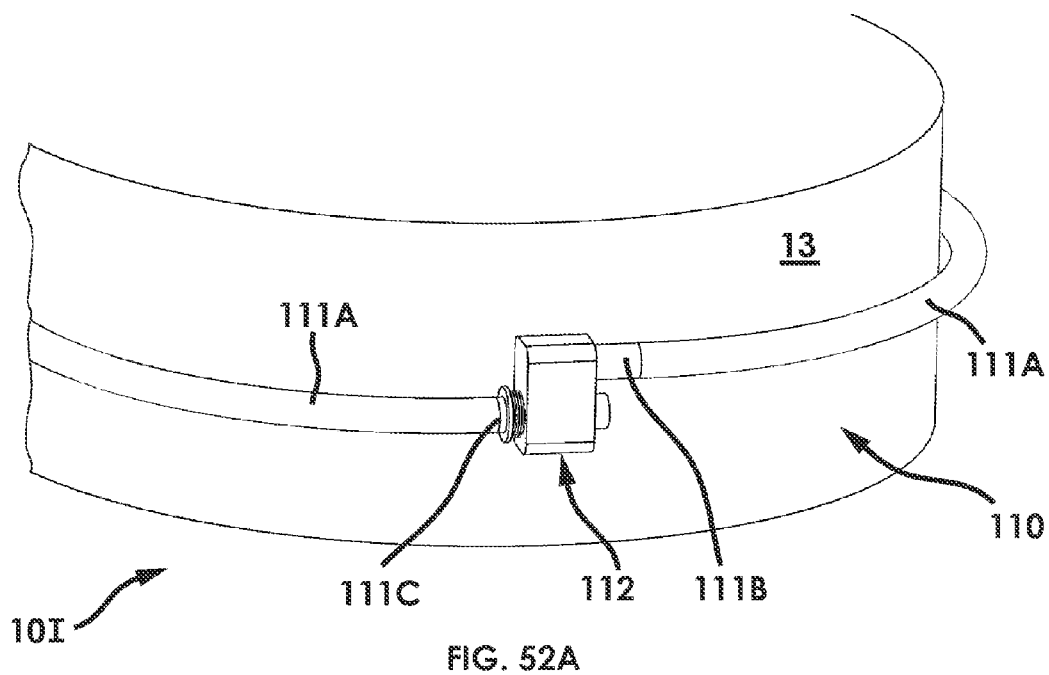
Figure 52B:
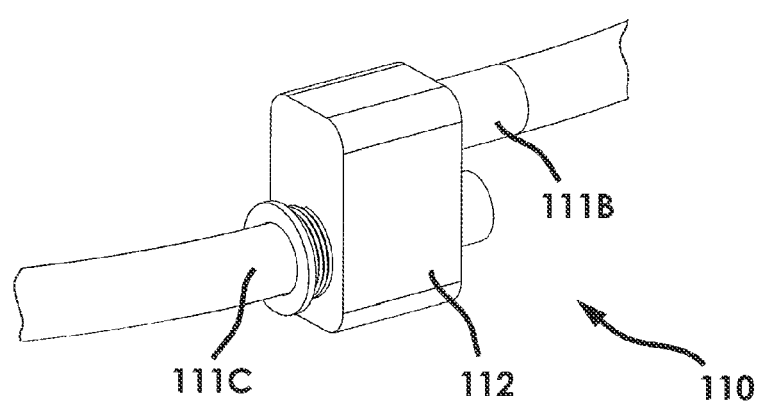
Figure 52C:
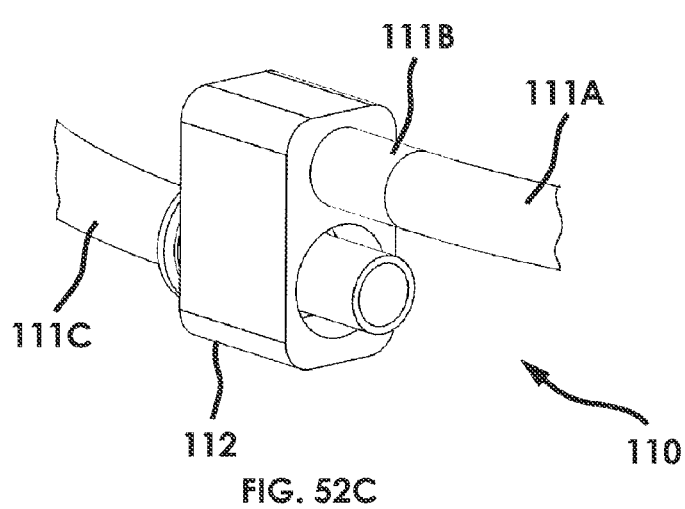
Figure 53:
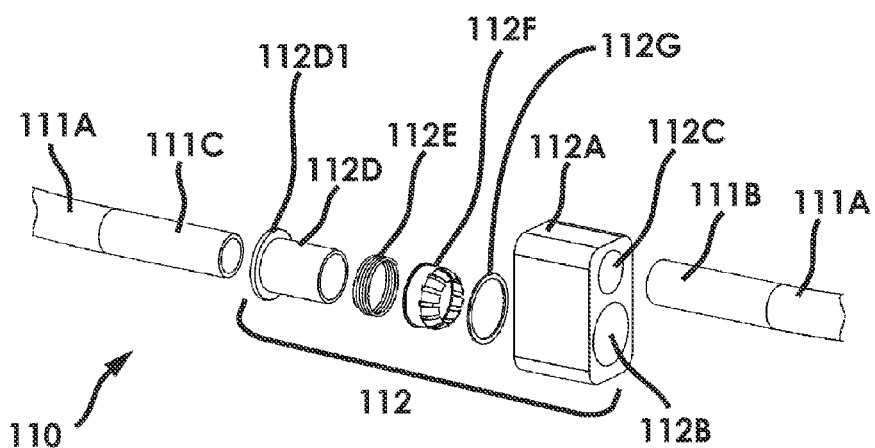
Figure 54A:
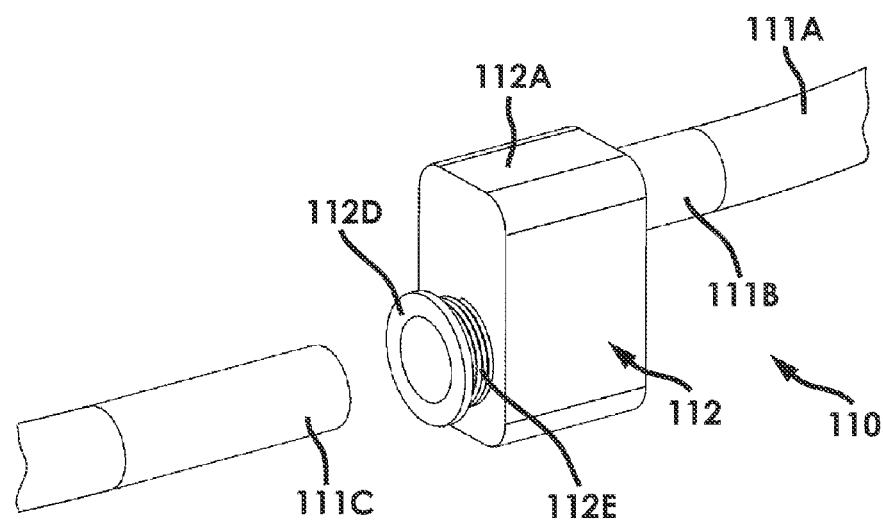
Figure 54B:
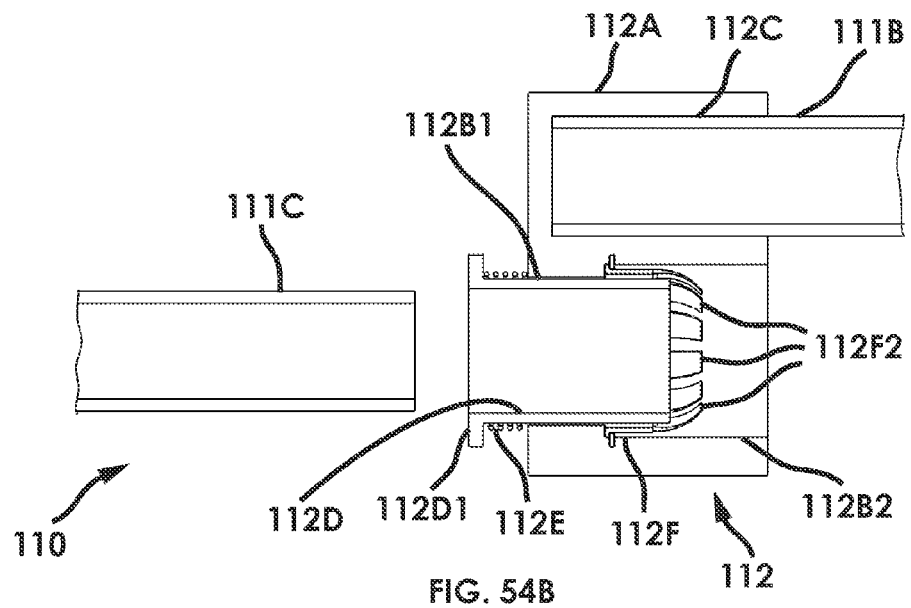
Figure 55A:
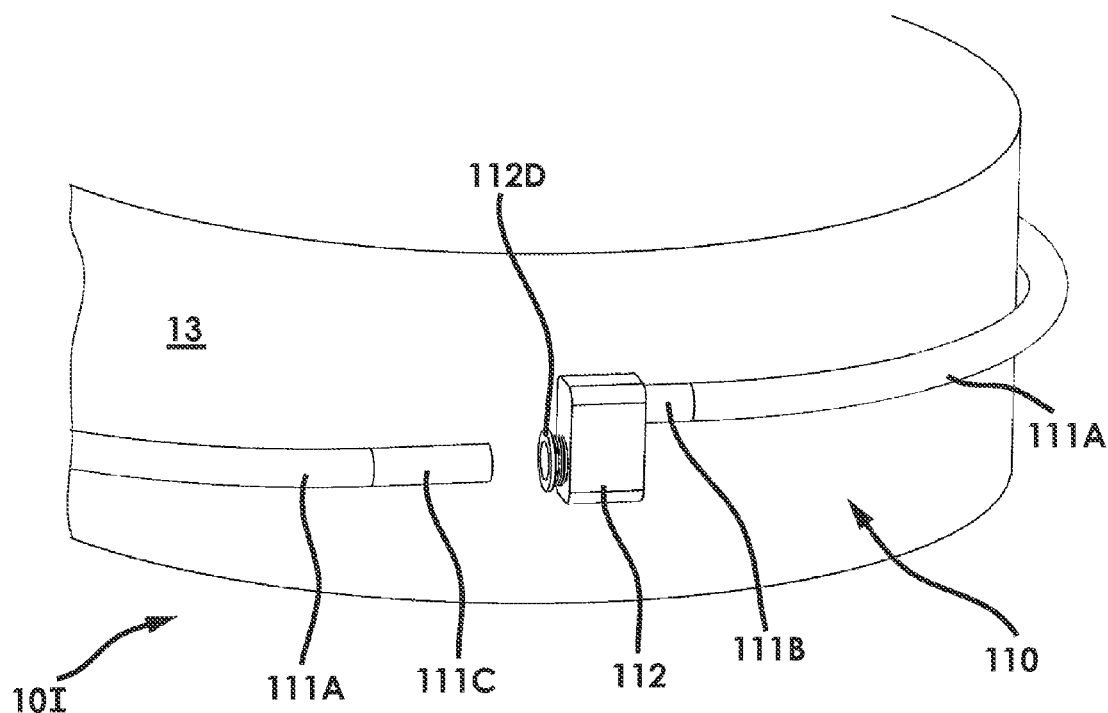
Figure 55B:
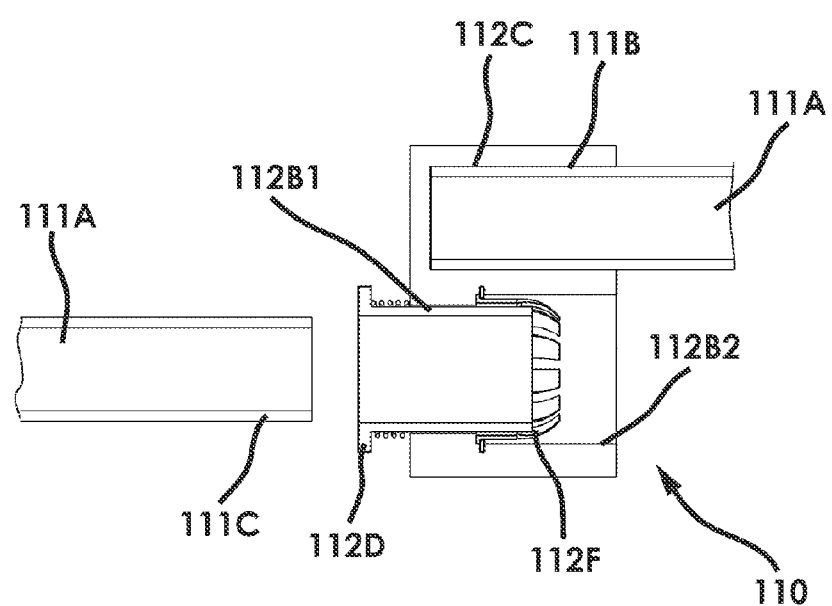
Figure 56A:
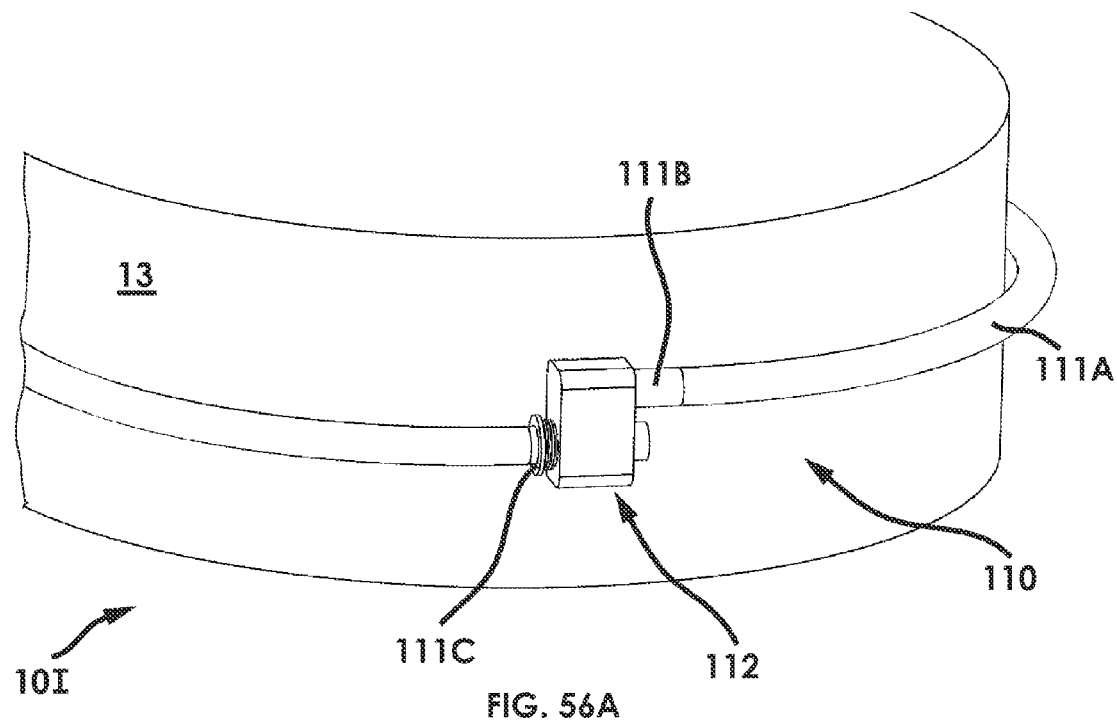
Figure 56B:
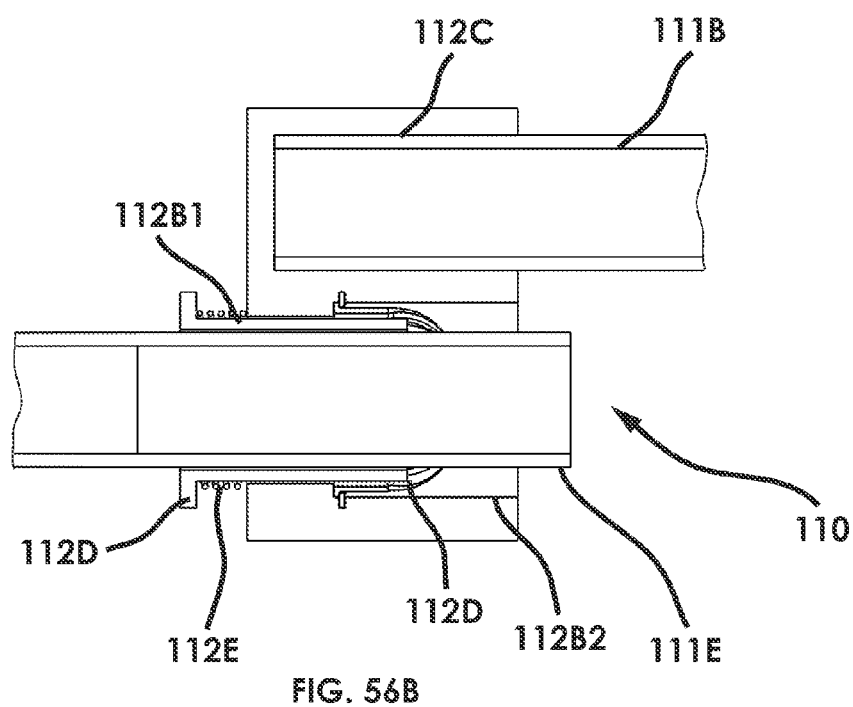
Figure 57:
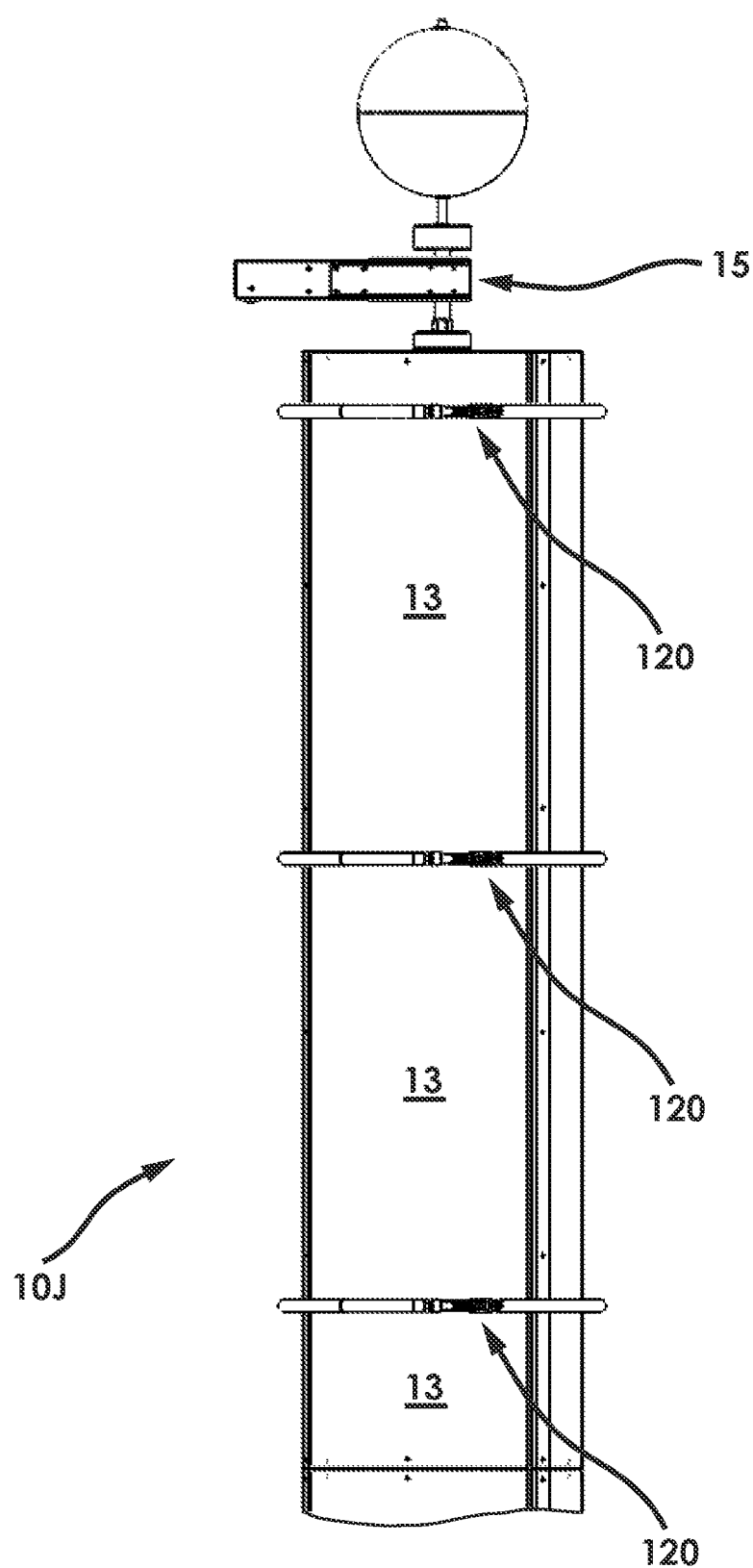
Figure 58A:
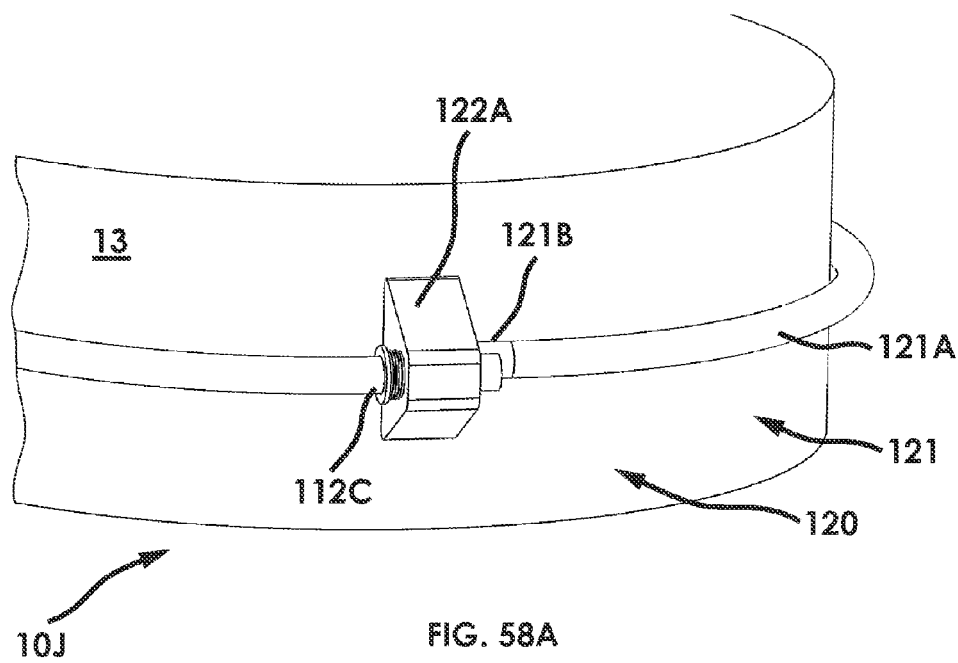
Figure 58B:
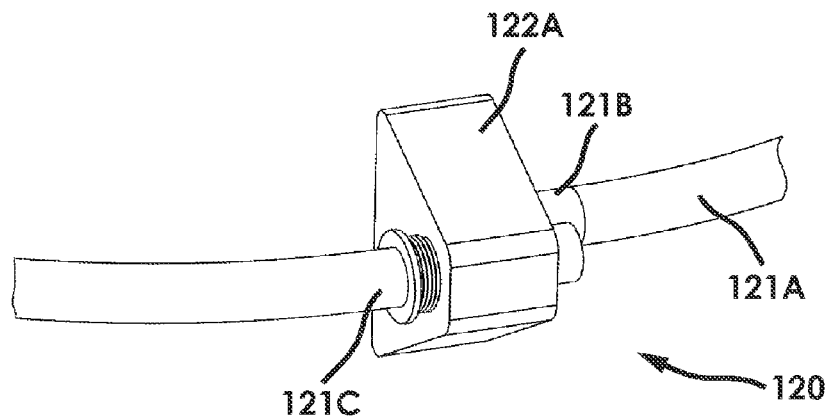
Figure 58C:
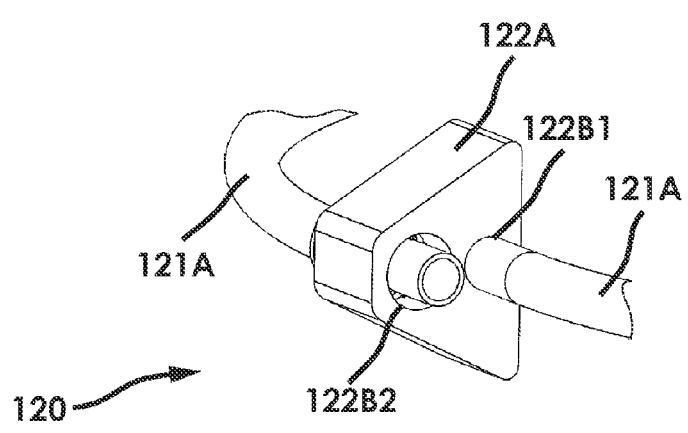
Figure 59:
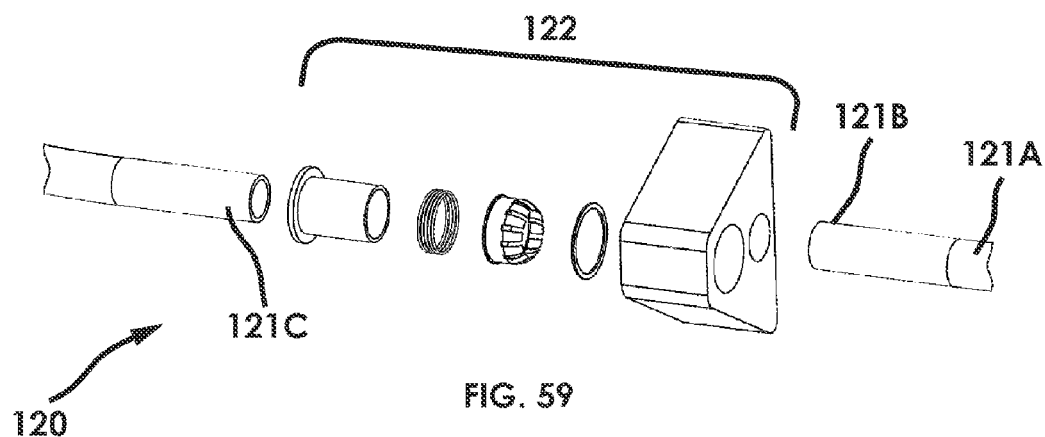
Figure 60A:
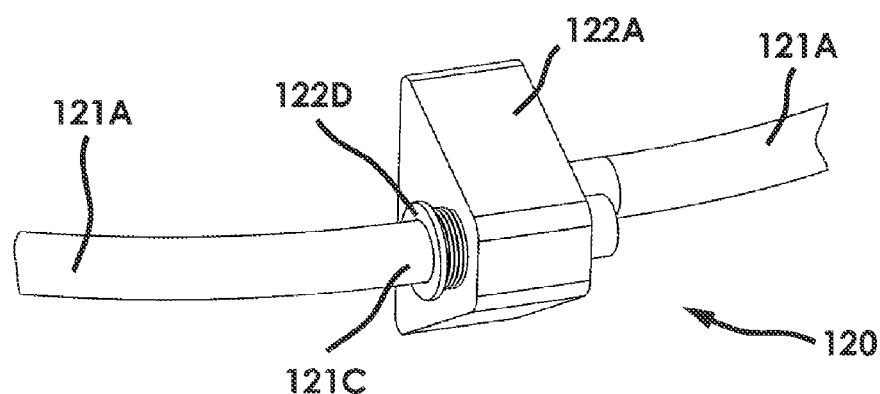
Figure 60B:
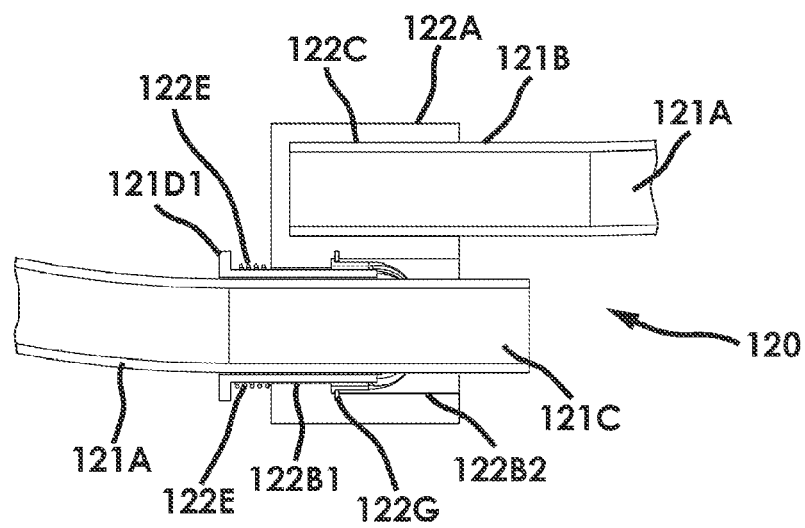
Figure 61A:
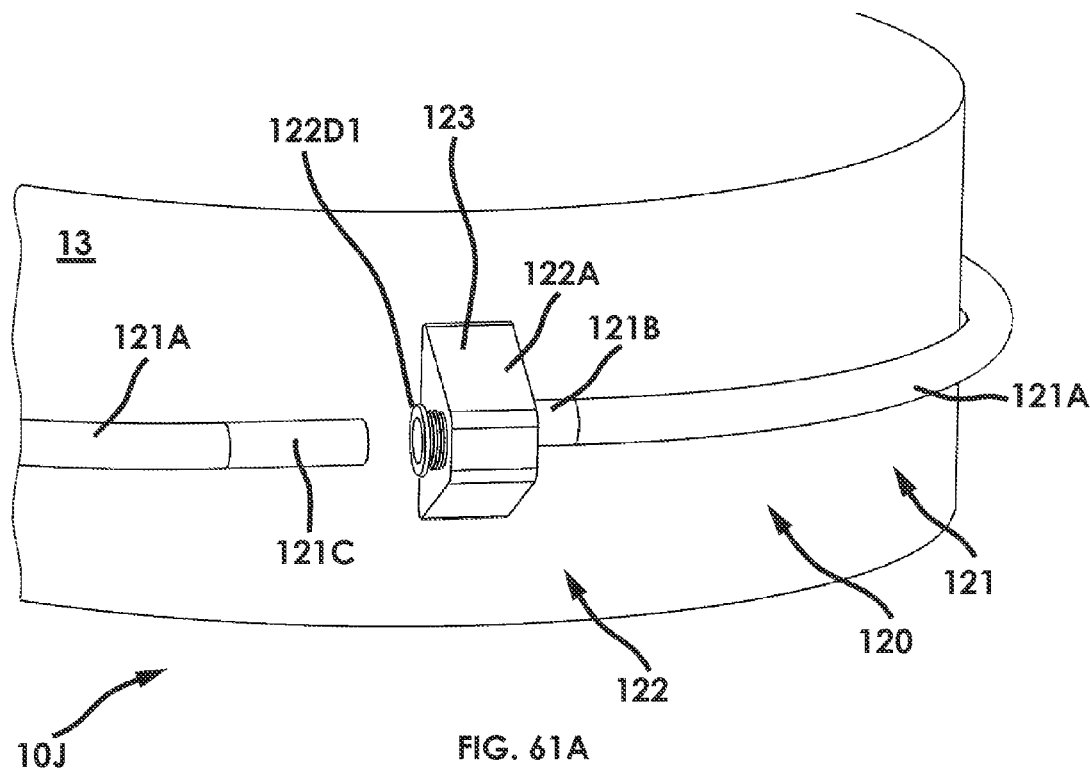
Figure 61B:
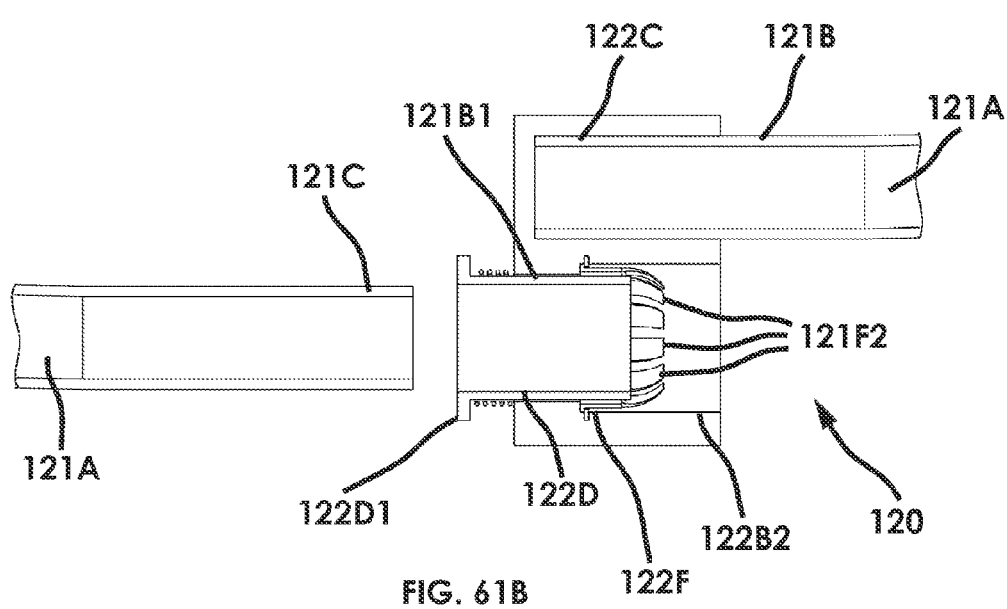
Figure 62A:
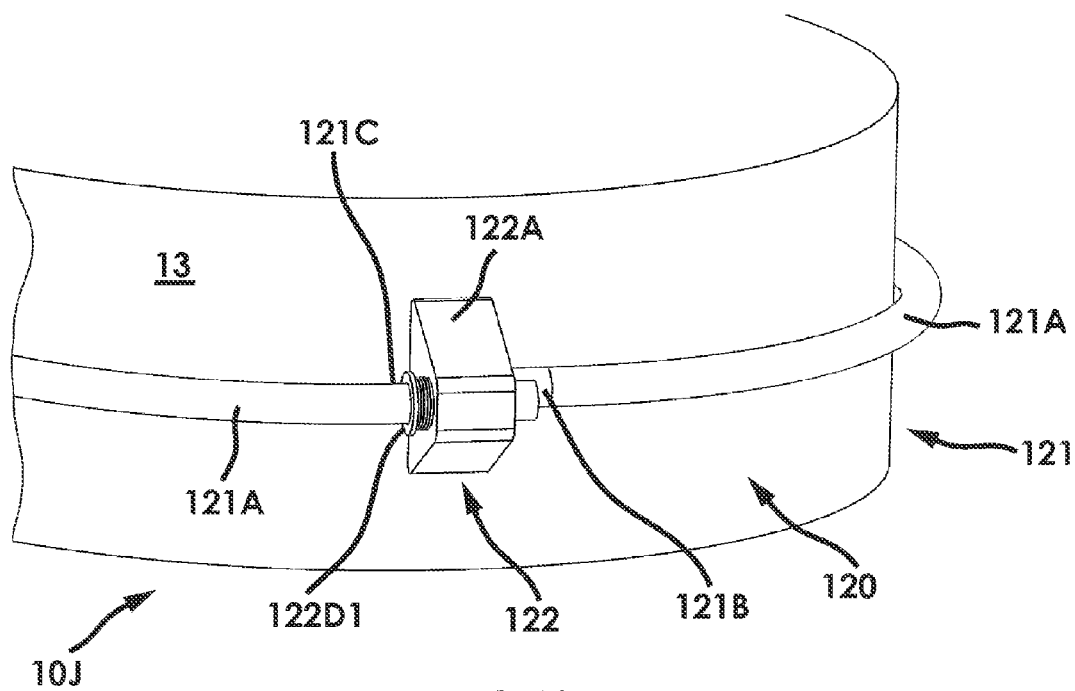
Figure 62B:
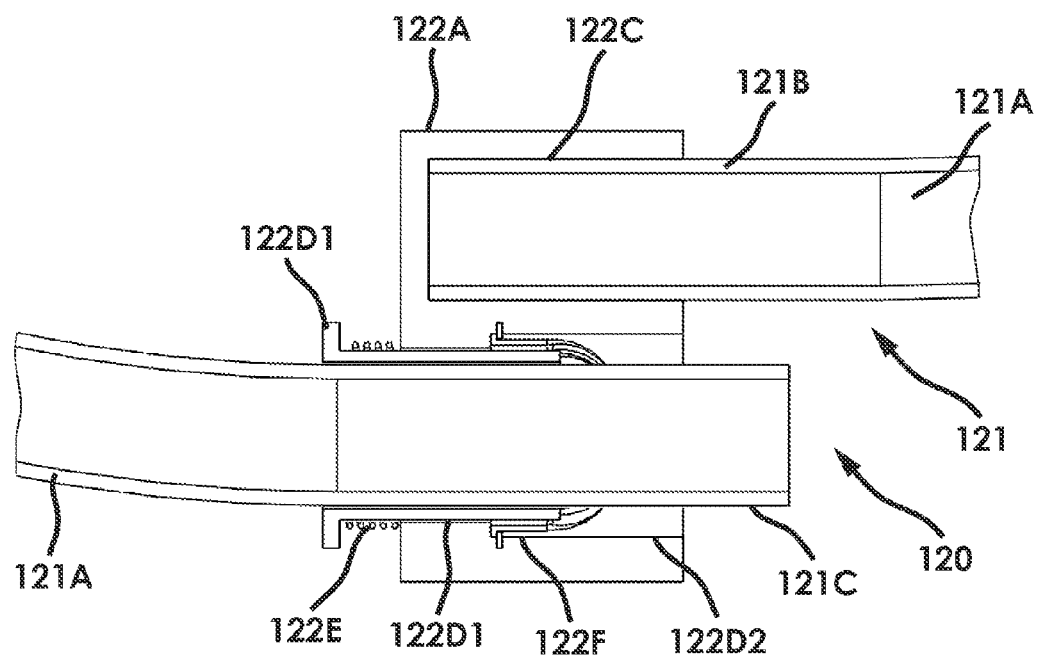
Figure 63:
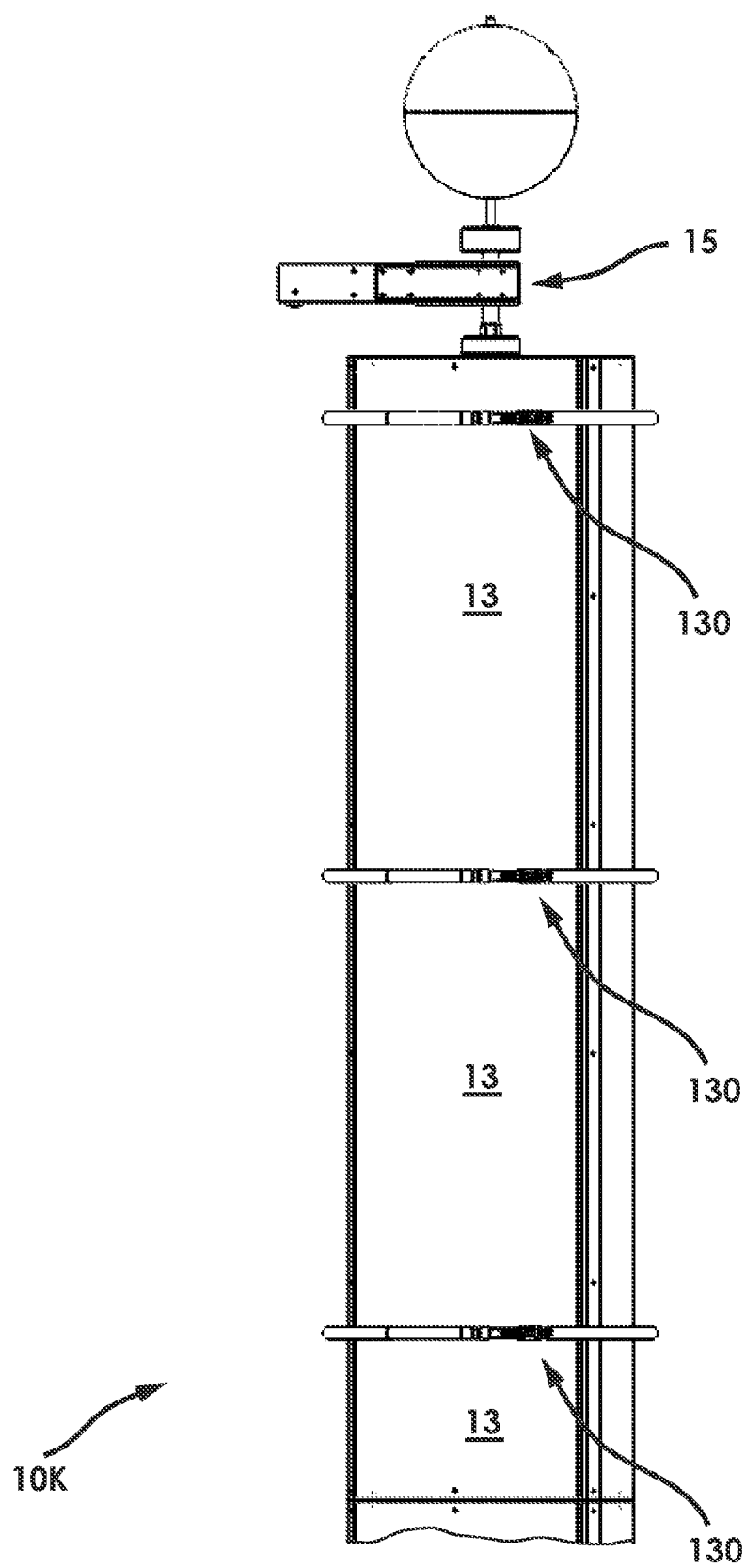
Figure 64A:
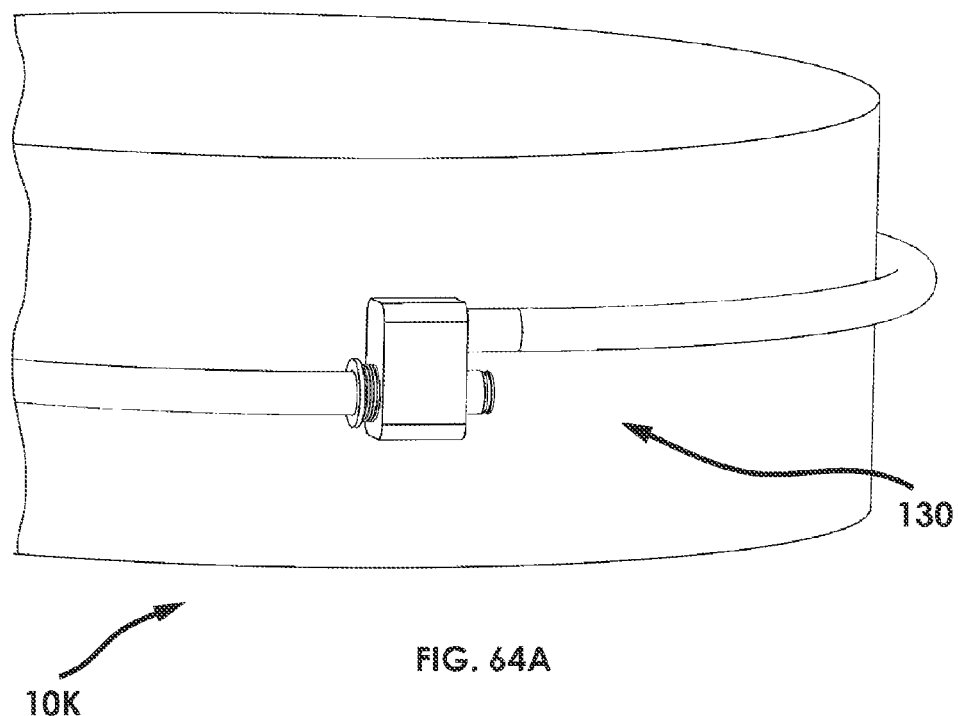
Figure 64B:
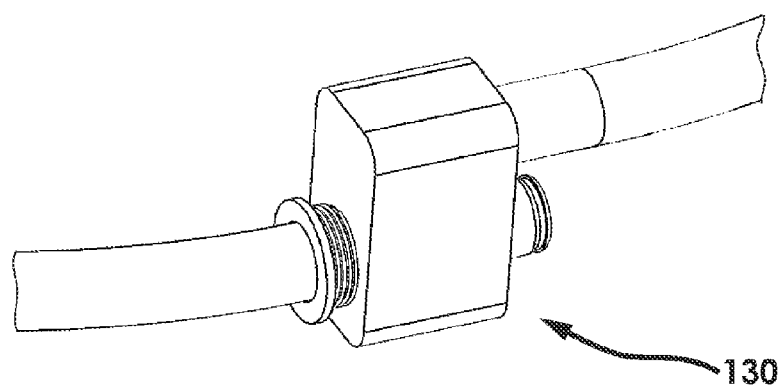
Figure 64C:
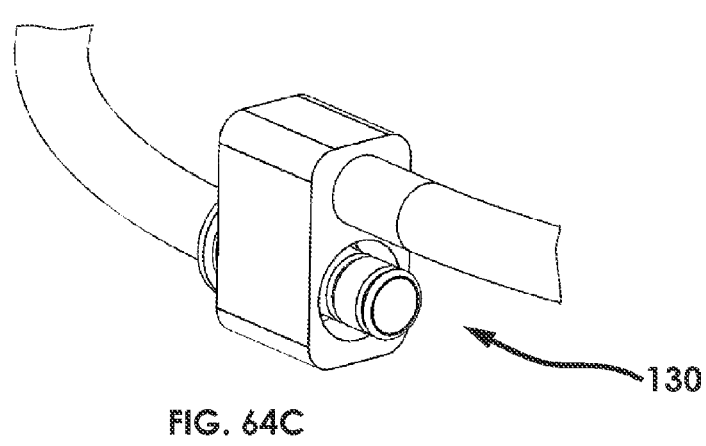
Figure 65:
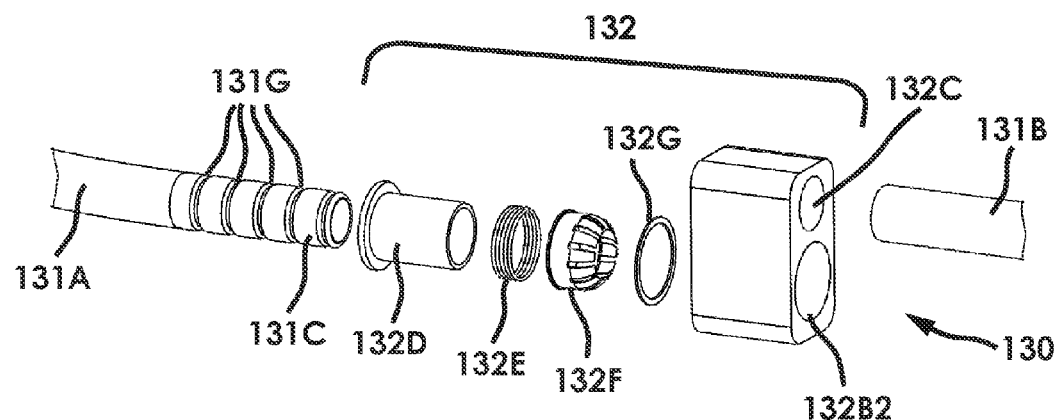
Figure 66A:
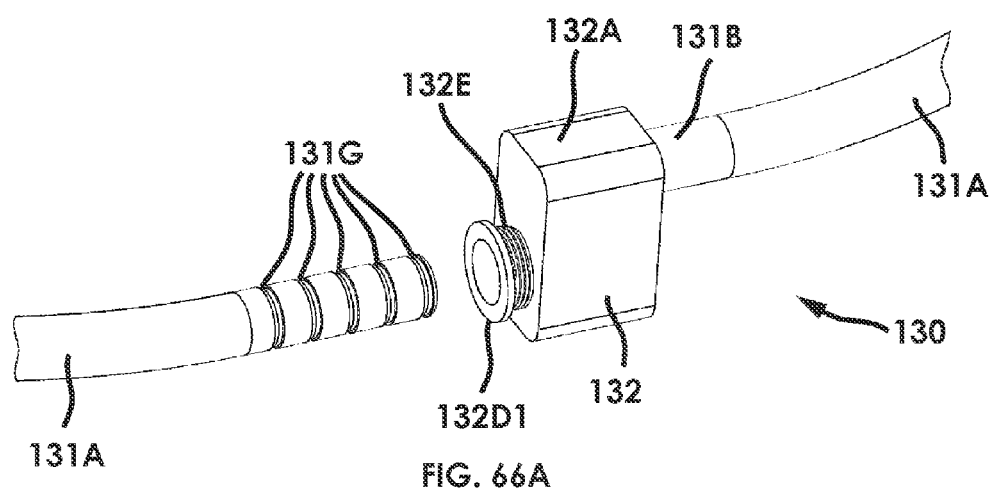
Figure 66B:
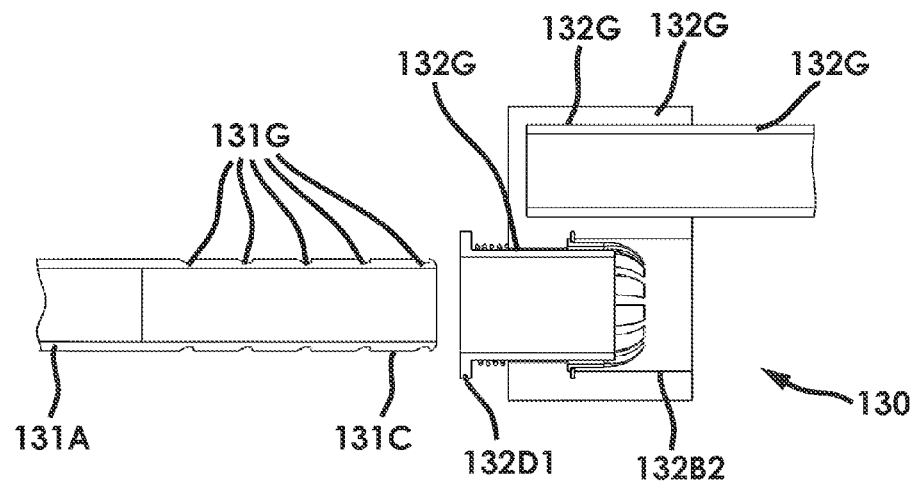
Figure 67A:
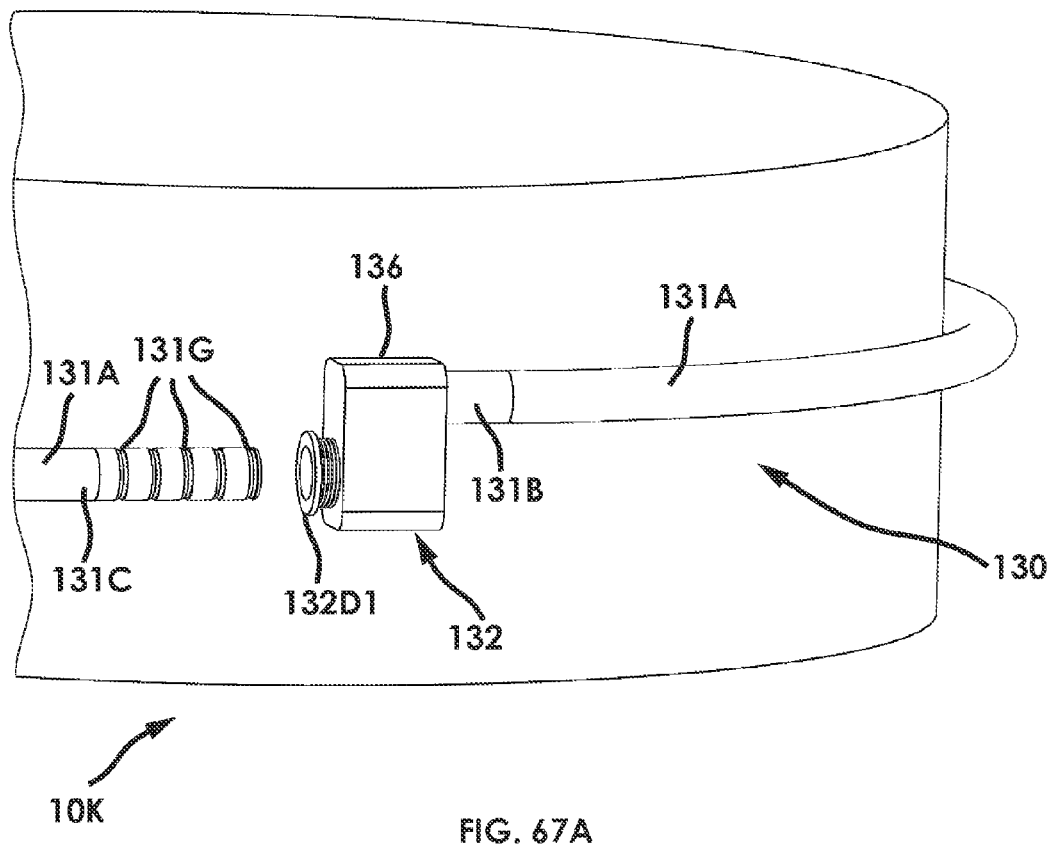
Figure 67B:
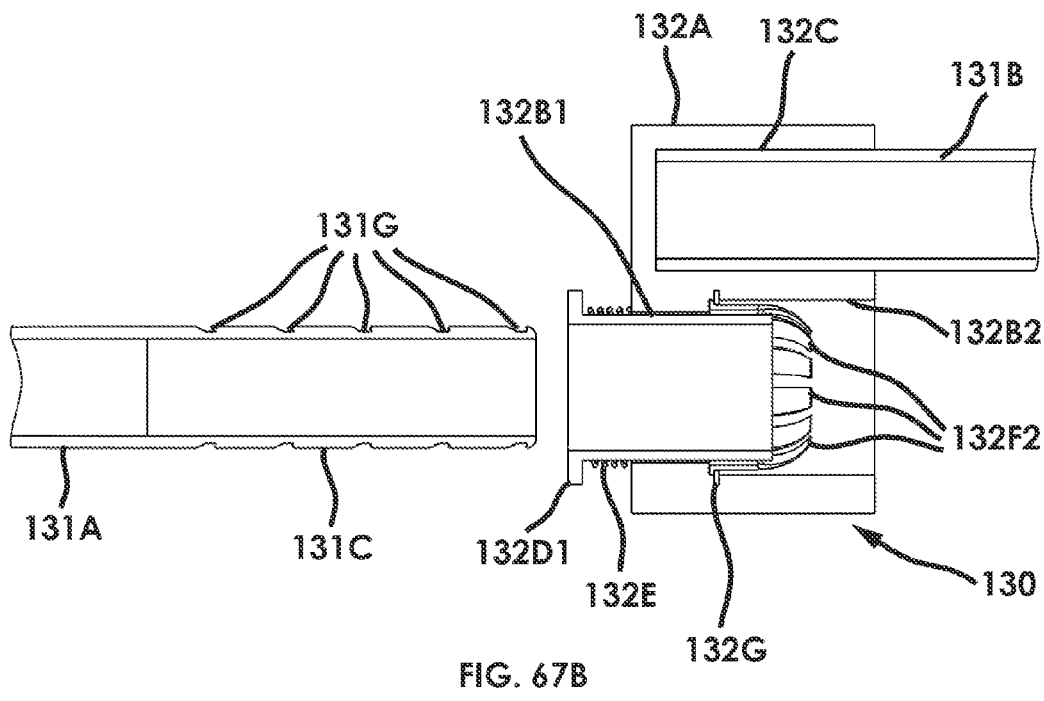
Figure 68A:
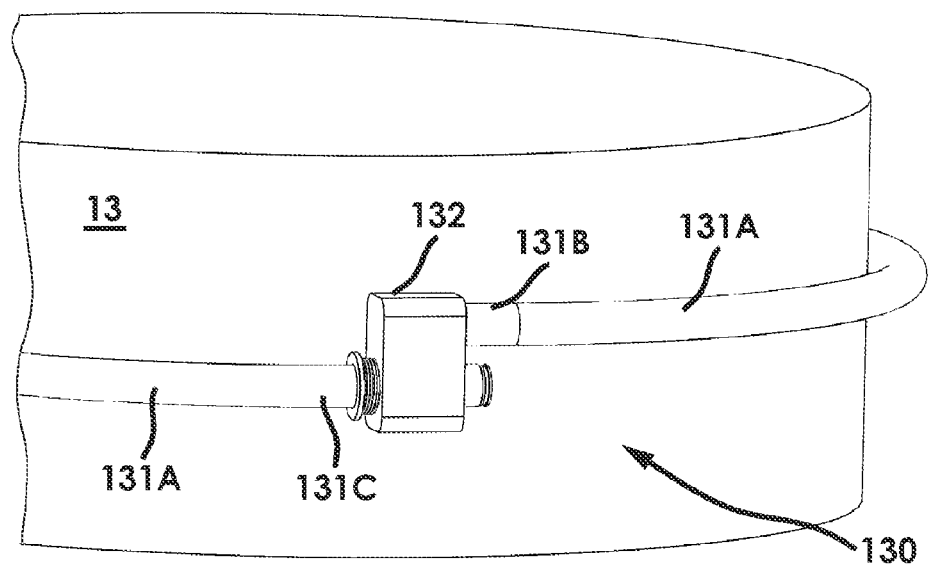
Figure 68B:
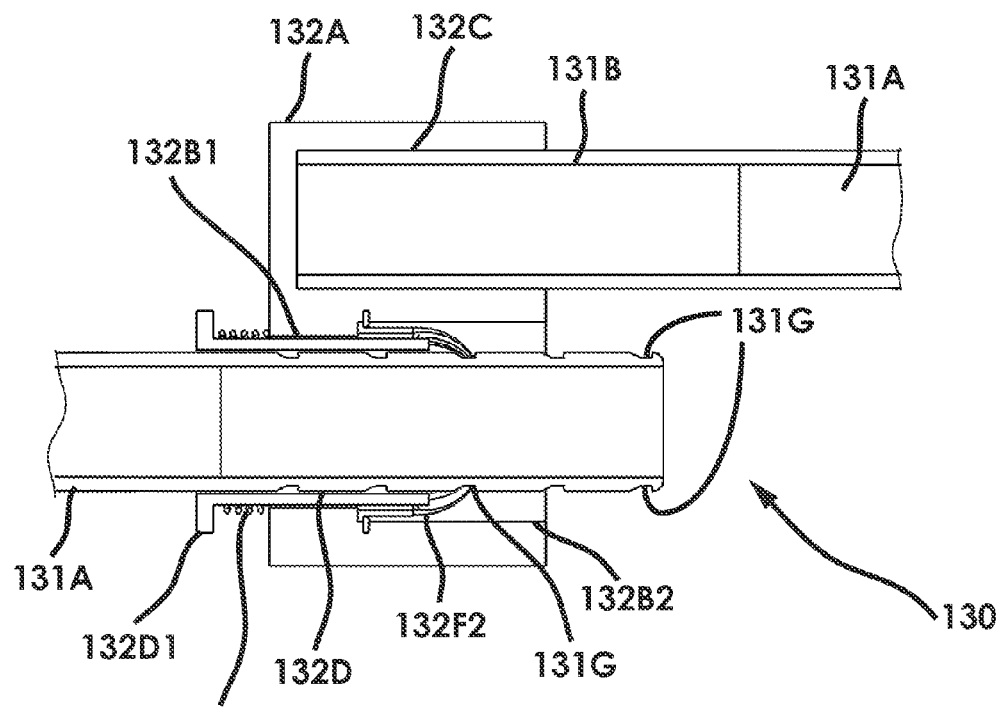
Figure 69:
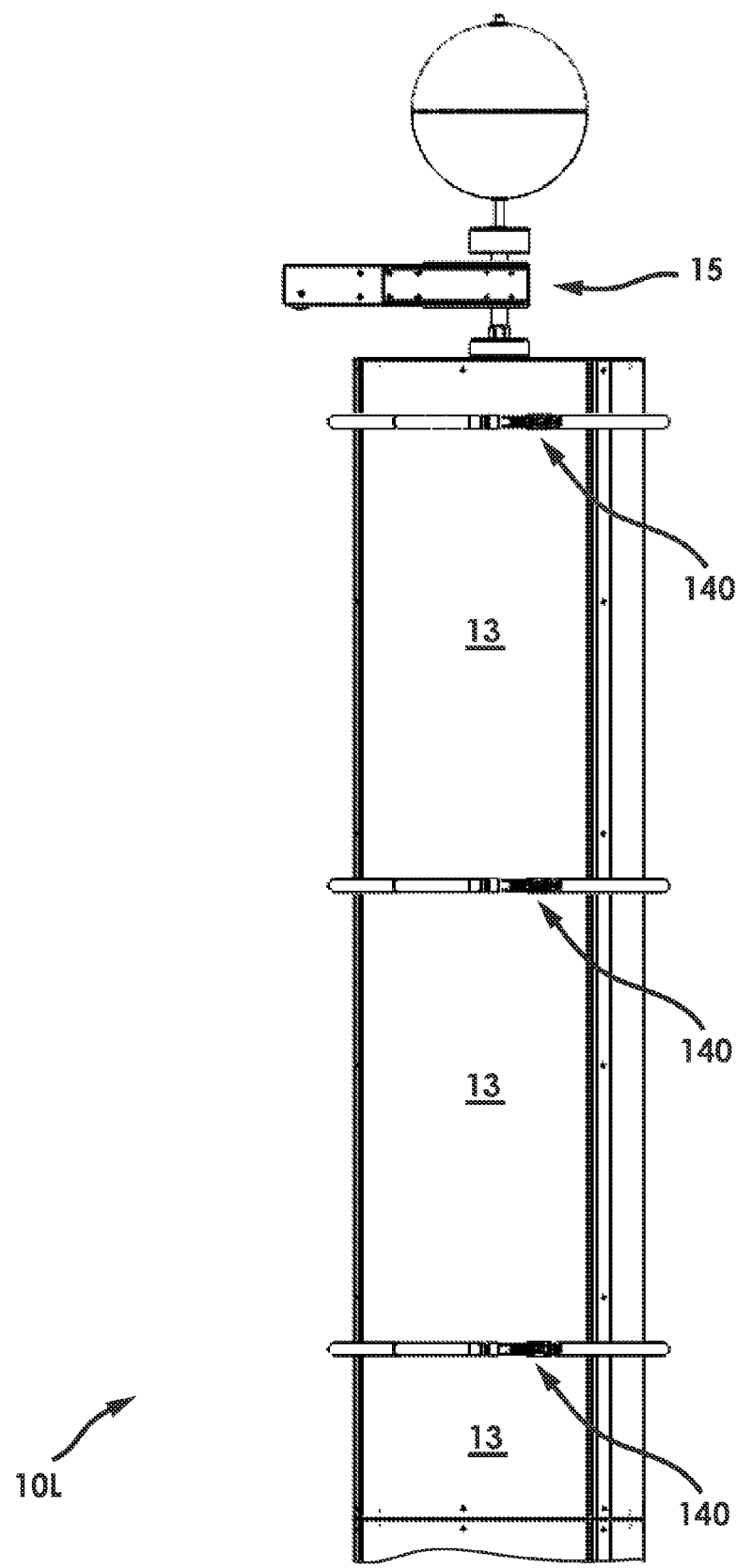
Figure 72A:
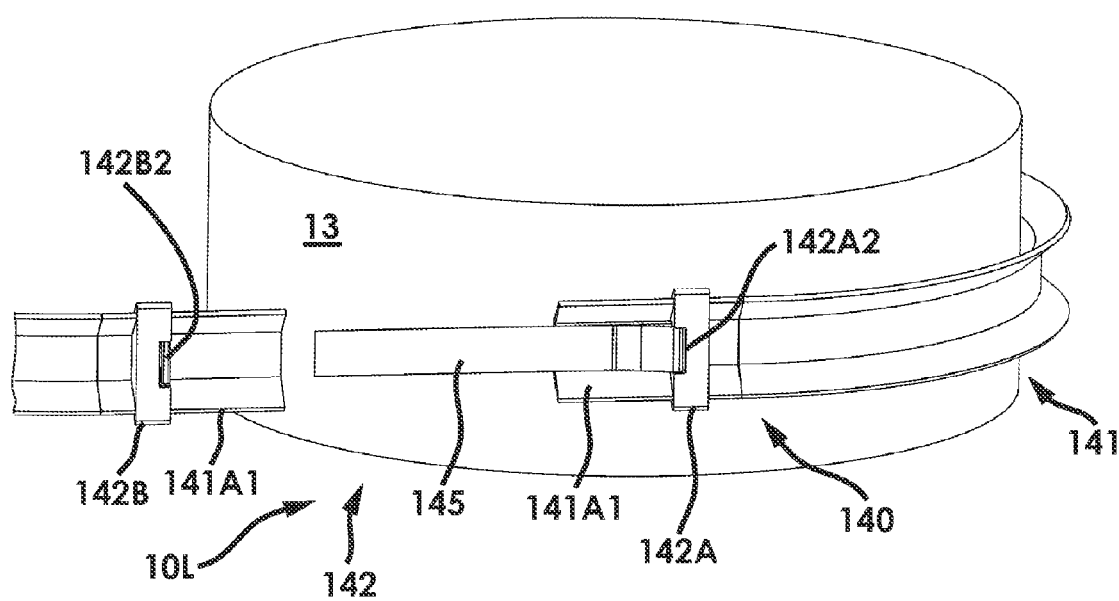
Figure 72B:
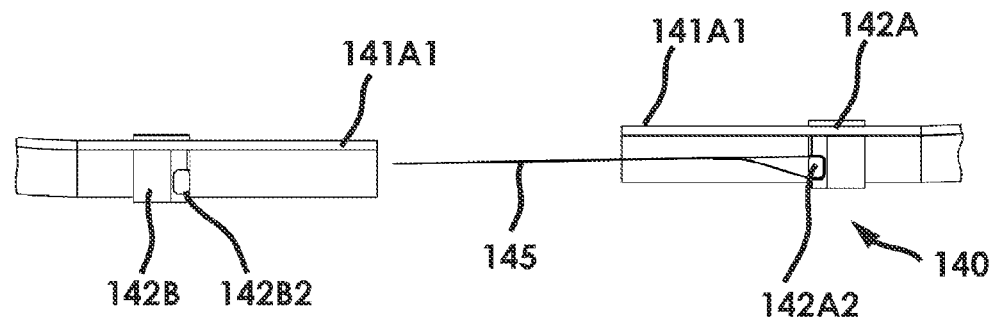
Figure 73A:
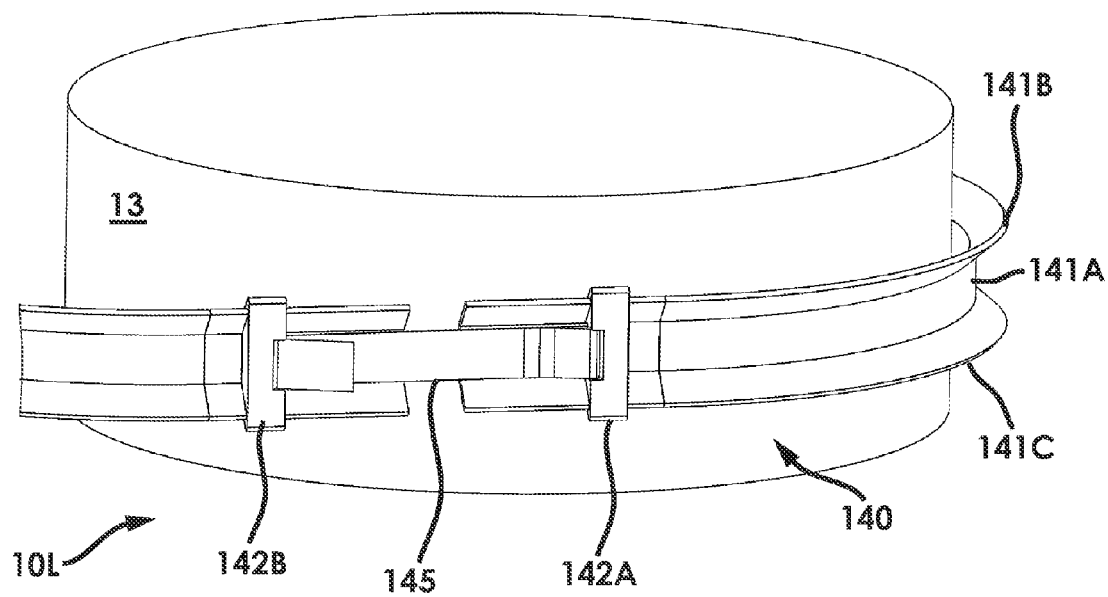
Figure 73B:
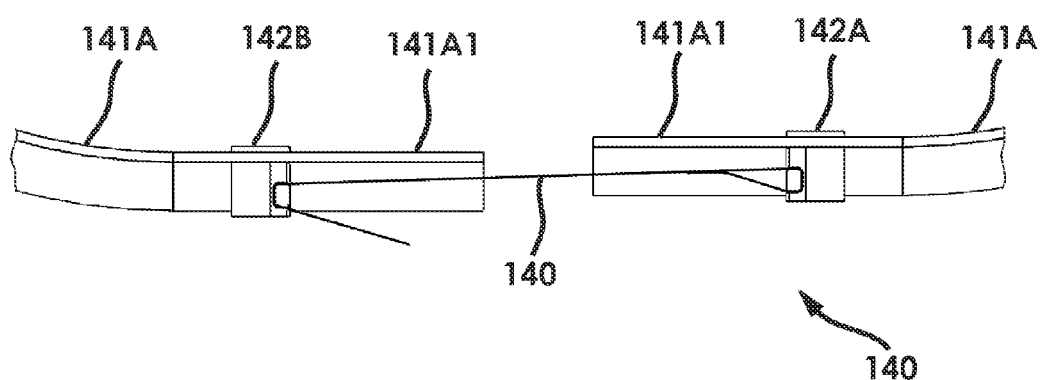
Figure 74A:
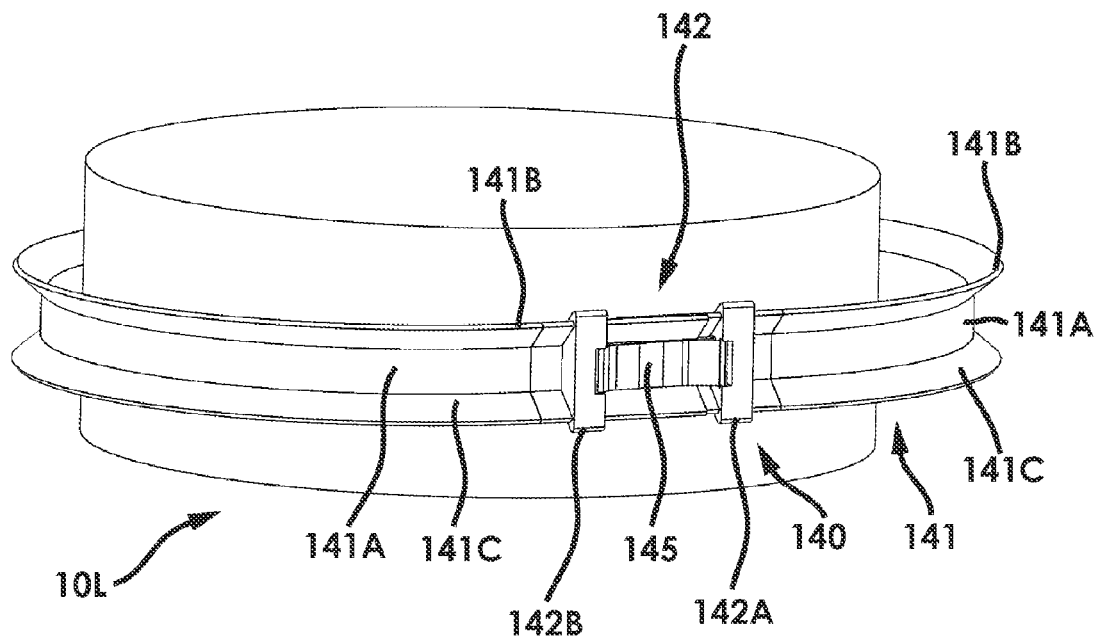
Figure 74B:
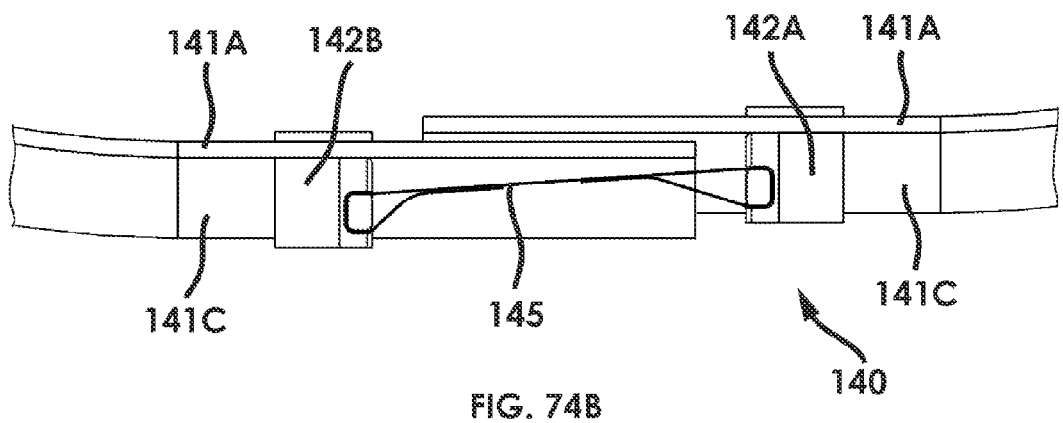
Figure 75:
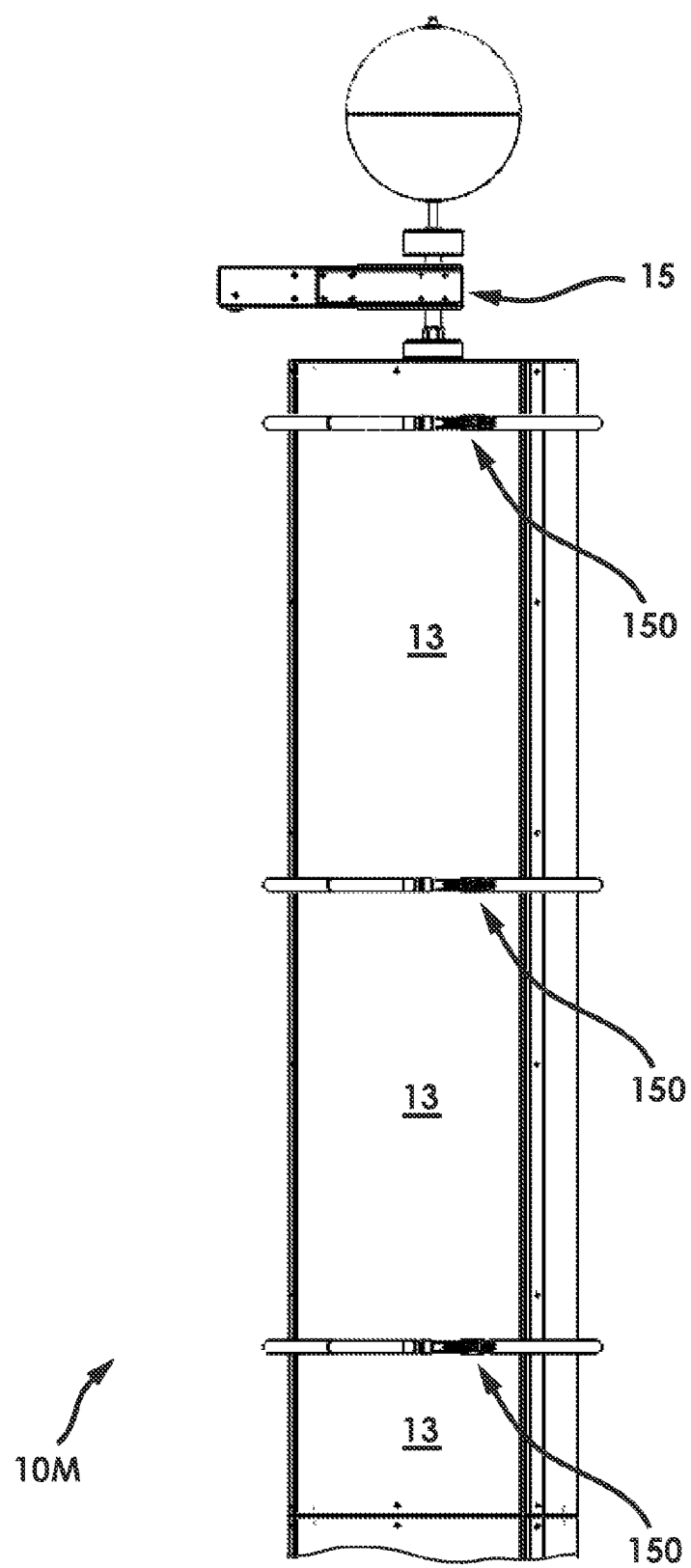
Figure 76:
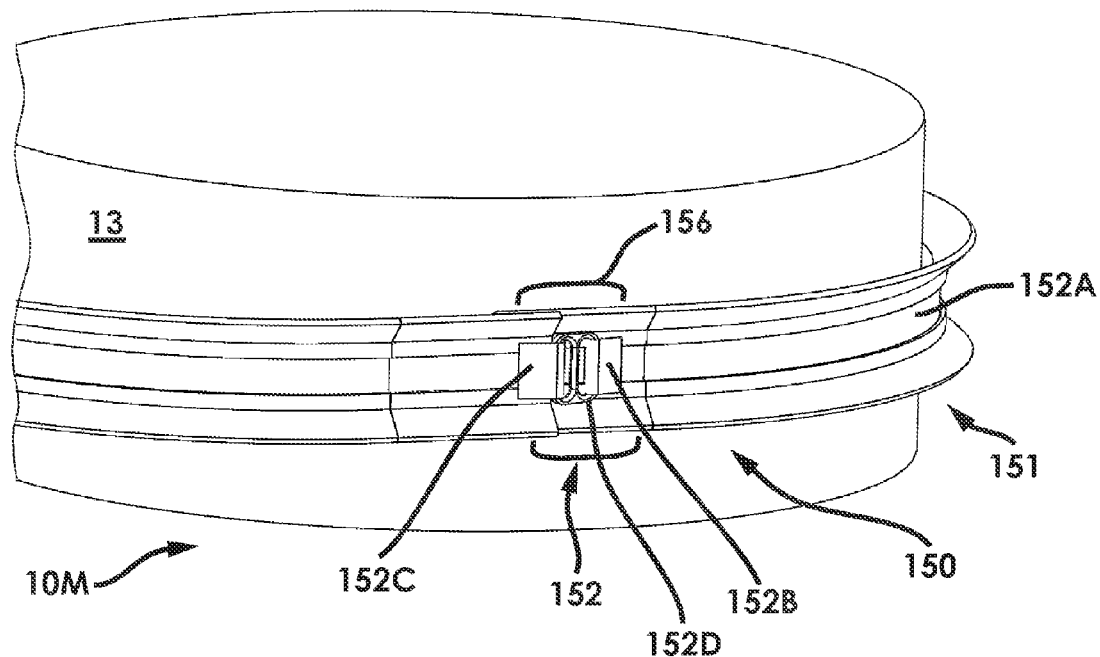
Figure 77:
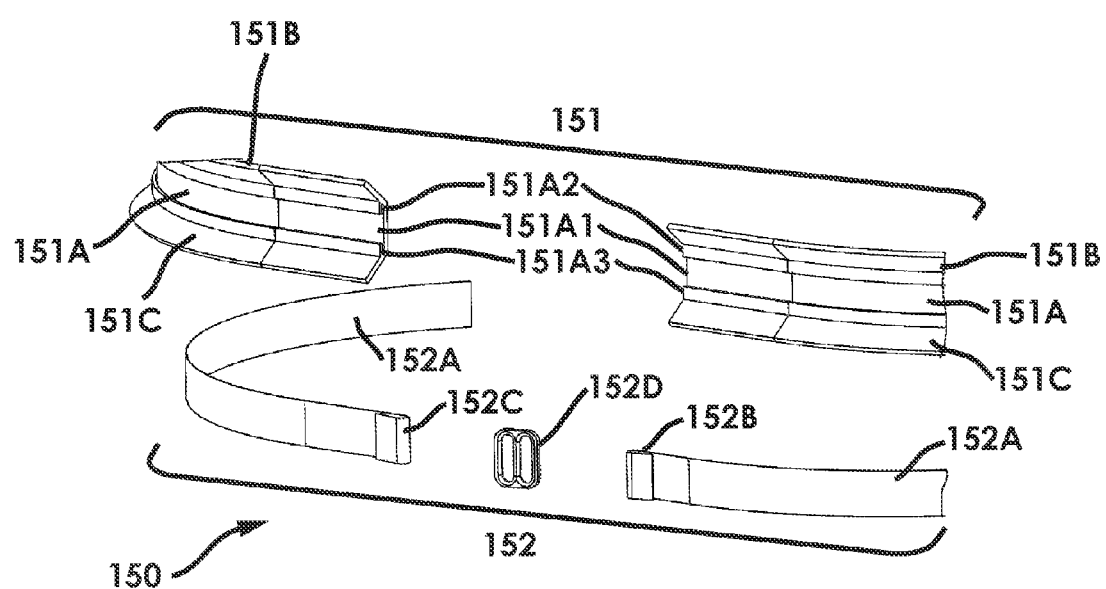
Figure 78A:
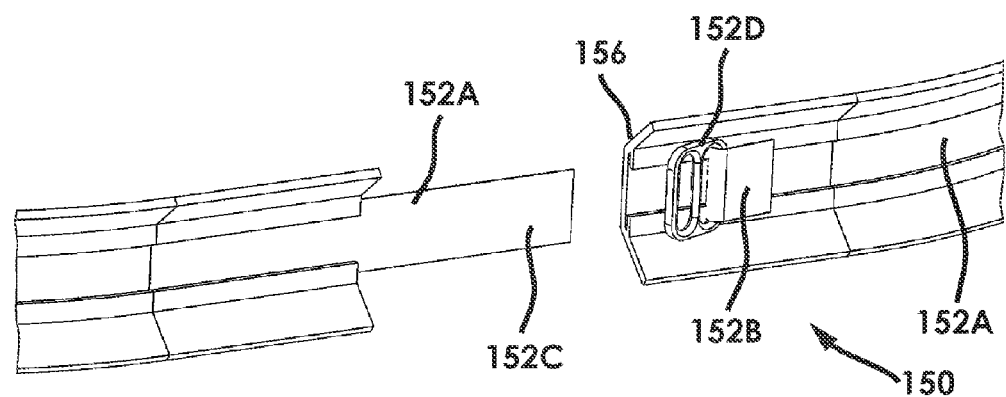
Figure 78B:
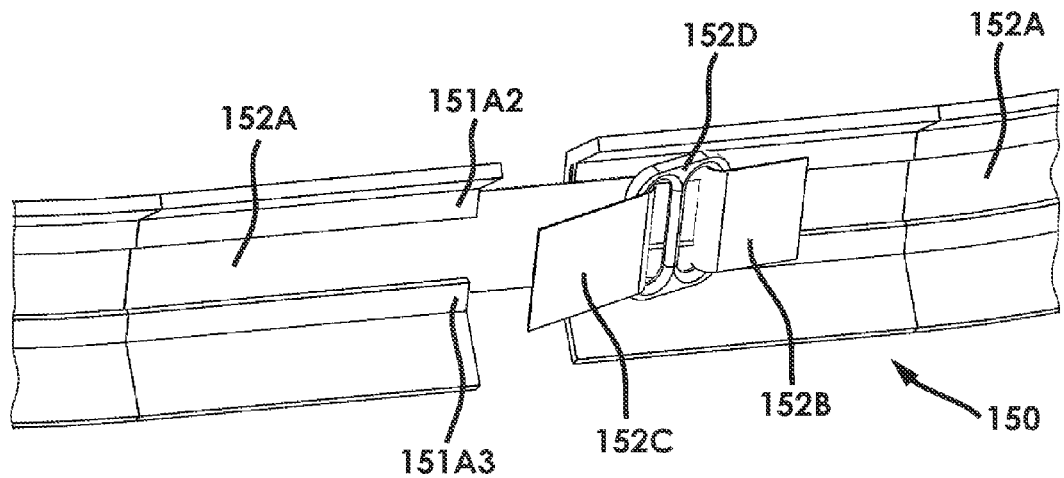
Figure 78C:
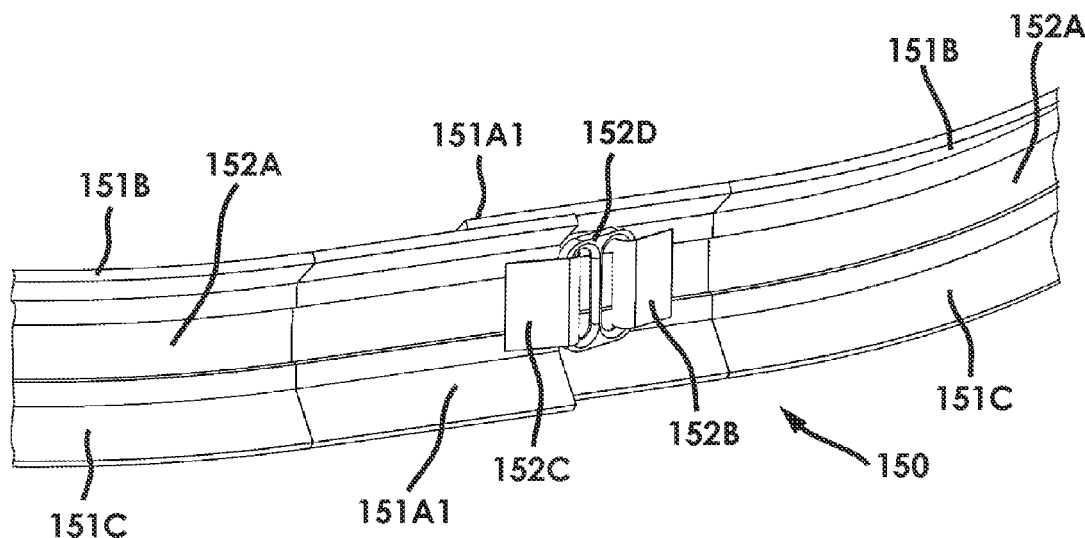
Figure 79A:
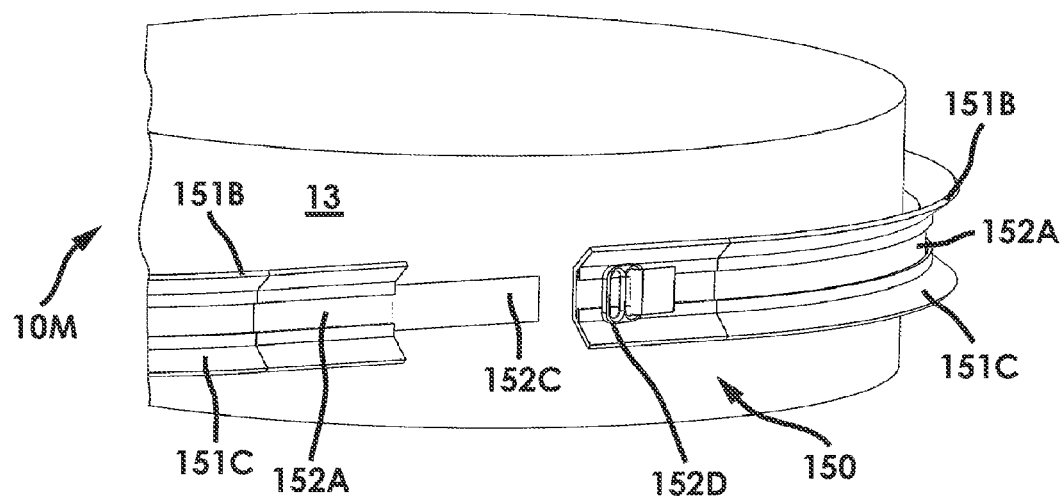
Figure 79B:
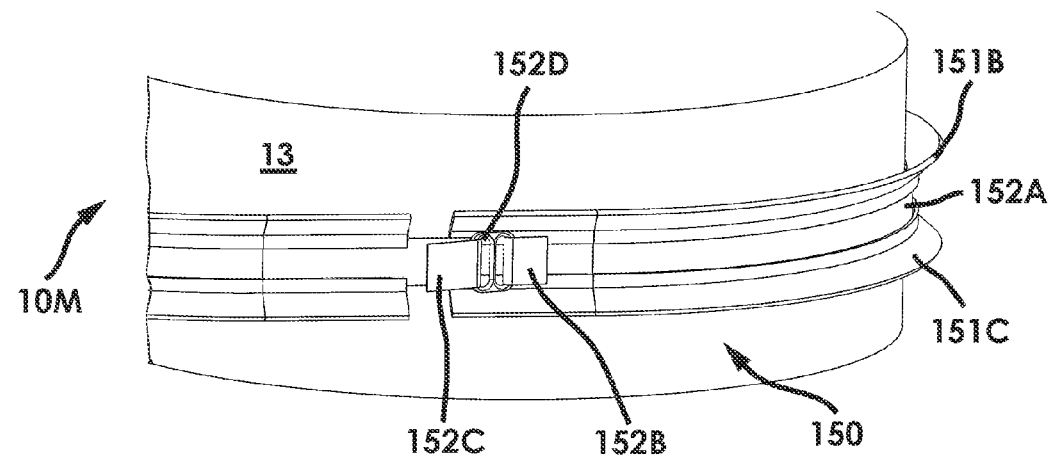
Figure 79C:
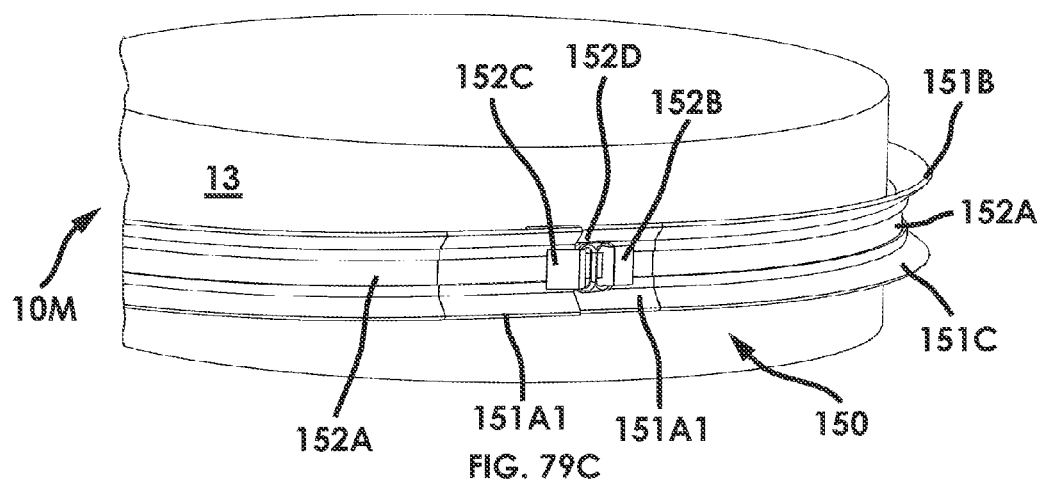

FIG. 33A is a perspective view of the communication tower panel security device of the fourth illustrative embodiment of the present invention, showing its flat pronged end connector being slid into the connector channel of the connecting/tensioning assembly of the device, and the free end of the cord is routed about the pulley within the connected/winding module, so that the device can surround and secures the shroud panels of the communication tower;

FIG. 33B is a first perspective view of the communication tower panel security device of the fourth illustrative embodiment of the present invention, where its flat pronged end connector is slid into the connector channel of the connecting/tensioning assembly of the device, and the free end of the cord has been pulled through the pulley within the connected/winding module, so that the cord and plastic tubing encasing the same surrounds and secures the shroud panels of the communication tower under a desired degree of tension;

FIG. 33C is a second perspective view of the communication tower panel security device of the fourth illustrative embodiment of the present invention, shown in FIG. 33B;

FIG. 34 is an elevated side view of the communication tower panel security device of the fourth illustrative embodiment of the present invention, where the flat pronged end connector has slid further along the connector channel of the connecting/tensioning assembly of the device, and the free end of the cord has been further pulled through the pulley within the connected/winding module, so that the cord and plastic tubing encasing the same surrounds and secures the shroud panels of the communication tower under a desired degree of tension, while the ratchet mechanism locks the tensioned cord in position;

FIG. 35 is an elevated side view of a cellular communication tower (CCT) equipped with multiple communication tower panel security devices according to the fifth illustrative embodiment of the present invention, illustrated in FIGS. 31 through 34;

FIG. 36 is a perspective view of the communication tower panel security device of the fifth illustrative embodiment that is fastened to an antenna bay of a communication tower shown in FIG. 35, and secured tightly thereabout;

FIG. 37 is an exploded view of the communication tower panel security device of the fifth illustrative embodiment of the present invention, shown in FIG. 35;

FIG. 38A is a perspective view of the communication tower panel security device of the fifth illustrative embodiment of the present invention, showing its flat dented end connector being slid into the connector channel of the connecting/tensioning assembly of the device so that the device can surround and secure the shroud panels of the communication tower;

FIG. 38B is a perspective view of the communication tower panel security device of the fifth illustrative embodiment of the present invention, where its flat dented end connector is manually slid into and along the connector channel of the connecting/tensioning assembly of the device, so that the plastic tubing encasing the same surrounds and is taught about the shroud panels of the communication tower;

FIG. 38C is a second perspective view of the communication tower panel security device of the fifth illustrative embodiment of the present invention, shown in FIG. 38B, where the tightening bar is rotated multiple times, each time, further advancing the dented end connector along the connector channel of the connecting/tensioning assembly of the device, so that the plastic tubing secures the shroud panels of the communication tower under a desired degree of tension; and;

FIG. 38D is a perspective view of the communication tower panel security device of the fifth illustrative embodiment of the present invention, as shown in FIG. 38C, but where the tightening bar is shown disposed in its half-rotated position;

FIG. 38E is an elevated cross-sectional view of the communication tower panel security device of the fifth illustrative embodiment of the present invention, shown in FIG. 38D;

FIG. 38F is a perspective view of the communication tower panel security device of the fifth illustrative embodiment of the present invention, as shown in FIG. 38E, but where the un-tightening bar is shown being rotated in the clockwise direction, pushing the dented end connector in the reverse direction so as to decrease the tension of the device about the communication tower;

FIG. 38G is a perspective view of the communication tower panel security device of the fifth illustrative embodiment of the present invention, as shown in FIG. 38F, where the un-tightening bar is shown being fully rotated in the clockwise direction, pushing the dented end connector in the reverse direction by a predetermined amount;

FIG. 39 is an elevated side view of a cellular communication tower (CCT) equipped with multiple communication tower panel security devices according to the sixth illustrative embodiment of the present invention, illustrated in FIGS. 40 through 44B;

FIG. 40A is a perspective view of the communication tower panel security device of the sixth illustrative embodiment that is fastened to an antenna bay of a communication tower shown in FIG. 39, and secured tightly thereabout;

FIG. 40B is a perspective view of the communication tower panel security device of the sixth illustrative embodiment of the present invention, shown in FIG. 40A;

FIG. 41 is an exploded view of the communication tower panel security device of the sixth illustrative embodiment of the present invention, shown in FIG. 40A, showing its flexible band structure, its connecting/tensioning assembly with its first connection channel and second pass-though connection channel, and its spring-loaded cam component rotatably mounted along the pass-though connection channel;

FIG. 42A is a perspective view of the communication tower panel security device of the sixth illustrative embodiment of the present invention, shown removed from the communication tower, with one free end of the flexible banding structure mounted within the mated connection channel, while the other free end of the flexible banding structure is removed and disengaged from its connection channel;

FIG. 42B is a perspective view of the communication tower panel security device of the sixth illustrative embodiment of the present invention, shown removed from the communication tower, with one free end of the flexible banding structure mounted within the mated connection channel, while the other free end of the flexible banding structure slid through, and engaged with the engaging cam component mounted along the pass-through connection channel;

FIG. 43A is a perspective view of the communication tower panel security device of the sixth illustrative embodiment of the present invention, shown in FIG. 41 with its connecting/tensioning assembly fastened to the surface of a shroud panel on a communication tower using Velcro fasteners, with the flexible banding structure wrapped around the tower but the free end thereof not yet inserted with the pass-through connection channel within the connecting/tensioning assembly;

FIG. 43B is an elevated cross-sectional view of the communication tower panel security device of the sixth illustrative embodiment shown in FIG. 43A, taken along line 43B-43B shown in FIG. 43A;

FIG. 44A is a perspective view of the communication tower panel security device of the sixth illustrative embodiment of the present invention, shown in FIG. 41 with its connecting/tensioning assembly fastened to the surface of a shroud panel on a communication tower using Velcro fasteners, and the flexible banding structure wrapped around the tower and its free end thereof inserted through the pass-through connection channel within the connecting/tensioning assembly, and engaged by its engaging cam component;

FIG. 44B is an elevated cross-sectional view of the communication tower panel security device of the sixth illustrative embodiment shown in FIG. 44A, taken along line 44B-44B shown in FIG. 44A;

FIG. 45 is an elevated side view of a cellular communication tower (CCT) equipped with multiple communication tower panel security devices according to the seventh illustrative embodiment of the present invention, illustrated in FIGS. 46A through 50B;

FIG. 46A is a perspective view of the communication tower panel security device of the seventh illustrative embodiment that is fastened to an antenna bay of a communication tower shown in FIG. 45, and secured tightly thereabout;

FIG. 46B is a perspective view of the communication tower panel security device of the seventh illustrative embodiment shown removed from an antenna bay of a communication tower illustrated in FIG. 45;

FIG. 47 is an exploded view of the communication tower panel security device of the seventh illustrative embodiment of the present invention, shown in FIG. 45, showing its flexible band structure, its connecting/tensioning assembly with its first connection channel and second pass-though connection channel, and its spring-loaded ratchet component rotatably mounted along the pass-though connection channel;

FIG. 48A is a perspective view of the communication tower panel security device of the seventh illustrative embodiment of the present invention, shown removed from the communication tower, with one free end of the flexible banding structure mounted within the mated connection channel, while the other free end of the flexible banding structure is removed and disengaged from its connection channel;

FIG. 48B is a cross sectional view of the communication tower panel security device of the seventh illustrative embodiment of the present invention, taken along line 48B-48B in FIG. 48A;

FIG. 49A is a perspective view of the communication tower panel security device of the seventh illustrative embodiment of the present invention, shown in FIG. 45 with its connecting/tensioning assembly fastened to the surface of a shroud panel on a communication tower using Velcro fasteners, with the flexible banding structure wrapped around the tower but the free end thereof not yet inserted with the pass-through connection channel within the connecting/tensioning assembly;

FIG. 49B is an elevated cross-sectional view of the communication tower panel security device of the seventh illustrative embodiment shown in FIG. 45, taken along line 49B-49B shown in FIG. 49A;

FIG. 50A is a perspective view of the communication tower panel security device of the seventh illustrative embodiment of the present invention, shown in FIG. 45 with its connecting/tensioning assembly fastened to the surface of a shroud panel on a communication tower using Velcro fasteners, and the flexible banding structure wrapped around the tower and its free end thereof inserted through the pass-through connection channel within the connecting/tensioning assembly, and engaged by its engaging cam component;

FIG. 50B is an elevated cross-sectional view of the communication tower panel security device of the seventh illustrative embodiment shown in FIG. 50A, taken along line 50B-50B shown in FIG. 50A;

FIG. 51 is an elevated side view of a cellular communication tower (CCT) equipped with multiple communication tower panel security devices according to the eighth illustrative embodiment of the present invention, illustrated in FIGS. 52 through 56B;

FIG. 52A is a perspective view of the communication tower panel security device of the eighth illustrative embodiment that is fastened to an antenna bay of a communication tower shown in FIG. 45, and secured tightly thereabout;

FIG. 52B is a first perspective view of the communication tower panel security device of the eighth illustrative embodiment shown removed from an antenna bay of a communication tower illustrated in FIG. 51;

FIG. 52C is a second perspective view of the communication tower panel security device of the eighth illustrative embodiment shown removed from an antenna bay of a communication tower illustrated in FIG. 51;

FIG. 53 is an exploded view of the communication tower panel security device of the eighth illustrative embodiment of the present invention, shown in FIG. 51, showing its flexible tube structure, its connecting/tensioning assembly with its first connection channel and second pass-though connection channel disposed in different planes, and its spring-loaded locking component axially mounted along the pass-though connection channel;

FIG. 54A is a perspective view of the communication tower panel security device of the eighth illustrative embodiment of the present invention, shown removed from the communication tower, with one free end of the flexible tube structure mounted within the mated connection channel, while the other free end of the flexible tube structure is removed and disengaged from its connection channel;

FIG. 54B is a cross sectional view of the communication tower panel security device of the eighth illustrative embodiment of the present invention, taken along line 54B-54B in FIG. 54A;

FIG. 55A is a perspective view of the communication tower panel security device of the eighth illustrative embodiment of the present invention, shown in FIG. 51 with its connecting/tensioning assembly fastened to the surface of a shroud panel on a communication tower using Velcro fasteners, with the flexible tube structure wrapped around the tower but the free end thereof not yet inserted with the pass-through connection channel within the connecting/tensioning assembly;

FIG. 55B is an elevated cross-sectional view of the communication tower panel security device of the eighth illustrative embodiment shown in FIG. 51 taken along line 55B-55B shown in FIG. 55A, showing how the connection channels are disposed in different planes relative to the earth's plane when mounted on a communication tower;

FIG. 56A is a perspective view of the communication tower panel security device of the eighth illustrative embodiment of the present invention, shown in FIG. 51 with its connecting/tensioning assembly fastened to the surface of a shroud panel on a communication tower using Velcro fasteners, and the flexible tube structure wrapped around the tower and its free end thereof inserted through the pass-through connection channel within the connecting/tensioning assembly, and engaged by its engaging cam component;

FIG. 56B is an elevated cross-sectional view of the communication tower panel security device of the eighth illustrative embodiment shown in FIG. 56A, taken along line 56B-56B shown in FIG. 56A;

FIG. 57 is an elevated side view of a cellular communication tower (CCT) equipped with multiple communication tower panel security devices according to the ninth illustrative embodiment of the present invention, illustrated in FIGS. 58A through 62B;

FIG. 58A is a perspective view of the communication tower panel security device of the ninth illustrative embodiment that is fastened to an antenna bay of a communication tower shown in FIG. 45, and secured tightly thereabout;

FIG. 58B is a first perspective view of the communication tower panel security device of the ninth illustrative embodiment shown removed from an antenna bay of a communication tower illustrated in FIG. 57;

FIG. 58C is a second perspective view of the communication tower panel security device of the ninth illustrative embodiment shown removed from an antenna bay of a communication tower illustrated in FIG. 57;

FIG. 59 is an exploded view of the communication tower panel security device of the ninth illustrative embodiment of the present invention, shown in FIG. 57, showing its flexible tube structure, its connecting/tensioning assembly with its first connection channel and second pass-though connection channel disposed in substantially the same plane relative to the Earth's horizontal plane, and its spring-loaded locking component axially mounted along the pass-though connection channel;

FIG. 60A is a perspective view of the communication tower panel security device of the ninth illustrative embodiment of the present invention, shown removed from the communication tower, with one free end of the flexible tube structure mounted within the mated connection channel, while the other free end of the flexible tube structure is removed and disengaged from its connection channel;

FIG. 60B is a cross sectional view of the communication tower panel security device of the ninth illustrative embodiment of the present invention, taken along line 60B-60B in FIG. 60A, showing how the connection channels are disposed in substantially the same plane relative to the earth's horizontal plane when mounted on a communication tower;

FIG. 61A is a perspective view of the communication tower panel security device of the ninth illustrative embodiment of the present invention, shown in FIG. 57 with its connecting/tensioning assembly fastened to the surface of a shroud panel on a communication tower using Velcro fasteners, with the flexible tube structure wrapped around the tower but the free end thereof not yet inserted with the pass-through connection channel within the connecting/tensioning assembly;

FIG. 61B is an elevated cross-sectional view of the communication tower panel security device of the ninth illustrative embodiment shown in FIG. 57 taken along line 61B-61B shown in FIG. 55A;

FIG. 62A is a perspective view of the communication tower panel security device of the ninth illustrative embodiment of the present invention, shown in FIG. 57 with its connecting/tensioning assembly fastened to the surface of a shroud panel on a communication tower using Velcro fasteners, and the flexible tube structure wrapped around the tower and its free end thereof inserted through the pass-through connection channel within the connecting/tensioning assembly, and engaged by its engaging cam component;

FIG. 62B is an elevated cross-sectional view of the communication tower panel security device of the ninth illustrative embodiment shown in FIG. 62A, taken along line 62B-62B shown FIG. 63 is an elevated side view of a cellular communication tower (CCT) equipped with multiple communication tower panel security devices according to the tenth illustrative embodiment of the present invention, illustrated in FIGS. 64 through 68B;

FIG. 64A is a perspective view of the communication tower panel security device of the tenth illustrative embodiment that is fastened to an antenna bay of a communication tower shown in FIG. 45, and secured tightly thereabout;

FIG. 64B is a first perspective view of the communication tower panel security device of the tenth illustrative embodiment shown removed from an antenna bay of a communication tower illustrated in FIG. 63;

FIG. 64C is a second perspective view of the communication tower panel security device of the tenth illustrative embodiment shown removed from an antenna bay of a communication tower illustrated in FIG. 63;

FIG. 65 is an exploded view of the communication tower panel security device of the tenth illustrative embodiment of the present invention, shown in FIG. 63, showing its flexible tube structure, its connecting/tensioning assembly with its first connection channel and second pass-though connection channel, and its spring-loaded locking component axially mounted along the pass-though connection channel;

FIG. 66A is a perspective view of the communication tower panel security device of the tenth illustrative embodiment of the present invention, shown removed from the communication tower, with one free end of the flexible tube structure mounted within the mated connection channel, while the other free end of the flexible tube structure is removed and disengaged from its connection channel;

FIG. 66B is a cross sectional view of the communication tower panel security device of the tenth illustrative embodiment of the present invention, taken along line 66B-66B in FIG. 6A;

FIG. 67A is a perspective view of the communication tower panel security device of the tenth illustrative embodiment of the present invention, shown in FIG. 63 with its connecting/tensioning assembly fastened to the surface of a shroud panel on a communication tower using Velcro fasteners, with the flexible tube structure wrapped around the tower but the free end thereof not yet inserted with the pass-through connection channel within the connecting/tensioning assembly;

FIG. 67B is an elevated cross-sectional view of the communication tower panel security device of the tenth illustrative embodiment shown in FIG. 63 taken along line 67B-67B shown in FIG. 67A;

FIG. 68A is a perspective view of the communication tower panel security device of the tenth illustrative embodiment of the present invention, shown in FIG. 63 with its connecting/tensioning assembly fastened to the surface of a shroud panel on a communication tower using Velcro fasteners, and the flexible tube structure wrapped around the tower and its free end thereof inserted through the pass-through connection channel within the connecting/tensioning assembly, and engaged by its engaging cam component;

FIG. 68B is an elevated cross-sectional view of the communication tower panel security device of the tenth illustrative embodiment shown in FIG. 68A, taken along line 68B-68B shown in FIG. 68A;

FIG. 69 is an elevated side view of a cellular communication tower (CCT) equipped with multiple communication tower panel security devices according to the eleventh illustrative embodiment of the present invention, illustrated in FIGS. 70A through 74B;

FIG. 70A is a perspective view of the communication tower panel security device of the eleventh illustrative embodiment that is fastened to an antenna bay of a communication tower shown in FIG. 69, and secured tightly thereabout;

FIG. 70B is a first perspective view of the communication tower panel security device of the eleventh illustrative embodiment shown removed from an antenna bay of a communication tower illustrated in FIG. 69;

FIG. 71 is an exploded view of the communication tower panel security device of the eleventh illustrative embodiment of the present invention, shown in FIG. 69, showing its flexible banding structure, and its connecting/tensioning assembly comprising a pair of connection blocks secured near the free ends of the flexible banding structure (e.g. about 5-8 inches from the ends thereof), and Velcro® brand based releasable fastening mechanism coupling these connection blocks to provide the desired degree of tension;

FIG. 72A is a perspective view of the communication tower panel security device of the eleventh illustrative embodiment of the present invention, shown being wrapped about a communication tower to be secured, with one free end of the flexible banding structure being brought in close proximity to the other free end of the flexible banding, to thread the Velcro fastening strip (e.g. band) between the pair of connection blocks securely mounted near these free ends;

FIG. 72B is a cross sectional view of the communication tower panel security device of the eleventh illustrative embodiment of the present invention, taken along line 72B-72B in FIG. 72A;

FIG. 73A is a perspective view of the communication tower panel security device of the eleventh illustrative embodiment of the present invention, shown completely wrapped about a communication tower to be secured, with one free end of the flexible banding structure in close proximity to the other free end of the flexible banding, and the Velcro fastening strip (e.g. band) threaded between the pair of connection blocks securely mounted near these free ends and being adjusted so as to create the required degree of tension in the flexible banding structure to secure the communication tower shroud/cover panels;

FIG. 73B is a cross sectional view of the communication tower panel security device of the eleventh illustrative embodiment of the present invention, taken along line 73B-73B in FIG. 73A;

FIG. 74A is a perspective view of the communication tower panel security device of the eleventh illustrative embodiment of the present invention, shown completely wrapped about a communication tower to be secured, with the flexible banding structure fully connected and tensioned by the Velcro fastening strip (e.g. band) threaded between the pair of connection blocks, and tightly wrapping around the communication tower shroud/cover panels;

FIG. 74B is a cross sectional view of the communication tower panel security device of the eleventh illustrative embodiment of the present invention, taken along line 74B-74B in FIG. 74A;

FIG. 75 is an elevated side view of a cellular communication tower (CCT) equipped with multiple communication tower panel security devices according to the twelfth illustrative embodiment of the present invention, illustrated in FIGS. 76 through 34C;

FIG. 76 is a perspective view of the communication tower panel security device of the twelfth illustrative embodiment that is fastened to an antenna bay of a communication tower shown in FIG. 75, and secured tightly thereabout;

FIG. 77 is an exploded view of the communication tower panel security device of the twelfth illustrative embodiment of the present invention, shown in FIG. 75, showing its flexible banding structure, and its connecting/tensioning assembly comprising a thin but strong strap (with Velcro end strips) that slides into and along a central track formed along the outer surface of the flexible banding structure, and then buckled together using a conventional strap buckling device, to provide the desired degree of tension;

FIG. 78A is a perspective view of the communication tower panel security device of the twelfth illustrative embodiment of the present invention, shown removed from the communication tower, where the free ends of the flexible plastic banding structure are brought into proximity of each other, so that its connecting/tensioning assembly (comprising a thin but strong strap (with Velcro end strips) that slides into and along a central track formed along the outer surface of the flexible banding structure while its free ends are buckled together using a conventional strap buckling device) can generates the required degree of tension around the shroud panels around the communication tower;

FIG. 78B is a perspective view of the communication tower panel security device of the twelfth illustrative embodiment of the present invention, shown removed from the communication tower, where the free ends of the flexible plastic banding structure are buckled together using the strap-based connecting/tensioning assembly, to generate the desired degree of tension around the shroud panels around the communication tower;

FIG. 78C is a perspective view of the communication tower panel security device of the twelfth illustrative embodiment of the present invention, shown removed from the communication tower, where the free ends of the flexible plastic banding structure are overlapping and buckled together using the strap-based connecting/tensioning assembly, to generate the desired degree of tension around the shroud panels around the communication tower;

FIG. 79A is a perspective view of the communication tower panel security device of the twelfth illustrative embodiment of the present invention being installed about a communication tower, showing the free ends of the flexible plastic banding structure being brought into proximity of each other, so that its connecting/tensioning assembly (comprising a thin but strong strap (with Velcro end strips) that slides into and along a central track formed along the outer surface of the flexible banding structure while its free ends are buckled together using a conventional strap buckling device) can generate the required degree of tension around the shroud panels around the communication tower;

FIG. 79B is a perspective view of the communication tower panel security device of the twelfth illustrative embodiment of the present invention being installed about a communication tower, showing its flexible plastic banding structure wrapped around the communication tower, and its strap-based connecting/tensioning assembly being buckled together using a conventional strap buckling device, to provide the desired degree of tension around the shroud panels around the communication tower; and FIG. 79C is a perspective view of the communication tower panel security device of the twelfth illustrative embodiment of the present invention being installed about a communication tower, showing its flexible plastic banding structure wrapped around the communication tower, with its free ends overlapping each other, while its strap-based connecting/tensioning assembly is buckled together using a conventional strap buckling device, to provide the desired degree of tension around the shroud panels around the communication tower.

DETAILED DESCRIPTION OF THE ILLUSTRATIVE EMBODIMENTS OF THE PRESENT INVENTION

Referring to the figures in the accompanying Drawings, the illustrative embodiments of the system and will be described in great detail, wherein like elements will be indicated using like reference numerals.

First Illustrative Embodiment of the Communication Tower Panel Security Device of the Present Invention FIG. 6 shows a communication tower 10 constructed and adapted according to the principles of the present invention, wherein a flag (e.g. The American Flag) 11 is supported in proud, safe and secure manner. As shown, the communication tower 10 has multiple bays 12A through 12D covered by radio-transparent shroud panels 13 which are each secured by several cellar communication tower panel security devices 14, constructed in accordance with the first illustrative embodiment of the present invention, illustrated in great detail in FIGS. 6I through 22E.

Figure 6B:
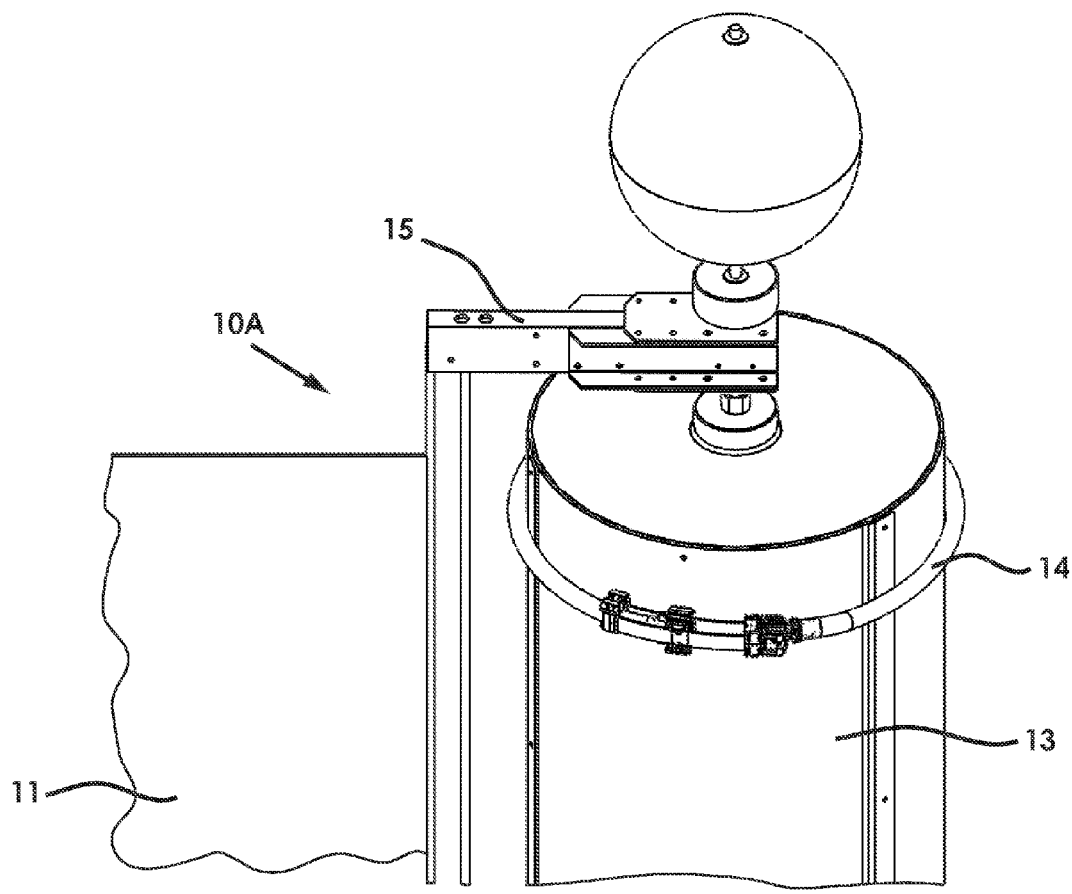
FIG. 6B shows a perspective enlarged view of the communication tower panel security device of the first illustrative embodiment of the present invention mounted at about the upper end of the top most bay of the communication tower illustrated in FIG. 6.

As shown in FIG. 6A, the upper section of the communication tower has several antenna/service bays about which multiple communication tower panel security devices 14 are mounted. As shown in FIG. 6B, the upper end of the top most bay of the communication tower illustrated supports a flag truck assembly 15 for supporting the flag 11. In FIGS. 16E, 16F, 17A, 19D, 22A, and 22B, the flag truck assembly 15 is removed from the top of the flag pole structure for purposes of illustration.

Figure 6C:
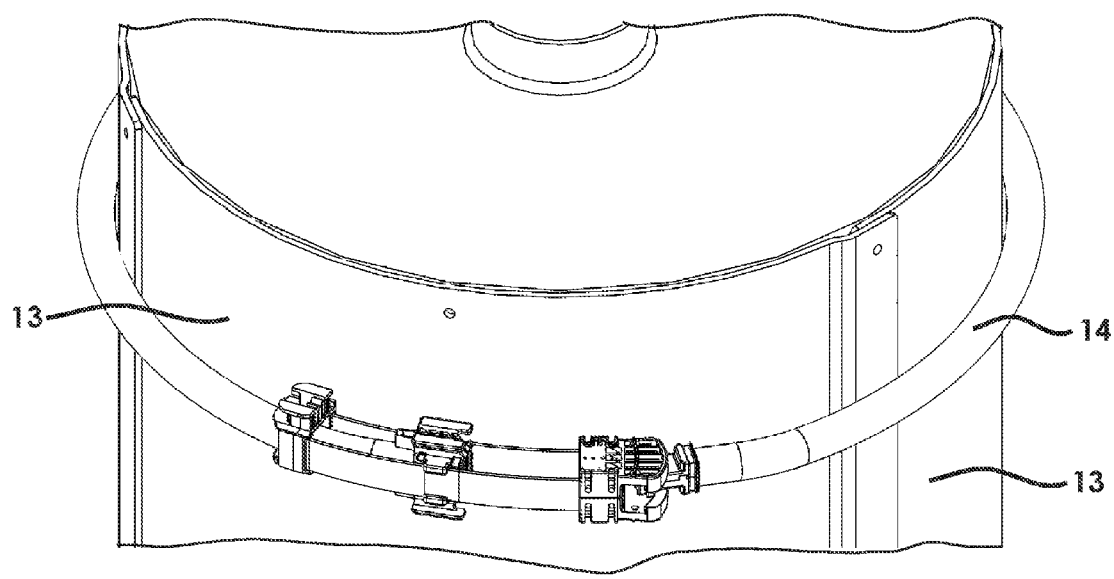
FIG. 6C is a partial cut-away perspective view of the communication tower panel security device shown in FIG. 6B.

As shown in FIG. 6C, the communication tower panel security device 14 is shown installed about the upper section of the top bay of the communication tower 10, while arranged in its closed and tensioned configuration.

Figure 6D:
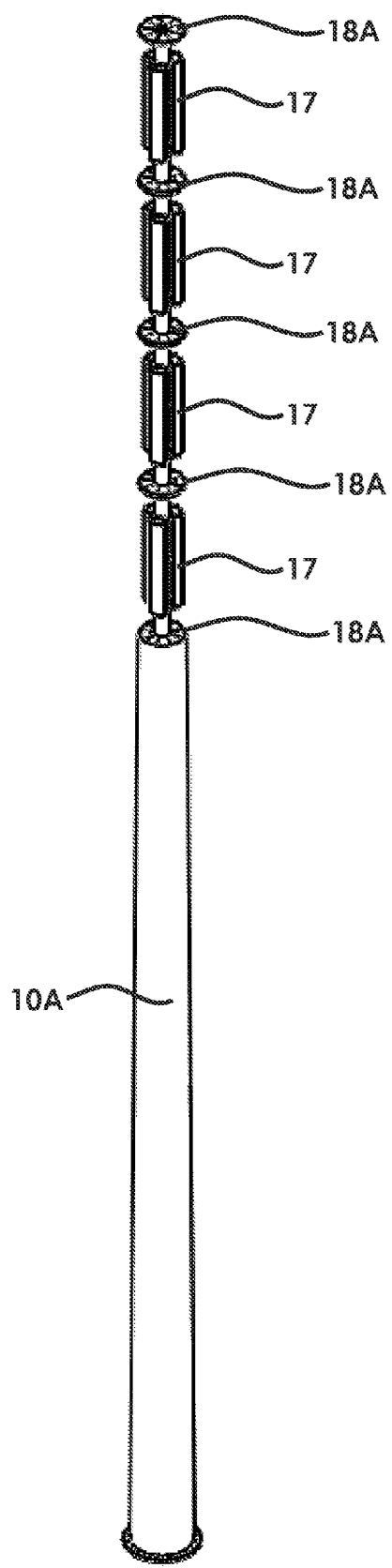
FIG. 6D shows a perspective view of the cell tower structure of FIG. 6, with the flag and its truck assembly removed from the top of the flag pole structure, as well as the shroud cover panels covering the top three bay sections of the cell tower structure, revealing antenna structures and associated electronics supported on the tower's supporting mast structure.
Figure 6E:
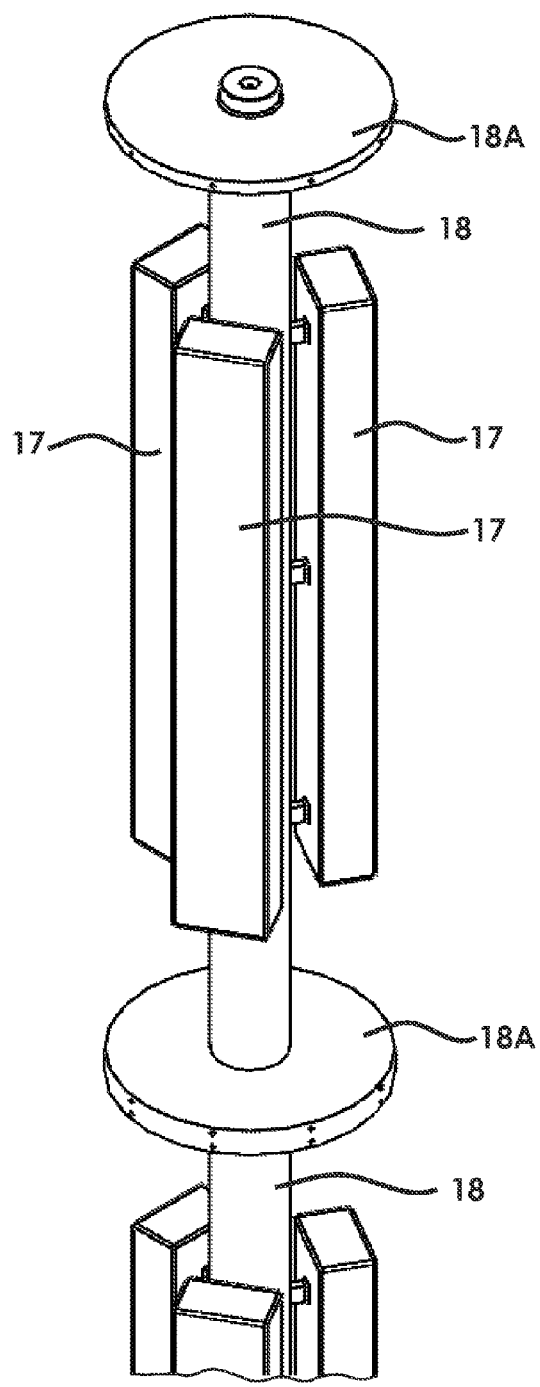
FIG. 6E shows a perspective enlarged view of the topmost antenna structure mounted within the tower structure illustrated in FIG. 6D.

As shown in FIG. 6D, all of the shroud cover panels 13 are shown removed from the four uppermost antenna service bays, revealing the antenna structures 17 and associated electronics supported on the tower's supporting mast structure 18, with cylindrical shroud cover support fixture discs 18A. FIG. 6E provides an enlarged view of the topmost antenna structure mounted within the tower structure illustrated in FIG. 6D.

It is understood that antenna structures and configurations that appears in wireless communication towers, on which the communication tower panel security devices are installed, will typically vary from wireless communication tower installation, and most cellular communication towers will contain antennas associated with different kinds of deployed digital cellular communication networks. Also, it is understood that the bandwidth of electromagnetic signal operation of any particular transmitting and/or receiving antenna structure, supported on any communication tower mast structure, will depend on the type of wireless telecommunication network in which the antenna structure is functioning. It is understood that the range of operating frequency (or operating bandwidth) of such antennas will differ for different mobile cellular phone networks, based on different digital cellular technologies, such as, for example: Global System For Mobile Communications (GSM); General Packet Radio Service (GPRS); cdmaOne (Interim Standard 95 or IS-95, the first CDMA-based digital cellular (2G) standard by Qualcomm); CDMA2000; Evolution-Data Optimized (EV-DO); Enhanced Data Rates for GSM Evolution (EDGE); Universal Mobile Telecommunication System (UMTS); Digital Enhanced Cordless Telecommunications (DECT); Digital AMPS (IS-136/TDMA technology); and Integrated Digital Enhanced Network (iDEN); and many other such digital cellular technologies, based on evolving telecommunication standards that are supported on many modern mobile phones, including smartphones and touch-screen tablet-like devices (e.g. iPad, iPhone, Android etc), modems, network devices and the like. It is also understood that the communication tower panel security devices of the present invention can be used with all such systems and networks and many others that will be developed in the future, and in should in no way limit the present invention.

Figure 6F:
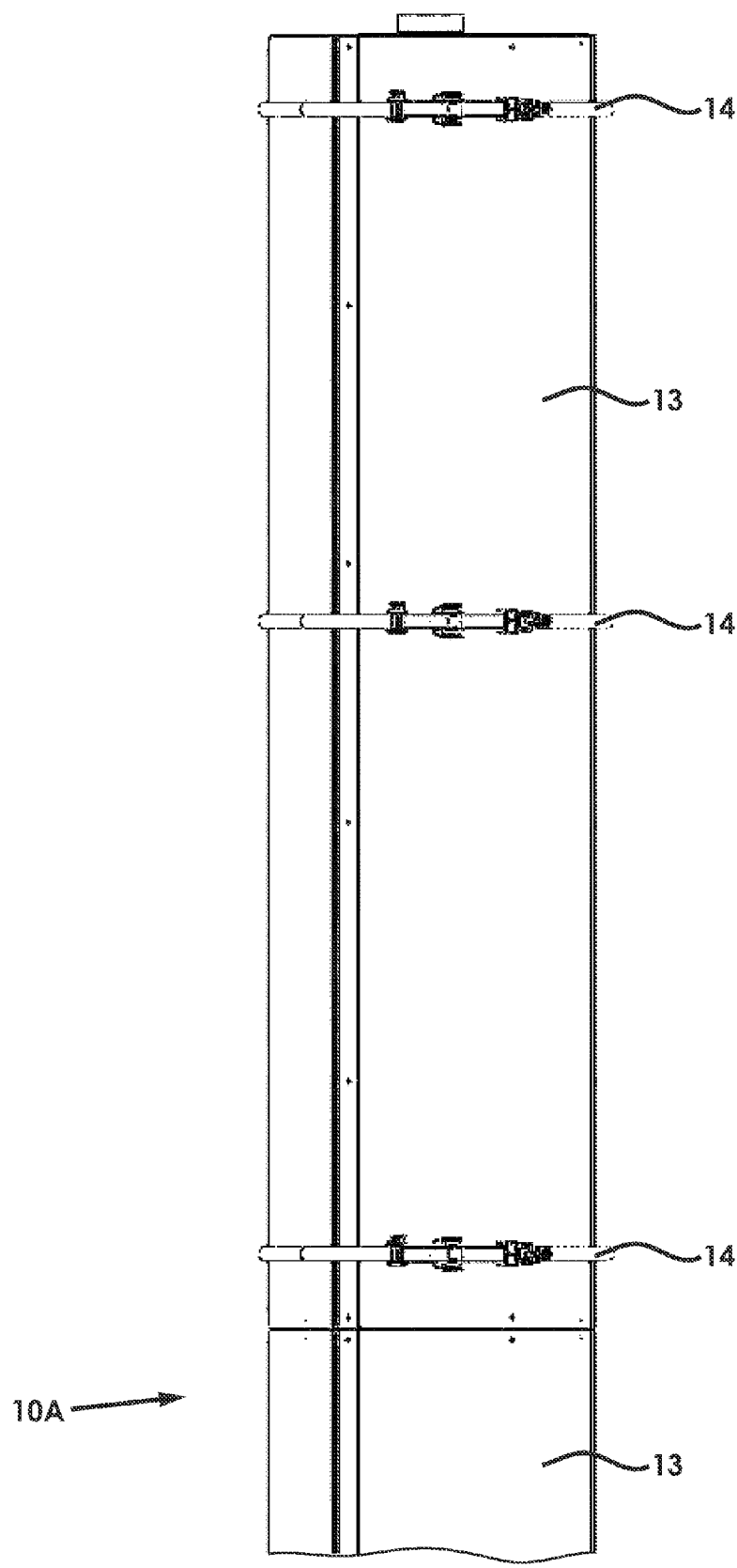
FIG. 6F shows a perspective view of the cell tower flag pole structure of FIGS. 6A through 1E, shown with its flag truck system removed and a set of communication tower panel security devices wrapped around the circumference of the communication tower structure at different height locations, to secure the panels in place against displacement in the presence of high winds and other foul weather conditions.
Figure 6G:
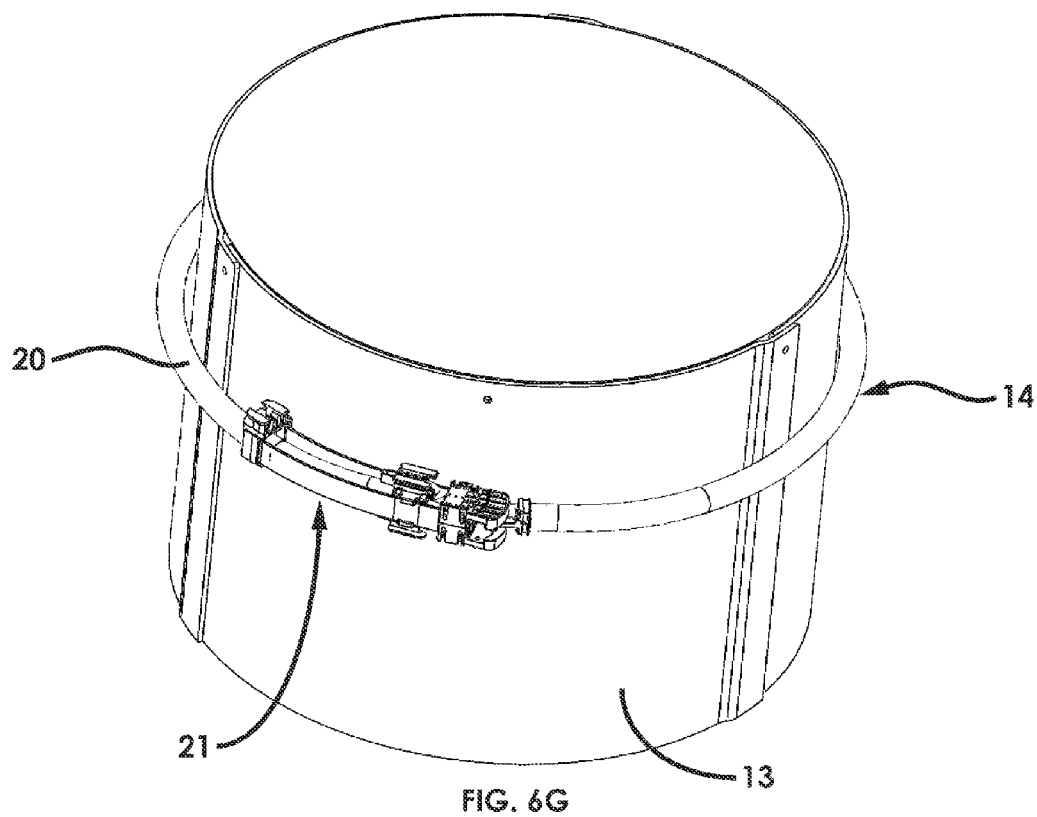
FIG. 6G is a perspective view of the topmost communication tower panel security device illustrated in FIG. 6F, encircling and securing the topmost shroud panel of the communication tower.
Figure 6H:
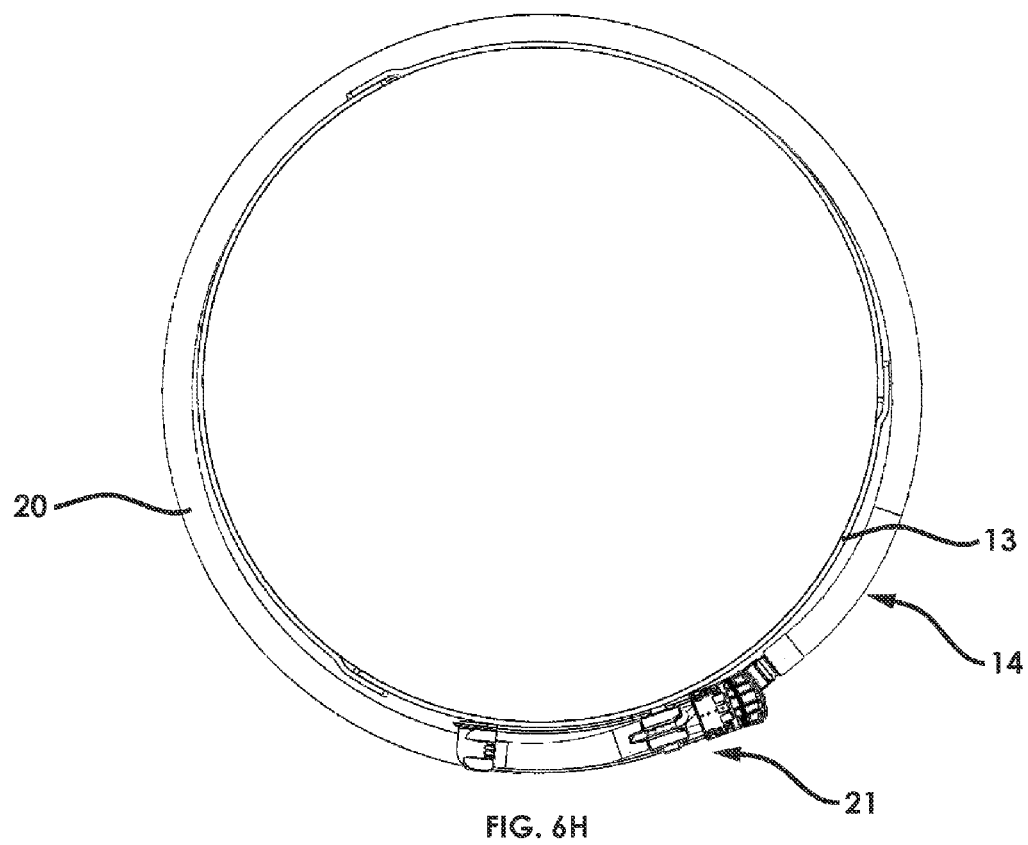
FIG. 6H shows a plan view of the communication tower panel security device of the first illustrative embodiment fastened the topmost portion of the communication tower illustrated in FIG. 6.

As shown in FIG. 6F, the cell tower flag pole structure of FIG. 6A has its flag truck system 15 removed and a set of communication tower panel security devices 14 are tightly wrapped around the circumference of the communication tower structure at different height locations, to secure the shroud (cover) panels in place against displacement in the presence of high winds and other foul weather conditions. In FIGS. 6G and 6H, the communication tower panel security device 14 is shown installed about the tower and arranged in its closed and tightened configuration.

Referring now to FIGS. 6 through 22, the first illustrative embodiment of new and improved cellar communication tower panel security device 14 of the present invention will be described in detail.

Figure 16A:
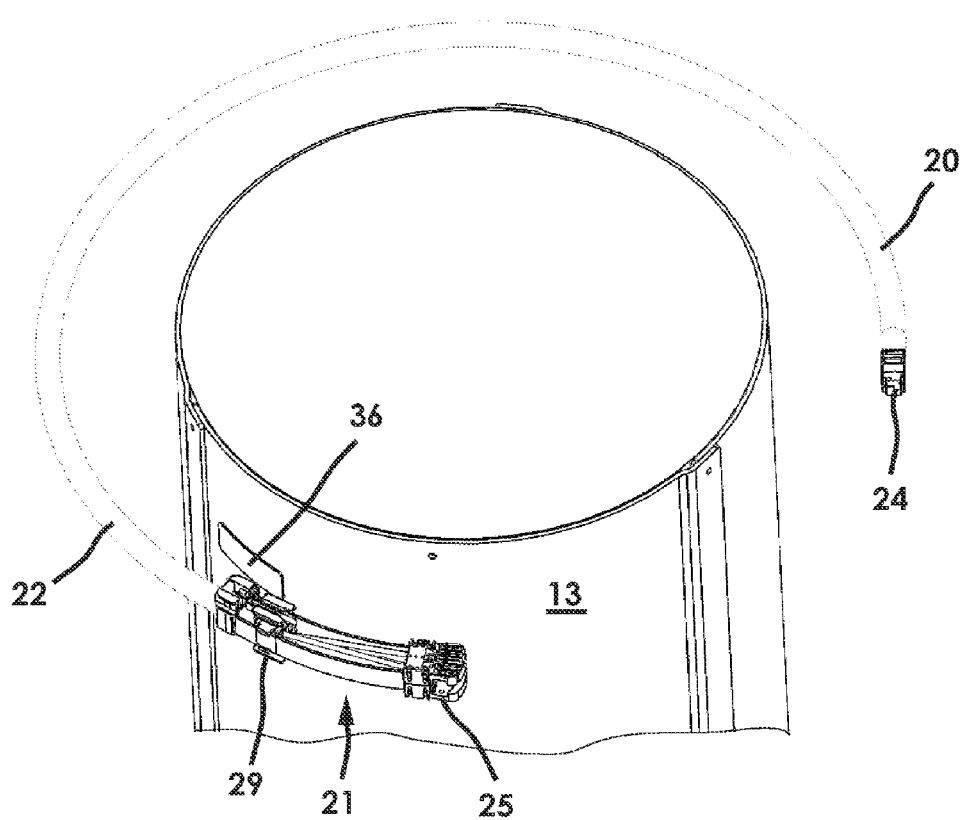
FIG. 16A is a perspective view of the top bay of the communication tower, about which the communication tower panel security device of the first illustrative embodiment is being aligned with a pre-affixed Velcro fastening patch applied to the mounting surface of the shroud panel associated with the antenna bay of the communication tower.
Figure 17A:
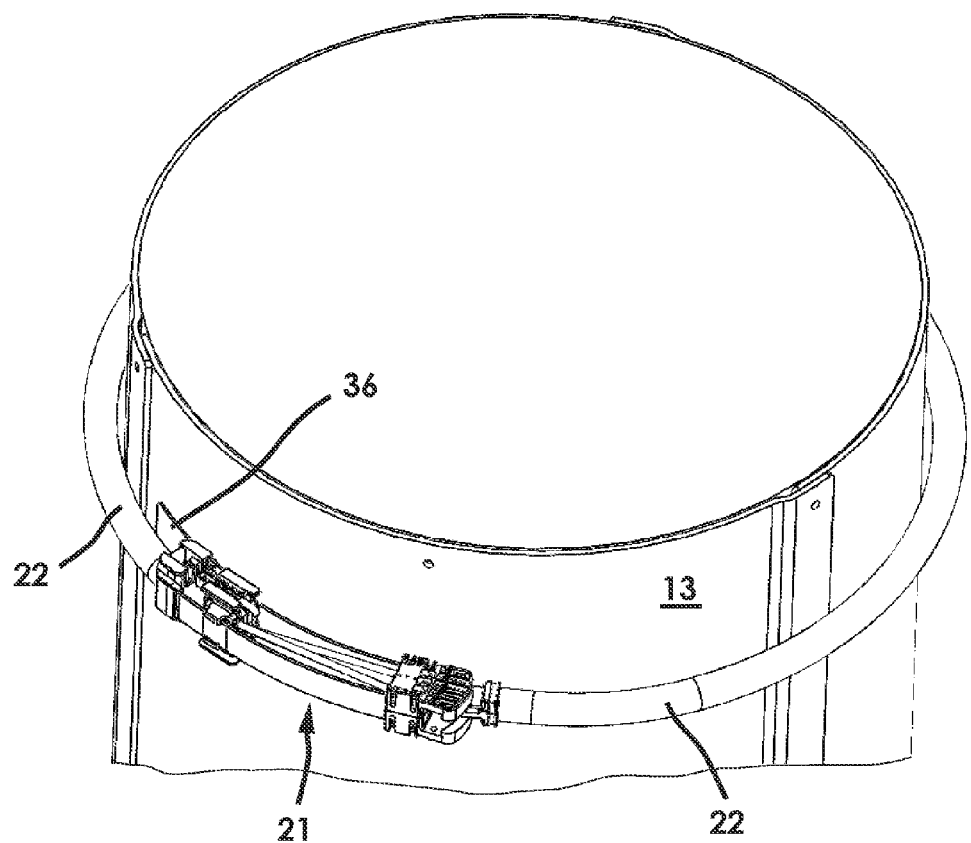
FIG. 17A is a perspective view of the top bay of the communication tower, about which the connecting/tensioning module of the communication tower panel security device of the first illustrative embodiment is mounted with the free end connector connected into the connector channel of the second end module, where the sliding module is located closely to the first end module and the cord is arranged in its loose configuration.

As shown in FIGS. 16A and 17A, the communication tower panel security device 14 comprises: a flexibly plastic tubing and cord/cord assembly 20 for wrapping around the shroud cover panels of antenna service bays of a cellular communication tower (CCT) 10; and a connecting/tensioning assembly 21 for interconnecting with the flexible plastic tubing and cord assembly 20 and generating and maintaining sufficient compression and tension forces to ensure that the plastic tubing 22 secures the shroud panels 13 in place to the supporting mast structure 18 during expected weather conditions.

As shown in FIGS. 16A and 17A, the communication tower panel security device 14 has both open and closed configurations, respectively, and between these two configurations, different degrees of tension are possible to safely and securely band together the service bay panels provided about any antenna service bay. In general, the communication tower panel security device 14 is designed for wrapping around the circumference of any bay of a communication tower (including a cell-tower flag pole structure) 10 at different height locations, and securely retaining the panels in place using a cord 23 (i) covered in protective plastic tubing which generates radially-directed compression forces against the tower shroud/cover panels when configured in its closed configuration, while preventing fraying, ripping or abrasion of a mounted flag and its lanyards, and (ii) connected together and tensioned using the connecting/tensioning assembly 21 illustrated in detail in FIGS. 6G and 6H, and elsewhere through the Specification.

Figure 6I:
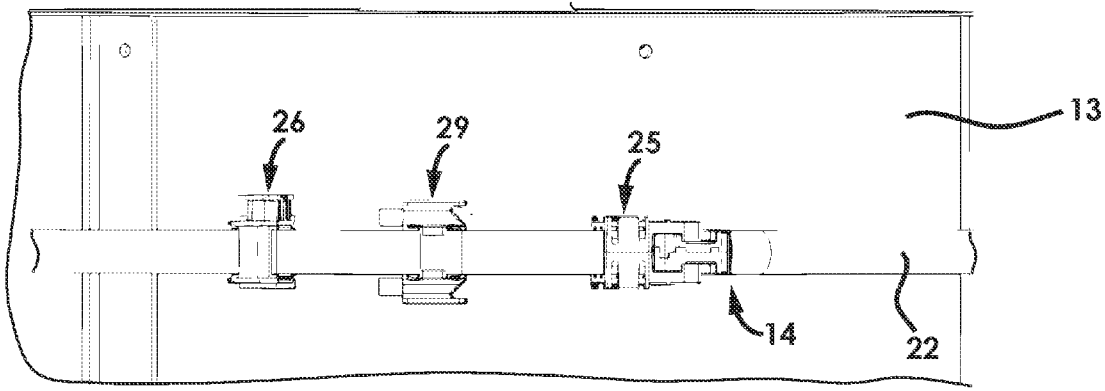
FIG. 6I shows an elevated side view of the communication tower panel security device of the first illustrative embodiment fastened the topmost portion of the communication tower illustrated in FIG. 6G.
Figure 6J:
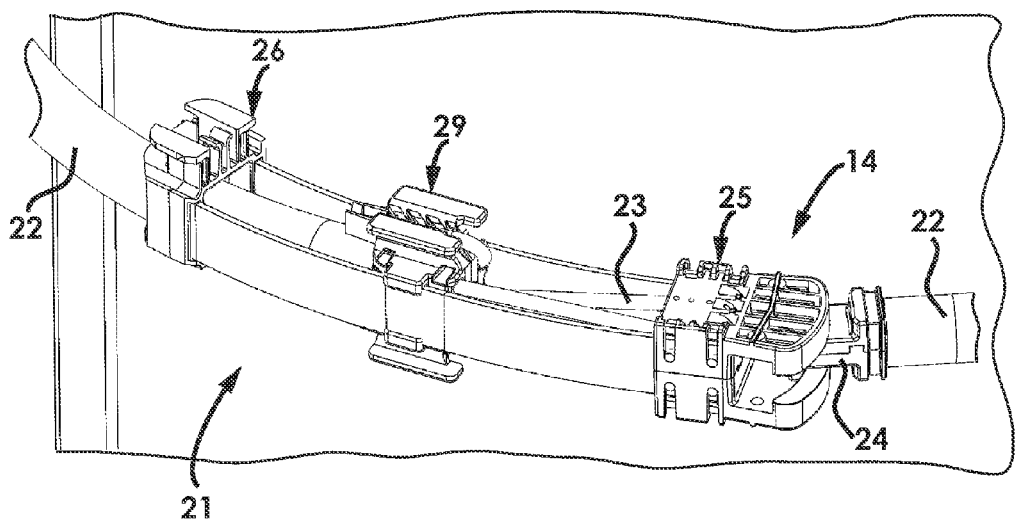
FIG. 6J shows a perspective side view of the communication tower panel security device of the first illustrative embodiment while fastened about the topmost portion of the communication tower illustrated in FIG. 6I.
Figure 6K:
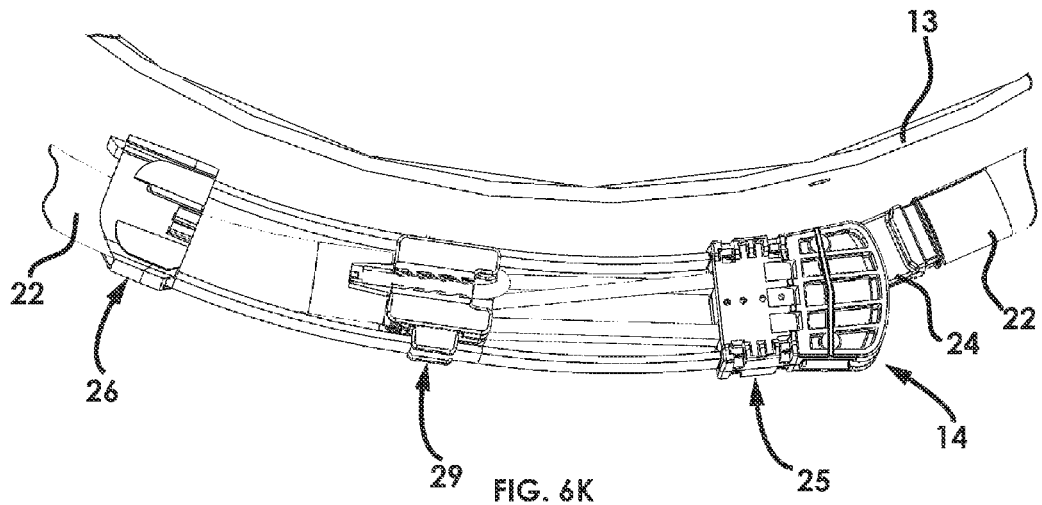
FIG. 6K shows a plan view of the communication tower panel security device of the first illustrative embodiment, fastened about the topmost portion of the communication tower illustrated in FIG. 6I.

In FIGS. 6I, 6J and 6K, the communication tower panel security device of the first illustrative embodiment 14 is shown fastened to the topmost portion of the communication tower illustrated in FIG. 6G, partially tensioned, and with its cord 23 shown partially cutaway and removed beyond the first cord retaining mechanism 29I supported on the upper portion of the sliding module 29, for purposes of illustration only. In other views, the cord 23 extending beyond the first cord retaining mechanism 29I on the sliding module 29 is wound-up about the cord windup fixtures 26F and 29J provided on the upper portions of the sliding module 29 and second end module 26, respectively.

Referring to FIGS. 7A through 7G, it is appropriate at this juncture to describe some inventive features of the communication tower panel security device 14 of the first illustrative embodiment of the present invention.

Figure 7A:
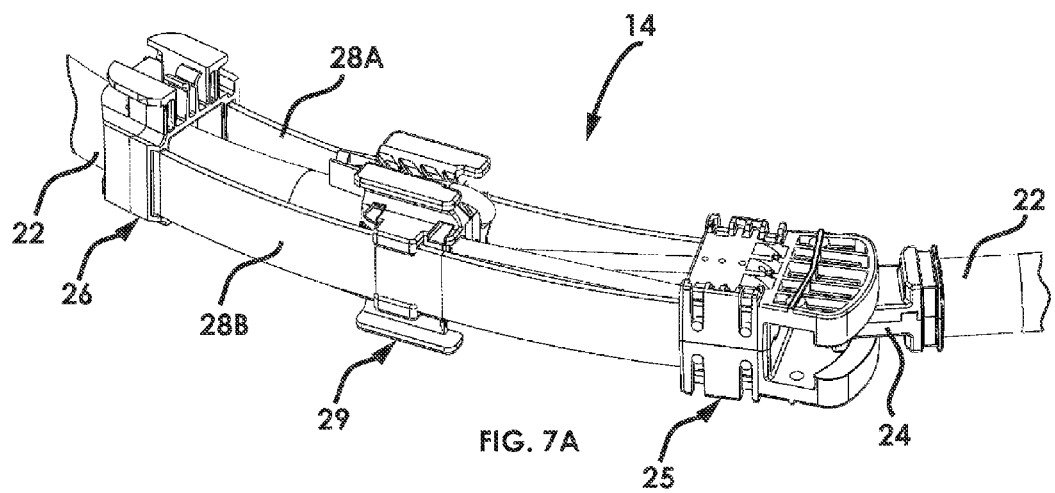
FIG. 7A shows a first perspective side view of the connecting/tensioning assembly of the communication tower panel security device of the first illustrative embodiment displayed while removed from the communication tower illustrated in FIG. 6.
Figure 7B:
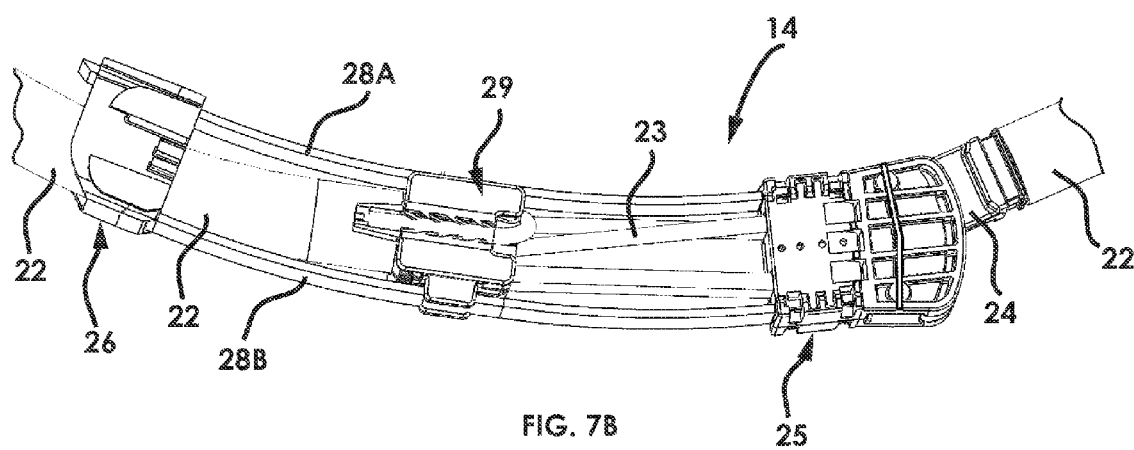
FIG. 7B shows a first plan view of the connecting/tensioning assembly of the communication tower panel security device of the first illustrative embodiment, displayed while removed from the communication tower illustrated in FIG. 6.
Figure 7C:
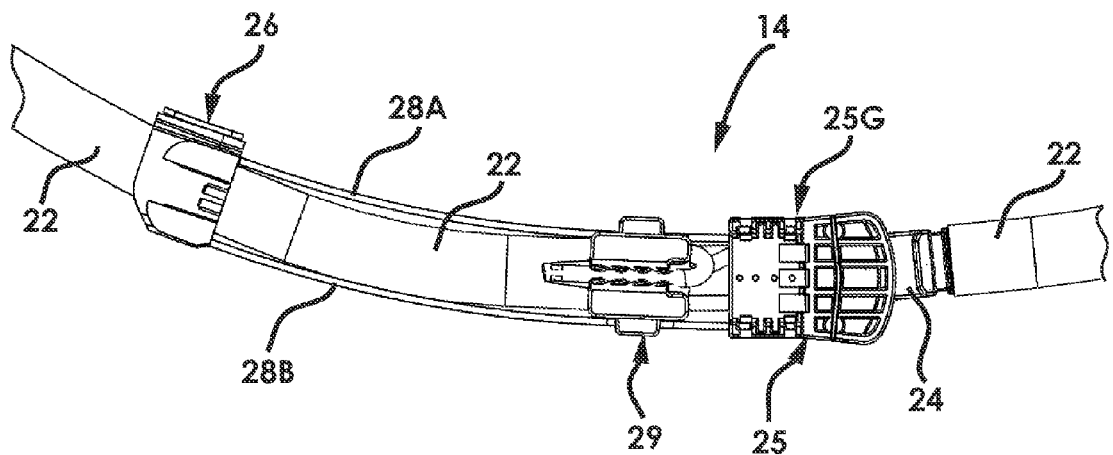
FIG. 7C shows a second plan view of the connecting/tensioning assembly of the communication tower panel security device of the first illustrative embodiment, flexibly configured for installation about a communication tower having a first diameter D1.
Figure 7D:
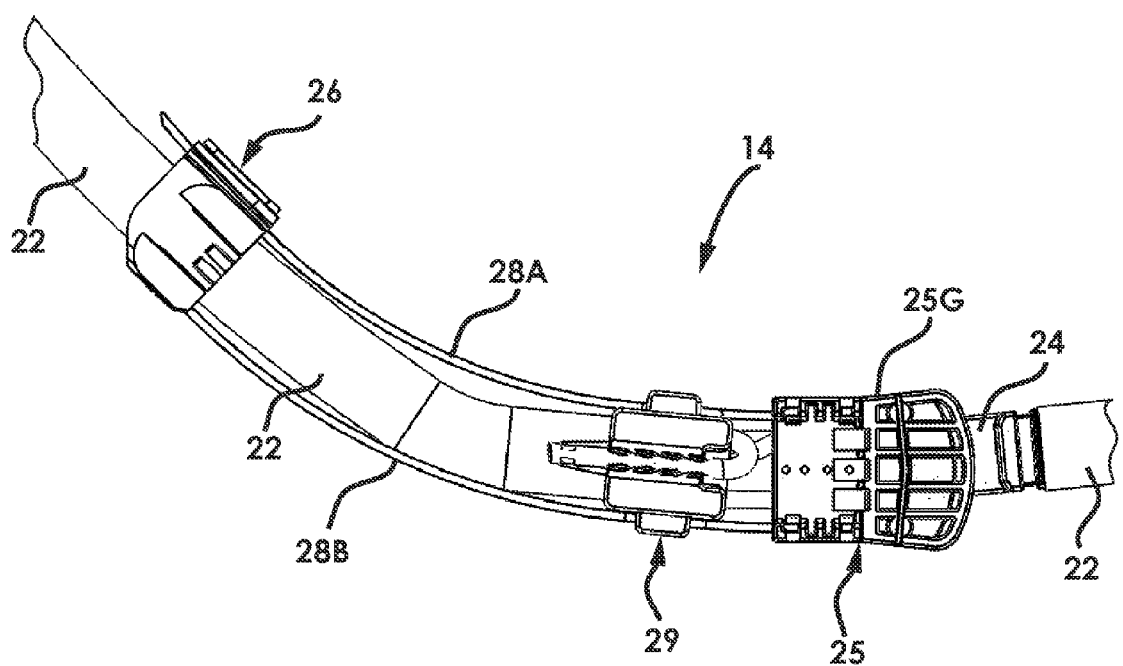
FIG. 7D shows a third plan view of the connecting/tensioning assembly of the communication tower panel security device of the first illustrative embodiment, flexibly configured for installation about a communication tower having a second diameter D2 which is substantially smaller than tower diameter D1, and requiring that the device adapted to a dramatic curvature.
Figure 7E:
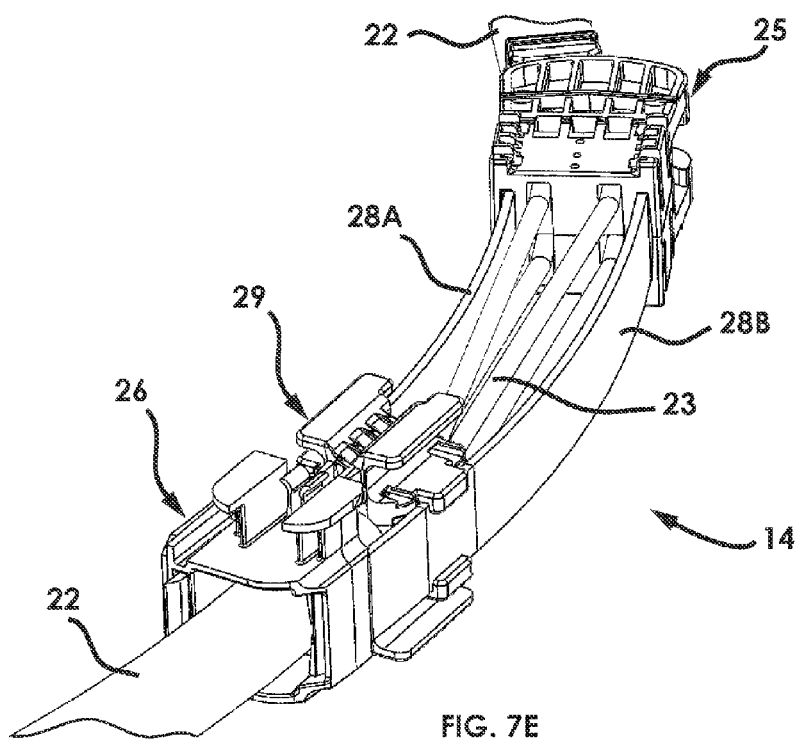
FIG. 7E is a second perspective view of the connecting/tensioning assembly of the communication tower panel security device of the first illustrative embodiment displayed while removed from the communication tower illustrated in FIG. 6.
Figure 7F:
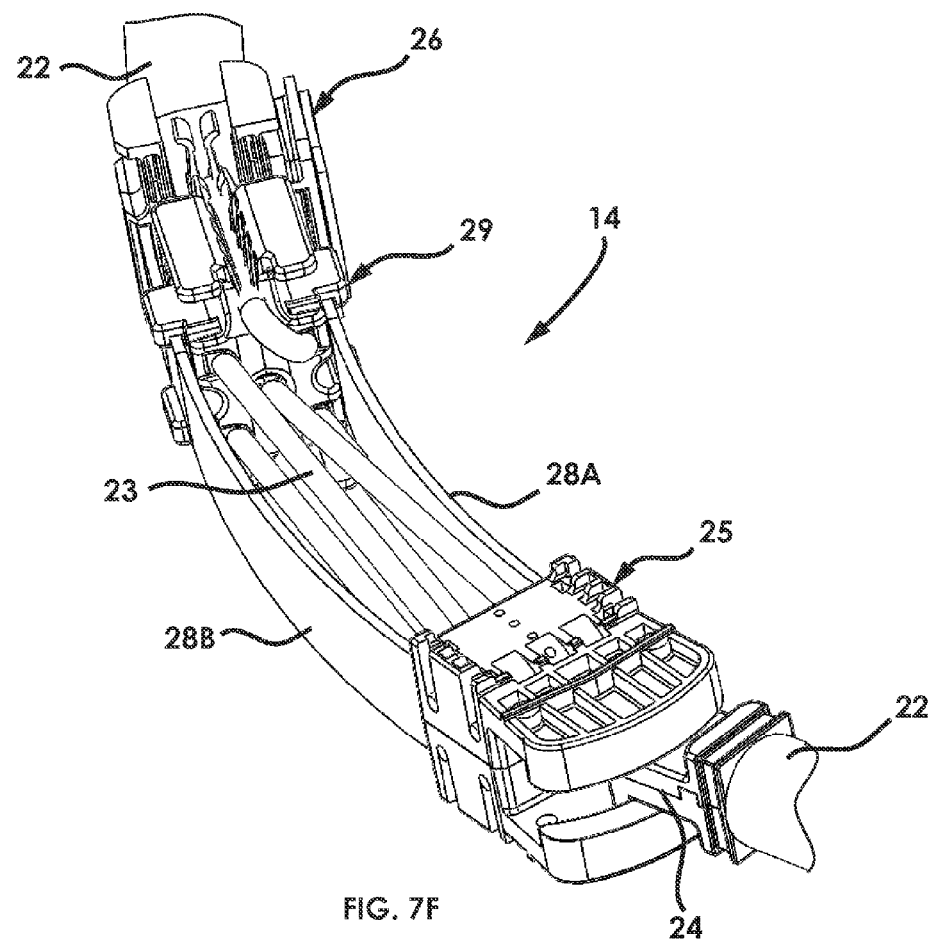
FIG. 7F is a third perspective view of the connecting/tensioning assembly of the communication tower panel security device of the first illustrative embodiment displayed while removed from the communication tower illustrated in FIG. 6.

One inventive feature, in particular, is that the connecting/tensioning assembly 21 of the device is designed to flexibly adapt to the curvature of the panel surfaces mounted about the communication tower, as shown in FIGS. 7C and 7D, and also in FIGS. 7E through 7G. This feature allows the CTT panel security device 14 to be easily installed about communication towers of substantially different diameters D1, D2 etc, as illustrated in FIGS. 22A through 22E, without the use of tools, improving bay to bay interchangeability. This is important because tower diameters vary not only from tower to tower (e.g. between 18 inches to 44 inches), but also between bay sections, and it is important that the device closely adapts to the panel surface curvature to ensure a uniform distribution of tension about the tower structure to maintain the cover panels safely and securely in place under all expected weather conditions. By virtue of its novel design and construction, the communication tower panel security device 24 also offers faster installation, thereby reducing on-site time and associated costs of installation and maintenance.

Another inventive feature is that the communication tower panel security device 14 is made entirely from high strength RF-energy transparent materials that can withstand high wind loads, and offer complete RF transparency over the expected range of electromagnetic radiation to be transmitted from and received by the antenna structures mounted behind and concealed by the shroud panels 13 of the communication tower 10. This allows the communication tower panel security device to be placed and installed about the middle of service bay sections of communication towers. Also using semi-elastic materials in the device helps maintain shroud compression when the device is installed on communication towers.

Referring now to FIGS. 8A through 14A, the communication tower panel security device of the first illustrative embodiment, including its subassemblies and subcomponents, will be described below.

Figure 8A:
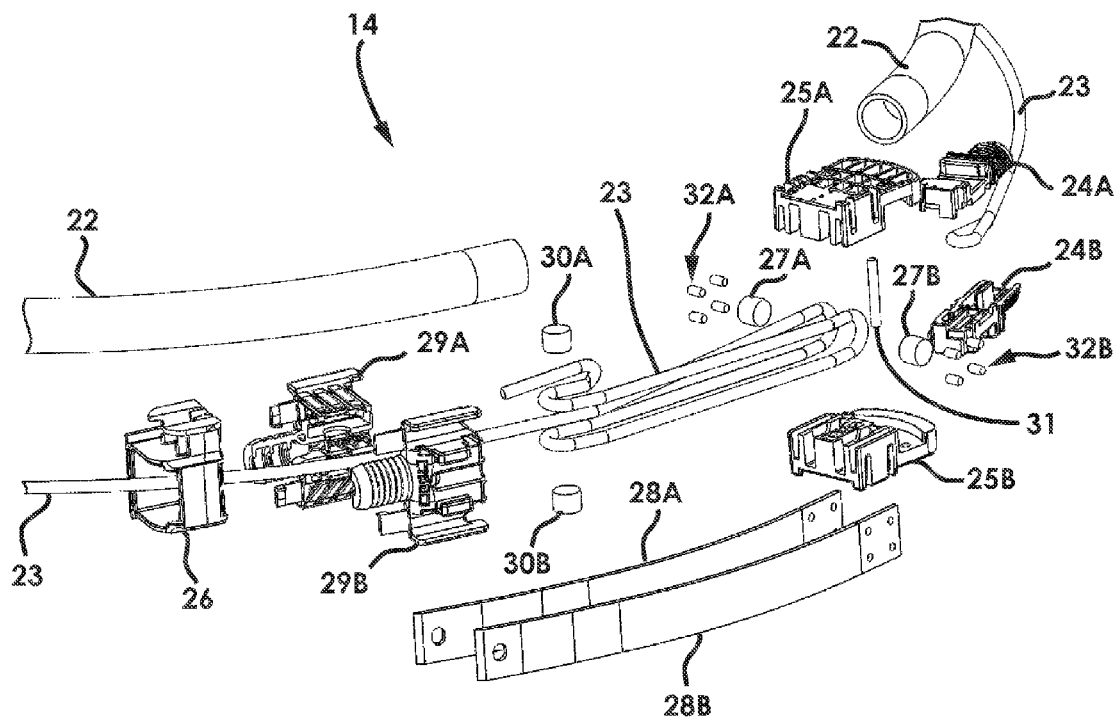
FIG. 8A is a first exploded view of the communication tower panel security device of the first illustrative embodiment including its subcomponents comprising the connecting/tensioning assembly of the device, its flexible plastic tubing and cord subassembly fixed to the end connector, the first end module, the second end module, the pair of flexible side panels, and the sliding module configured and assembled as shown in FIGS. 7A through 7D.
Figure 8B:
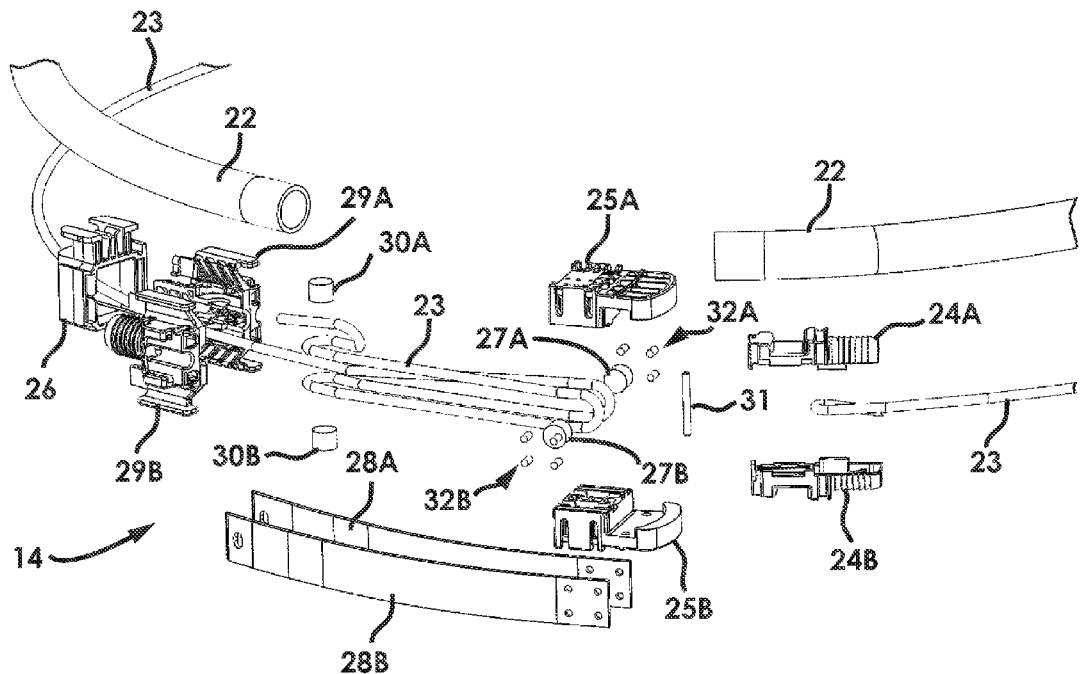
FIG. 8B is a second exploded view of the communication tower panel security device of the first illustrative embodiment, including the subcomponents comprising the connecting/tensioning assembly of the device as well as the flexible plastic tubing, cord and other components.
Figure 9A:
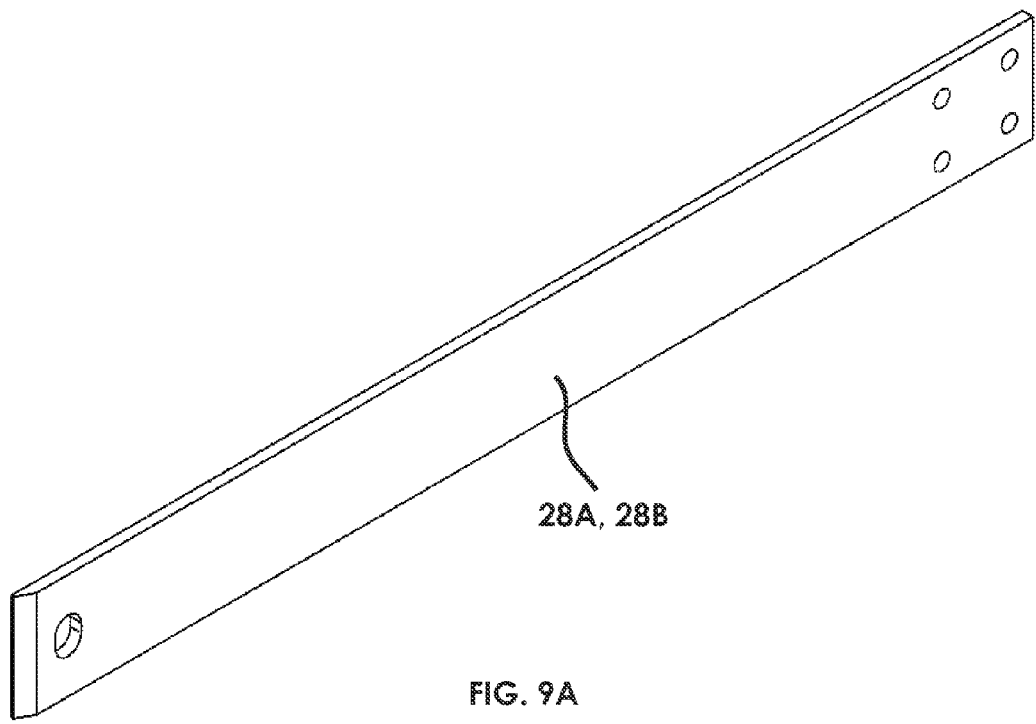
FIG. 9A is a perspective view of one of the flexible side panels employed in the communication tower panel security device of the first illustrative embodiment.
Figure 9B:
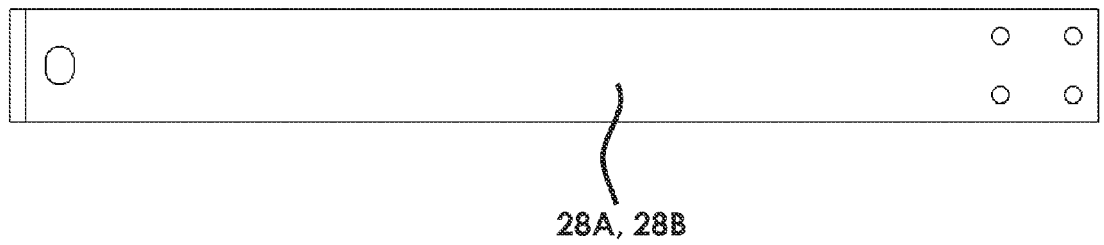
FIG. 9B is an elevated side view of one of the flexible side panels employed in the communication tower panel security device of the first illustrative embodiment.

As shown in FIGS. 8A and 8B, the communication tower panel security device 14 comprises: an end connector 24 a length of flexible cord 23 encased in a length of flexible plastic tubing 22 and having a first end that is connected to the end connector 24, and cut to suitable length for the application at hand; a first end module 25; a second end module 26 containing a first set of cylindrical pulleys 27A and 27B; a pair of flexible side panels 28A and 28B; and a sliding module 29 containing a second set of cylindrical pulleys 30A and 30B.

As shown in FIGS. 7A through 7G, the end connector 24 is connected to the first end of the length of flexible cord 23 and tubing 22, for surrounding the perimeter of the communication tower 10. The first end module 25 has (i) an exterior end connector receiving channel 25C, formed by surfaces 25C1 and 25C2, and adapted for releasably receiving the distal portion of the end connector 24 as shown in FIGS. 6J, 7A, 7F, 16E, 16F, 16G and 16H.

As shown in FIGS. 10A through 10G, the first end module 25 comprises: a first pair of side panel supports 25C1 and 25C2 for supporting the first ends of the flexible side panels 28A and 28B, respectively; a first cord input port and output port 25D1 and a first internal cord passageway 25E1 extending between the first cord input and output port 25D1, and along which the first rotatable pulley 27A of cylindrical geometry is mounted for pulling the cord thereover along the first internal cord pathway, to gain mechanical advantage of the first pulley; a second cord input and output port 25D2 and a second internal cord passageway 25F extending between the second cord input and output port 25D2, and along which the second rotatable pulley 27B of cylindrical geometry is mounted for pulling the cord thereover along the second internal cord pathway, to gain mechanical advantage of the second pulley 27B.

Figure 10A:
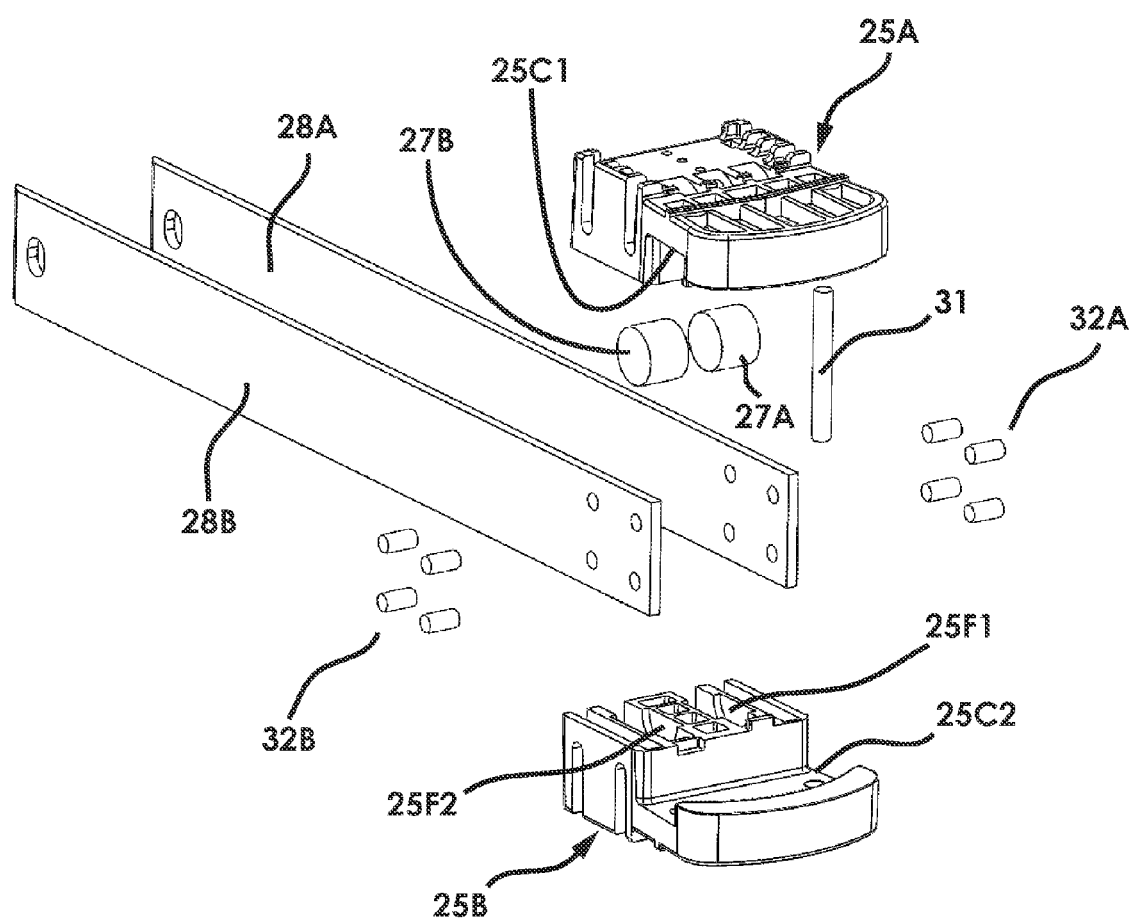
FIG. 10A is a perspective exploded view of the first end module subassembly comprising the pair of flexible side panels, the first set of pulleys mounted in the first end module, and the first and second half sections forming the first end module.
Figure 10B:
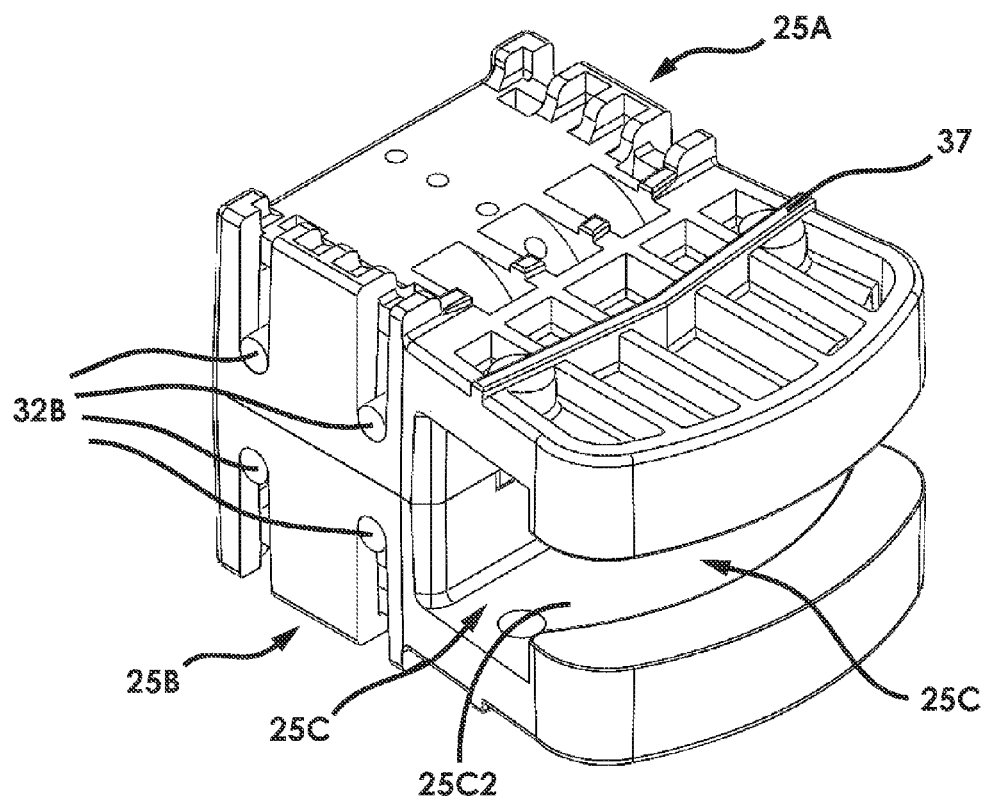
FIG. 10B is a first perspective view of the first end module shown assembled without the pair of flexible side panels, and its connector receiving portion adapted for receiving the connector attached to the flexible tubing and cord assembly during the device installation procedure of the present invention.
Figure 10C:
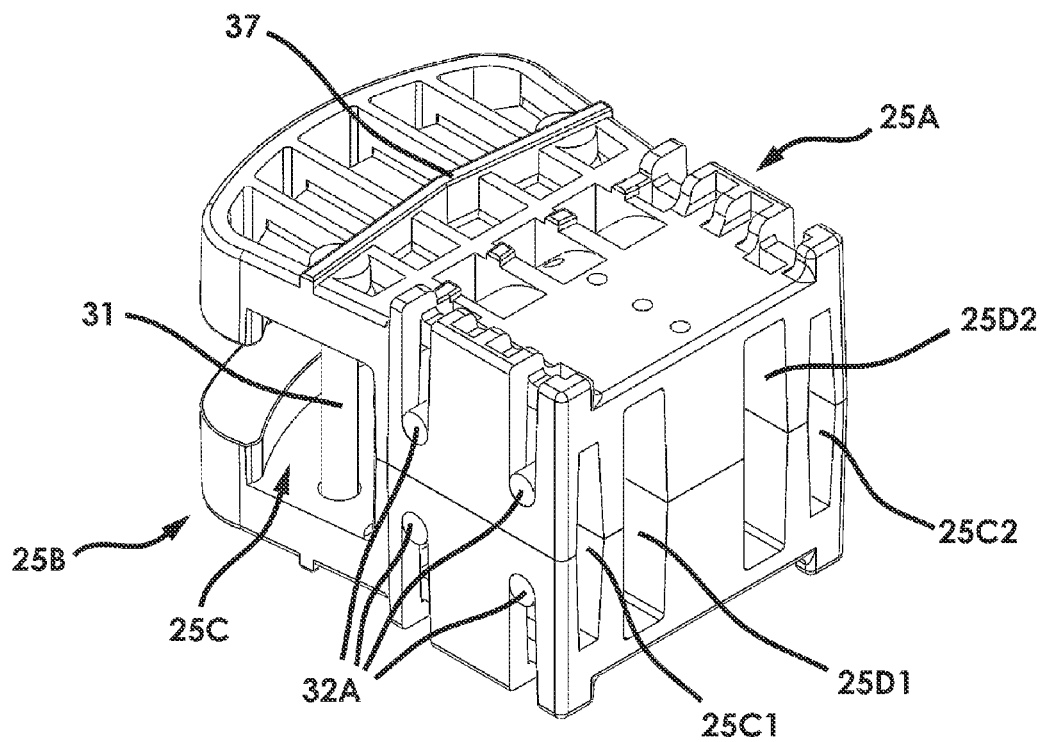
FIG. 10C is a second perspective view of the first end module shown assembled without the pair of flexible side panels, and its connector receiving portion adapted for receiving the connector attached to the flexible tubing and cord assembly during the device installation procedure of the present invention.
Figure 10D:
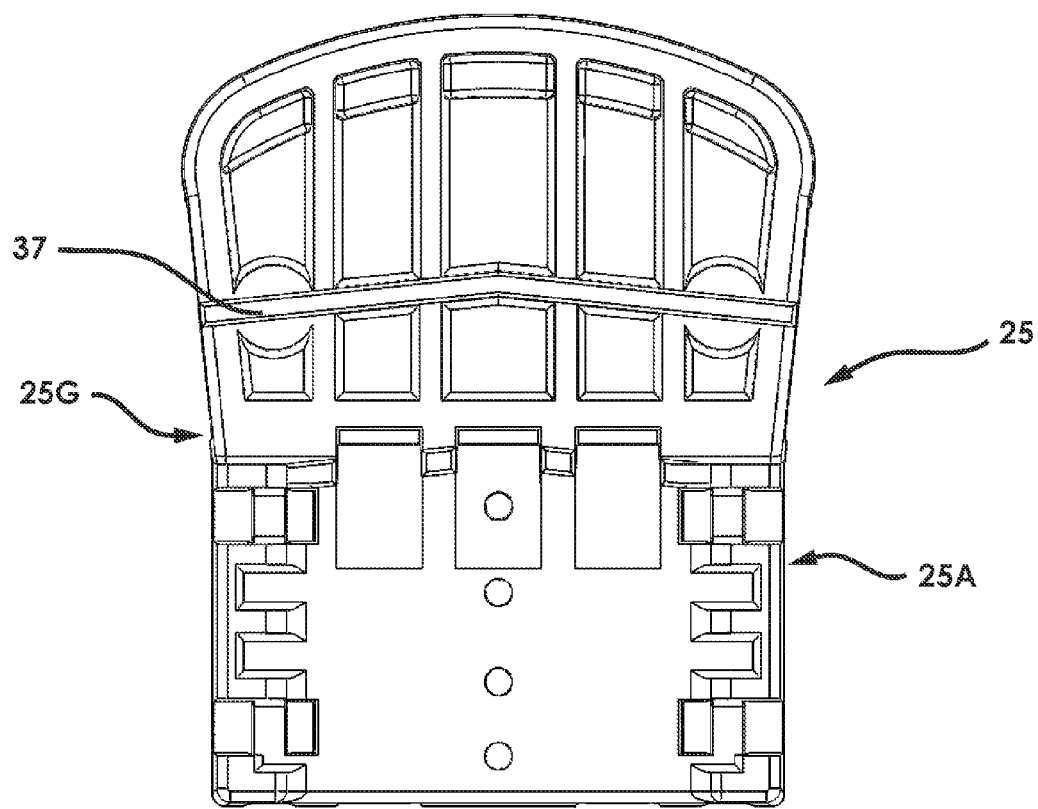
FIG. 10D is a first plan view of the first end module shown assembled without the pair of flexible side panels, and illustrating its cut tubing marking line realized as a relief-type raised line formed in the upper surface of the first end module, on the open channel side thereof.
Figure 10E:
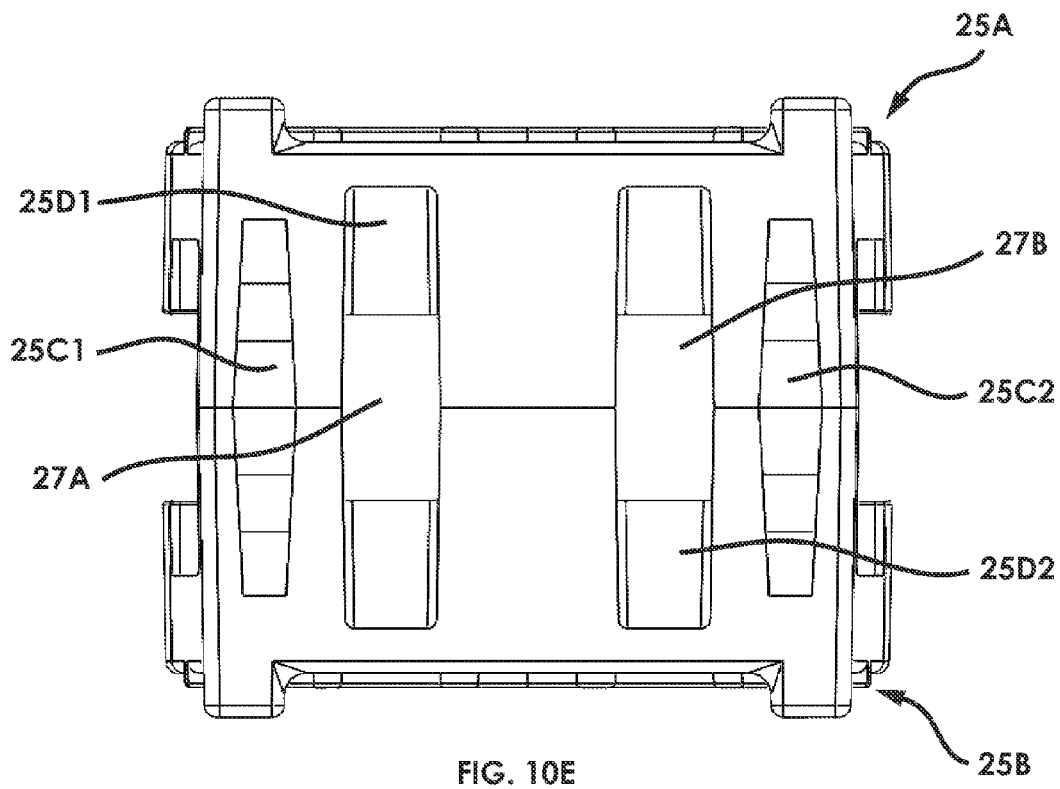
FIG. 10E is an elevated end view of the first end module shown assembled without the pair of flexible side panels, showing the open connector receiving channel.
Figure 10F:
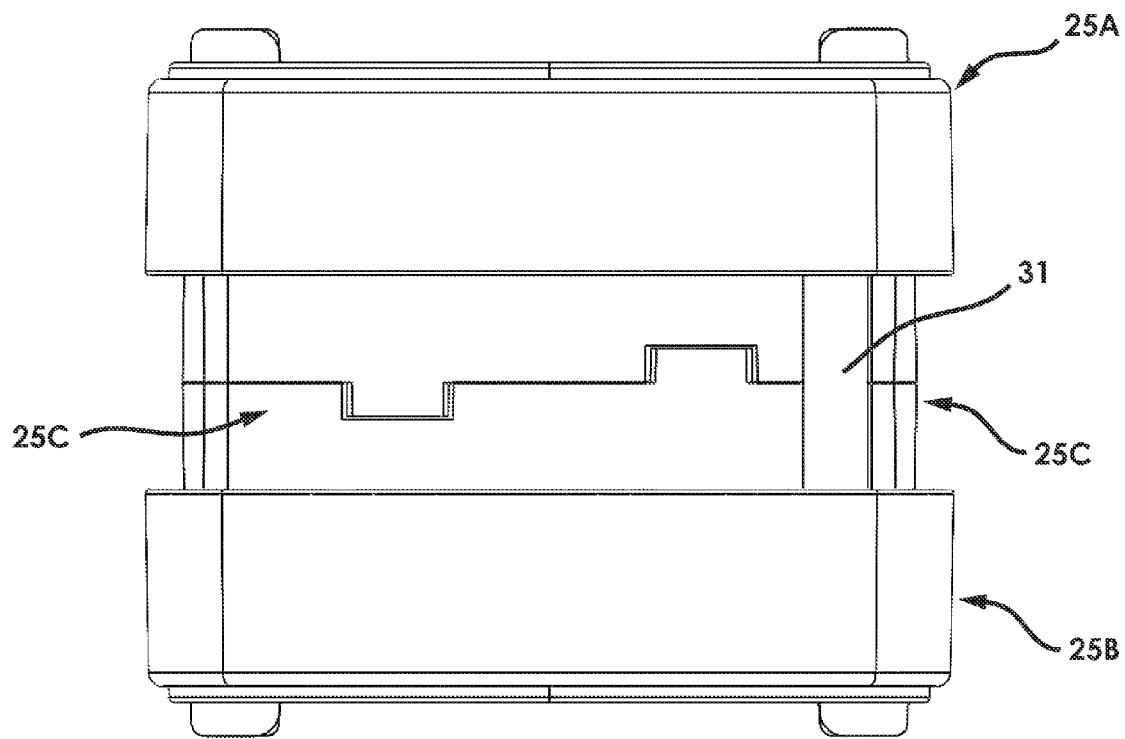
FIG. 10F is an elevated end view of the first end module shown assembled without the pair of flexible side panels, showing the end connector receiving channel.
Figure 10G:
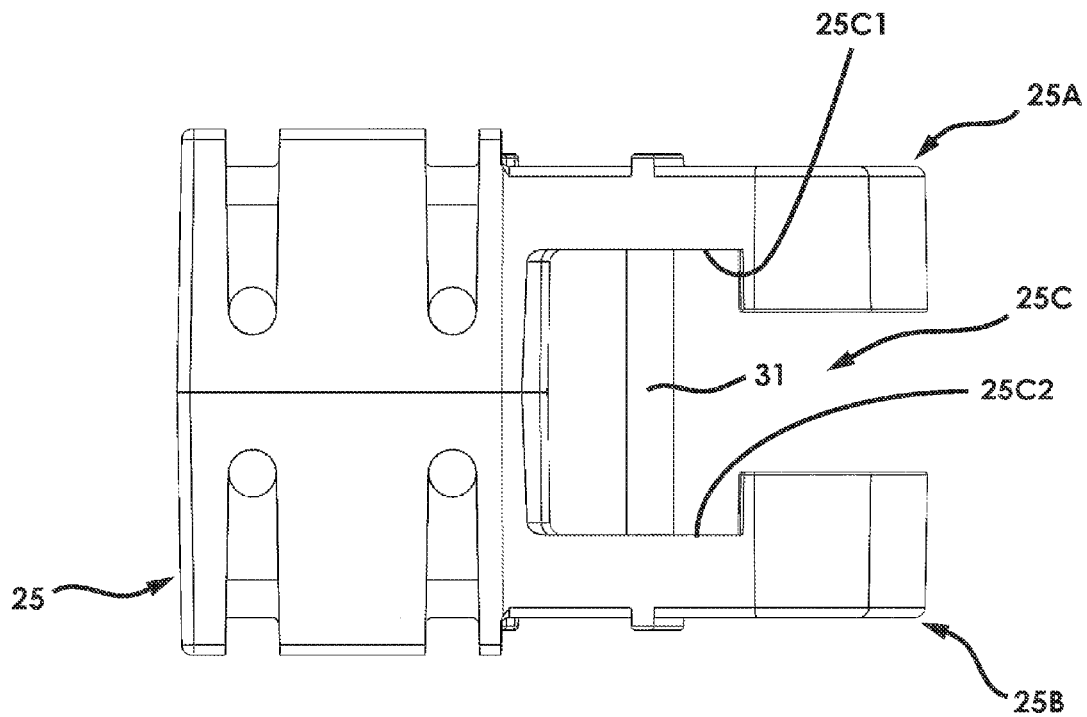
FIG. 10G is an elevated side view of the first end module shown assembled without the pair of flexible side panels, showing the side opening portion of the connector receiving channel.
Figure 11A:
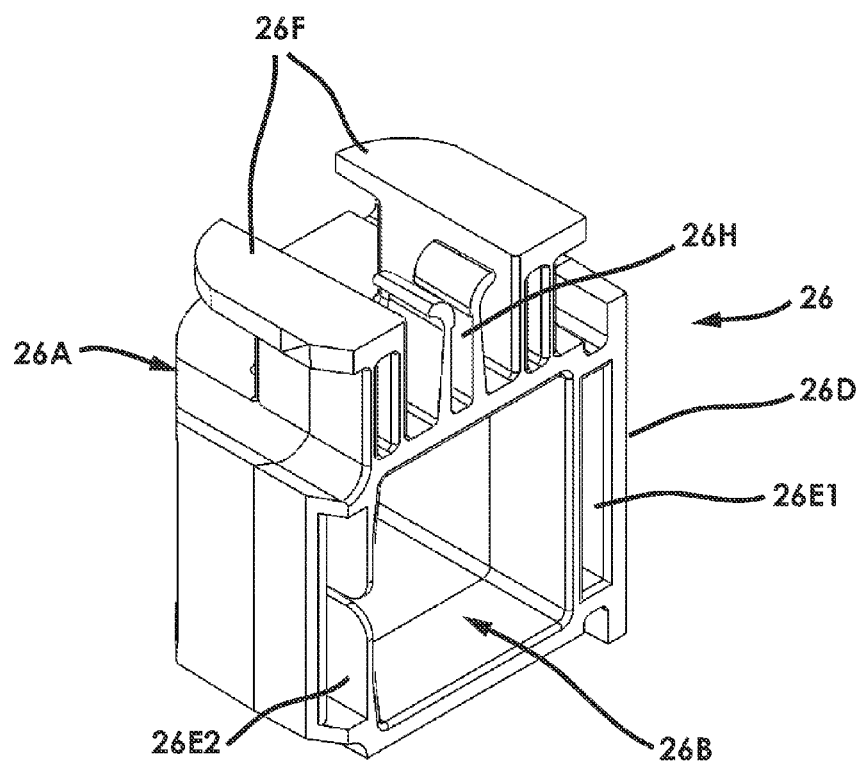
FIG. 11A is a first perspective view of the second end module employed in the communication tower panel security device of the first illustrative embodiment, showing its central opening, pair of flexible side panel receiving channels, shroud panel mounting surface, and excess cord windup fixture.
Figure 11B:
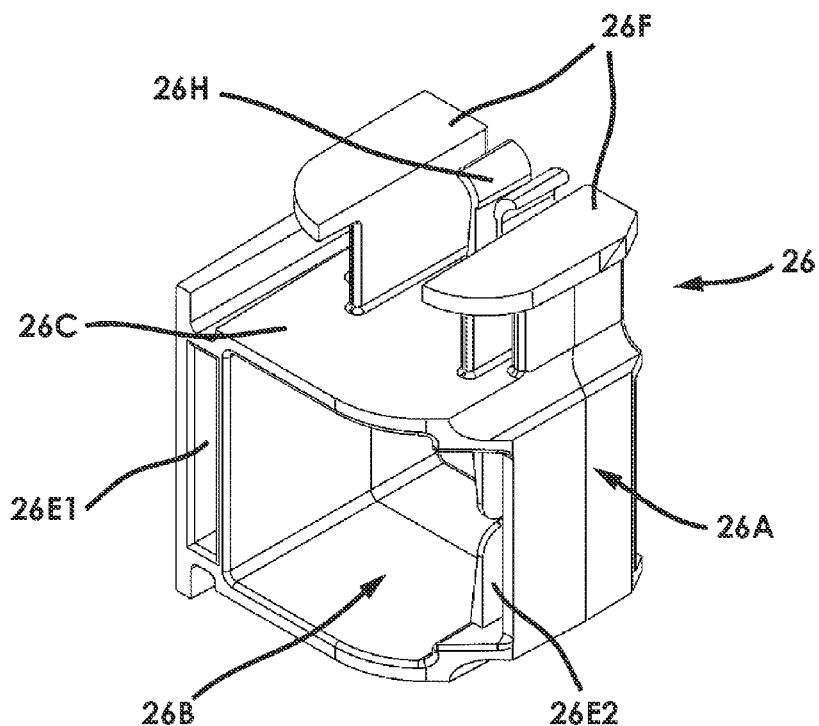
FIG. 11B is a second perspective end view of the second end module employed in the communication tower panel security device of the first illustrative embodiment, showing its central opening, pair of flexible side panel receiving channels, shroud panel mounting surface, and the excess cord windup fixture.
Figure 11C:
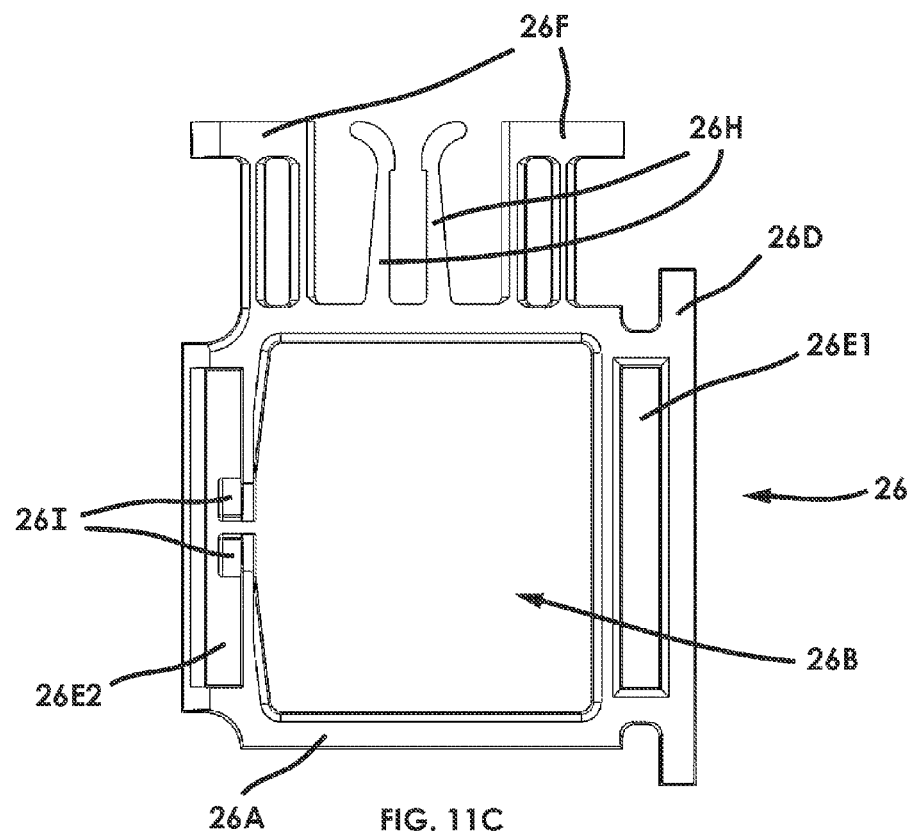
FIG. 11C is an elevated front view of the first end module showing its central opening, pair of flexible side panel receiving channels, shroud panel mounting surface, and the excess cord windup fixture.
Figure 11D:
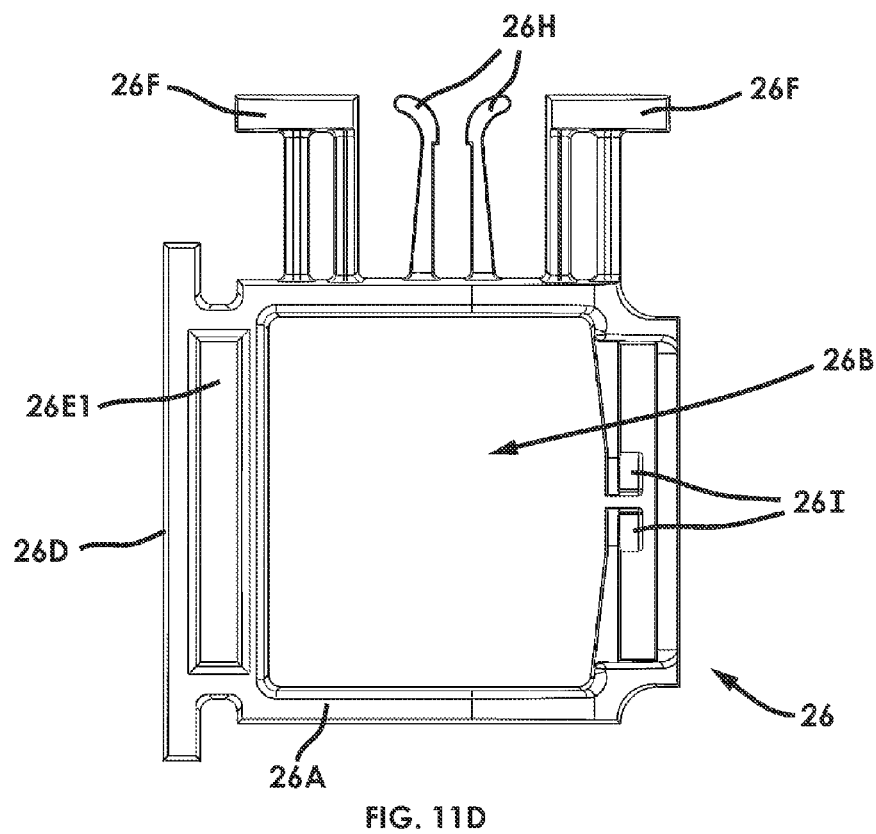
FIG. 11D is an elevated end view of the second end module showing its central opening, pair of flexible side panel receiving channels, shroud panel mounting surface, and the excess cord windup fixture.
Figure 11E:
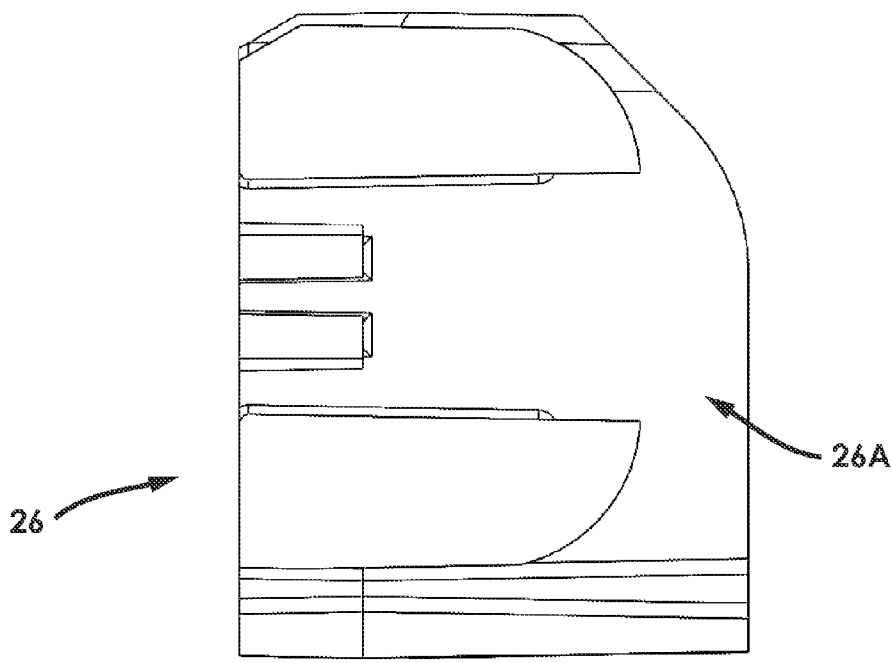
FIG. 11E is an elevated side view of the second end module.
Figure 11F:
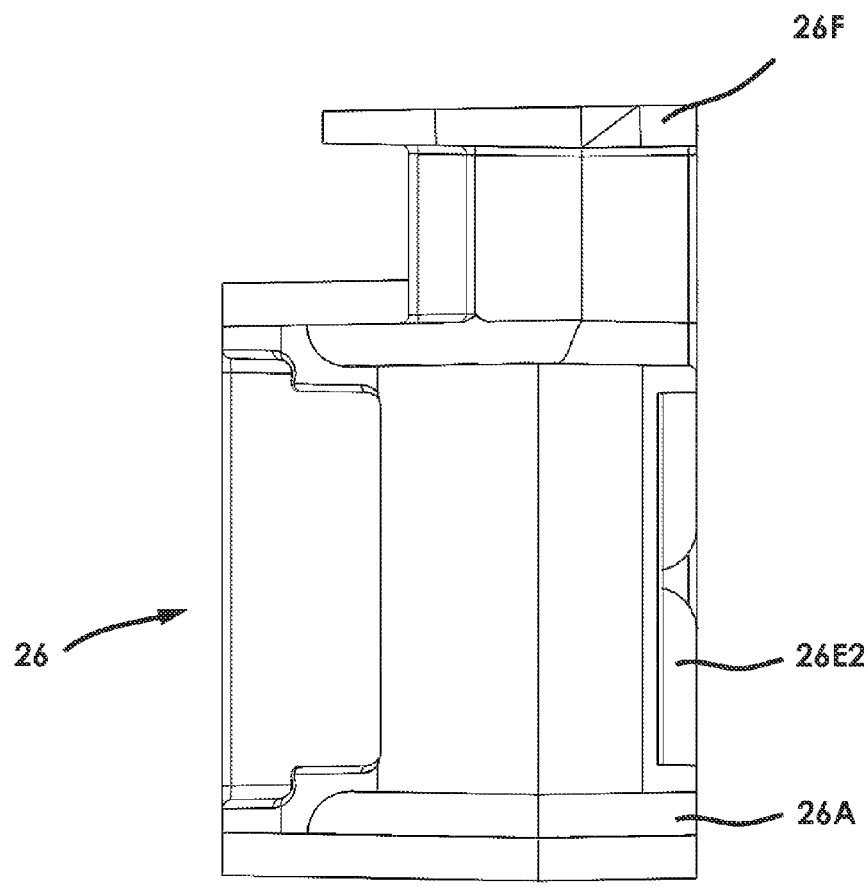
FIG. 11F is an elevated front end view of the second end module.
Figure 12A:
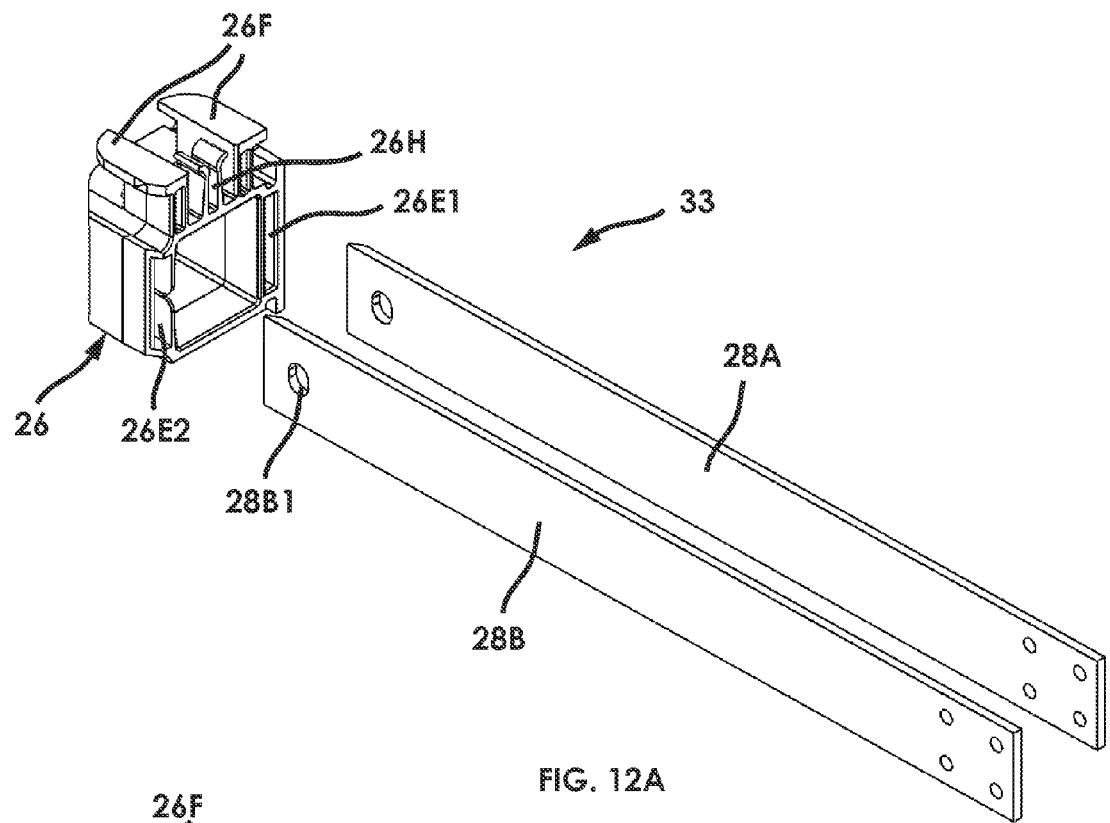
FIG. 12A is a perspective exploded view of a subassembly comprising the second end module and the pair of flexible side panels.
Figure 12B:
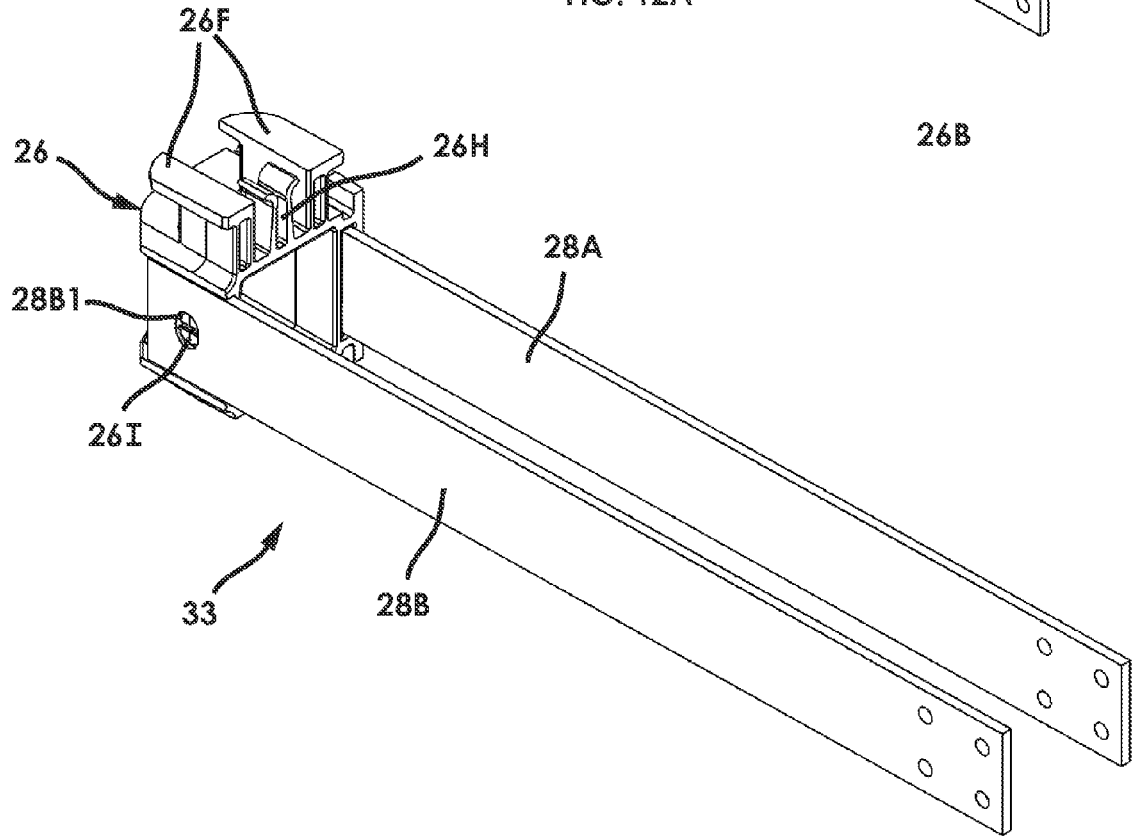
FIG. 12B is a perspective view of the subassembly of FIG. 12A shown comprising the second end module and the pair of flexible side panels assembled together.
Figure 12C:
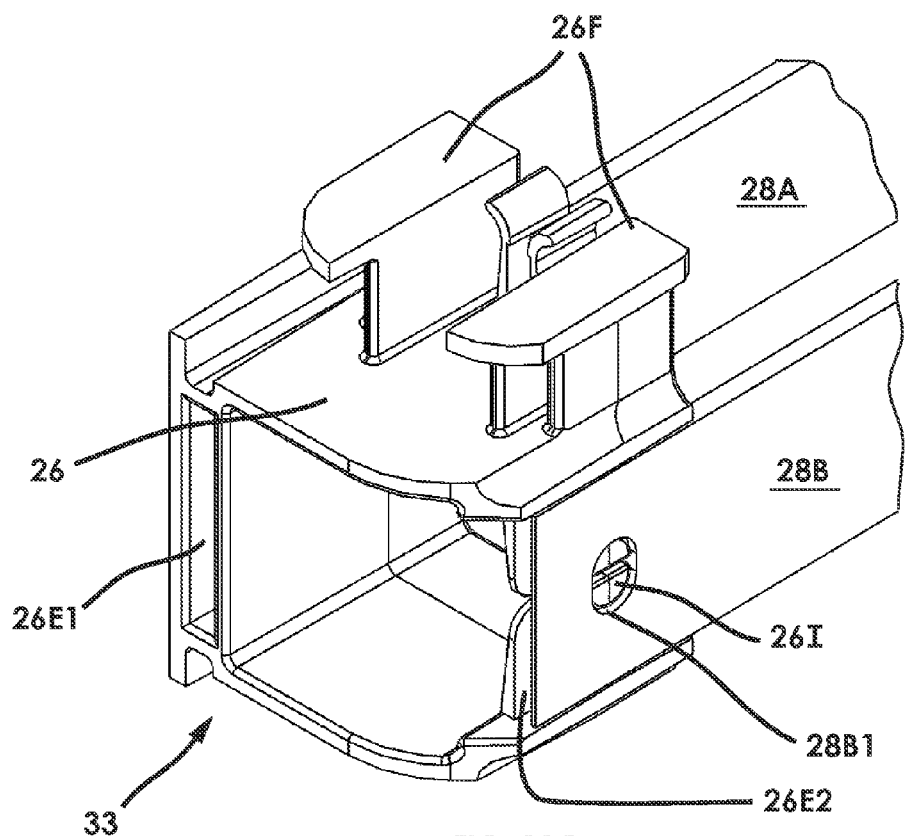
FIG. 12C is a first perspective partially fragmented view of the second end module and flexible side panels shown in FIG. 12B.
Figure 12D:
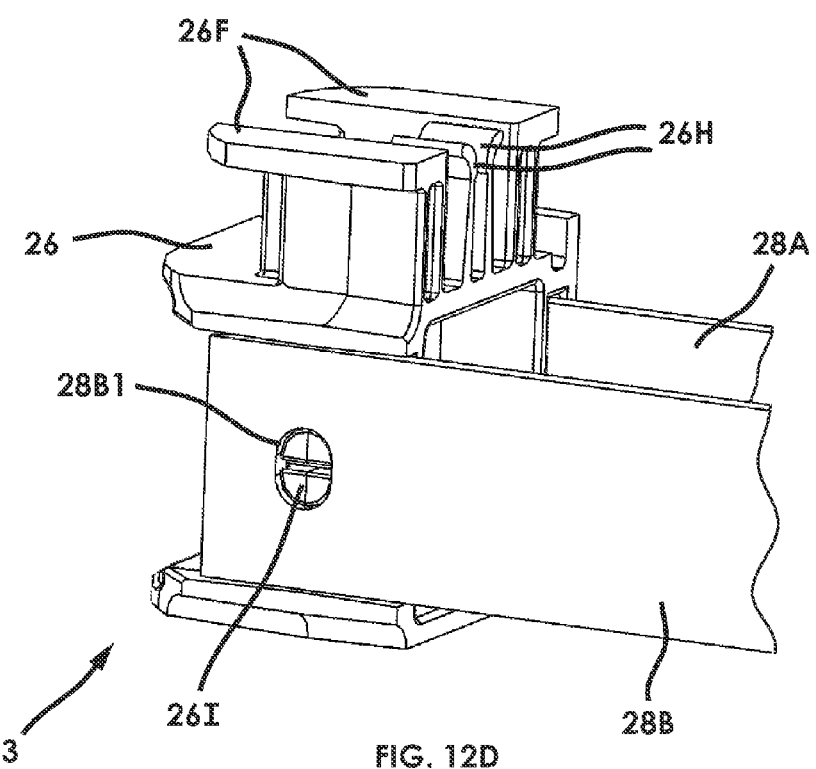
FIG. 12D is a second perspective partially fragmented view of the second end module and flexible side panels shown in FIGS. 12B and 12C.
Figure 13A:
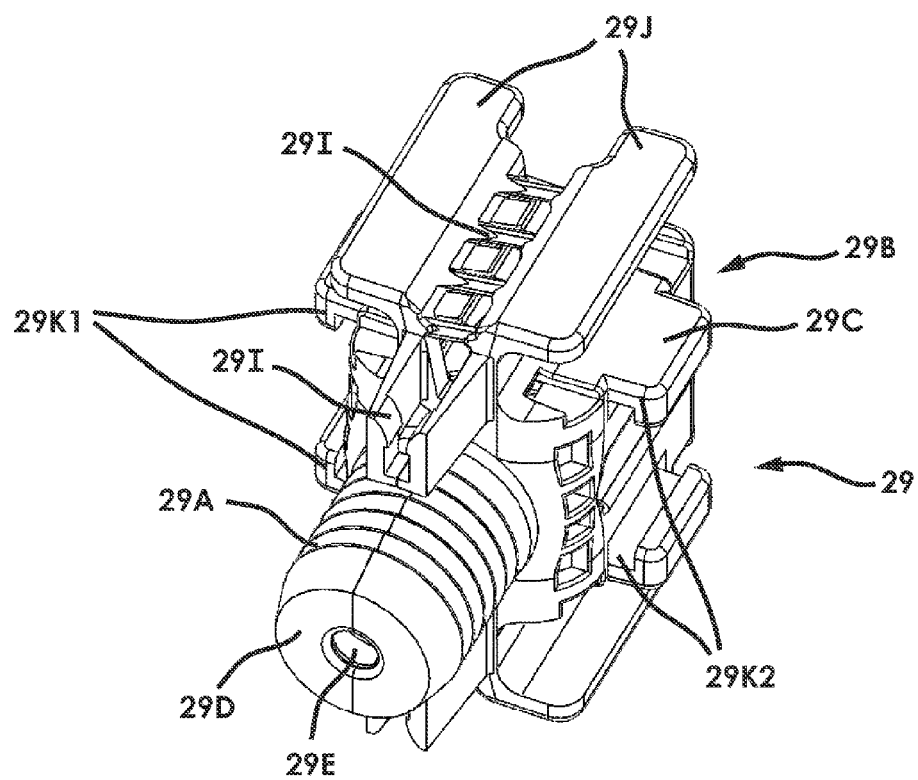
FIG. 13A is a first perspective view of the sliding module employed in the communication tower panel security device of the first illustrative embodiment, showing its tubing connector, cord retaining mechanism, excess cord windup fixture and side panel support channels.
Figure 13B:
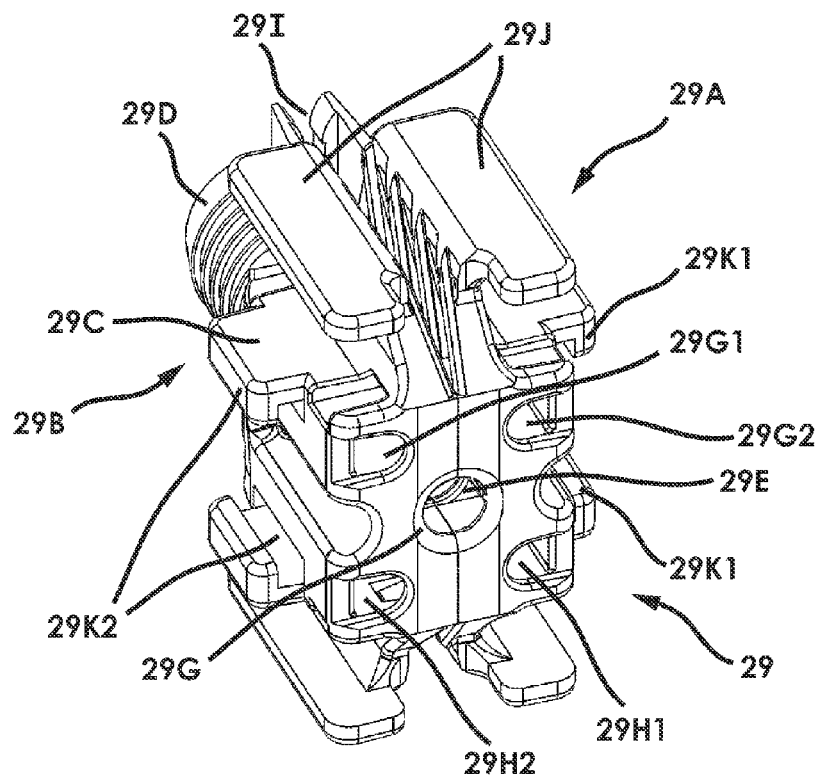
FIG. 13B is a second perspective view of the sliding module employed in the communication tower panel security device of the first illustrative embodiment, showing its tubing connector, cord retaining mechanism, excess cord windup fixture and side panel support channels.
Figure 13C:
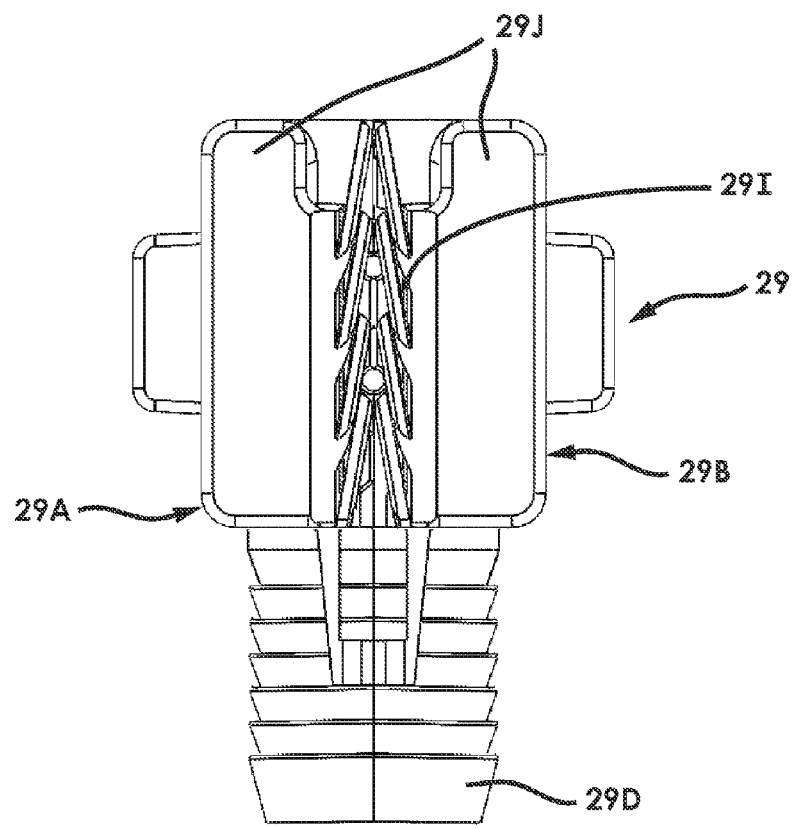
FIG. 13C is a plan view of the sliding module employed in the communication tower panel security device of the first illustrative embodiment, showing its tubing connector, cord retaining mechanism, and excess cord windup fixture.
Figure 13D:
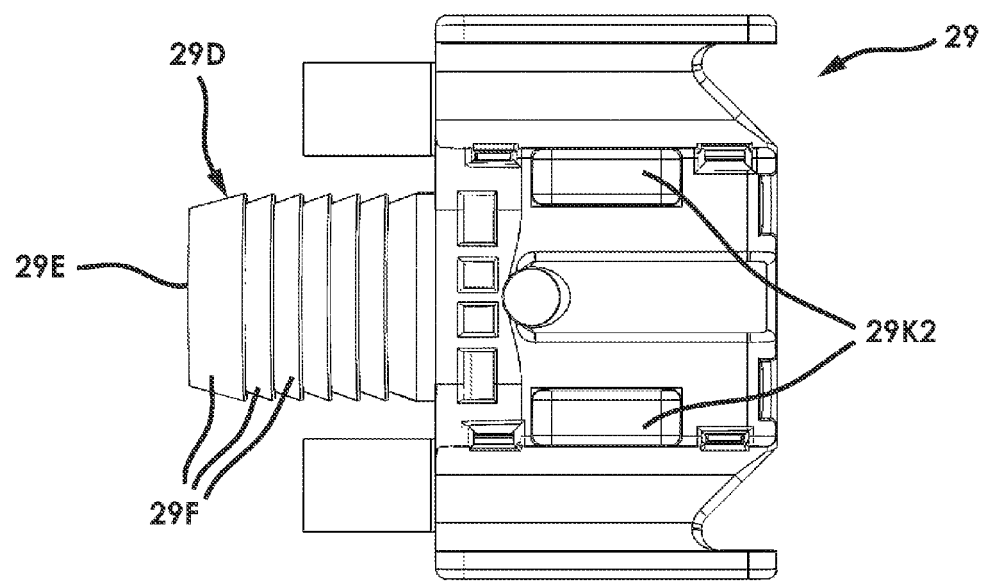
FIG. 13D is an elevated side view of the sliding module employed in the communication tower panel security device of the first illustrative embodiment, showing its tubing connector, excess cord windup fixture and one of the side panel support channels.
Figure 13E:
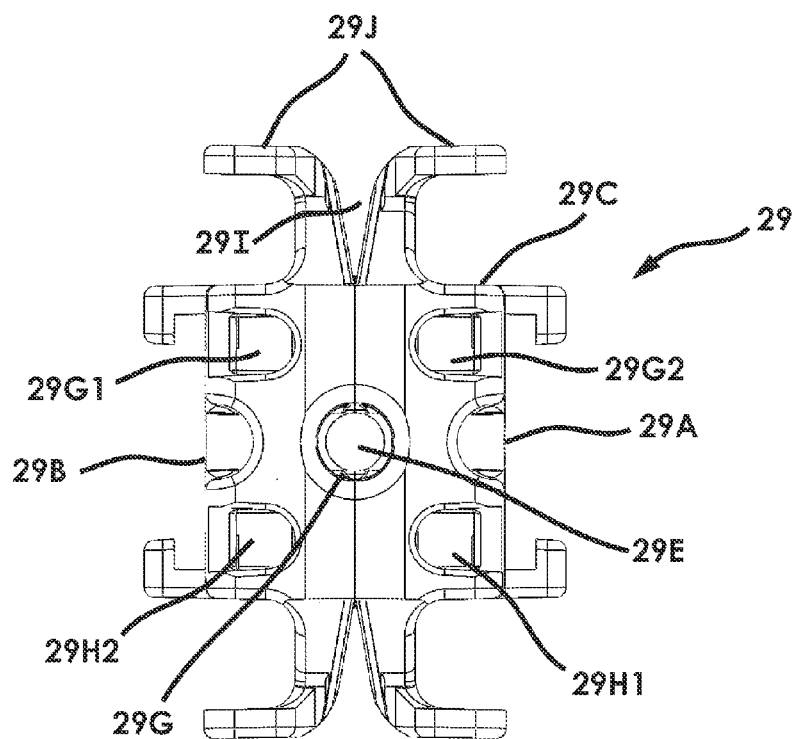
FIG. 13E is an elevated front view of the sliding module employed in the communication tower panel security device of the first illustrative embodiment, showing an axial view of the central cord passage port, the cord retaining mechanism, and excess cord windup fixture, and the side panel support channels.
Figure 13F:
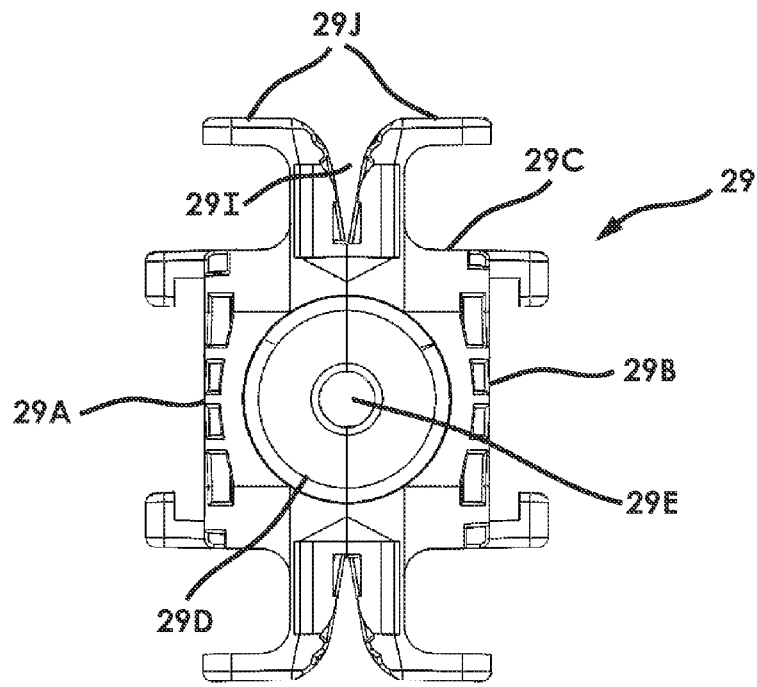
FIG. 13F is an elevated front view of the sliding module employed in the communication tower panel security device of the first illustrative embodiment, showing an axial view of the tubing connector, the cord retaining mechanism, and excess cord windup fixture, and the side panel support channels.
Figure 13G:
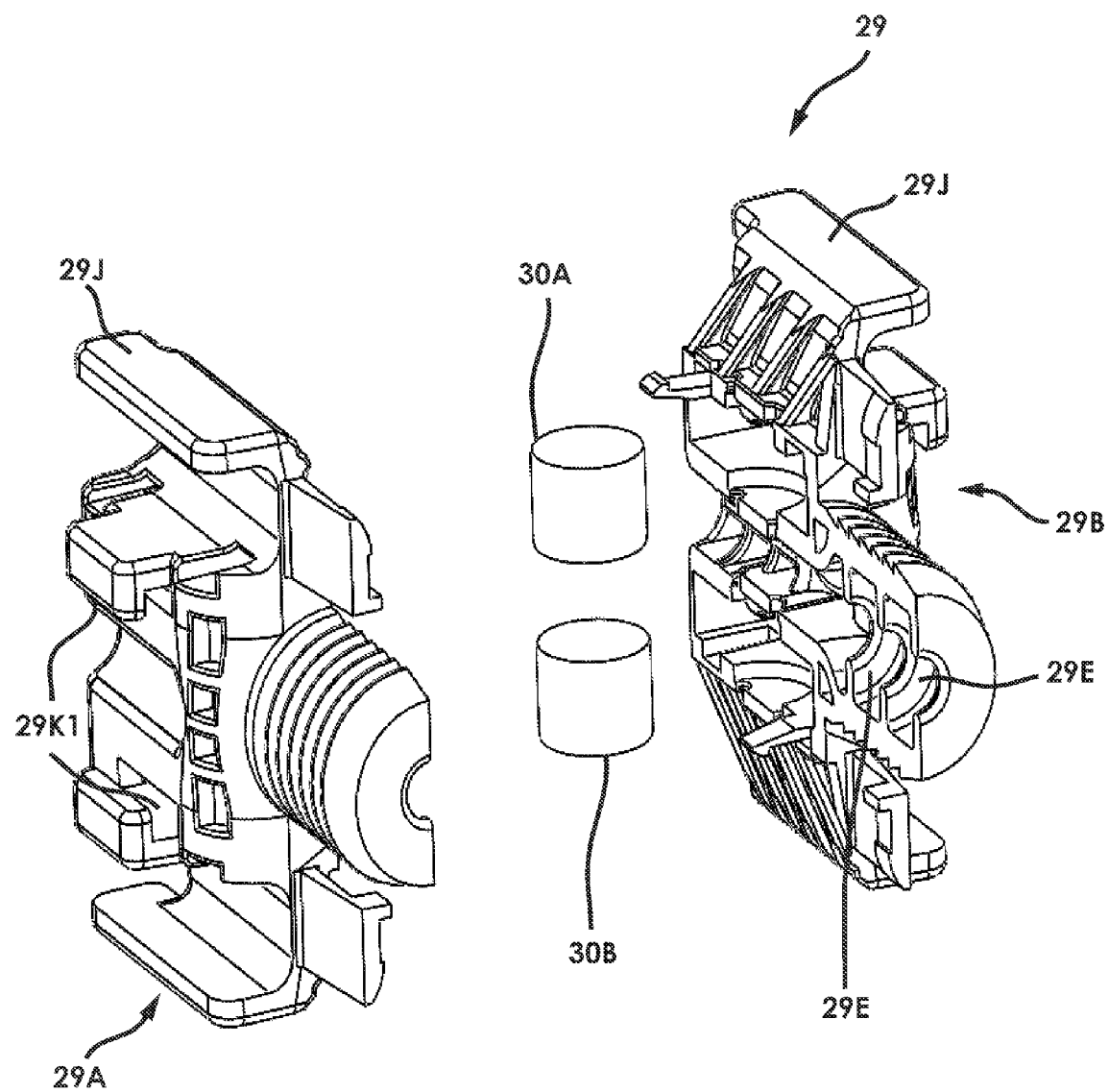
FIG. 13G is an exploded view of the sliding module employed in the communication tower panel security device of the first illustrative embodiment, comprising a body or frame half portions that are joined together to form the body or frame portion of this component with a pair of rotatable cylindrical pulleys supported therebetween.
Figure 14A:
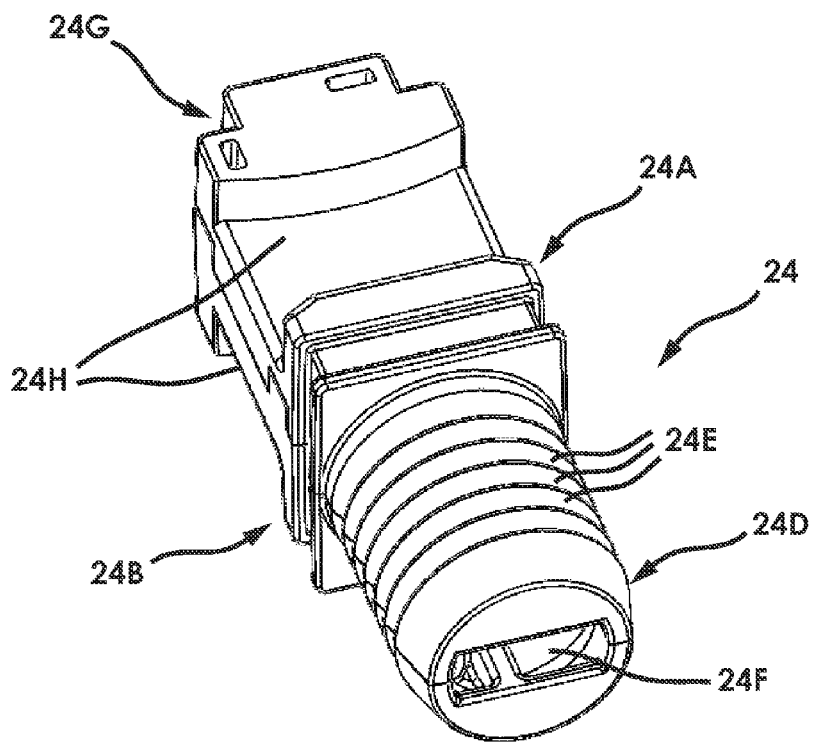
FIG. 14A is a first perspective view of the cord/tubing connector shown assembled and comprising a channel engaging portion, a cord passage port, and a barbed tubing connector.
Figure 14B:
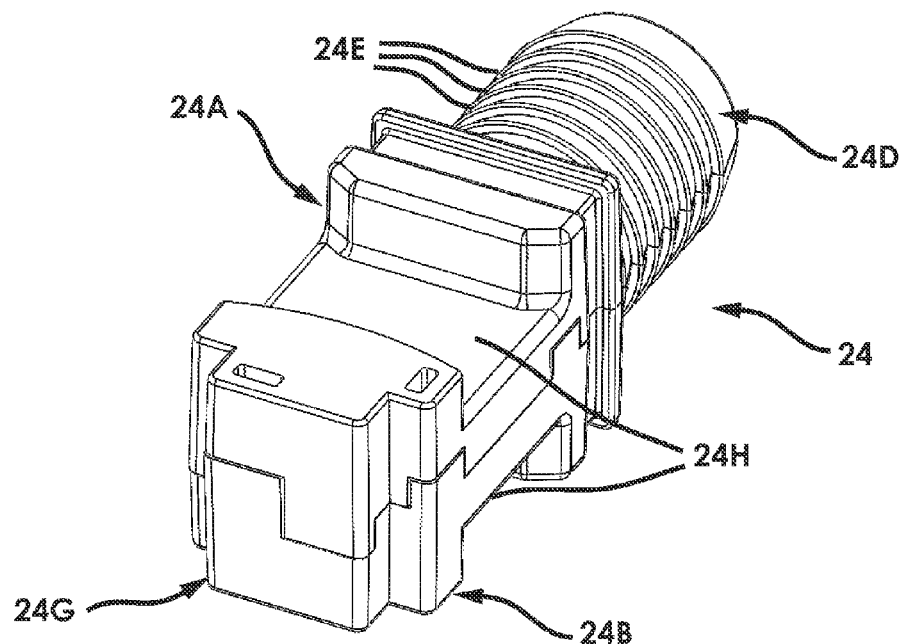
FIG. 14B is a second perspective view of the cord/tubing connector of FIG. 14A showing its channel engaging portion, and barbed tubing connector.
Figure 14C:
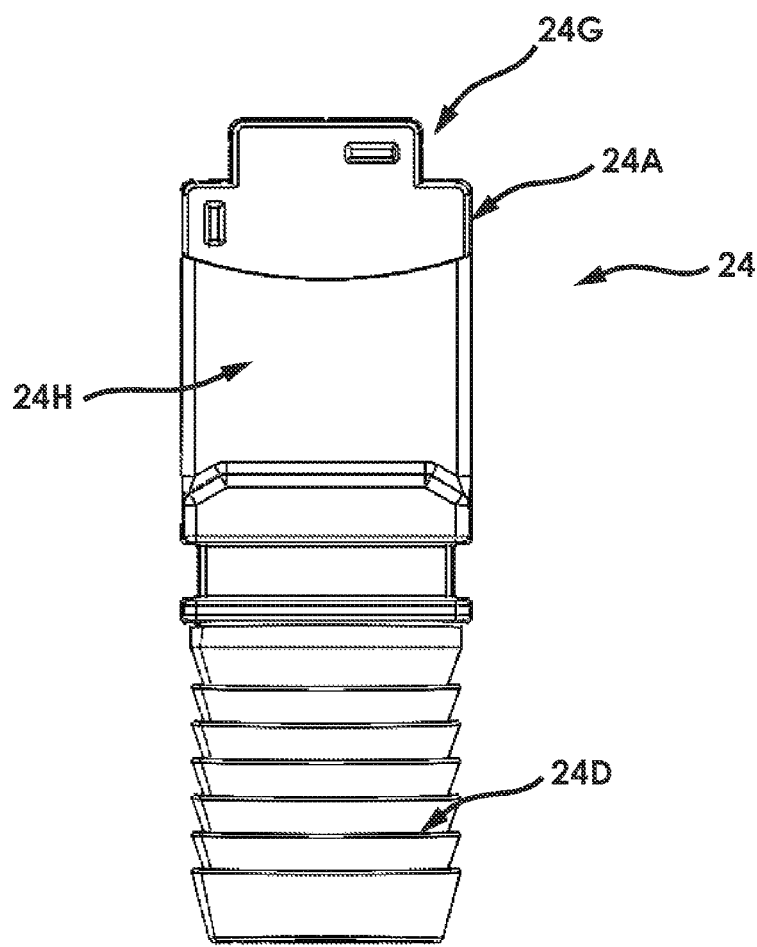
FIG. 14C is a plan view of the sliding module of FIGS. 13A and 13B showing its channel engaging portion and its barbed tubing connector.
Figure 14D:
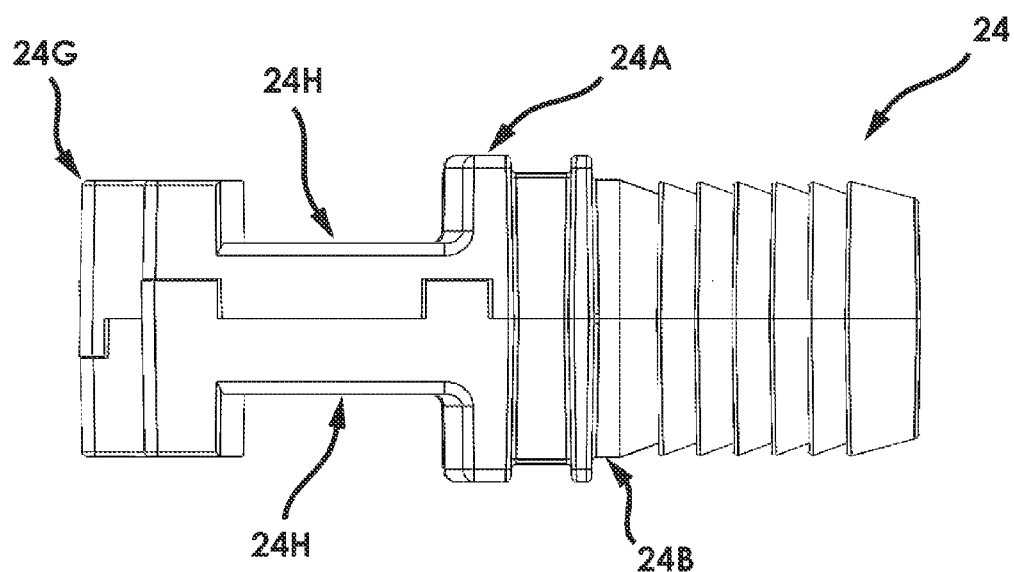
FIG. 14D is a first elevated side view of the cord/tubing connector of FIG. 14A showing its channel engaging portion, and barbed tubing connector.
Figure 14E:
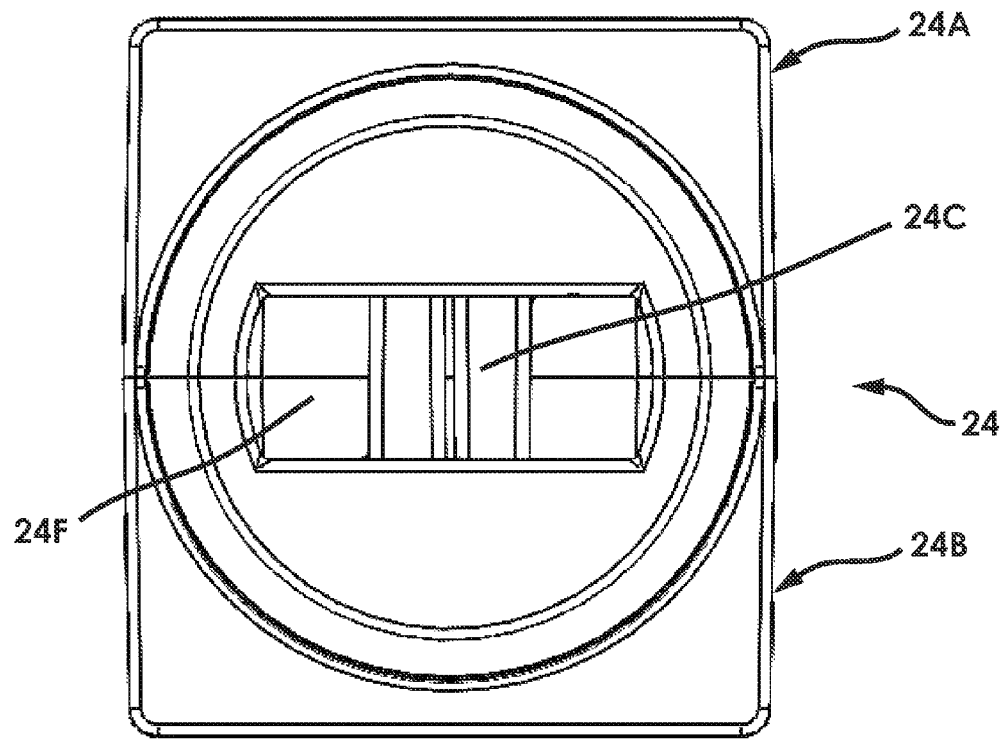
FIG. 14E is a first axial view of the cord/tubing connector of FIG. 14A showing its barbed tubing connector.
Figure 14F:
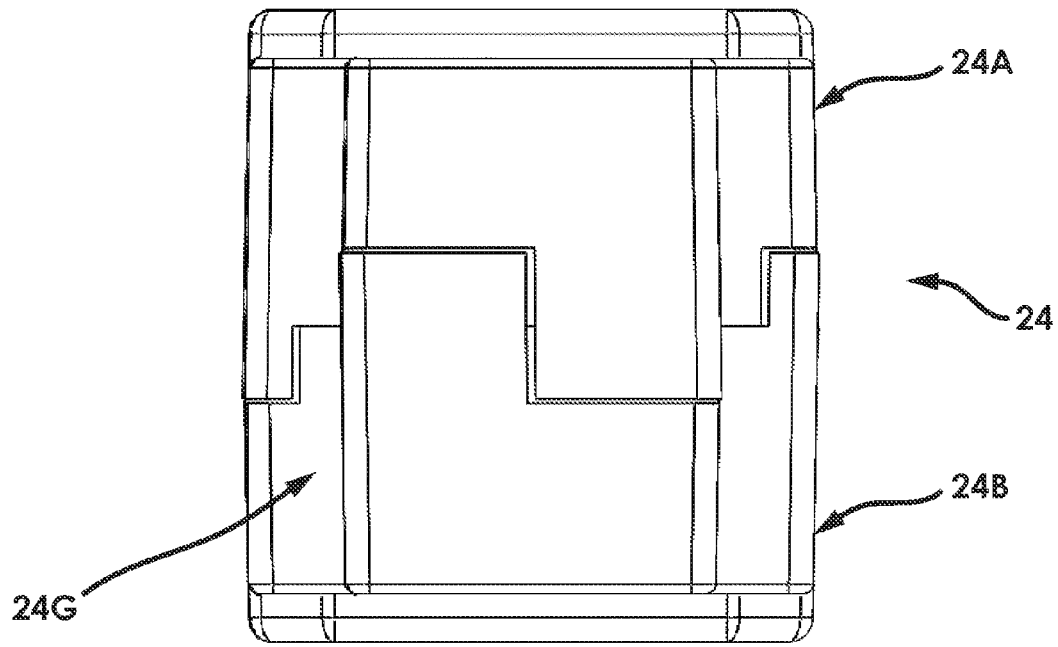
FIG. 14F is a second axial view of the cord/tubing connector of FIG. 14A showing its channel engaging portion.
Figure 14G:
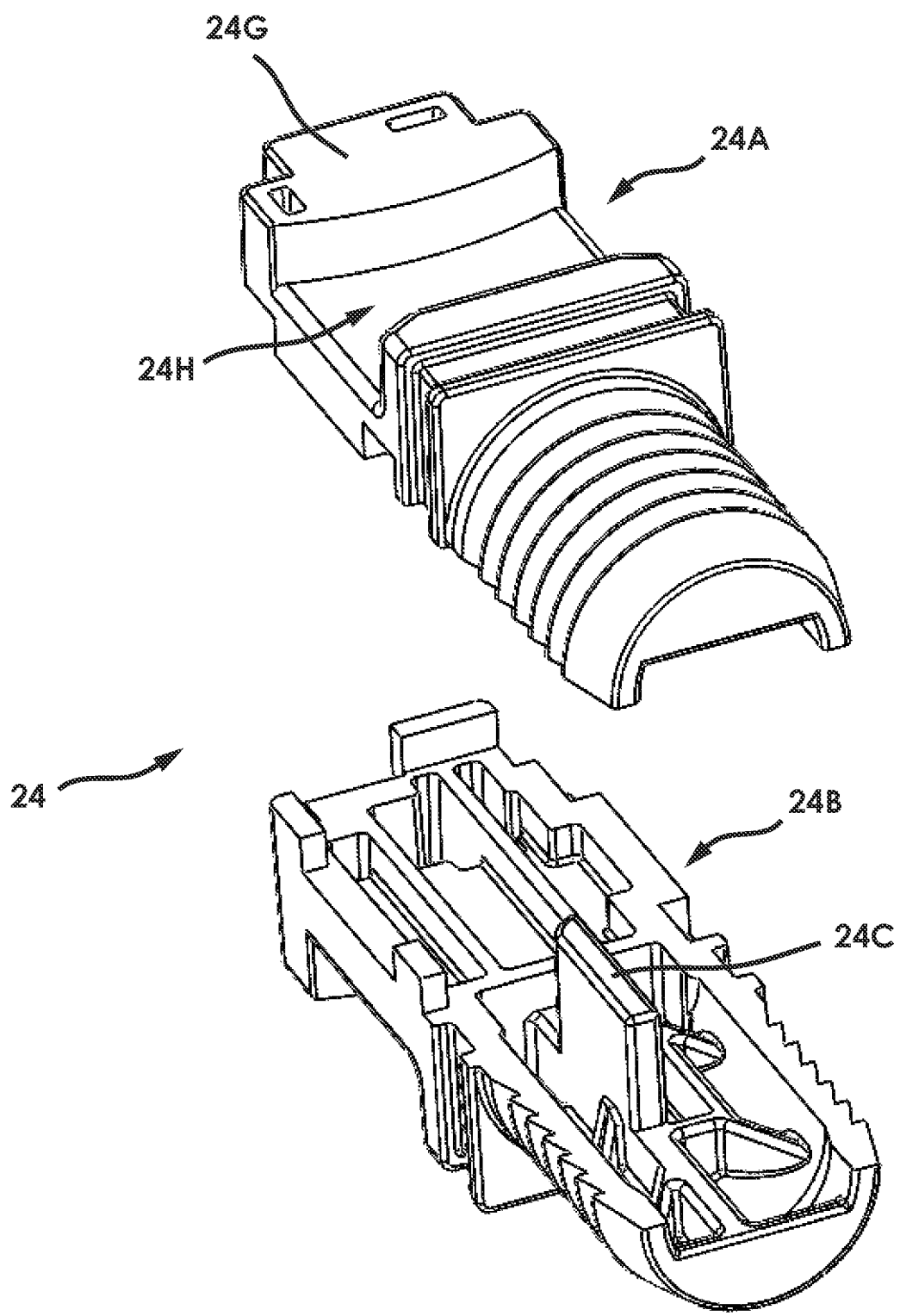
FIG. 14G is a perspective exploded view of the cord/tubing connector of FIGS. 14A through 14F, showing its first and second half portions and interior structures including a central post about which the routed cord can be securely tied.

As shown in FIG. 10A, one end of the flexible side panels 28A, 28B are set within the support channels 25C1 and 25C2 in the first end module halves 25A and 25B, and then the pulleys 27A and 27B are installed within respective pulley recesses 26F1, 27F2 of cylindrical geometry, and then sets of pins 32A and 32B are used to lock the module halves together with the side panels 25A and 25B and pulleys contained therewith, to form a subassembly. In this subassembly, the flexible side panels 28A, 28B are securely connected to the first end module 25, while the pair of internal pulleys 27A and 27B are free to rotate as cord is pulled thereover.

As shown in FIGS. 10B, 10C, 10D and 6H, the exterior side wall surface 25G of the first end module 25 is provided with slight degree of curvature (e.g. 10 to 20 degrees) so that this side wall surface can closely adapt and fit against the curved surfaces of the tower shroud panels 13, against which the device is mounted during installation procedures. This inventive features enables an optimally close fit of the first end module 25 against the tower shroud panel 13, wherever mounted.

As shown in FIGS. 11A through 11G, the second end module 26 comprises: a frame portion 26A having a central passageway 26B of substantially square cross-sectional dimensions and allowing the passage of the plastic tubing and cord subassembly 20 to freely pass therethough during assembly, installation and normal operations, as shown in FIGS. 7A through 7G; an upper surface 26C; a narrow planar exterior mounting surface 26D facing the tower's shroud panel, for mounting thereagainst during installation; a second pair of side panel support channels 26E1 and 26E2 for supporting the second ends of the flexible planar side panels 28A and 28B, respectively, with the innermost end of the side panel 28A to freely slide within its support channel 26E1 so that the side panels 28A and 28B can bend together, as shown in FIGS. 7C and 7D and adapt to the surface curvature of the shroud panels 13, against which the device 14 is mounted; a first excess cord windup fixture 26F mounted on the upper surface 26C for winding up excess cord 23; and a cord retaining mechanism 26H realized by spaced apart clips 26H1 and 26H2 between which the end of the wound up cord 23 can be pressed by the installer and retained therein.

As shown in FIGS. 12A through 12D, the flexible side panels 28A and 28B are mounted within their respective support channels 26E1 and 26E2 formed in the second end module 26 so that the outer side panel 28B is locked into position by the passage of plastic projection 26I through aperture 28B1 formed in the outer side panel 28B, while the other inner side panel 28A is free to slide within the support channel 26E1 formed in the second end module 26. As mentioned above, this subassembly construction 33 allows the side panels 28A and 28B to flex and adapt to the surface curvature of the tower shroud panel against which the device is installed. The other ends of the flexible side panels 28A and 28B are mounted within the support channels 25C1 and 25C2 in the first end module 25, as shown in FIG. 10A, to form a flexible framework, or subassembly 34, within which to mount and support the sliding module 29, as will be further described below.

As shown in FIGS. 13A through 13G, the sliding module 29 comprises: a body or frame half portions 29A and 29B that are joined together to form the body or frame portion of this component; an upper surface 29C; a second barbed connector 29D extending from the frame portion and having barbs 29F on its outer surface and a central bore 29E passing through the body of the module for the passage of cord 23 therethrough, and for receiving the second end of the length of 29E flexible tubing 22 as shown in FIGS. 7A through 7G; a central opening 29G for passage of the free end of the flexible cord 23 after passing through the central bore 29E; a first cord input port 29H, a first cord output port 29H2 and a first internal cord passageway 29H3 extending between the first cord input port 29H1 and first output port 29H2, and along which a first rotatable cylindrical pulley 30B is mounted for pulling the cord thereover along the pathway, to gain mechanical advantage of the pulley 30B; a second cord input port 29G1, a second cord output port 29G2 and a second internal cord passageway 29G3 extending between the second cord input port 29G1 and second output port 29G2, and along which a second rotatable pulley 30A is mounted for pulling the cord thereover along the pathway, to gain mechanical advantage of the second pulley 30B; a second cord retaining mechanism 29I mounted on the upper surface 29C realizing as a pair of spaced apart cord retaining clips 29I1 and 29I2 for insertion and compression of the cord pushed therein by the installer; a second excess cord windup fixture 29J for winding up excess cord 23 after a selected portion of the cord is retained in the second cord retaining mechanism 29I; and first and second side panel support channels 29K1 and 29K2, for supporting inner flexible side panel 28A and out side panel 28B, respectively, and allowing the sliding module 29 to slide up and down the spaced apart parallel side panels 28A and 28B, during cord tensioning and un-tightening operations. Notably, the first end module 25, the second end module 26, and the sliding module 29 are made from high strength plastic materials (e.g. UV resistant polycarbonate) using injection molding techniques, or other techniques well known in the art.

Figure 15D:
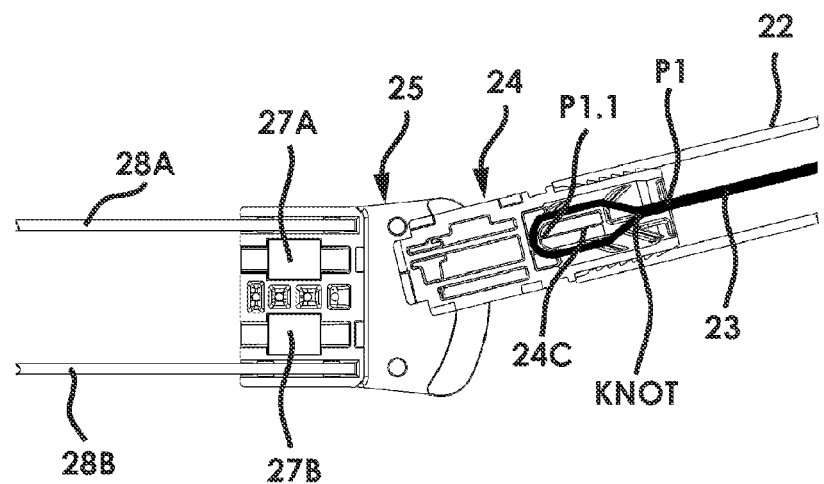
FIG. 15D is a plan cross-sectional view of the end connector module interconnected with the second end module, showing the cord being tied and secured about the central post within the end connector module at points P1 and P.1.
Figure 15E:
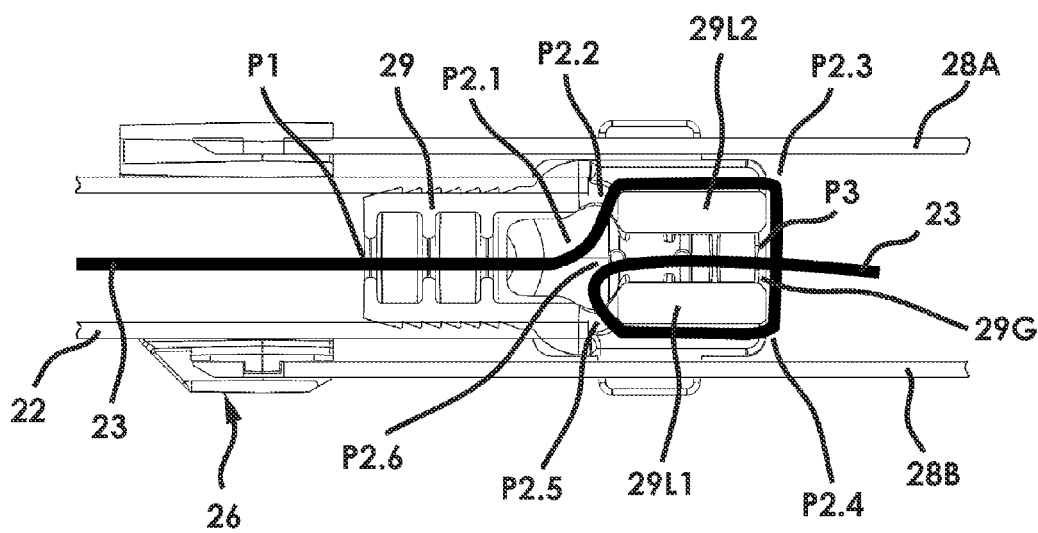
FIG. 15E is a cross-sectional view of the sliding module mounted within the flexible side panels, showing the cord pathway from the central cord input port at point P2, then routed long pathway points P2.1, P2.2, P2.3, P2.4, P2.5, P2.6 and P2.3, as shown.

As shown in FIGS. 14A through 14H, the end connector 24 comprises: a body portion 24 formed from first and second end connector halves 24A and 24B, having an internal post structure 24C, about which to tie one free end of the cord 23 used in constructing the device 14 of the present invention, as shown in FIG. 15D; a barbed connector 24D having barbed surface 24E for securely receiving a free end of the plastic tubing 23 once pushed and slid thereover (i.e. once the cord has been cut to the appropriate length during installation) and further secured using a clamping or like fastening device (e.g. tie-wrap fastener), and a central bore 24F for receiving the free end of the cord 23; head portion 24G disposed at its distal end, and having substantially block-like geometry and fitting within the channel 25C of the first end module 25 described above; and a connector engaging channel 24H disposed between the head portion 24G and the barbed connector 24D. While the head portion 24G in the illustrative embodiment is polygonal in geometry, and the receiving channel 25C in the first end module 25 is matched to receive and engage with this mated structure 24G, it is understood that the head portion 24G and channel 25C can be realized using different shapes and geometries provided they are designed to interlock via a slide together action, and connect the free end of the cord and plastic tubing subassembly with the connecting/tensioning assembly 21 of the illustrative embodiment of the device 14.

Referring to FIGS. 15A through 15M, the routing pathway of the cord 23 through its plastic tubing structure 22, and between the internally mounted pulleys 27A and 27B mounted within the first end module 25 and the internally mounted pulleys 30A and 30B mounted within the sliding module 29, will now be described in great technical detail.

Figure 15F:
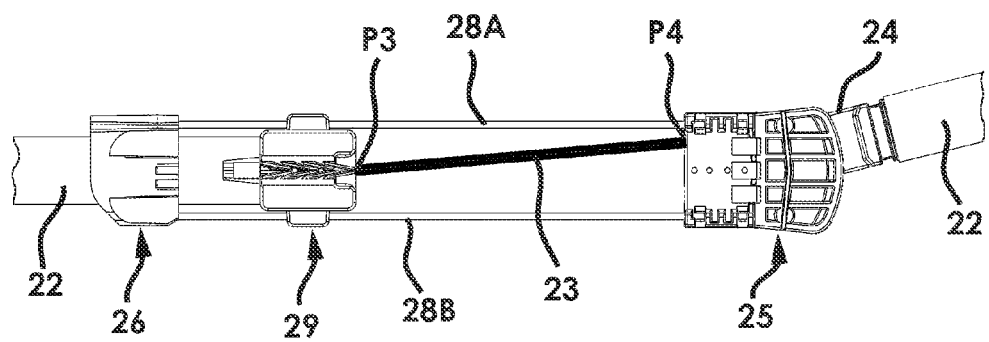
FIG. 15F is a plan view of the connecting/tensioning module showing the cord routed from central cord output port at point 3 to left side cord input port at point P4.
Figure 15G:
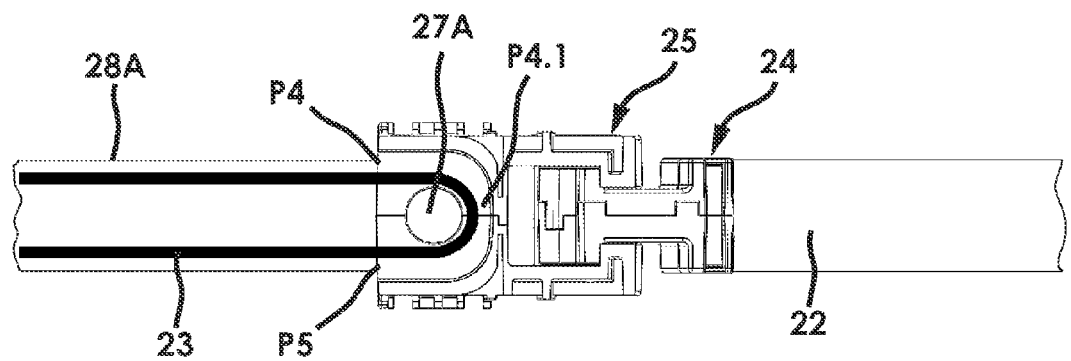
FIG. 15G is a cross section view of the second end module and connector module, showing the cord routed from the left cord input and output ports at point P4 to P5, around the pulley cylinder at point P4.1.
Figure 15H:
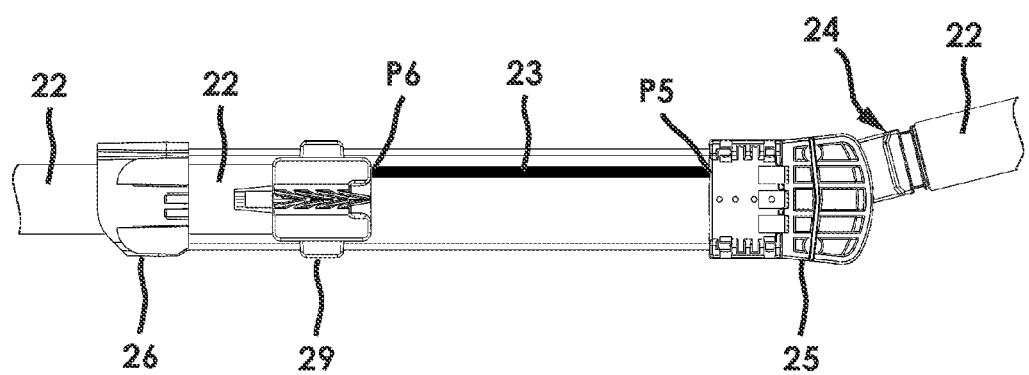
FIG. 15H is a plan view of the connecting/tensioning module, showing the cord being routed from point P5 at the second end module to point P6 at the sliding module.
Figure 15I:
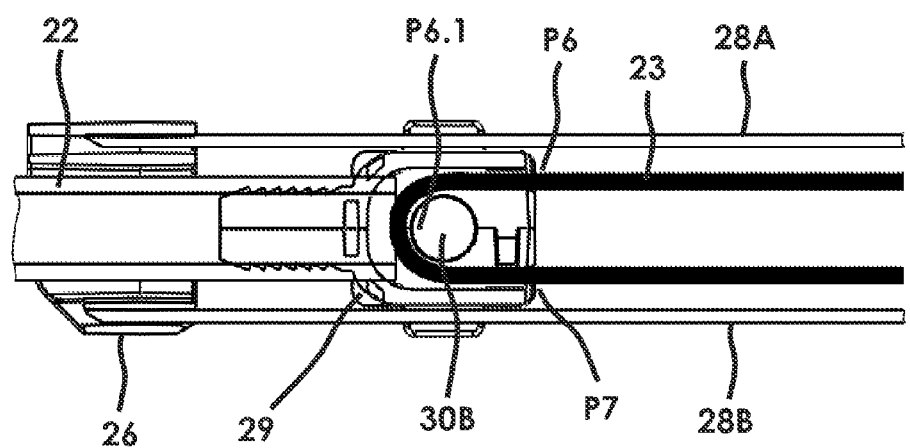
FIG. 15I is a plan view of the sliding module within the connecting/tensioning module, showing the cord being routed from cord input point P6, about the first pulley at point P6.1, to cord output point P7.
Figure 15J:
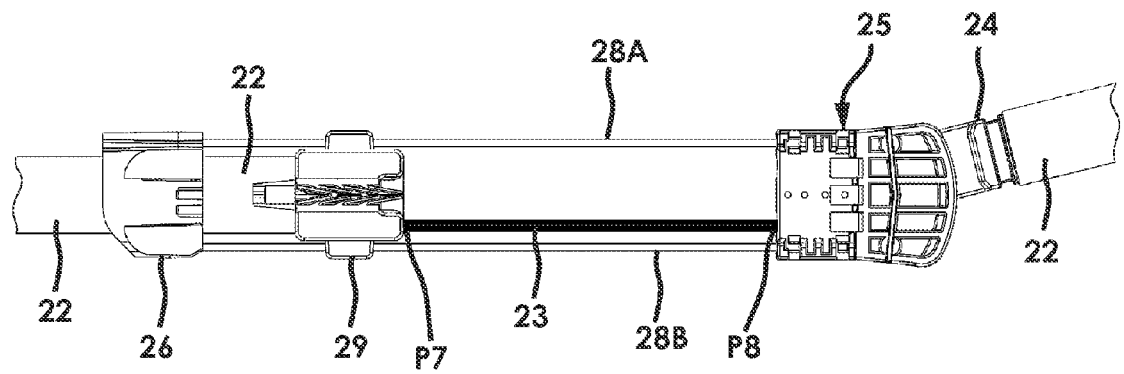
FIG. 15A is a plan view of an assembled communication tower panel security device of the first illustrative embodiment with its end connector interconnected to the first end module, and cord routing points P1 and P2 indicated where the cord enters and exits the connecting/tensioning module of the device.
FIG. 15B is a perspective view of the sliding module showing its central cord output input port at point P2, central cord output port at point P3, its lower cord input and output ports at points P6 and P7, and its upper cord input and output ports at points P10 and P11.
FIG. 15C is a perspective view of the second end module showing its left cord input and output ports at points P4 and P5, and its right cord input and output ports at points P8 and P9.
FIG. 15L is a plan view of the connecting/tensioning module, showing the cord being routed from point P7 at the sliding module to point P8 at the second end module.
FIG. 15K is a plan view of the second end module within the connecting/tensioning module, showing the cord being routed from cord input point P8, about the second pulley at point P8.1, to cord output point P9.
FIG. 15M is a plan view of the sliding module within the connecting/tensioning module, showing the cord being routed from cord input point P10, about the second pulley at point P10.1, to cord output point P11.
Figure 15K:
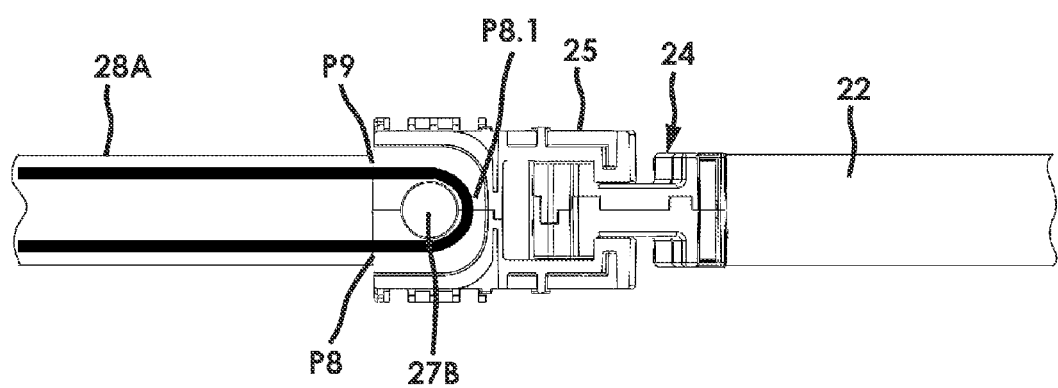
Figure 15L:
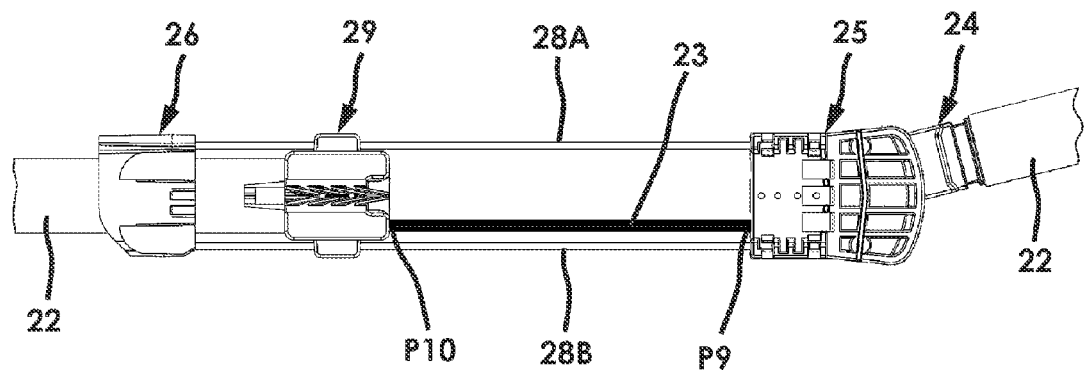
Figure 15M:
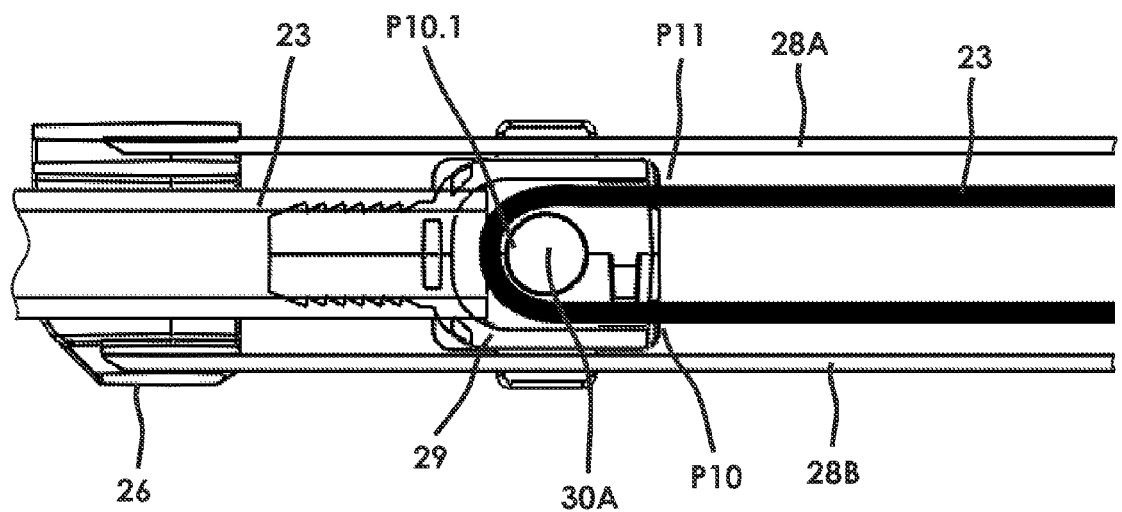

In FIG. 15A, a high level view of the cord pathway is shown within the tubing and between the sliding module 29 and first end module 25. As shown in FIGS. 15A, 15B and 15C, the path of the cord 23 begins at point P1 where its free end enters the central bore 24E of the end 24 and is wrapped about internal post 24C and is tied to the cord, using a know, as shown in FIG. 15D. The other free end of the cord extends long the flexible plastic tubing 22, which is connected to the barbed connector 24D on the end connector 24, and travels the length of the plastic tubing 22 and enters into the bore opening 29E on the barded connector side 29D of the sliding module 29, as indicated at point P2. From point P2, the cord passes through the sliding module 29 and travels a cloverleaf type path about internal blocks 29L1 and 29L, starting at point P2.1, turning a corner at point P2.2, then at point P2.3, then at point P2.4, then at point P2.5, and travels through the central bore 29E out the central cord exit 29G at point P3, shown clearly in FIG. 15E. As shown in FIG. 15F, the cord exits from the center cord output port 29E at point P3, and travels across between the side panels 28A, 28B and through upper portion of cord input port input port 25D1 at point P4, around the pulley 27A at point P4.1 and exits at lower portion of cord port 25D1 at point P5, as illustrated in FIG. 15G. As shown in FIG. 15H, the cord exits at point P5, travels between the side panels 28A, 28B, and enters the lower input port 29H1 at point P6, then around pulley 30A at point P5.1 and exits lower output port 29H2 at point P7, as shown in FIG. 15I. As illustrated in FIG. 15J, the cord travels from point P7 between the side panels 28A, 28B to lower portion of input port 25Da in the first end module 25 at point P8. As illustrated in FIG. 15K, the cord travels from point P8 around pulley 27B at point P8.1 and exits at upper potion of cord port 25D2 at point P9. As illustrated in FIG. 15L, the cord exits at point P9, travels between side panels 28A and 28B and enters the upper input port 29G1 at point P10. As illustrated in FIG. 15M, the cord 23 travels around pulley 30B at point P10.1, and then finally exits at upper output port 29G2 at point P11 at the sliding module 29. From point P11, the excess length of cord 23 is pulled outwardly along its path by the installer until the desired cord tension is created within the assembly and about the communication tower, so that adequate forces are created around the plastic tubing 22 and cord assembly installed about the circumference of the communication tower 14.

After the installer has tightened the cord using the connecting/tensioning assembly 21, the cord is pulled up from point P11 and retained into the pathway traveling through the first cord retaining clip mechanism 29I on the surface of the sliding module 29, as shown in FIGS. 19A, 19B, 9C and 19D. Then any excess cord extending beyond the cord retainer clip mechanism 29I is wrapped about the first and second cord excess windup fixtures 29J and 26F along the pathway shown in FIGS. 20A and 20B. After all excess cord is wound about the wind-up fixtures 29F and 26F, the free end of the cord 23 is finally securely retained in the second cord retaining mechanism 26H supported on the second end module 26, as shown in FIGS. 20B, 21A and 21B. The installation process will be described in greater detail hereinbelow.

Specification of Preferred Method of Installation to be Used in Connection with the Communication Tower Panel Security Device of the First Illustrative Embodiment of the Present Invention Referring to FIGS. 16A through 22E, a preferred method of installing the communication tower panel security device 14 about a selected section of a communication tower 10, will now be described in great technical detail.

In general, it is recommended that two people be selected for preparation and installation of the communication tower panel security device 14 of the present invention. It is noted that the diameters of tower shroud panel assemblies can vary from antenna service bay to antenna service bay and also along the same service bay. Therefore, the communication tower panel security device 14 of the present invention will most likely need to be individually sized and labeled with numbers to make reusing the communication tower panel security devices easier.

Preparing the Communication Tower for Installation of the Communication Tower Panel Security Device Thereto The first step involves selecting a spot for affixing a Velcro strip 36 on the shroud panel 13 of the tower, to which the connecting/tensioning assembly will be fastened by its matching Velcro affixed on the mounting surface 26D of the second end module 26 shown in FIGS. 11A through 11D. When possible, each Velcro strip, applied to each of devices being installed about the shroud panel with appropriate spacing, should be aligned with each other vertically on the tower 10. During this step, the installer should lightly the installation spot using a sanding sponge or like device, then clean the surface with alcohol and a cloth rag. After allowing the cleaned installation spot to dry, the Velcro strip backing is removed and the strip is placed onto the tower and a roller used to firmly apply pressure to ensure it sticks securely to the shroud panel of the communication tower 10.

Attaching the Communication Tower Panel Security Device to a Communication Tower and Measuring where to Cut the Plastic Tubing and Cord to the Correct Length for the Installation The second step of the installation method involves attaching connecting/tensioning assembly 21 of the communication tower panel security device 14 to Velcro strip 36 mounted to the tower, and making sure the sliding module is moved is all the way against the second end module (i.e. functioning as a cleat block).

Thereafter, the plastic tubing and cord assembly (22, 23, 24) is wrapped about the tower and over the channel region 25C of the first end device 25, and a Sharpie type marker is used to mark the plastic tubing 22 at the end of the channel 25C, indicated by a thick, raised red color line 37 formed on the top surface of the first end module 25.

The communication tower panel security device 14 is then removed from the tower and the plastic tubing 22 is cut at the mark made using a pair of sharp cutters, with great care taken to not cut or slice the cord 22 therewithin.

Then the free end of the cord 23 is connected to the barbed end of the end connector 24 by separating the end connector into it half sections 24A, 24B, and then routing the cord around the interior mounting post 24C, as shown in FIG. 15D, and then tying a knot at its end to form a loop about the post and then sealing the know with glue to prevent fraying. When dried, the end connector halves 24A and 24B of the end connector are reassembled, and the cord loop is pulled tight in the end connector to close the halves completely.

The plastic tubing 22 is then straightened with a partner or by hanging it vertically. All excess cord 23 is pulled from the right side from the sliding module 29, until the end connector 24 end hits the cut free end of the plastic tubing 22.

Before fully inserting the barbed end of the end connector 24 into the cut end of the plastic tubing 22, the end connector 24 should be rotated so that it can be inserted into the channel 25C of the first end module 25 without twisting the plastic tubing section 22.

Thereafter, a hose clamp is placed over the middle of the barded portion of the end connector 25, aligning the larger clamping part with either the top or bottom of the barded end. The hose clamp is then tightened using channel lock pliers until the teeth are fully engaged.

While the plastic tubing is straightened out, the small amount of excess cord that remains therein is pulled so that the cord is tightened to the "inside" face of the plastic tubing 22 with no slack anywhere along its length.

The excess cord 23 is pulled through the pulleys 27A, 27B, 30A and 30O, starting with the center "middle" hole 29E, creating a tight loop around the sliding module 29.

The sliding module 29 is held in place against the second end module 26, while the loose end of the cord is pulled until all excess cord is "outside" the pulleys.

The sliding module 29 is then fully pushed against the first end module 25. This defines the maximum movement that the cord can travel during tensioning operations. Several wraps of electrical tape are wound onto the cord 23 at the edge of the second end module 26, while the sliding module is pushed up against the first end module 25. The tape and cord are then cut at the edge of the second end module 26, leaving most of the tape on the remaining cord end. The length of the cord beyond the sliding module 29 is substantially equal to the length of the side panels 28A and 28B. Then end of the cut cord is then coated with super glue to seal it and prevent the cord from fraying.

Installing the Communication Tower Panel Security Device to a Cellular Communication Tower The third major step of the installation method involves installing the communication tower panel security device 14 by the following procedure, for example, as illustrated in FIGS. 16A through 22E.

As shown in FIG. 16A, the first step of the procedure involves aligning the communication tower panel security device 14 with the right side of a pre-affixed Velcro fastening patch 36 applied to the mounting surface of the shroud panel 13 associated with the antenna service bay of the communication tower 10.

Figure 16B:
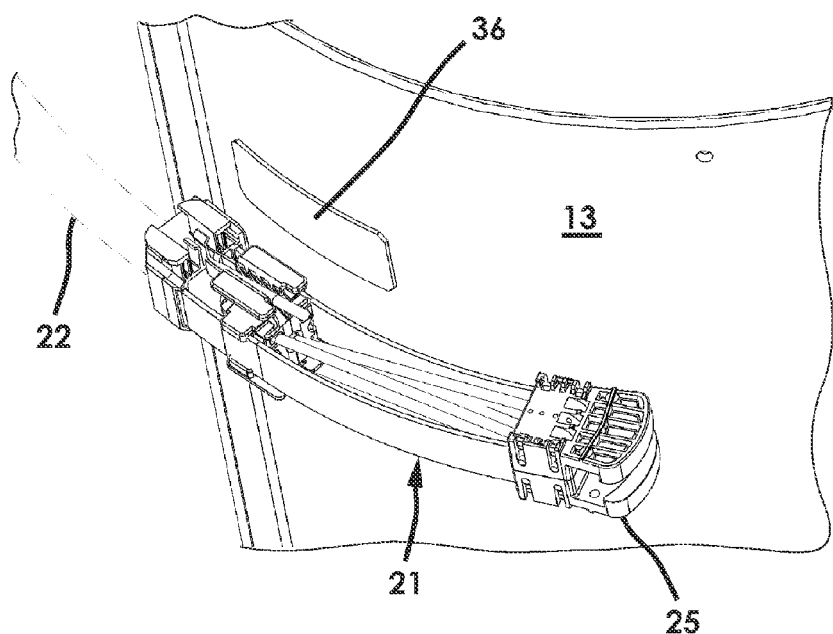
FIG. 16B is a perspective view of the communication tower panel security device of the first illustrative embodiment being brought closed to an aligned pre-affixed Velcro fastening patch applied to the mounting surface of the shroud panel of the communication tower.

As shown in FIG. 16B, the second step of the procedure involves bringing the aligned pre-affixed Velcro fastening patch 36 applied to the mounting surface of the shroud panel of the communication tower.

Figure 16C:
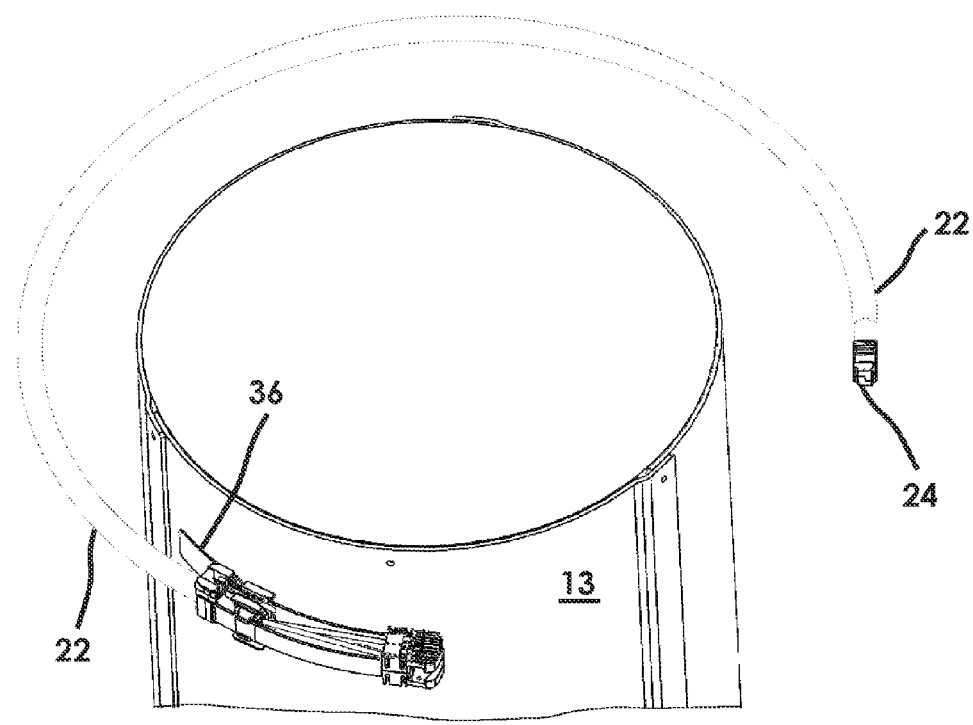
FIG. 16C is a perspective partially fragmented view of the communication tower, showing the communication tower panel security device of the first illustrative embodiment mounted to the pre-affixed Velcro fastening patch applied to the mounting surface of the shroud panel of the communication tower.
Figure 16D:
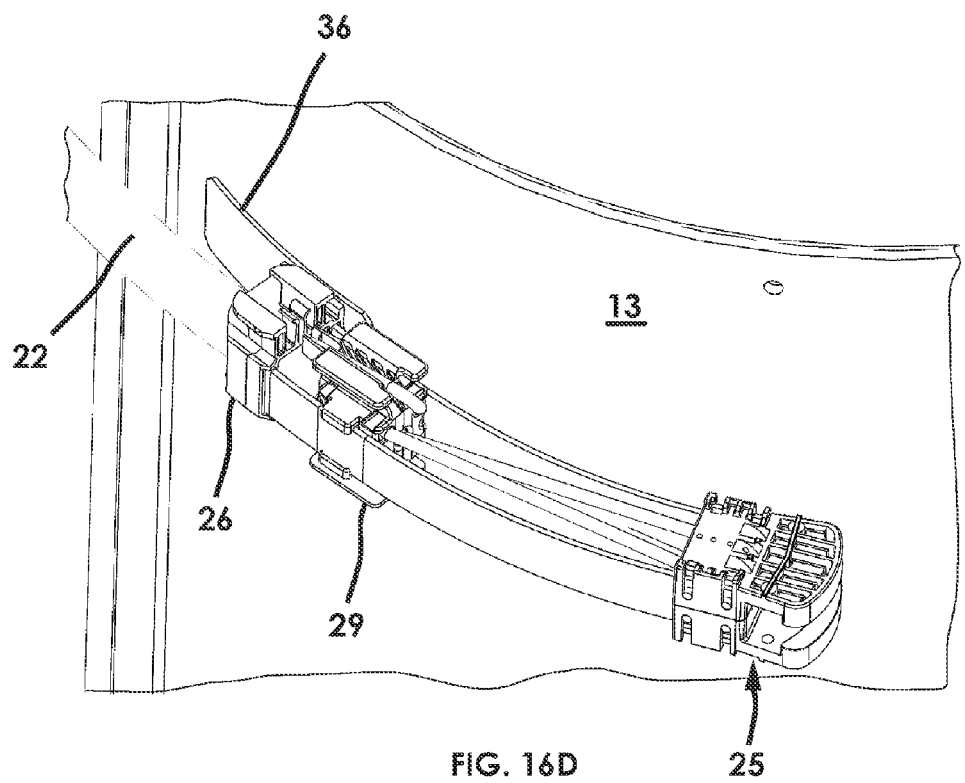
FIG. 16D is a perspective view of the communication tower panel security device of the first illustrative embodiment mounted to the pre-affixed Velcro fastening patch applied to the mounting surface of the shroud panel of the communication tower.
Figure 16E:
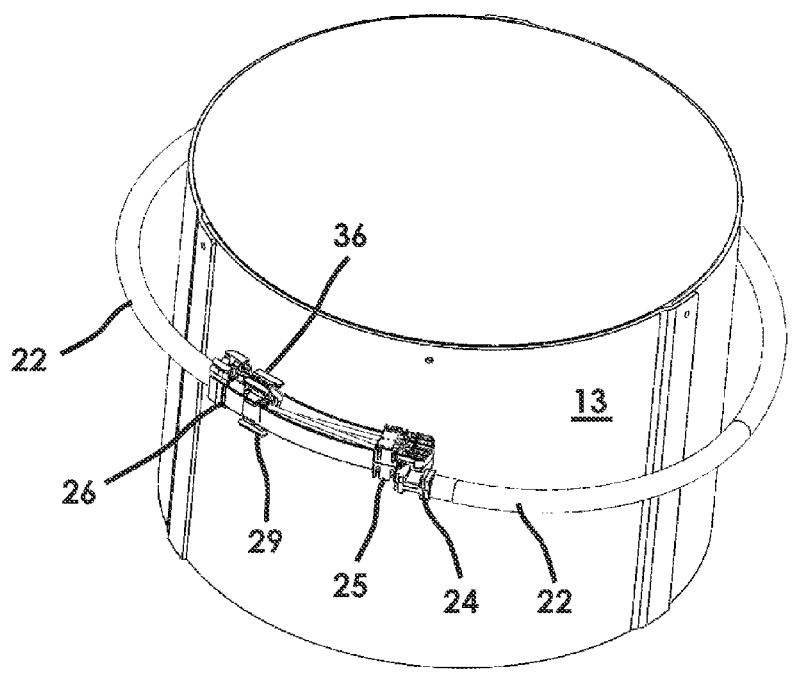
FIG. 16E is a perspective view of the top bay of the communication tower, about which the connecting/tensioning module of the communication tower panel security device of the first illustrative embodiment is mounted to a Velcro fastener affixed to a shroud panel associated with the communication tower, and where the free end connector is being slidably connected to the connector channel of the second end module.
Figure 16F:
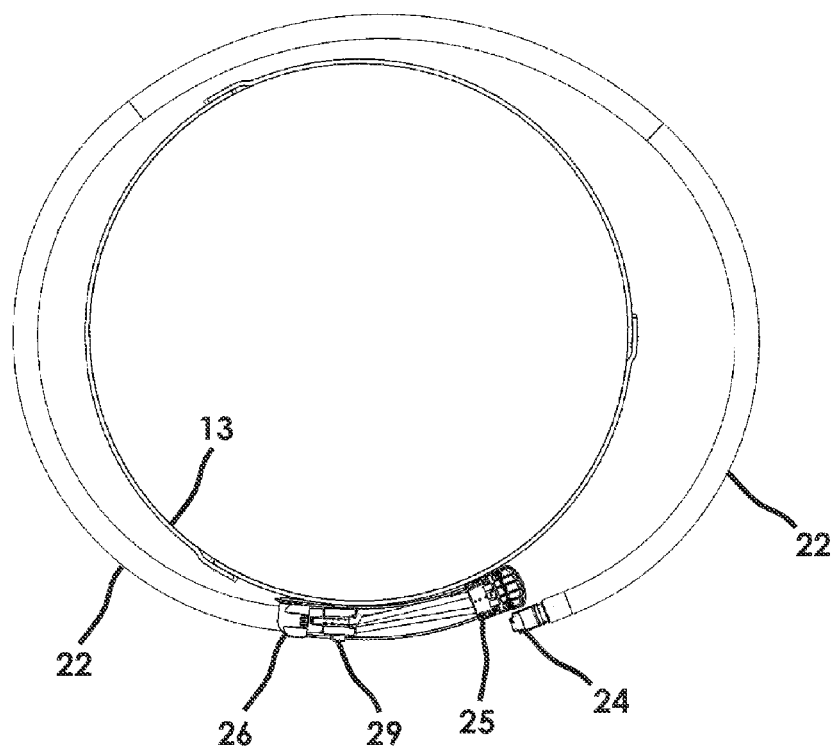
FIG. 16F is a plan view of the free connector end of the communication tower panel security device of the first illustrative embodiment being connected to the mounting surface of the shroud panel of the communication tower.
Figure 16G:
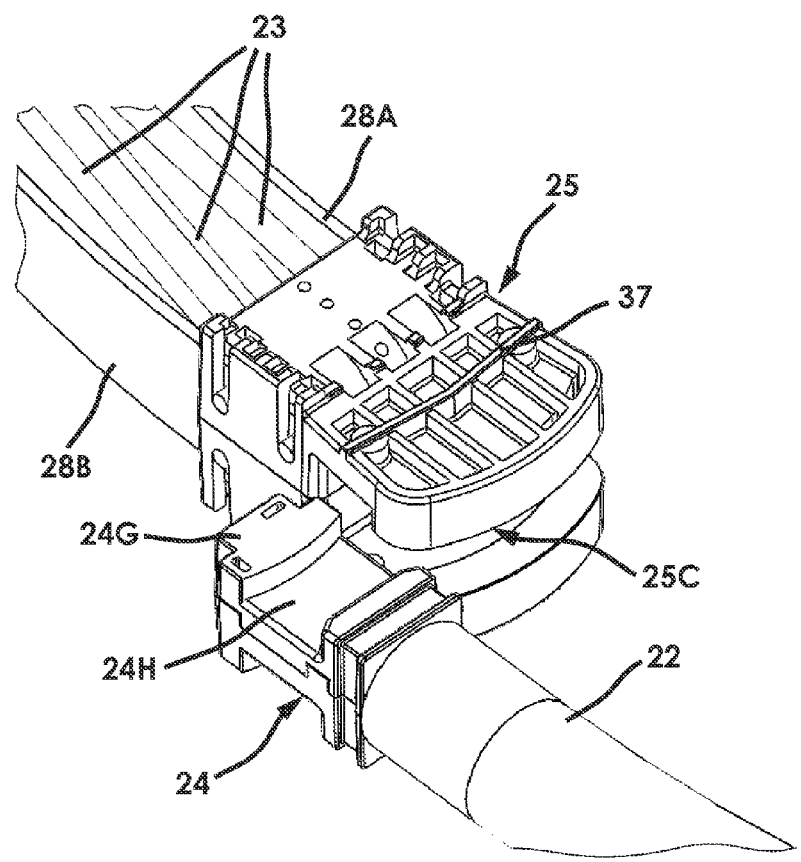
FIG. 16G is a first perspective closer view showing the end connector module being slid into the connector channel provided on the rear end portion of the second end module of the first illustrative embodiment of the present invention.
Figure 16H:
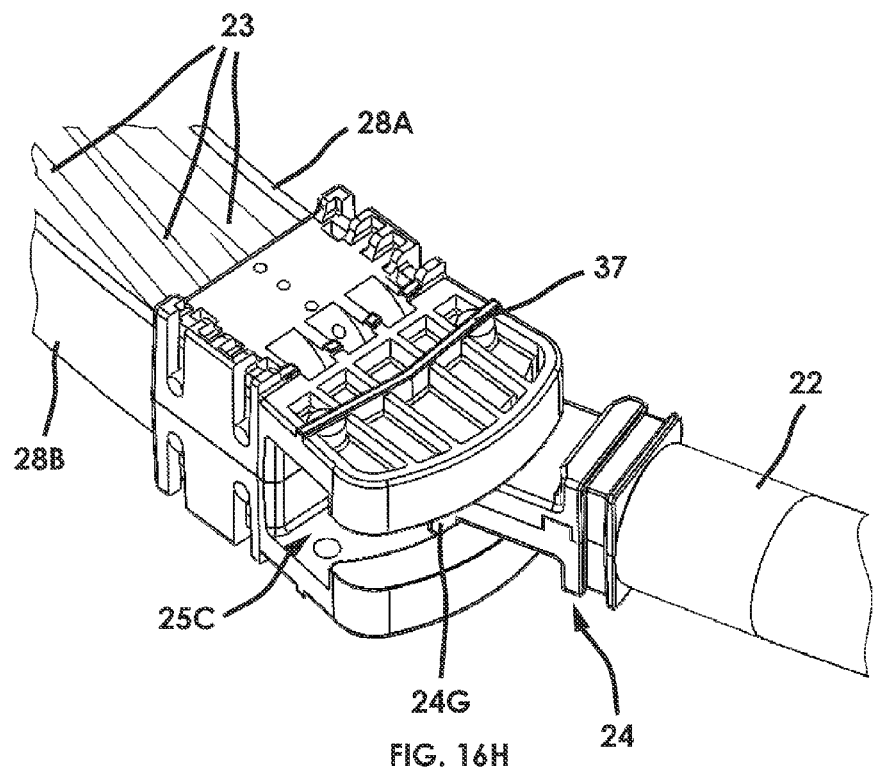
FIG. 16H is a second perspective closer view showing the end connector module slid fully into the connector channel provided on the rear end portion of the second end module of the first illustrative embodiment of the present invention.

As shown in FIGS. 16C and 16D, the third step involves mounting the planar surface 26D communication tower panel security device 14 to the pre-affixed Velcro fastening patch 36 applied to the mounting surface of the shroud panel of the communication tower.

Figure 17B:
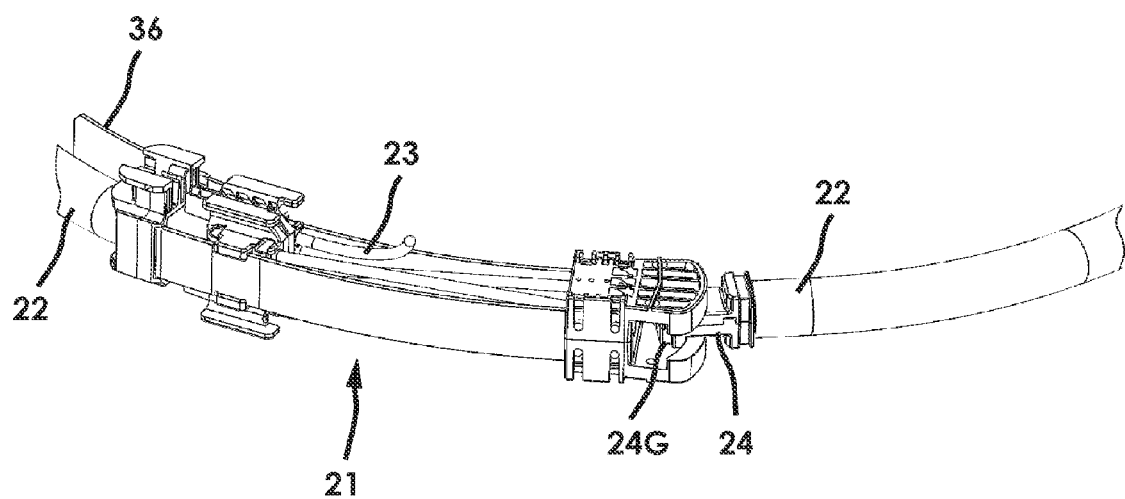
FIG. 17B is a perspective view of the connecting/tensioning module of the communication tower panel security device of the first illustrative embodiment shown removed from the communication tower of FIG. 17A.

As shown in FIGS. 16E, 16F, 16G and 16H, the fourth step involves wrapping the plastic tubing and cord assembly about the tower, and then sliding the head portion 24G of free end connector 24 into the connector channel 25C of the second end module 25. In FIGS. 17A and 17B, the communication tower panel security device is shown installed about communication tower in a loose un-tightened configuration.

Figure 18A:
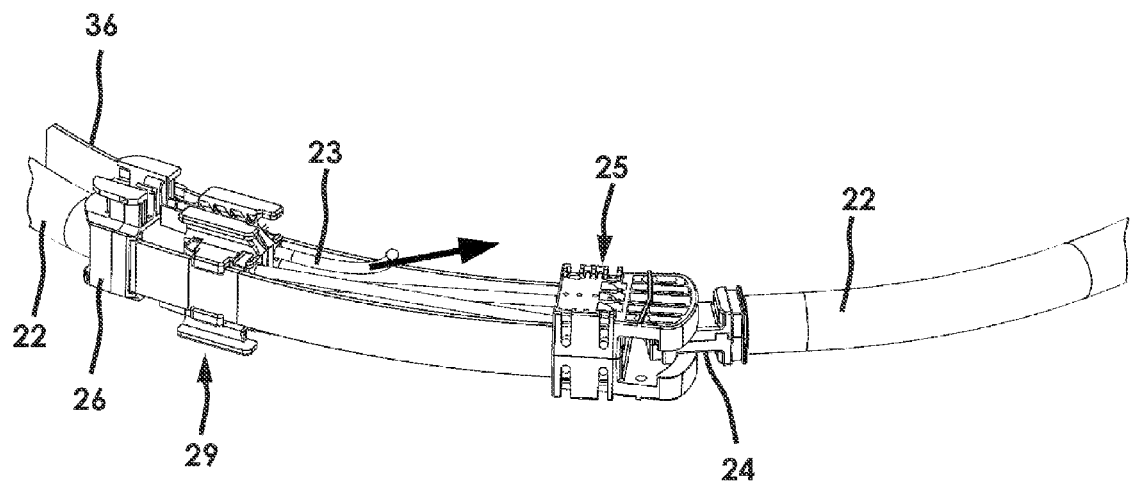
FIG. 18A is a perspective view of the connecting/tensioning module of the communication tower panel security device of the first illustrative embodiment mounted on the communication tower of FIG. 17A, wherein during the first step of the cord tensioning process, the cord from the sliding module is pulled upwardly, causing the cord to tighten and the sliding module to slide closer towards the second end module.
Figures 1, 18A:
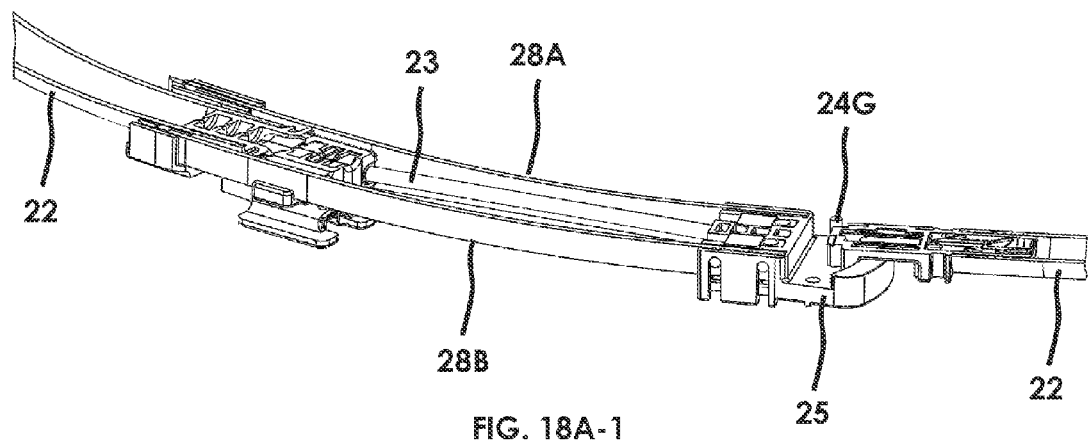
Figure 18B:
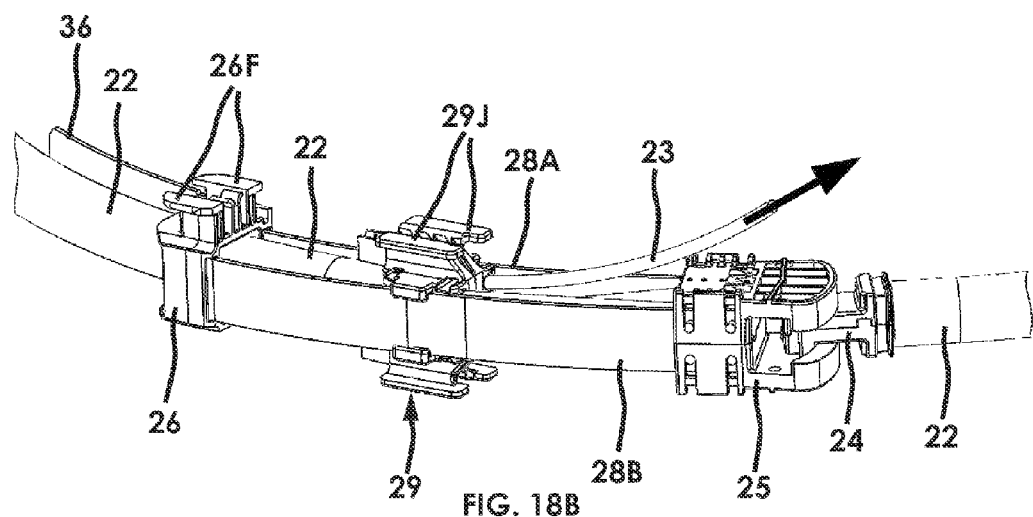
FIG. 18B is a perspective view of the connecting/tensioning module of the communication tower panel security device of the first illustrative embodiment shown removed from the communication tower of FIG. 17A, wherein during the second step of the cord tensioning process, the cord from the sliding module is pulled further upwardly, causing the cord to further tighten and the sliding module to slide even closer towards the second end module.

As shown in FIGS. 18A through 18B, the first step of the cord tensioning process, the cord from the sliding module 29 is pulled upwardly, causing the cord 23 to tighten to a semi-tight condition, and causing the sliding module 29 to slide closer towards the second end module 26. Then the excess cord 23 is retained in the cord retaining mechanism 29I (i.e. jam cleat and cord catch) on the sliding module 29I as shown. Then both ends of the communication tower panel security device 14 should be grabbed, and the device wiggled side to side while pulling it away from the tower surface, causing the tension in the device to even around the tower and removing any bulging of the cover panels banded by the device. The communication tower panel security device 14 should be retightened once again using the same procedure recited above, and the excess cord 23 secured once again in the cord retaining mechanism 29I on the sliding module 29.

Figure 19A:
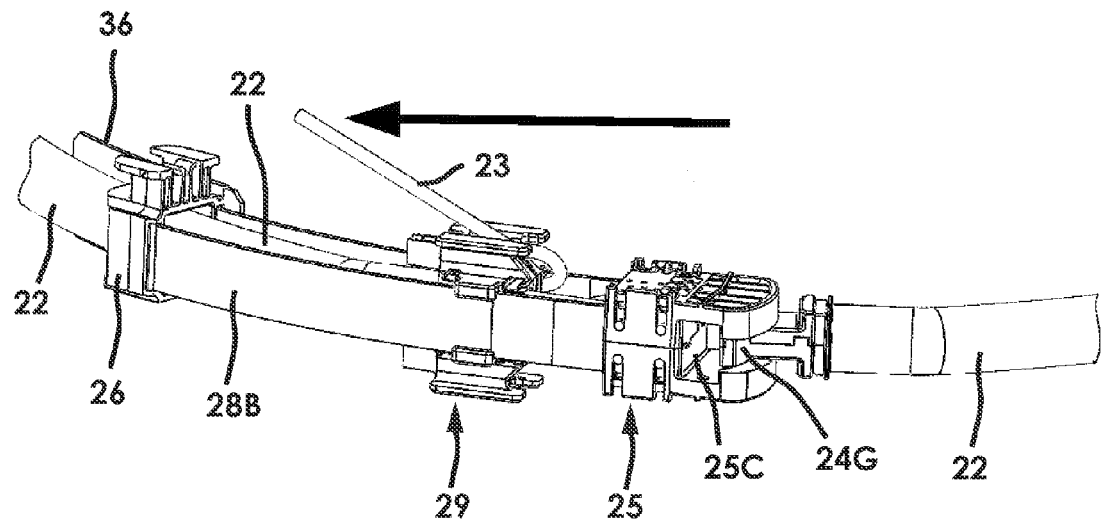
FIG. 19A is a perspective view of the connecting/tensioning module of the communication tower panel security device of the first illustrative embodiment shown mounted on the communication tower of FIG. 17A, wherein during the third step of the cord tensioning process, the tightened cord is pulled back through the cord retaining mechanism on the top of the sliding module and locked into place therein.
Figure 19B:
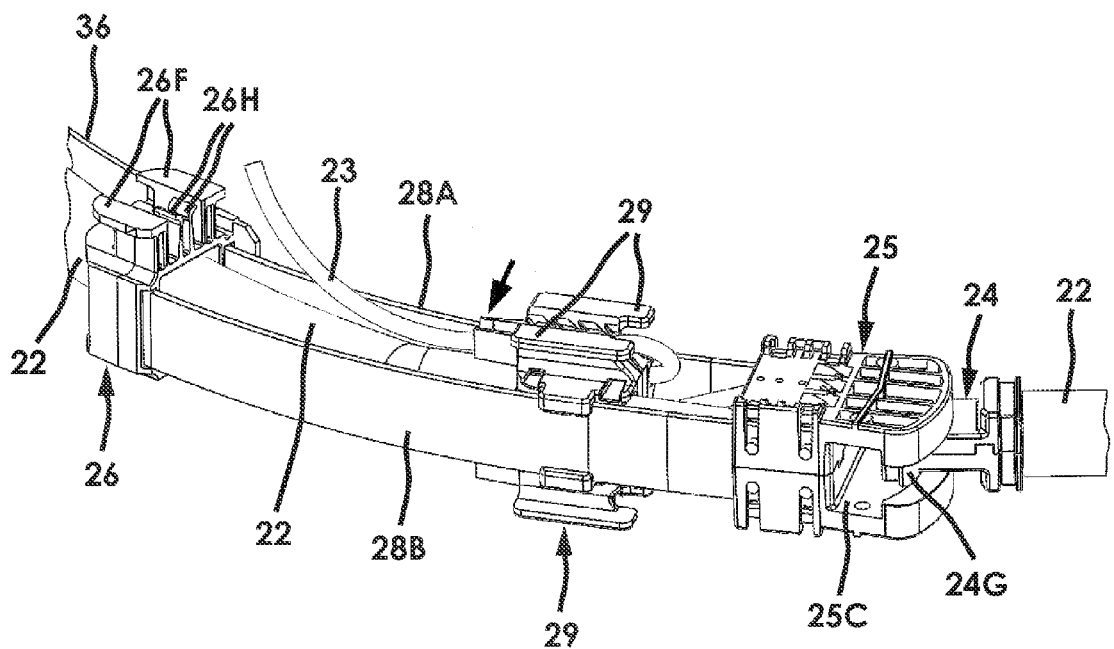
FIG. 19B is a perspective view of the connecting/tensioning module of the communication tower panel security device of the first illustrative embodiment shown mounted on the communication tower of FIG. 17A, wherein during the third step of the cord tensioning process, the tightened cord is pulled back through the cord retaining mechanism on the top of the sliding module and locked into place therein, as shown, and where excess cord can thereafter we wound up during a subsequent cord handling step.
Figure 19C:
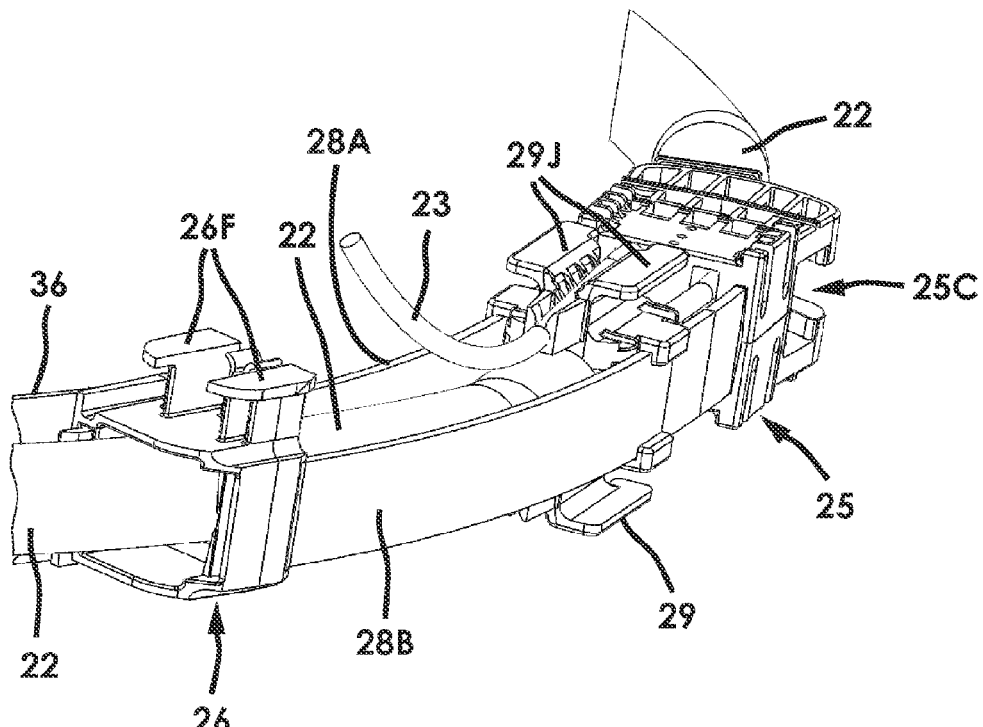
FIG. 19C is a perspective view of the connecting/tensioning module of the communication tower panel security device of the first illustrative embodiment as shown and configured in FIG. 19B.
Figure 19D:
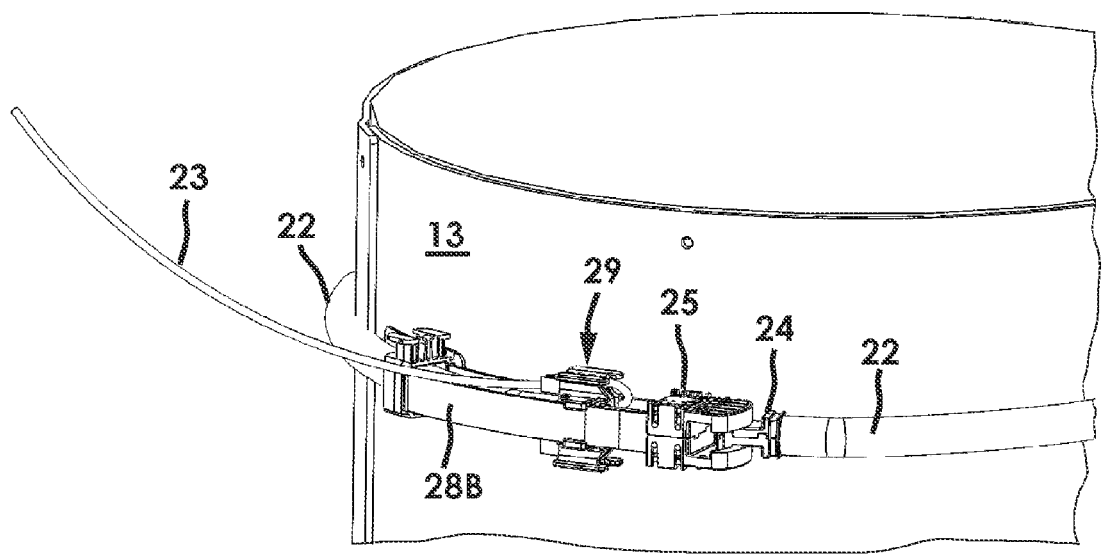
FIG. 19D is a perspective view of the connecting/tensioning module of the communication tower panel security device of the first illustrative embodiment as shown and configured in FIG. 19C, where the excess cord is drawn and prepared to be wrapped around the excess cord wrapping fixtures supported by the device.

As shown in FIGS. 19A and 19B, the next step of the cord tensioning process involves pulling back the tightened cord through the cord retaining mechanism 29I on the top of the sliding module 29 and locked into place therein. FIGS. 19C and 19D shows the cord 23 after it has been tied down within the cord retaining mechanism 29I on the sliding module 29.

Figure 20A:
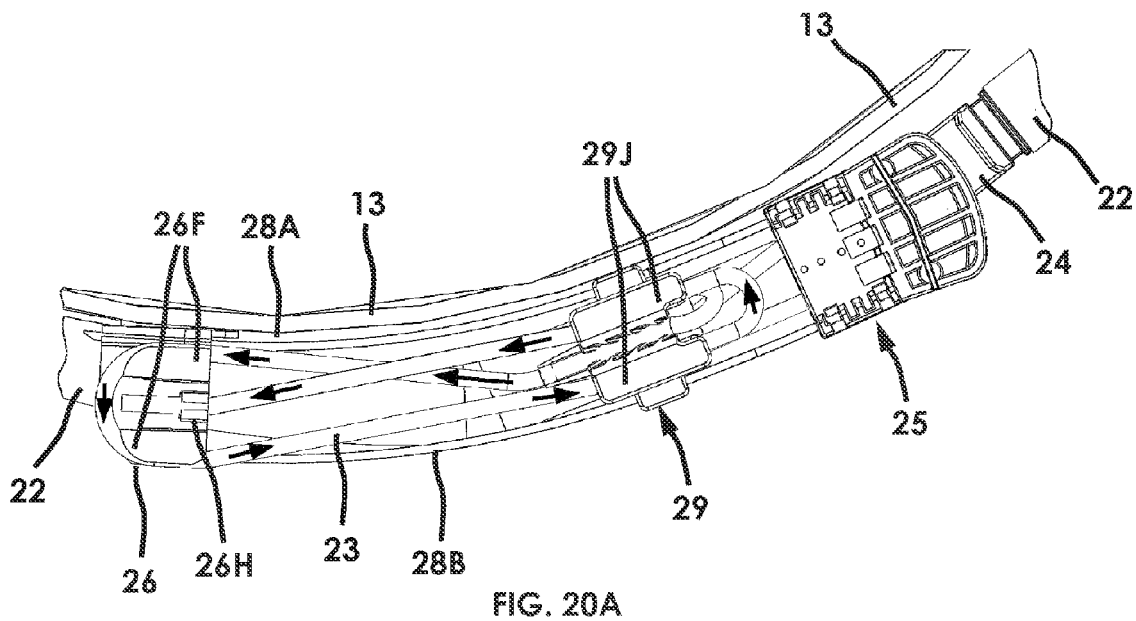
FIG. 20A is a plan view of the connecting/tensioning module of the communication tower panel security device shown and configured in FIG. 19D, where the excess cord has been wrapped around the excess cord wrapping fixtures supported by the device.
Figure 20B:
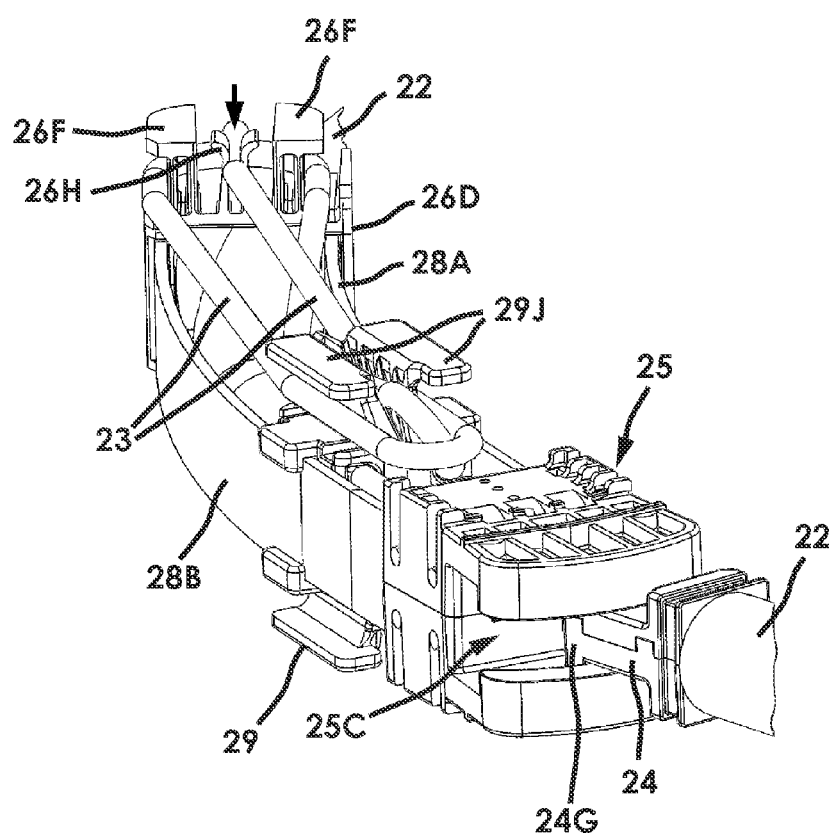
FIG. 20B is a perspective view of the connecting/tensioning module of the communication tower panel security device shown and configured in FIG. 20A, where the excess cord has been wrapped around the excess cord wrapping fixtures supported by the device.
Figure 21A:
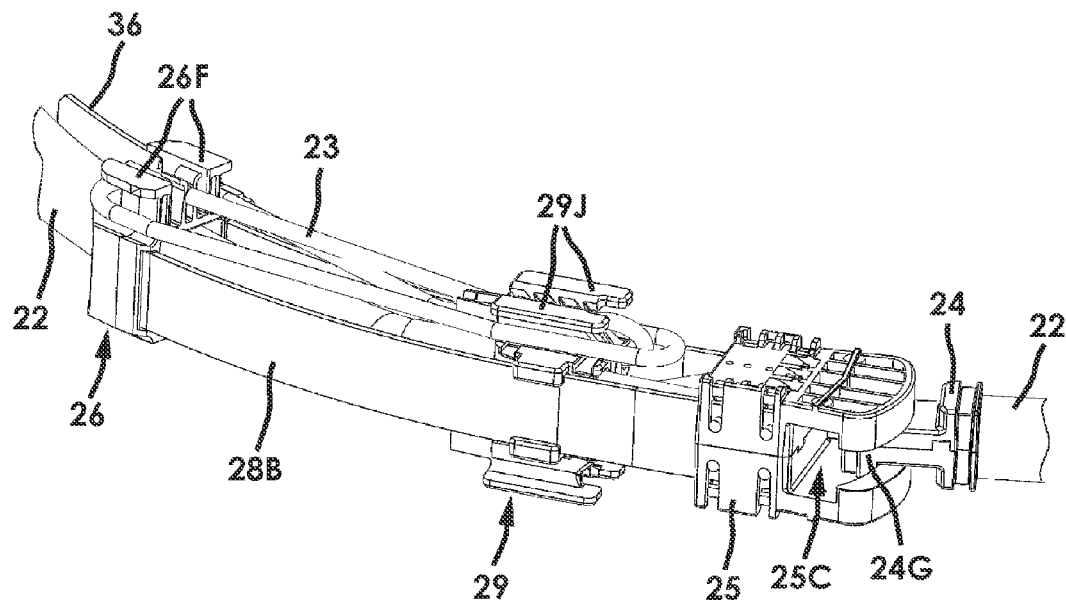
FIG. 21A is a perspective view of the connecting/tensioning module of the communication tower panel security device shown and configured in FIGS. 20A and 20B, where the excess cord has been wrapped around the excess cord wrapping fixtures supported by the device, and the free end of the cord retained in a second cord retaining mechanism supported on the first end module.
Figure 21B:
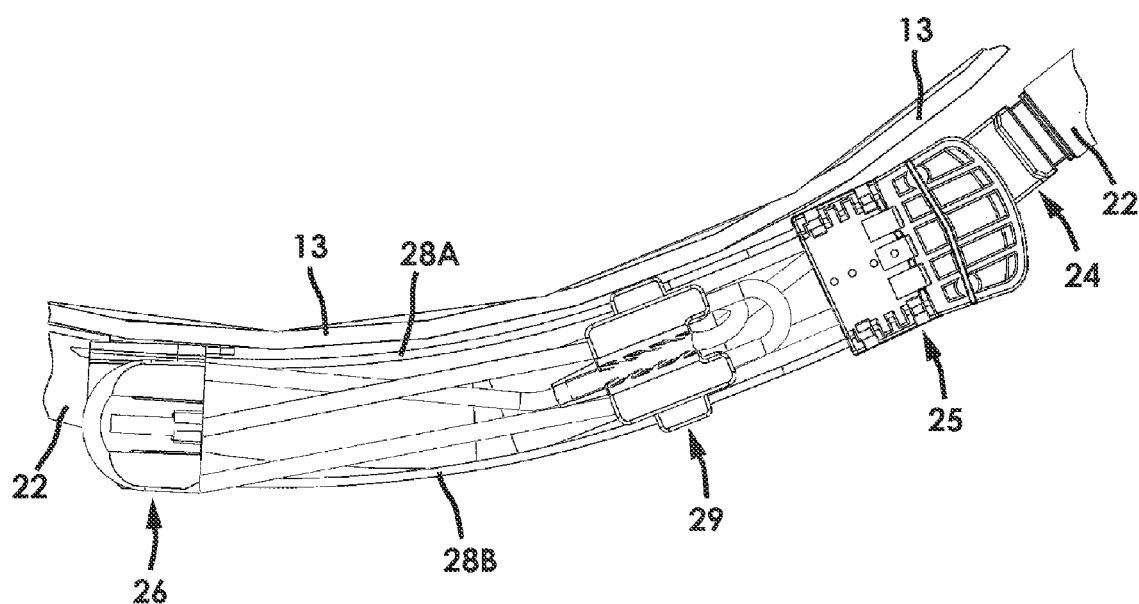
FIG. 21B is a plan view of the connecting/tensioning module of the communication tower panel security device shown and configured in FIG. 20A, where the excess cord has been wrapped around the excess cord wrapping fixtures supported by the device, and the free end of the cord retained in a second cord retaining mechanism supported on the first end module.

As shown in FIGS. 20A and 20B, the next step of the procedure involves wrapping the excess cord 23 around the excess cord wrapping fixtures 26F and 29J supported by the device 14.

As shown in FIGS. 21A and 21B, after the excess cord is wrapped around the excess cord wrapping fixtures supported by the device, the free end of the cord 23 is retained in a second cord retaining mechanism 26I supported on the second end module 26. Thereafter, the installers should verify that the communication tower panel security device 14 installed tightly around the tower 10, under sufficient tension to make it difficult to pull it away from the tower.

Figure 22A:
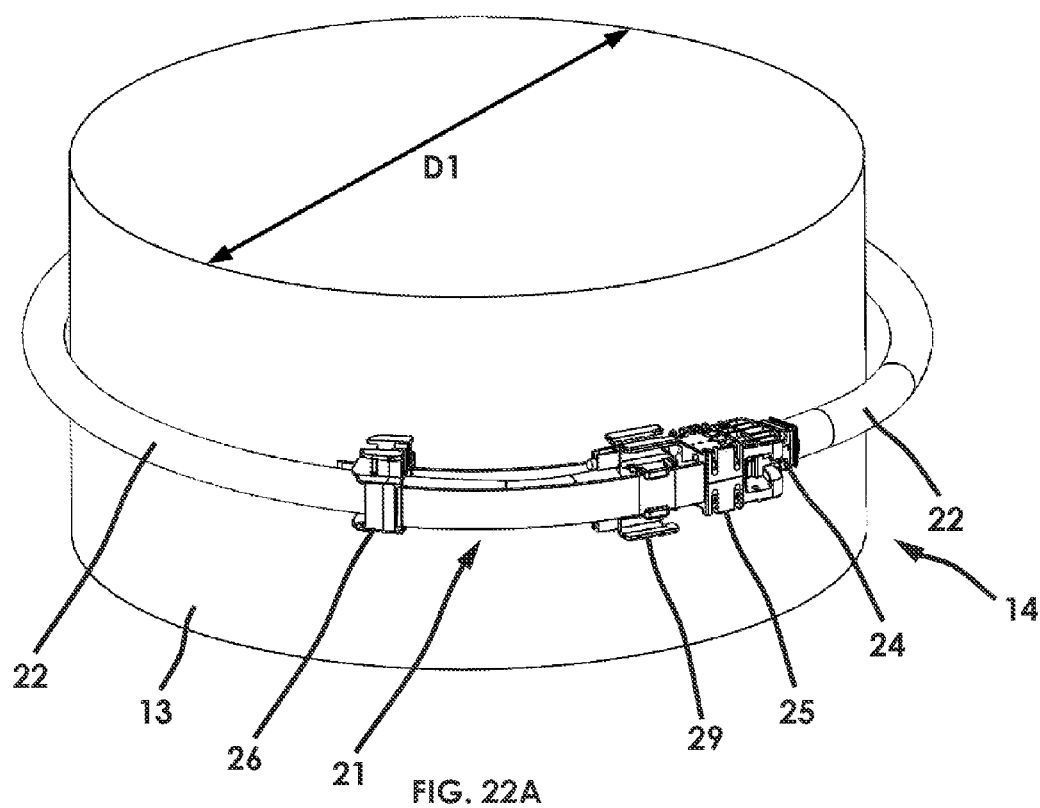
FIG. 22A is a perspective view of the communication tower panel security device of the first illustrative embodiment shown installed and configured about a communication tower having a first outer diameter D1, where the connecting/tensioning housing has flexed and closely adapted the radius of curvature of the shroud panels of the communication tower to provide a tight fit thereabout.
Figure 22B:
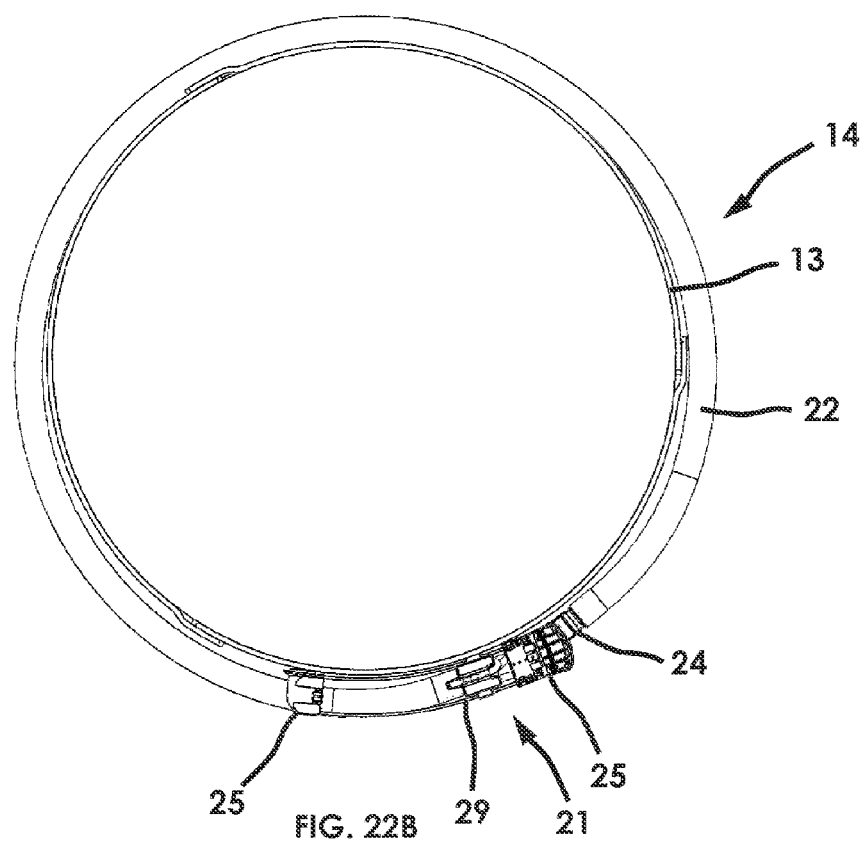
FIG. 22B is a plan view of the communication tower and communication tower panel security device of the first illustrative embodiment shown in FIG. 22A.
Figure 22C:
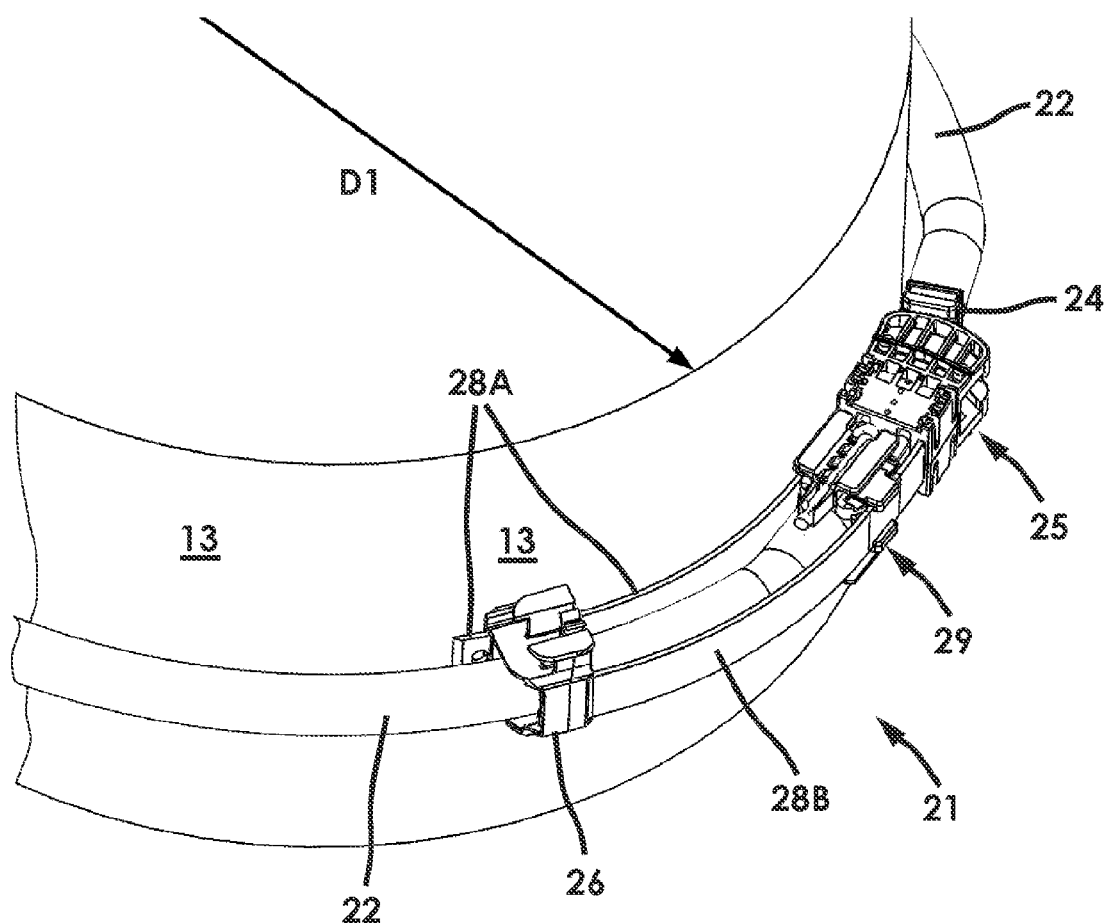
FIG. 22C is a perspective view of the communication tower and communication tower panel security device of the first illustrative embodiment shown in FIG. 22A, having a radius of curvature D1.
Figure 22D:
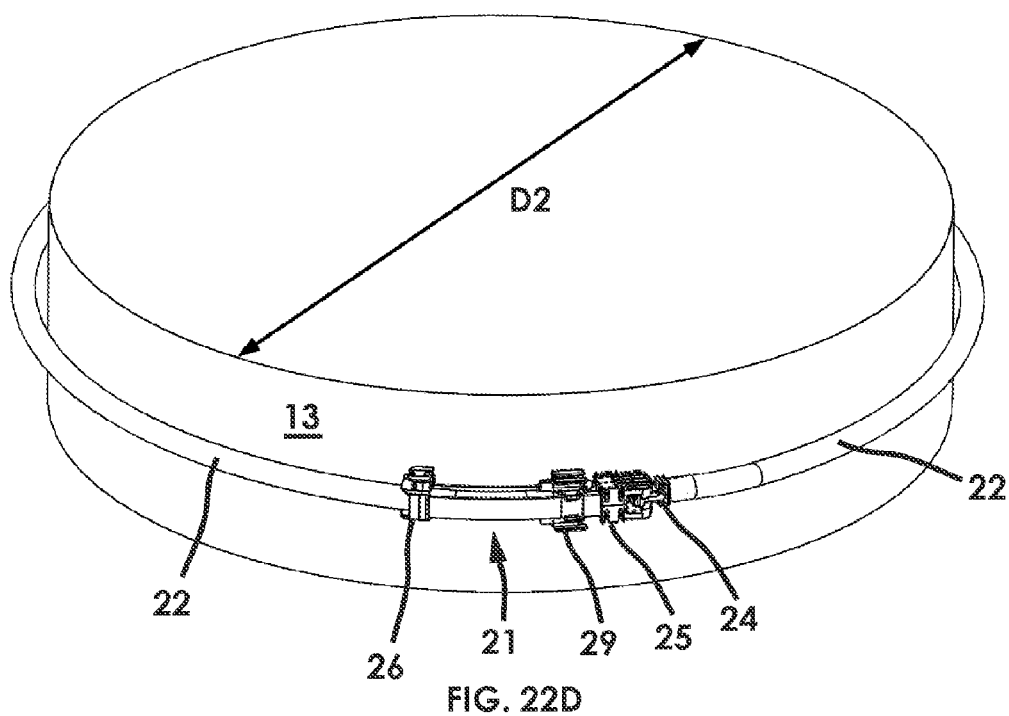
FIG. 22D is a perspective view of the communication tower panel security device of the first illustrative embodiment shown installed and configured about a communication tower having a second outer diameter D2, which is much smaller than diameter D1, where the connecting/tensioning housing has flexed and closely adapted the radius of curvature of the shroud panels of the communication tower to provide a tight fit thereabout.
Figure 22E:
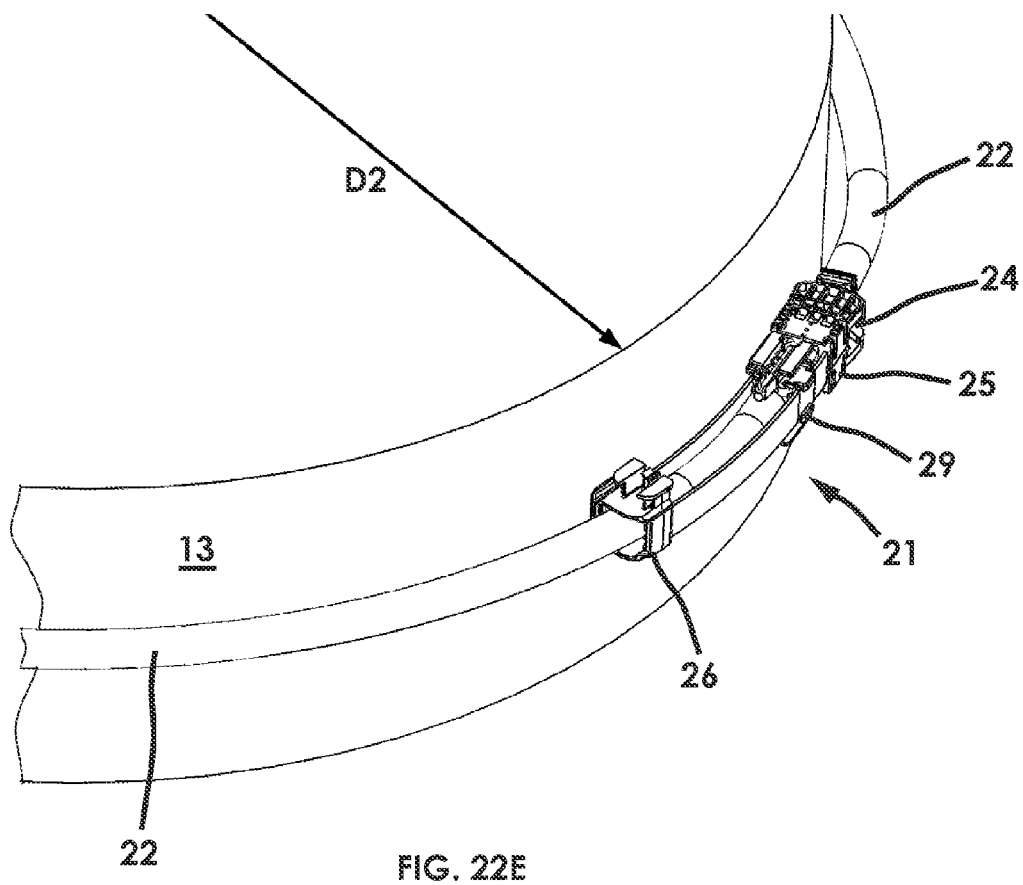
FIG. 22E is a perspective view of the communication tower and communication tower panel security device of the first illustrative embodiment shown in FIG. 22A, having a shorter radius of curvature D2 (D1<D2)

It should be note at this juncture that, as shown in FIGS. 22A, 22B and 22C, the connecting/tensioning assembly 21 has flexed and closely adapted to the radius of curvature of the shroud panels mounted about the communication tower of diameter D1, to provide a tight fit thereabout. By virtue of this feature of the present invention, the connecting/tensioning assembly 21 can also flex and closely adapt to the radius of curvature of shroud panels about the communication tower having a significantly smaller diameter D2 (where D1>D2) to provide a tight fit thereabout, as shown in FIGS. 22D and 22E.

Method of Removing the Communication Tower Panel Security Device from a Communication Tower To remove the communication tower panel security device 14 from its communication tower, the following reverse procedure can be used.

As the length of communication tower panel security devices will vary, it is important to make sure communication tower panel security devices and tower locations are properly labeled, using a sharpie to label them and their positions on the tower structure (e.g. device ID, tower service bay ID, bay location—top, middle or lower, etc).

First, the end of the cord is removed from the cord retaining mechanism 26H and the excess cord is unwrapped from the cord wrapping fixtures 26F and 29J. The sliding module 29 is then allowed to move on its own to release some tension. Thereafter, the sliding module 29 is pushed until it contacts the second end module 26. The cord is then secured in the cord retaining mechanism 26H. Then the end connector 24 is removed from the connection channel 25C of the first end module 25, and the plastic tubing and cord assembly unwrapped from around the tower. Finally, the connecting/tensioning assembly 21 of the communication tower panel security device is pulled off the Velcro strip 36 mounted on the surface of the tower panel 13.

By virtue of this embodiment of the communication tower panel security device of the present invention, it is possible to generate and maintain tension using a double pulley and cord mechanism embodied within a flexible connector/tensioning assembly 21 connecting the free ends of a plastic tubing and cord assembly 22, 23, and achieving the shroud panel security objectives of the present invention.

Second Illustrative Embodiment of the Cellar Communication Tower Panel Security Device of the Present Invention Referring now to FIGS. 23A through 26C-2, the communication tower panel security device 40 according to the second illustrative embodiment of the present invention will be described.

Figure 23A:
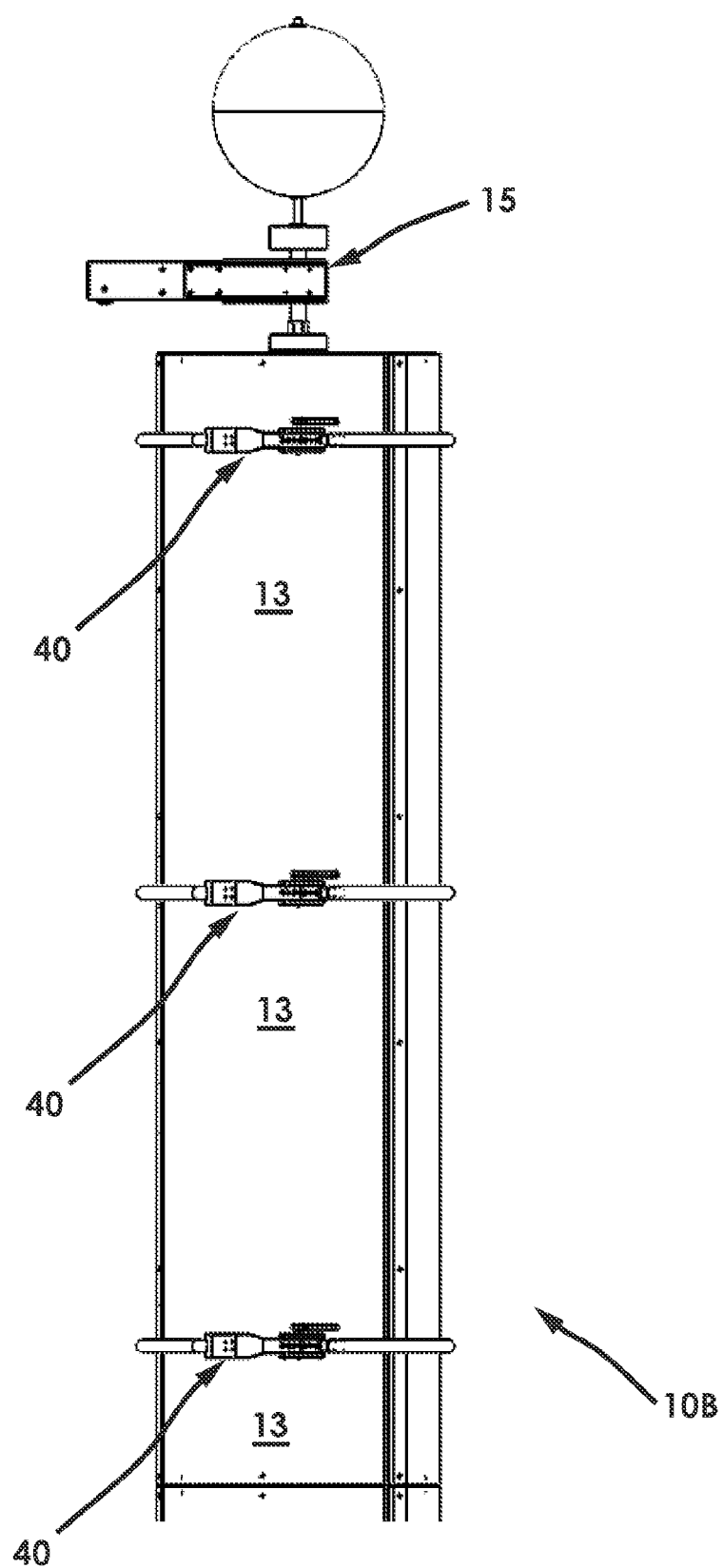
FIG. 23A is an elevated side view of a cellular communication tower (CCT) equipped with multiple communication tower panel security devices according to the second illustrative embodiment of the present invention, illustrated in FIGS. 23B through 26C-2.
Figure 23B:
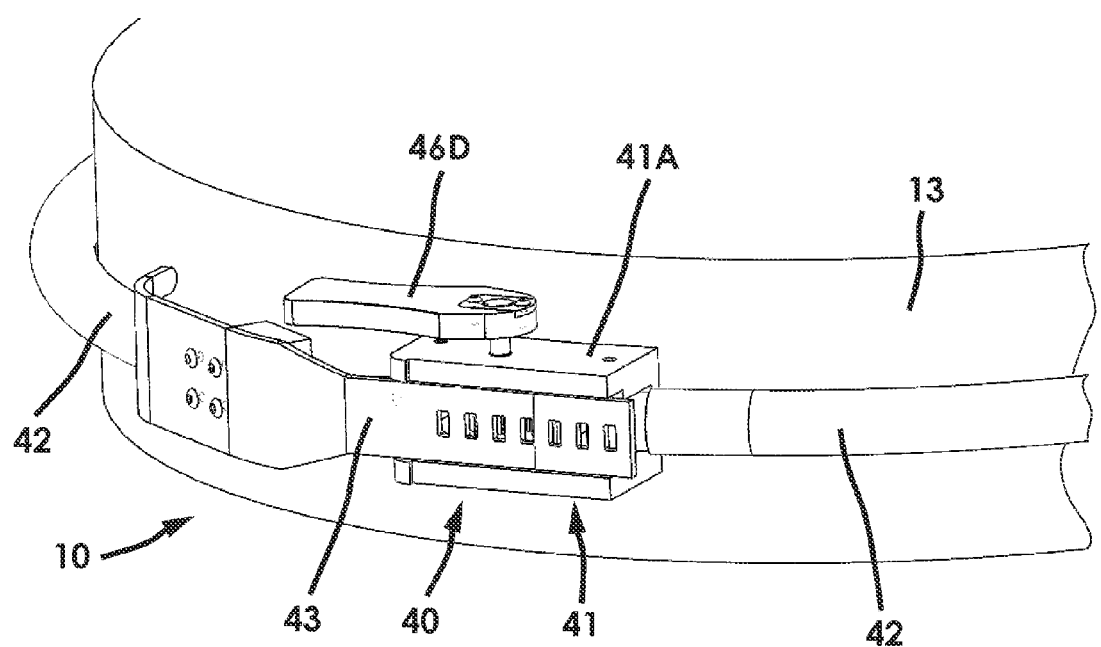
FIG. 23B is a perspective view of the communication tower panel security device of the second illustrative embodiment fastened to an antenna bay of a communication tower, and secured tightly thereabout.

As shown in FIGS. 23A and 23B, multiple communication tower panel security devices 40 according to the second illustrative embodiment are shown fastened about the shroud cover panels of antenna service bays of a cellular communication tower (CCT) 10B as described hereinabove. As shown, the communication tower panel security device 40 comprises: a flexible plastic tubing assembly 42 for wrapping around the shroud panels 13 of the communication tower 10B; and a connecting/tensioning assembly 41 for interconnecting with the flexible plastic tubing assembly 42 and generating and maintaining sufficient tension forces along the flexible plastic tubing assembly to ensure that the plastic tubing 42 secures the shroud panels 13 in place during expected weather conditions.

Figure 24:
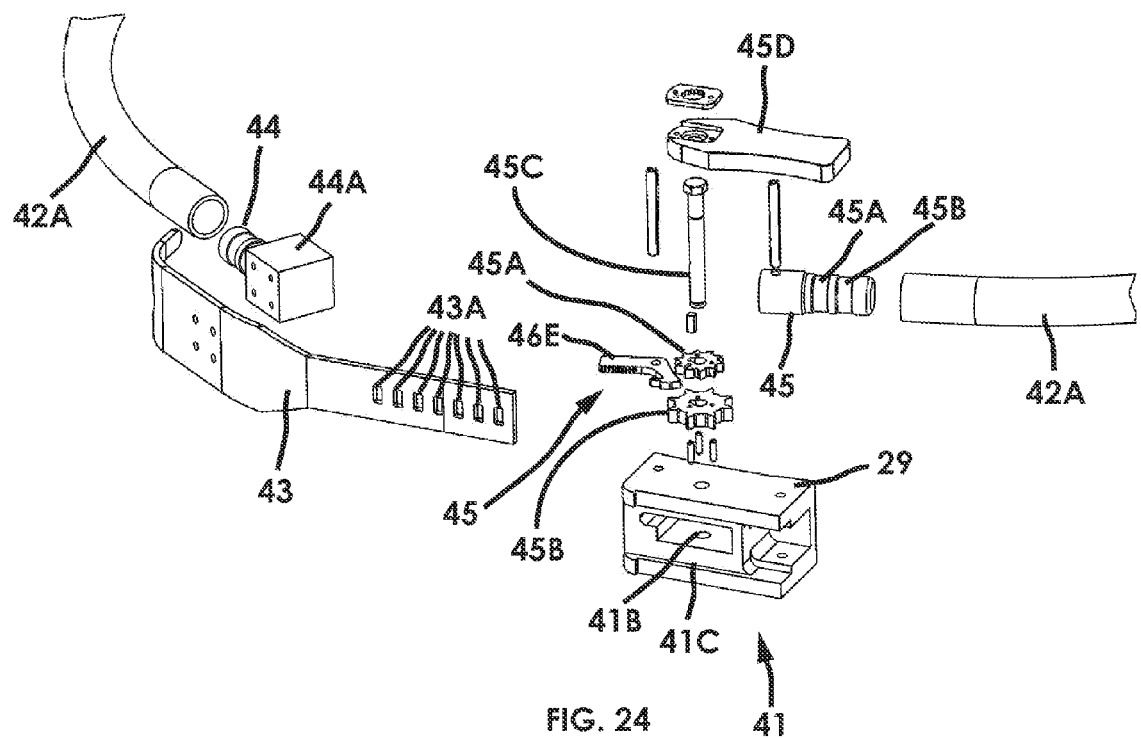
FIG. 24 is an exploded view of the communication tower panel security device of the second illustrative embodiment of the present invention.

As shown in FIG. 24, the flexible plastic tubing assembly 42 employed in the communication tower panel security device 40 comprises: a first end connector 43 having a channel engaging portion 43 and a barbed portion 44 for receiving the first free end of a length of plastic tubing 42A; a second end connector 45 having a base portion 45A of block configuration, and a barbed portion 45B for receiving the second free end of a length of plastic tubing 42A.

Figure 25:
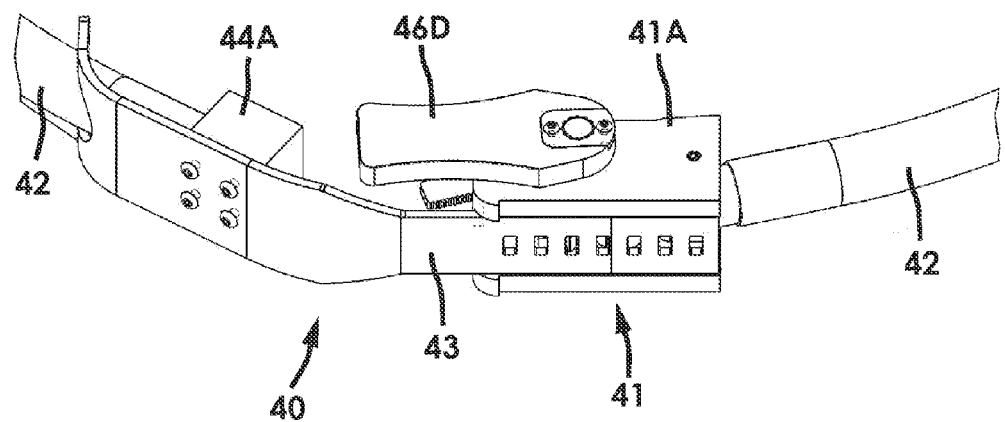
FIG. 25 is a perspective view of the communication tower panel security device of the second illustrative embodiment of the present invention, shown removed from the communication tower.
Figure 26A:
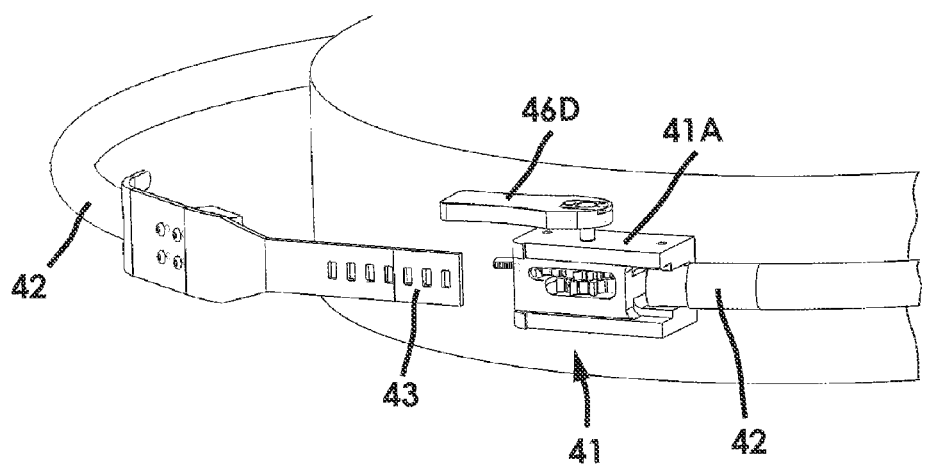
FIG. 26A is a perspective view of the communication tower panel security device of the second illustrative embodiment of the present invention, showing the end strap being slid into the connecting/tensioning assembly of the device of the present invention.
Figure 26B:
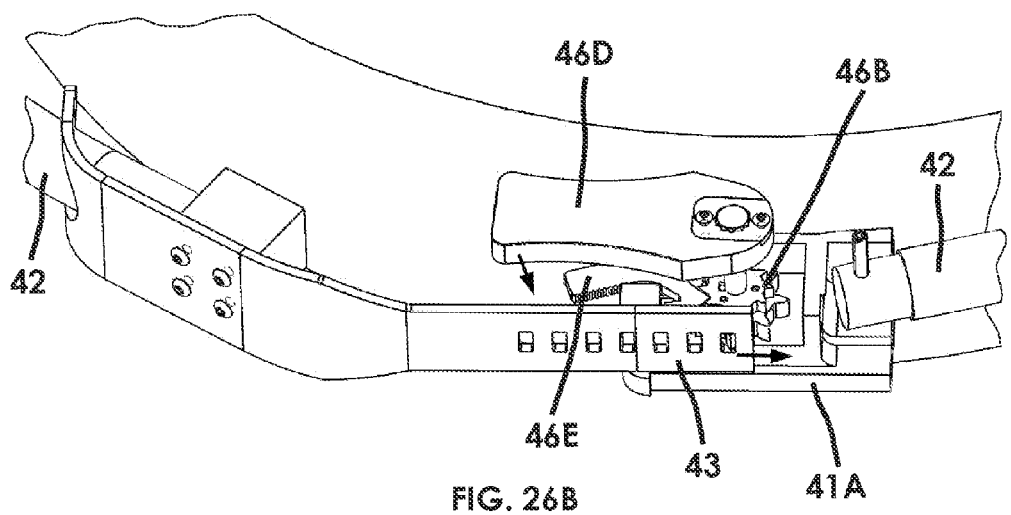
FIG. 26B is a perspective, partially cutaway view of the communication tower panel security device of the second illustrative embodiment of the present invention, showing the end strap slid into and engaged by connecting/tensioning assembly of the device, so that the device surrounds and secures the shroud panels of the communication tower.
Figures 1, 26B:
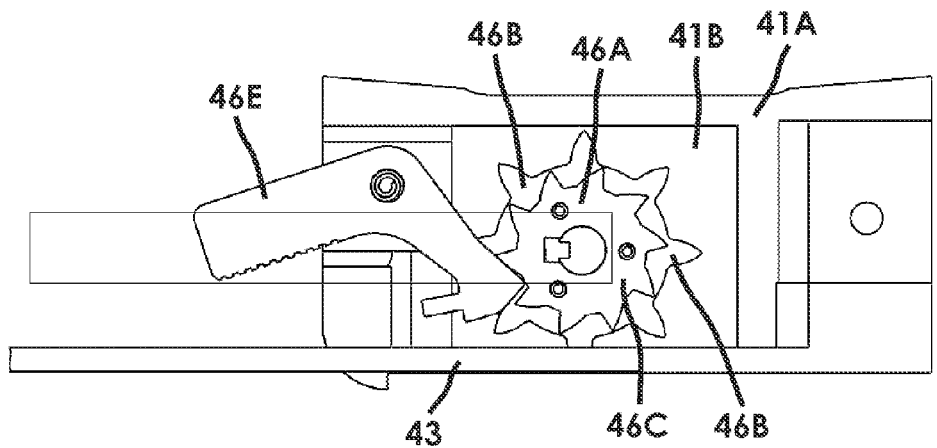
Figure 26C:
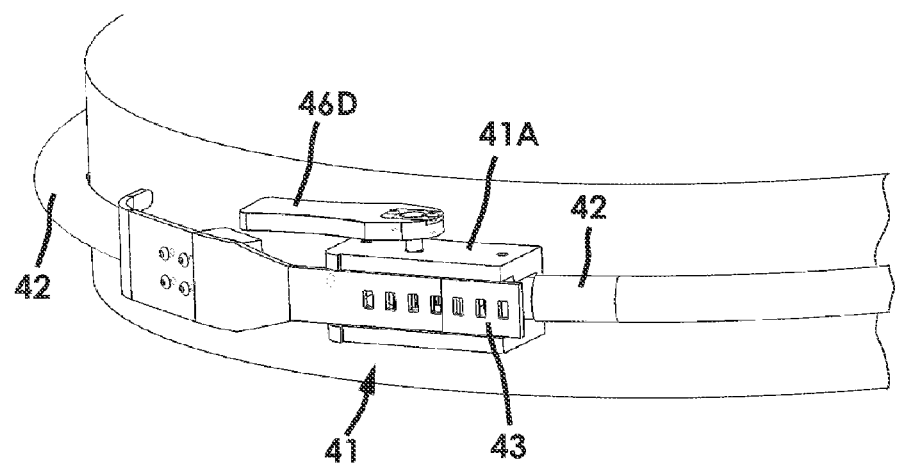
FIG. 26C is a perspective view of the communication tower panel security device of the second illustrative embodiment of the present invention, showing its end strap slid into and engaged by connecting/tensioning assembly of the device and the device fully tightened so that the it fully surrounds and secures certain shroud panels of the communication tower.
Figures 1, 26C:
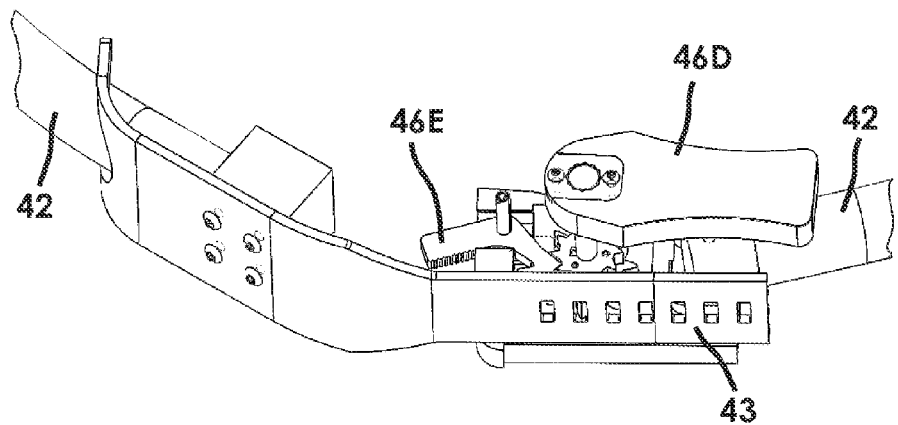
Figures 2, 26C:
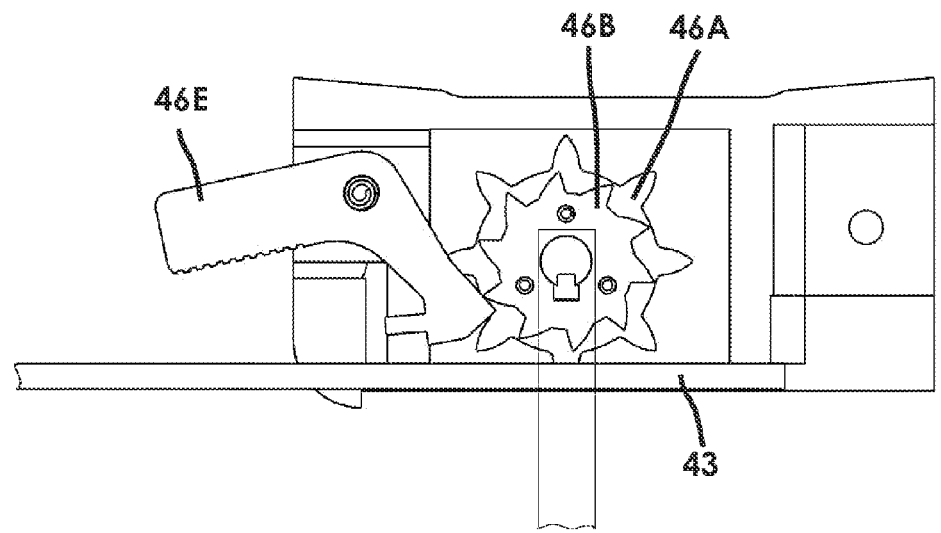

As shown in FIG. 24, the connecting/tensioning assembly 41 comprises: a frame 41A with a central cavity 41B within which a ratchet mechanism 46 is mounted. Specifically, the ratchet mechanism 46 comprises: a set of concentrically mounted sprockets 46A and 46B are mounted to a post 46C that is connected to tensioning lever 46D, wherein the top sprocket 46A has a smaller diameter, and engages a release lever 46E that is pivotally mounted to the frame within the cavity 41B. As shown in FIGS. 25 and 25, the first end of a tension band 43 is connected on one end to the block portion of the first end connector 44A, whereas the other end of the tension band 43 tapered and slid into and along an external channel 41C formed in the frame 41A. As shown in FIGS. 2B and 26B-1, the tension band end portion 43 has spaced apart apertures 43A which are received in and engaged by the teeth of the larger sprocket wheel 46B as the tension band 43 is slid and advanced within the channel 41C as the tension lever 45D is cranked in the counter-clockwise direction, so as to tighten the device about the tower to secure its shroud panels. In FIG. 26B-1, the mechanism is shown in its locking configuration, locking the tension strap 43 into place relative to the frame 41A each time it is advanced forward into a tensioned state, by the larger sprocket wheel being rotated by the lever 46D being rotated counter-clockwise. In FIGS. 26C-1 and 26C-2, the tension band 43 is being un-tensioned by the user releasing the release level 46D, and then rotating the tension lever 46D in the clock-wise direction.

By virtue of this embodiment of the communication tower panel security device of the present invention, it is possible to generate and maintain tension using a ratchet mechanism embodied within a simple connector/tensioning assembly 41 connecting the free ends of a plastic tubing assembly 42, and achieve the shroud panel security objectives of the present invention.

Third Illustrative Embodiment of the Cellar Communication Tower Panel Security Device of the Present Invention Referring now to FIGS. 27A through 29E, the communication tower panel security device 50 according to the third illustrative embodiment of the present invention will be described.

Figure 27A:
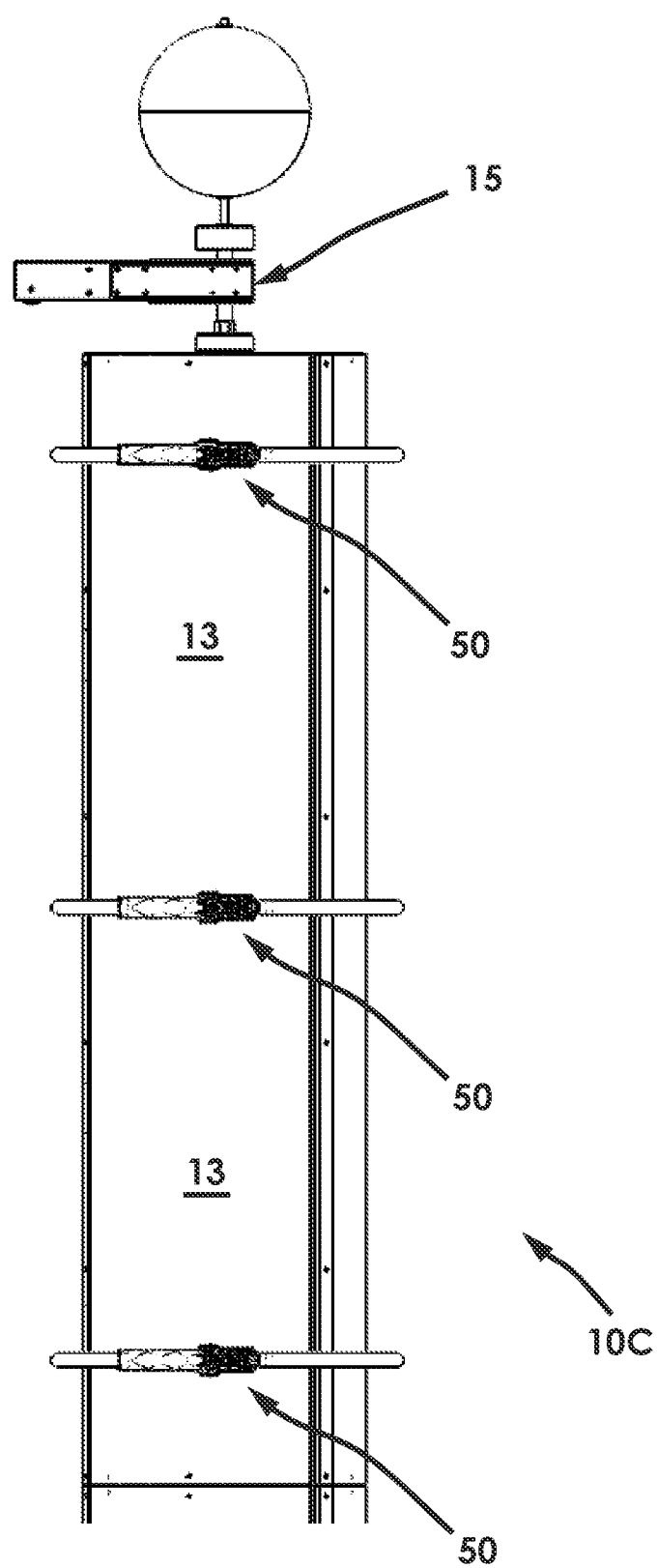
FIG. 27A is an elevated side view of a cellular communication tower (CCT) equipped with multiple communication tower panel security devices according to the third illustrative embodiment of the present invention, illustrated in FIGS. 27B through 29E.
Figure 27B:
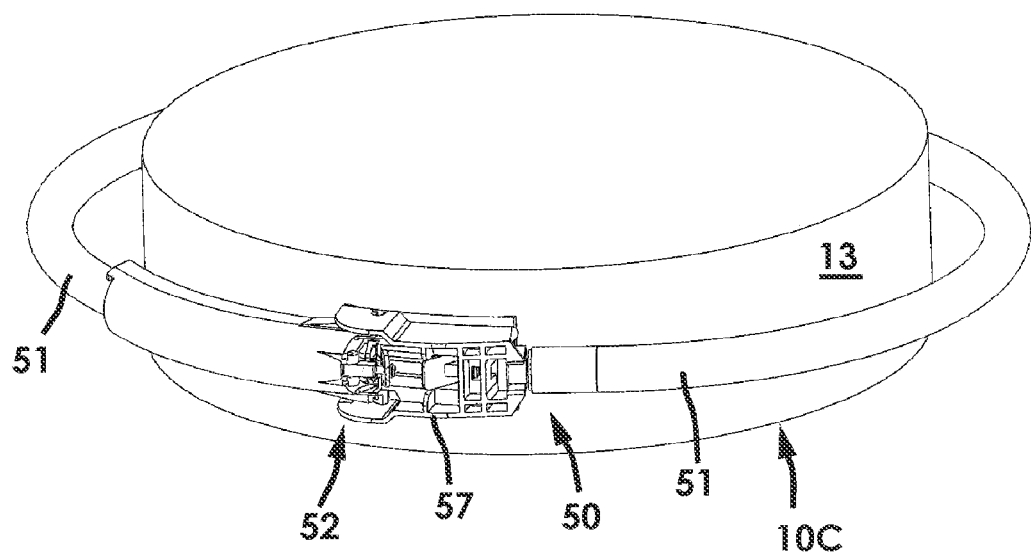
FIG. 27B is a perspective view of the communication tower panel security device of the third illustrative embodiment fastened to an antenna bay of a communication tower, and secured tightly thereabout.

As shown in FIGS. 27A and 27B, multiple communication tower panel security devices 50 according to the third illustrative embodiment are shown fastened about the shroud cover panels of antenna service bays of a cellular communication tower (CCT) as described hereinabove. As shown, the communication tower panel security device 50 comprises: a flexible plastic tubing assembly 51 for wrapping around the shroud panels 13 of the communication tower 10C; and a connecting/tensioning assembly 52 for interconnecting with the flexible plastic tubing assembly 51 and generating and maintaining sufficient tension forces along the flexible plastic tubing assembly ensure that the plastic tubing 51 secures the shroud panels 13 in place during expected weather conditions.

As shown in FIG. 24, the flexible plastic tubing assembly 51 employed in the communication tower panel security device 50 comprises: a first end connector 53 having a channel engaging portion 53A and a barbed portion 53B for receiving the first free end of a length of plastic tubing 51; a second end connector 54 comprising halves 54A, 54B providing a barbed portion 54C for receiving the second free end of a length of plastic tubing 51, and a central aperture 54D for receiving one end of a shaft 55 having square cross-sectional dimensions.

Figure 28:
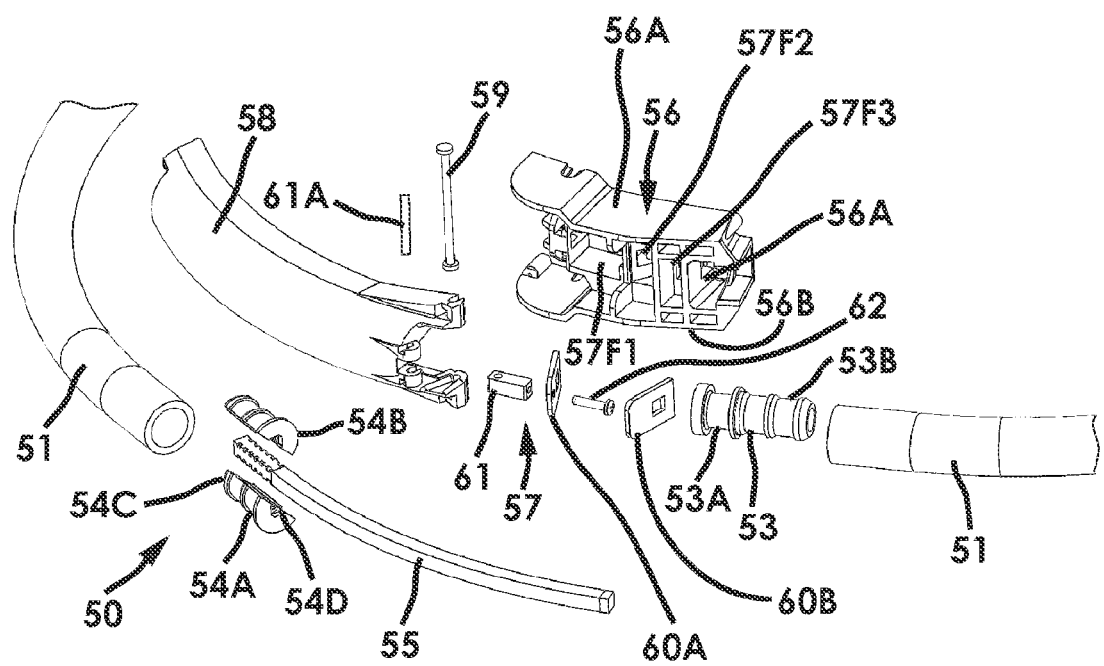
FIG. 28 is an exploded view of the communication tower panel security device of the third illustrative embodiment of the present invention.

As shown in FIG. 28, the connecting/tensioning assembly 52 comprises: a frame 56 having a open channel 56A for receiving the engaging end portion of the end connector 53A, a pair of side walls 56B and 56C with a open cavity region 56D within which a linear-type ratcheting mechanism 57 is mounted. As shown in FIGS. 29C, 29D and 29E, the frame 56 comprises: a series of apertures 57A, 57B, 57C and 57D formed in transverse walls 56E1, 56E2, 56E3 and 56E4 respectively, extending between the pair of side walls 56A and 56B, and forming cavities 57F1, 57F2 and 57F3; a handle 58 pivotally mounted at the ends of side walls 56A and 56B about a shaft 59 that is supported along the longitudinal axis of the frame 56 and passing through the series of apertures 57A and 57B; a pair of apertured plates 60A and 60B that are slid over the shaft 55 and are fitted within cavities 57A and 57F2 formed within the frame 56 between the traverse walls 56E1 and 56E2; and an engaging block 61 hingedly connected to the proximal end of the handle 58 using a first pin, and also coupled to apertured plate 60A using a screw 62 that passes through the plate 60A and into threads in the end of push block 61. As shown, when the handle 58 is rotated clockwise as shown in FIG. 29B, it translates the push block 61 which, in turn, translates plate 60A which, in turn, advances the shaft 55 in a tension-generating direction by an incremental amount during each handling cranking operation. As shown, the function of plate 60A is for advancing the shaft 55 along its axis during tensioning operations, whereas the other plate 60B is for locking the shaft 55 in position during tensioning operations.

Figure 29A:
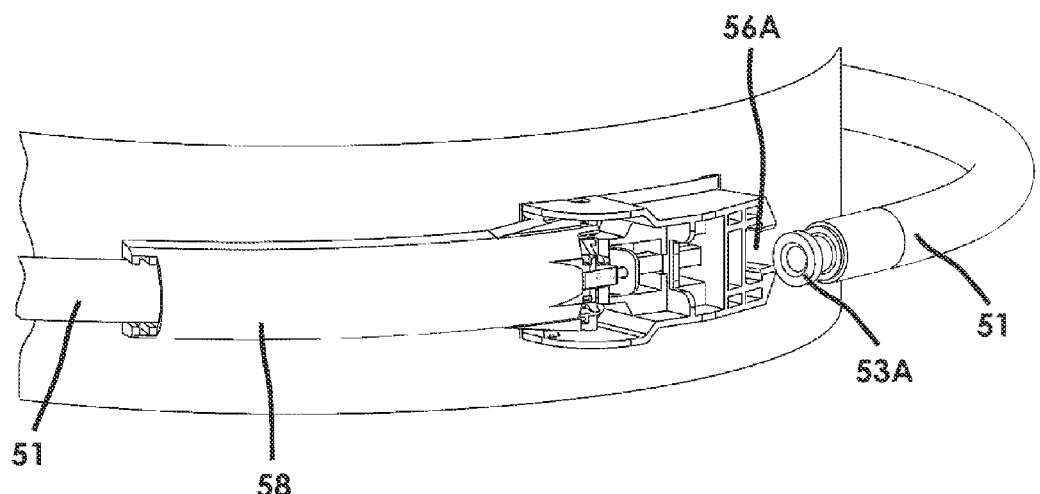
FIG. 29A is a perspective view of the communication tower panel security device of the third illustrative embodiment of the present invention, showing the end connector being inserted into the connector channel of the connecting/tensioning assembly of the device of the second embodiment of the present invention, so that the device surrounds and secures the shroud panels of the communication tower.
Figure 29B:
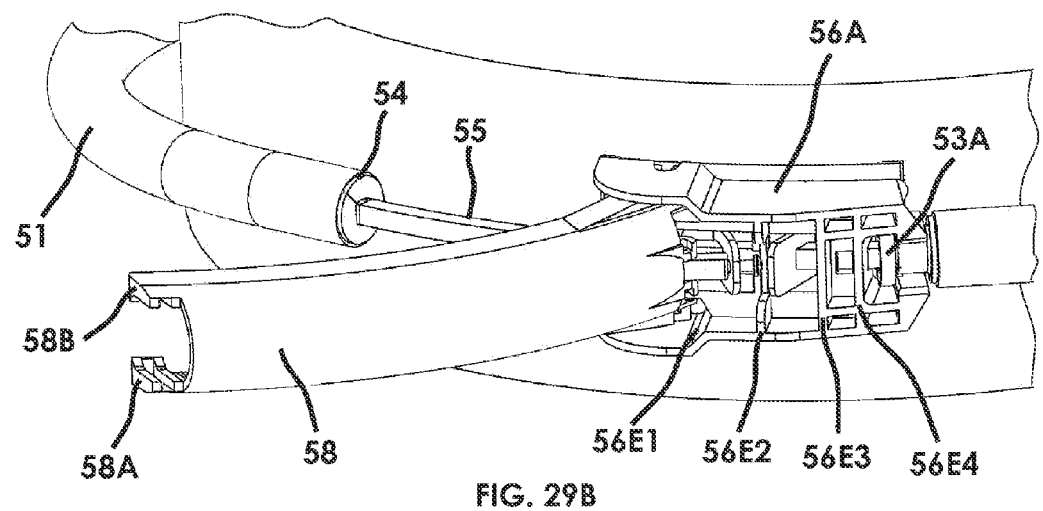
Figure 29C:
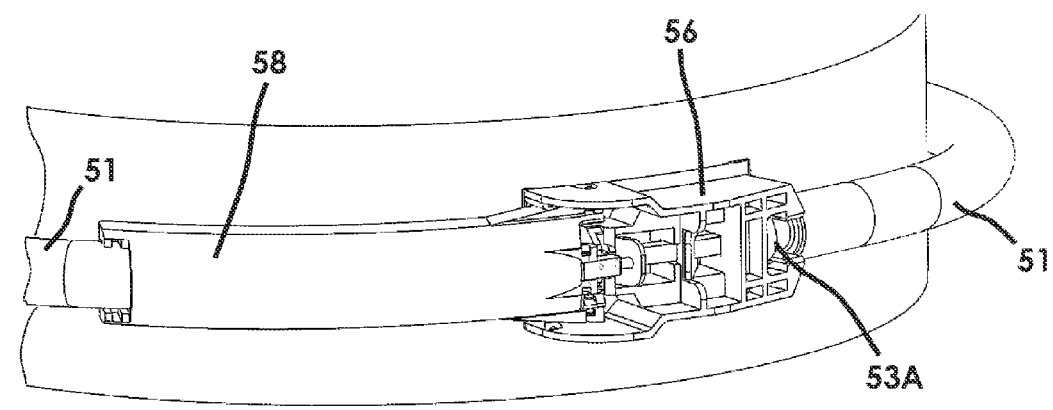
Figure 29D:
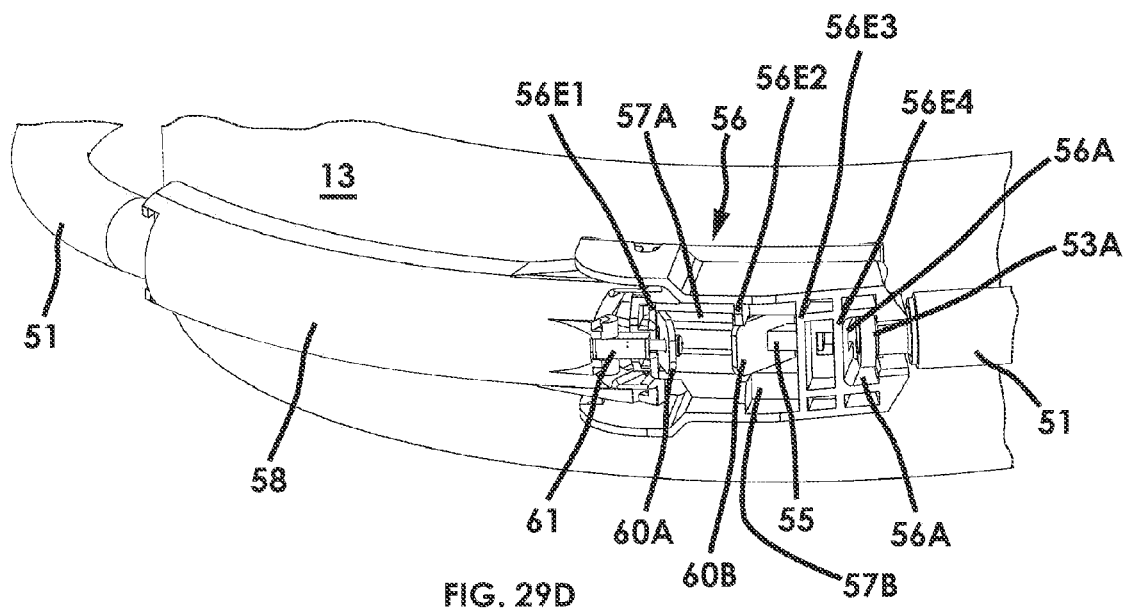
Figure 29E:
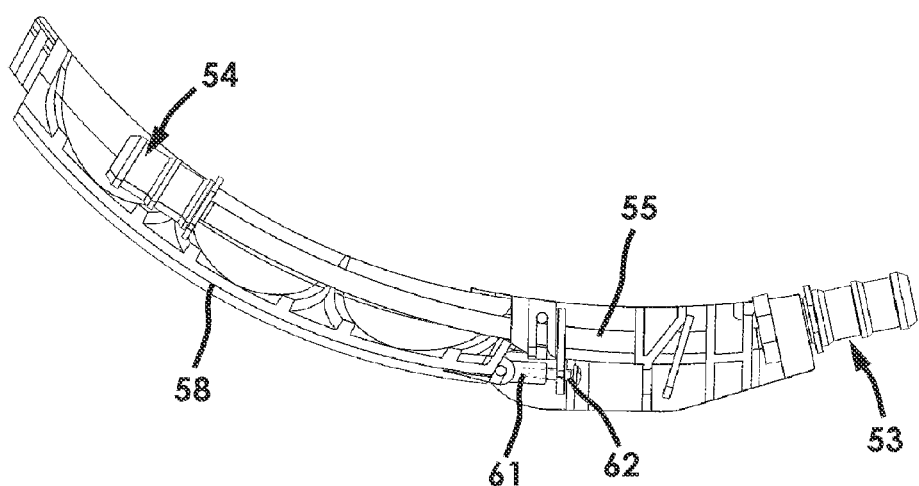

In FIG. 29A, the mechanism is shown in its locked configuration, while the free end of the connector 53A is being inserted within the channel 56A of the frame 56 of the connecting/tensioning assembly 52, after tube sizing and cutting operations similar to those described above in connection with the first and second illustrative embodiments. In FIG. 29B, the handle 58 is cranked (i.e. rotated) in the clock-wise direction causing the block 61 to push aperture plate 60A forward and advancing the position of the shaft 55 within frame 56, creating tension within the connected tubing 51, while plate 60B locks the shaft into position after the handle 58 has reached its full rotation. With each increment of forward moment of the shaft 55, achieved by the cranked rotation of handle 58 in the clockwise direction, the second apertured plate 60A locks into the grooves of the shaft 55 preventing the shaft 55 from slipping backwards and maintaining the tension being created during the tensioning operations. With each crank of the handle, greater tension is imparted to the plastic tubing 51 about the shroud panels 13, security them in position. When tensioning operations are completed, the handle 58 is pushed and locked in its closed downwardly configuration as shown in FIG. 29C, where the end of the handle 58 has projections 58A and 58B that grip about and locked around the plastic tubing surrounding the barded portion of end connector 54, as shown. At any time, the communication tower panel security device 50 can be un-tensioned and then removed from its communication tower. This is achieved by simply lifting up the handle 58 from its closed configuration, as shown in FIG. 29D, and then pushing/rotating the release plate 60B to the right or clockwise direction using ones finger. This causes plate 60B to disengage from the dents on the surface of the shaft 55, and releasing the tension along the shaft 55 and plastic tubing loop 51 to be quickly released and the free end of the connector 53A to be released from its engaging channel 56A and the device removed from the tower 10C.

By virtue of this embodiment of the communication tower panel security device of the present invention, it is possible to generate and maintain tension using a linear ratcheting mechanism embodied within a simple connecting/tensioning assembly 52 connecting the free ends of a plastic tubing assembly 51, and achieve the shroud panel security objectives of the present invention.

Fourth Illustrative Embodiment of the Communication Tower Panel Security Device of the Present Invention Referring now to FIGS. 30 through 34, the communication tower panel security device according to the fourth illustrative embodiment of the present invention will be described.

Figure 30:
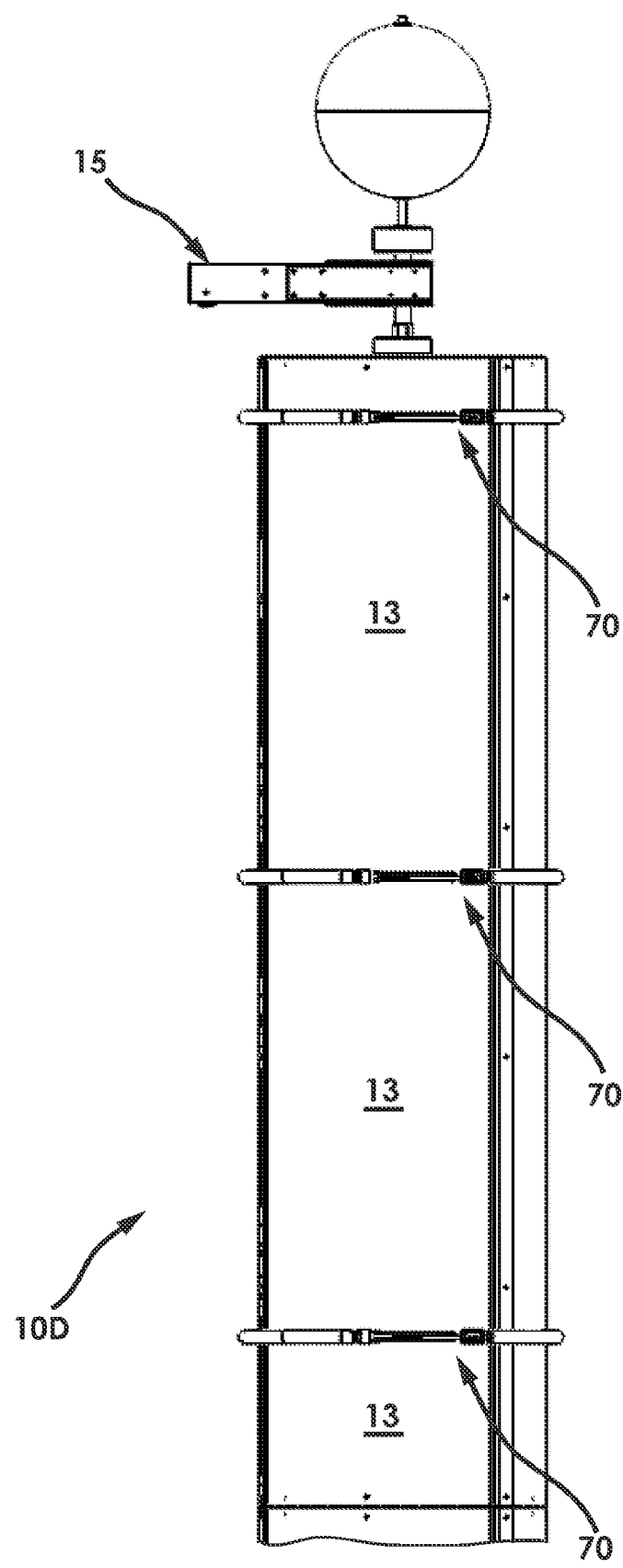
Figure 31:
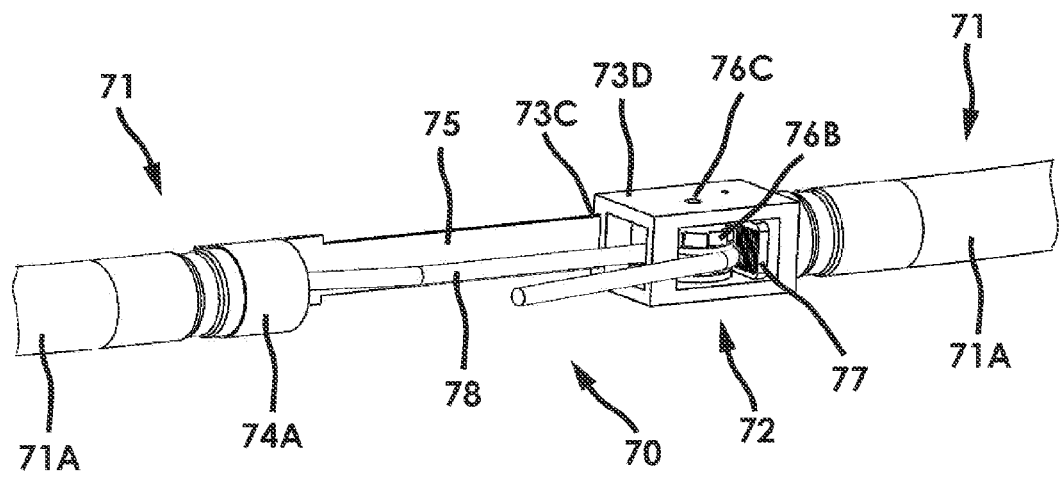

As shown in FIGS. 30 and 31, multiple communication tower panel security devices 70 according to the fourth illustrative embodiment are shown fastened about the shroud cover panels of antenna service bays of a cellular communication tower (CCT) 10D as described hereinabove. As shown, the communication tower panel security device 14 comprises: a flexible plastic tubing assembly 71 for wrapping around the shroud panels 13 of the communication tower 10D; and a connecting/tensioning assembly 72 for interconnecting with the flexible plastic tubing assembly 71 and generating and maintaining sufficient tension forces along the flexible plastic tubing assembly 71 to ensure that the plastic tubing 71 secures the shroud panels 13 in place during expected weather conditions.

Figure 32:
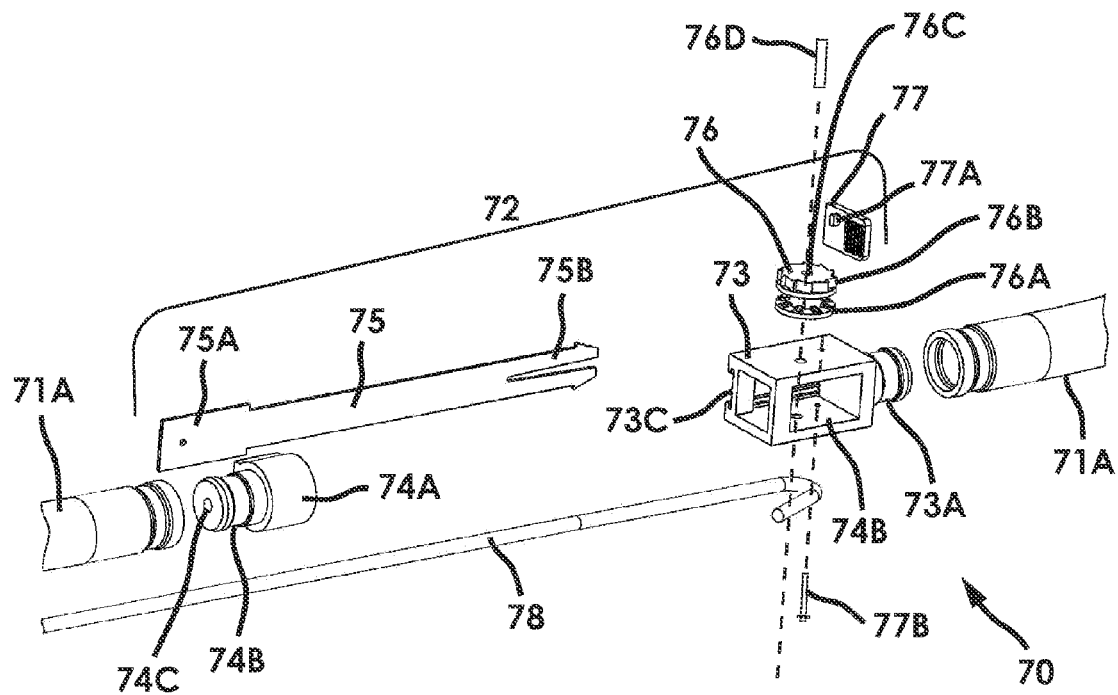

As shown in FIG. 32, the flexible plastic tubing assembly 71 employed in the communication tower panel security device 70 comprises: a first free end of a length of plastic tubing 71A for connecting to the barbed connector portion 73A of the connecting/tensioning assembly 72; an end connector 74 having a base portion 73A with an axial hole 73C for passage and connecting the free end of a length of cord 78, a barbed portion 74C for receiving the second free end of a length of plastic tubing 71A, and tension strap 75 connected to the base portion 74A at one end with fasteners (e.g. screws or other means) and having a forked end 75B with speared projections. The length of the plastic tubing will be sized and cut in a manner described above during installation.

As shown in FIG. 32, the connecting/tensioning assembly 72 further comprises: a frame 73 with a central cavity 73B within which a pulley-based ratchet-like mechanism 76 is mounted; barbed connector 73A for connecting to the first free end of the plastic tubing 71A; and a external channel 73C for slidably receiving the distal end of tension strap 75B and retaining the tension strap 75 in the channel 76C during assembly and operation.

More specifically, the pulley-based ratchet mechanism 76 further comprises: a pulley 76A mounted about a post 76D within the frame, and having (i) integrated sprocket wheel 76B with teeth 76E that are engaged by a spring-based release lever 77 that is pivotally mounted to the frame within the cavity 74B, and (ii) a circumferential grooves 74F, over and around which the cord 78 runs in a friction-fit manner without slippage.

As shown in FIG. 33A, after affixing the frame 76 to the surface of the tower using Velcro fasteners 79, as in the first illustrative embodiment, the plastic tubing is wrapped about the tower and then the pronged end of the tension strap 75 is slid into and along the channel 73C of the frame 73, and the cord is passed over and through the pulley wheel 76B, as shown in FIG. 33B.

As shown in FIG. 33C, the communication tower panel security device 70 is tightened or tensioned by pulling the cord, and increasing the tension in the plastic tubing 71 and the cord 78, while the sprocket mechanism retains the advanced position of the pulley and tension strap 75. Once the desired tension has been generated, the excess length of cord can be wrapped up about winding fixtures provided on the base portion 74A of the end connector 74 and the top of the frame 73. To release the tension in the system, the user presses the release lever 77 as shown in FIG. 34, quickly releasing the pulley to rotate and the cord 78 to loose its tension. Thereafter, the device can be removed from the tower in a manner described above.

By virtue of this embodiment of the communication tower panel security device of the present invention, it is possible to generate and maintain tension using a ratchet mechanism 76 embodied within a simple connector/tensioning assembly 72 connecting the free ends of a plastic tubing assembly 71, and achieve the shroud panel security objectives of the present invention.

Fifth Illustrative Embodiment of the Communication Tower Panel Security Device of the Present Invention Referring now to FIGS. 35 through 38G, the communication tower panel security device 80 according to the fifth illustrative embodiment of the present invention will be described.

As shown in FIGS. 35 and 36, multiple communication tower panel security devices 80 according to the fifth illustrative embodiment are shown fastened about the shroud cover panels of antenna service bays of a cellular communication tower (CCT) 10E as described hereinabove. As shown, the communication tower panel security device 80 comprises: a flexible plastic tubing assembly 81 for wrapping around the shroud panels 13 of the communication tower 10E; and a connecting/tensioning assembly 82 for interconnecting with the flexible plastic tubing assembly 81 and generating and maintaining sufficient tension forces along flexible plastic tubing assembly 8' to ensure that the plastic tubing 81A secures the shroud panels 13 in place (on the supporting mast structure 18) during expected weather conditions.

As shown in FIG. 35, the flexible plastic tubing assembly 81 employed in the communication tower panel security device 80 comprises: a first free end of a length of plastic tubing 81A for connecting to the barbed connector portion 82A of the connecting/tensioning assembly 82; an end connector 83A having a base portion 83 for attaching a the proximal end of a tension strap 84 and a barbed portion 83B for receiving the second free end of a length of plastic tubing 81A, and a tension strap 84 connected to the base portion 83A with dents 84A formed along its length in a spatially periodic manner. The length of the plastic tubing 81A will be sized and cut in a manner described above during installation.

As shown in FIG. 37, the connecting/tensioning assembly 82 further comprises: frame 82 having an external channel 82B for slidably receiving the distal portion of tension strap 84 and retaining the tension strap 84 in the channel 82B during assembly and operations; barbed connector 82A for connecting to the first free end of the plastic tubing 81A; an open cavity 82C in communication with the external channel 82B; and a double-lever mechanism 85 mounted in the open cavity 82C and comprising a first spring-loaded lever 85A, rotatably-mounted about pin axis 85A1 within the cavity 82C, for advancing the tension strap along the channel in an incremental manner each time the user manually rotates the lever 85A in the counter-clockwise direction, as shown in FIG. 38C through 38E, and (ii) a second spring-loaded lever 86A, also mounted in the cavity 82C, about pin axis 86A within the recess 85B formed in the first lever 85A, for preventing or restricting the tension strap from sliding backwards along the channel 82B, and maintaining the position of the tension strap 84 in the channel 82B, each time the tension strap 84 is advanced forwardly in the channel to increase the tension along the tension strap and thus around the entire plastic tubing structure 81A wrapped about the communication tower.

As shown in FIG. 38A, after affixing the frame 82 to the surface of the tower using Velcro fasteners, as in the first illustrative embodiment, the plastic tubing is wrapped about the tower and then the distal end of the tension strap 84 is slid into and along the channel 82B of the frame, as shown in FIG. 38B.

As shown in FIG. 38C, the communication tower panel security device 80 is tightened or tensioned by rotating the first lever 85A in the counter-clockwise direction as indicated by the directional arrow in FIG. 38C, thereby increasing the tension in the tension strap 84 and also the plastic tubing wrapped 81A about the communication tower 10E, while the second spring-loaded lever 86A retains the advanced position of the tension strap 84 by its distal portion thereof engaging in a detent 84A along the tension strap that corresponds with the position of the strap within the channel 82B. To release the tension in the system, the user rotates the release lever 86A as shown in FIGS. 38F and 38G, quickly releasing the tension strap 84 and allowing it to slide out of the channel 82B. Thereafter, the device can be removed from the tower 10E in a manner described above.

Sixth Illustrative Embodiment of the Communication Tower Panel Security Device of the Present Invention Referring now to FIGS. 39 through 44B, the communication tower panel security device 90 according to the sixth illustrative embodiment of the present invention will be described.

As shown in FIGS. 39 and 40A, multiple communication tower panel security devices 90 according to the sixth illustrative embodiment are shown fastened about the shroud cover panels of antenna service bays of a cellular communication tower (CCT) 10F as described hereinabove. As shown, the communication tower panel security device 90 comprises: a flexible plastic banding assembly 91 for wrapping around the shroud panels 13 of the communication tower 10F; and a connecting/tensioning assembly 92 for interconnecting with the flexible plastic banding assembly 91 and generating and maintaining sufficient tension along the flexible plastic banding assembly 91 forces to ensure that the plastic banding structure 91A secures the shroud panels 13 in place to the supporting mast structure 18 during expected weather conditions.

As shown in FIG. 40B, the flexible plastic banding assembly 91 employed in the communication tower panel security device 91 comprises: a length of extruded (or molded) plastic strip material 91A, that is sized and cut to length to fit around a communication tower circumference during installation, and having (i) a planar portion 91A1; and (ii) a pair of angled flange portions 91A2 and 91A3 integrally connected to the planar portion 91A1 and extending outwardly at an acute angle (e.g. 45 degrees) from the plane of the planar portion 91A1 as shown in FIG. 40B.

As shown in FIG. 41, the connecting/tensioning assembly 92 comprises: a frame 92A with a central cavity 92B; a first (dead-end) connector channel 92C having cross sectional dimensions that are the same as those of the flexible strip 91A for receiving the first free end of the plastic strip 91A and being secured therein by means of a screw, bonding-glue or other permanent or releasable fastening means or appropriate holding strength; and a second pass-through channel 92D, also having cross sectional dimensions that are the same as those of the flexible strip 91A and in communication with the open cavity 92B, for slidably receiving the end portion of plastic strip 91A and allowing it to slide therethrough during tensioning operations; a spring-loaded cam mechanism 92E, biased using a torsional or extension spring 92F, and rotatably mounted about an shaft 92E1 supported within the cavity 92B, and having (i) a first configuration in which the surfaces of the rotatably-mounted cam 92E permit the plastic strip 91A to slide freely within pass-though channel 92D without restraint, and (ii) a second configuration in which the surfaces of the rotatably-mounted cam 92E grip the plastic strip 91A and do not permit the plastic strip 91A to slide through channel 92D during tensioning operations where both free ends of the plastic strip are brought together in an overlapping arrangement, as shown in FIG. 42B, to generate tension on the plastic strip around the communication tower circumference.

More specifically, the cam mechanism 92E comprises: cam 92E mounted about a post or shaft 92E1 within the cavity 92B of the frame, and having (i) a first surface portion 92G1 adapted to allow the cord to slide freely thereover without snag or engagement when the plastic banding material attempts to move in the forward tensioning direction; and (ii) a second surface portion 92G2 adapted engage with and snag the plastic banding material when it attempts to move in the reverse un-tensioning direction; and (iii) a third surface portion 92G3 that allows the plastic banding material to slid freely thereover during un-tensioning operations performed when the user lifts up upon cam 92E, accessible through the window 92J in the frame 92A, allowing the cam 92E rotate away from its first tightening configuration to a second release configuration.

As shown in FIG. 43C, the module 92 of the communication tower panel security device 10G is fastened to the tower surface using Velcro 96 and then the plastic banding 91A is wrapped about the tower and sized and then cut to length so there is about 6-8 inches overlap, beyond the edge of the module housing 92. Then the free end of the plastic strip 91A is inserted into and pushed through pass-through channel 92D, as shown in FIGS. 43A and 43B, to tighten or tension the plastic strip 91D together, thereby increasing the tension in the plastic strip about the tower.

As shown in FIGS. 44A and 44B, the banding assembly is fully tightened by the connecting/tensioning assembly 92. To release the tension in the system, the user presses the cam 92E through window 92J thereby quickly releasing the tension in the plastic banding assembly. Thereafter, the device 90 can be removed from the tower 10F in a manner described above.

Seventh Illustrative Embodiment of the Communication Tower Panel Security Device of the Present Invention Referring now to FIGS. 45 through 50B, the communication tower panel security device 100 according to the seventh illustrative embodiment of the present invention will be described.

As shown in FIGS. 46 and 46A, multiple communication tower panel security devices 100 according to the seventh illustrative embodiment are shown fastened about the shroud cover panels of antenna service bays of a cellular communication tower (CCT) 10G as described hereinabove. As shown, the communication tower panel security device 100 comprises: a flexible plastic banding assembly 101 for wrapping around the shroud panels 13 of the communication tower 10G; and a connecting/tensioning assembly 102 for interconnecting with the flexible plastic banding assembly 101 and generating and maintaining sufficient tension forces along the flexible plastic banding assembly 101 to ensure that the plastic banding structure 101 secures the shroud panels 13 in place to the supporting mast structure 18 during expected weather conditions.

As shown in FIG. 46B, the flexible plastic banding assembly 101 employed in the communication tower panel security device 100 comprises: a length of extruded (or molded) plastic strip material, that is sized and cut to length to fit around a communication tower circumference during installation, and having (i) a planar portion 101A; and (ii) a pair of angled flange portions 101B and 101C integrally connected to the planar portion 101A and extending outwardly at an acute angle (e.g. 45 degrees) from the plane of the planar portion 101A as shown in FIG. 46B.

As shown in FIG. 47, the connecting/tensioning assembly 102 comprises: a frame 102A with a central cavity 102B; a first connector channel 101C having fixed depth and cross sectional dimensions that are the same as those of the flexible strip 101A for securely receiving the first free end of the plastic strip 101A; and a second pass-through channel 101D, also having cross sectional dimensions that are the same as those of the flexible strip 101A and in communication with the open cavity 101B, for slidably receiving the distal portion of the plastic strip 101A and allowing it to slide therethrough during tensioning operations and being retained therein during operation of the device; a spring-loaded ratchet mechanism 102E rotatably mounted within the cavity 102B, biased with a torsional or extension spring 102J and having (i) a first configuration shown in FIG. 49B in which the plastic strip 101A is advanced into the pass-through channel 1012D and allowed to slide freely without restraint, (ii) a second configuration shown in FIG. 50B in which the plastic strip 101A is gripped and not permitted to slide in the reverse direction during tensioning operations where both free ends of the plastic strip are brought together to generate tension on the plastic strip around the communication tower circumference, and (iii) a third configuration in which the ratchet lever 1012H is pulled back or rotated in the counter-clockwise direction to release the tooth 102G from the dents 101D in the plastic strip 101 while the strip is withdrawn from the pass-through channel 102D during tension-release operations.

More specifically, the ratchet mechanism 102E comprises: a ratchet arm 102E1 with a tooth 102I supported about a post 102E2 within the cavity of the frame; and spring 102J mounted in the cavity 102B and biased to normally retain the ratchet arm 102E1 in a position supporting the first and second configurations.

As shown in FIGS. 49A and 49B, the module 102 of the communication tower panel security device 100 is fastened to the tower surface 13 using Velcro 106 and then the plastic banding 101 is wrapped about the tower 10G and sized and then cut to length so there is about 8-10 inches overlap after the module 102. Then the free end of the plastic strip 101A is inserted into and pushed through pass-through channel 102B in the module 102, as shown, to tighten or tension the plastic strip 101A about the tower 10G.

As shown in FIGS. 50A and 50B, the banding assembly 101 is fully tightened by the connecting/tensioning assembly 102. To release the tension in the system, the user presses the cam lever 102H through window 102K, thereby quickly releasing the tension in the plastic banding assembly 101. Thereafter, the device 100 can be removed from the tower 10G in a manner described above.

Eighth Illustrative Embodiment of the Communication Tower Panel Security Device of the Present Invention Referring now to FIGS. 51 through 50B, the communication tower panel security device 110 according to the eighth illustrative embodiment of the present invention will be described.

As shown in FIGS. 51, 52A, 52B and 52C, multiple communication tower panel security devices 110 according to the eighth illustrative embodiment are shown fastened about the shroud cover 13 panels of antenna service bays of a cellular communication tower (CCT) 10I as described hereinabove. As shown, the communication tower panel security device 110 comprises: a flexible plastic banding assembly 111 for wrapping around the shroud panels 13 of the communication tower 101; and a connecting/tensioning assembly 112 for interconnecting with the flexible plastic banding assembly 111 and generating and maintaining sufficient tension forces along the flexible plastic banding assembly 111 to ensure that the plastic banding structure 111 secures the shroud panels 13 in place to the supporting mast structure 18 during expected weather conditions.

As shown in FIG. 52A, the flexible plastic banding assembly 110 employed in the communication tower panel security device 110 comprises: a length of extruded (or molded) plastic tubing material 111A, that is sized and cut to length to fit around a communication tower circumference during installation, and having first and second free ends; and first and second end connectors 111B and 111C respectively, having relatively stiff characteristics and secured to the first and second free ends of the length of plastic tubing 111A.

As shown in FIG. 53 the connecting/tensioning assembly 112 comprises: a frame 112A with a first cylindrical connection cavity 112C for securely receiving the first end connector 111C of the plastic tubing assembly 101; a second cylindrical connection cavity 112B having a first portion 112B1 with a diameter greater than the first cylindrical connection cavity 112C in which a first cylindrical sleeve 112D, providing a pass-through channel, is mounted with a cylindrical spring 112E between its flange 112D1 and the end surface of the module 112A, and a second portion 112B2 of large inner diameter for receiving a compression-creating ring 112F having a narrow cylindrical ring portion 112F1 from which extend a set of circumferentially disposed and radially-extending compression fingers 112F1 that are press fit into the bore 112D and held in place using a retaining washer 112G, inserted from the larger diameter side 112B2; wherein the second end connector 111C of the tubing assembly 111 is allowed to slide through the inner bore of cylindrical sleeve 112D during installation shown in FIGS. 55A and 55B, and retained therein, during tensioning operations, by the compression-creating ring 112F, as shown in FIGS. 56A and 56B during tensioning operations.

As shown in FIGS. 55A and 55B, the module 112 of the communication tower panel security device 112 is fastened to the tower surface using Velcro and then the plastic tubing 111A is wrapped about the tower and sized and then cut to length so there is about 8-10 inches overlap. Then the second end connector 111C is inserted into and pushed through pass-through channel 112D as shown in FIGS. 56A and 56B, to tighten or tension the plastic tubing 111A together thereby increasing the tension in the plastic tubing about the tower shroud panels 13.

As shown in FIGS. 56AA and 56B, the banding assembly is fully tightened by the connecting/tensioning assembly 112. To release the tension in the system, the user presses the flange 112D1 against the biasing spring 112E to thereby quickly releasing the tension in the plastic banding assembly 111. Thereafter, the device 110 can be removed from the tower in a manner described above.

Ninth Illustrative Embodiment of the Communication Tower Panel Security Device of the Present Invention Referring now to FIGS. 57 through 62B, the communication tower panel security device 120 according to the ninth illustrative embodiment of the present invention will be described. The primary difference between the eighth and ninth embodiments is that the first and second connector channels or ports in the ninth embodiment are arranged in the same plane relative to the earth's horizontal plane, making for a more aesthetically pleasing configuration, without compromising connecting and tensioning performance characteristics.

As shown in FIGS. 57, 58A, 58B and 58C, multiple communication tower panel security devices 120 according to the ninth illustrative embodiment are shown fastened about the shroud cover panels 13 of antenna service bays of a cellular communication tower (CCT) 10J as described hereinabove. As shown, the communication tower panel security device 120 comprises: a flexible plastic tubing assembly 121 for wrapping around the shroud panels 13 of the communication tower 10J; and a connecting/tensioning assembly 122 for interconnecting with the flexible plastic tubing assembly 121 and generating and maintaining sufficient compression and tension forces to ensure that the plastic tubing/banding structure 121A secures the shroud panels 13 in place to the supporting mast structure 13 during expected weather conditions.

As shown in FIG. 58A, the flexible plastic banding assembly 121 employed in the communication tower panel security device 120 comprises: a length of extruded (or molded) plastic tubing (or other shaped) material 121A, that is sized and cut to length to fit around a communication tower circumference during installation, and having first and second free ends; and first and second end connectors 121B and 121C respectively, having relatively stiff characteristics and secured to the first and second free ends of the length of plastic tubing 121A.

As shown in FIGS. 59, 60A and 60B, the connecting/tensioning assembly 122 comprises: a frame 122A with a first cylindrical connection cavity 122C for securely receiving the first end connector 121B of the plastic tubing assembly 121; a second cylindrical connection cavity 122B having a first portion 122B1 with a diameter greater than the first cylindrical connection cavity 122C in which a first cylindrical sleeve 122D is mounted with a cylindrical 122E between its flange 122D1 and the end surface of the module 122A, and a second portion 122D2 of larger inner diameter for receiving a narrow cylindrical ring portion 122F1 from which extend a set of circumferentially disposed and radially-extending compression fingers 122F1 that are press fit into the bore 122D and held in place using a retaining washer 122G inserted from the side of smaller diameter bore 122D2; where the second end connector 121C is slid into the pass-through channel 122D as shown in FIGS. 61A and 61B, and retained therein during tensioning operations by the compression-creating ring 122F, as shown in FIGS. 62A and 62B during tensioning operations.

As shown in FIGS. 61A and 61B, the connecting/tensioning assembly 122 of the communication tower panel security device 120 is fastened to the tower surface using Velcro 123 and then the plastic tubing 121A is wrapped about the tower and sized and then cut to length so there is about 8-10 inches overlap. Then the second end connector 121C is inserted into and pushed through pass-through channel 122D as shown in FIGS. 62A and 62B, to tighten or tension the plastic tubing 121A together thereby increasing the tension in the plastic strip about the tower 10J.

As shown in FIGS. 62A and 62B, the banding assembly is fully tightened by the connecting/tensioning assembly 122. To release the tension in the system, the user presses the flange 122D1 against biasing spring 122E to thereby quickly releasing the tension in the plastic banding assembly 121. Thereafter, the device can be removed from the tower in a manner described above.

Tenth Illustrative Embodiment of the Communication Tower Panel Security Device of the Present Invention Referring now to FIGS. 63 through 68B, the communication tower panel security device 130 according to the ninth illustrative embodiment of the present invention will be described. The primary difference between the eighth and tenth embodiments is that the second end connector 131A in the tenth embodiment has a series of concentric grooves 131G spaced spatial-periodically along its distal end for improved engagement with the concentrically disposed compression fingers 132F within the module 132, in effort to improve the connecting and tensioning performance characteristics of the device As shown in FIGS. 63, 64A, 64B and 64C, multiple communication tower panel security devices 130 according to the tenth illustrative embodiment are shown fastened about the shroud cover panels of antenna service bays of a cellular communication tower (CCT) as described hereinabove. As shown, the communication tower panel security device 130 comprises: a flexible plastic tubing assembly 131 for wrapping around the shroud panels 13 of the communication tower 10K; and a connecting/tensioning assembly 132 for interconnecting with the flexible plastic tubing assembly 131 and generating and maintaining sufficient tension along the flexible plastic tubing assembly 131 to ensure that the plastic banding structure 131A secures the shroud panels 13 in place to the supporting mast structure 18 during expected weather conditions.

As shown in FIG. 64A, the flexible plastic banding assembly 131 employed in the communication tower panel security device 130 comprises: a length of extruded (or molded) plastic tubing material 131A, that is sized and cut to length to fit around a communication tower circumference during installation, and having first and second free ends; and first and second end connectors 131B and 131C respectively, having relatively stiff characteristics and secured to the first and second free ends of the length of plastic tubing 131A; wherein the second end connector 131C has a series of concentric grooves 131G spaced spatial-periodically along its distal end for improved engagement with the concentrically disposed compression fingers 132F2 within the module.

As shown in FIGS. 65, 66A and 66B, the connecting/tensioning assembly 132 comprises: a frame 132A with a first cylindrical connection cavity 132C for securely receiving the first end connector 131B1 of the plastic tubing assembly 131A; a second cylindrical connection cavity 132B having a first portion 132B1 with a diameter greater than the first cylindrical connection cavity 132C in which a first cylindrical sleeve 131B, providing a pass-through channel, is mounted with a cylindrical biasing spring 132E between its flange 132D1 and the end surface of the module 132A, and a second portion 132D2 of large inner diameter for receiving a circumferentially disposed and radially-extending compression fingers 132F2 that are press fit into the bore 132B2 and held in place using a retaining washer 132G; wherein the pass-through channel 132D extends though the spring-biased cylindrical sleeve 132D, also has inner cross sectional dimensions that are slightly greater than the outer diameter of the second end connector 131C for slidably receiving the second end connector 131C and allowing it to slide therethrough during installation shown in FIGS. 61A and 61B, and retaining the connector from sliding out or moving out of the channel 132D during tensioning operations by the compression-creating ring 132F, as shown in FIGS. 68A and 68B during tensioning operations.

As shown in FIGS. 67A and 67B, the connecting/tensioning assembly 132 of the communication tower panel security device 130 is fastened to the tower surface using Velcro 136 and then the plastic tubing 131A is wrapped about the tower 10K and sized and then cut to length so there is about 8-10 inches overlap. Then the second end connector 131C is inserted into and pushed through pass-through channel 132D as shown in FIGS. 67A and 67B, to tighten or tension the plastic tubing 131A together, thereby increasing the tension in the plastic strip about the tower 10K.

As shown in FIGS. 68A and 68B, the banding assembly is fully tightened by the connecting/tensioning assembly 132 to release the tension in the system, the user presses the flange 132D2, against biasing spring 132E, to thereby quickly releasing the tension in the plastic banding assembly 131. Thereafter, the device can be removed from the tower in a manner described above.

Eleventh Illustrative Embodiment of the Communication Tower Panel Security Device of the Present Invention Referring now to FIGS. 69 through 74B, the communication tower panel security device 140 according to the eleventh illustrative embodiment of the present invention will be described.

As shown in FIGS. 69 and 40A, multiple communication tower panel security devices 140 according to the twelfth illustrative embodiment are shown fastened about the shroud cover panels 13 of antenna service bays of a cellular communication tower (CCT) 10L as described hereinabove. As shown, the communication tower panel security device 140 comprises: a flexible plastic banding assembly 141 for wrapping around the shroud panels 13 of the communication tower 10L; and a connecting/tensioning assembly 142 for interconnecting with the flexible plastic banding assembly 141 and generating and maintaining tension along the flexible plastic banding assembly 141 to ensure that the plastic banding structure 141 secures the shroud panels 13 in place to the supporting mast structure 18 during expected weather conditions.

As shown in FIG. 70A, the flexible plastic banding assembly 141 employed in the communication tower panel security device 140 comprises: a length of extruded (or molded) plastic strip material 141, that is sized and cut to length to fit around a communication tower circumference during installation, and having (i) a planar portion 141A; and (ii) a pair of angled flange portions 141B and 141C integrally connected to the planar portion 141A and extending outwardly at an acute angle (e.g. 45 degrees) from the plane of the planar portion 141A as shown in FIG. 40B.

As shown in FIG. 71, the connecting/tensioning assembly 142 comprises: a pair of polygonal-shaped connector module (e.g. blocks) 142A and 142B; and a releasable fastening mechanism, including a Velcro® brand strap fastener 145 for use in coupling together these connection blocks 142A and 142B under tension, to provide the desired degree of tension in the plastic banding assembly 141 wrapped about a communication tower 10L.

As shown in FIGS. 70B and 71, the first connector block 142A comprises: a frame portion 142A of polygonal dimensions; a first pass-through channel 142A1 having cross-sectional dimensions that are similar to the cross-sectional dimensions of the plastic strip material 141 so that the first free end of the plastic strip material 141A1 can pass through the pass-through channel 142A1 of the first connector module 142A and extend therethrough by a predetermined amount (e.g. 6-10 inches or so) and then be secured and locked into position by a first and second set of screws 143A, 143B or like fasteners; and a first aperture 142A2 through which one end of the Velcro® brand strap fastener 145 is passed and looped on its end to secure connect to the first connector module 142A.

As shown in FIGS. 70B and 71, the second connector block 142B comprises: a frame portion of polygonal dimensions; a second pass-through channel 142B1 having cross-sectional dimensions that are similar to the cross-sectional dimensions of the plastic strip material 141 so that the second free end of the plastic strip material 141A1' can pass through the pass-through channel 142B1 of the second connector module 142B and extend therethrough by a predetermined about (e.g. 6-10 inches or so) and then be secured and locked into position by a second set of screws 144A, 144B or like fasteners; and a second aperture 142B2 through which the other end of the Velcro® brand strap fastener 145 is passed and looped on its end to secure connect to the second connector module 142B.

As shown in FIGS. 72A and 72B, during installation, the plastic banding assembly 141 is wrapped around the communication tower, sized and cut to a proper length to provide free end overlap (e.g. 6-10 inches). Thereafter, the first and second connector modules 142A and 142B are installed and secured with first and second screws sets 143A, 143B and 144A, 144B, respectively. Then the Velcro® brand strap fastener 145 is configured through connector module apertures 142A2 and 142B2 to couple tightly both connector blocks 142A and 142B, as shown in FIGS. 73A and 73B. After the strap fastener 145 is tightened, and the free ends overlap between the end connector modules 142A and 142B, as shown in FIGS. 74A and 74B, the plastic banding assembly 141 will be under tension and maintain the shroud panels 13 securely to the mast structure of the communication tower. To release tension in the banding system, the strap fastener 145 is released allowed the plastic banding to return to a relaxed state, and thereafter the communication tower panel security device 140 can be removed for antenna bay servicing and the like.

Twelfth Illustrative Embodiment of the Communication Tower Panel Security Device of the Present Invention Referring now to FIGS. 75 through 79C, the communication tower panel security device 150 according to the twelfth illustrative embodiment of the present invention will be described.

As shown in FIGS. 75 and 76, multiple communication tower panel security devices 150 according to the twelfth illustrative embodiment are shown fastened about the shroud cover panels of antenna service bays of a cellular communication tower (CCT) 10M as described hereinabove. As shown, the communication tower panel security device 150 comprises: a flexible plastic banding assembly 151 for wrapping around the shroud panels 13 of the communication tower 10M; and a connecting/tensioning assembly 152 for interconnecting with the flexible plastic banding assembly 151 and generating and maintaining sufficient compression and tension forces to ensure that the plastic banding structure 151 secures the shroud panels 13 in place to the supporting mast structure 18 during expected weather conditions.

As shown in FIGS. 76 and 77, the flexible plastic banding assembly 151 employed in the communication tower panel security device 150 comprises: a length of extruded (or molded) plastic strip material 151, that is sized and cut to length to fit around a communication tower circumference during installation, and having (i) a planar portion 151A, (ii) a central track 151A1 defined by raised tracks 151A2 and 151A3 formed along the outer surface of the flexible banding structure, along which a thin but strong tension strap (with Velcro end strips) 152A is adapted to slide and be retained during installation of the device; and (iii) a pair of angled flange portions 151B and 151C integrally connected to the planar portion 151A and extending outwardly at an acute angle (e.g. 45 degrees) from the plane of the planar portion 151A as shown in FIG. 40B.

As shown in FIG. 77, the connecting/tensioning assembly 152 comprises: the thin but strong tension strap (with Velcro® fasteners applied to its free end strips) 152A that runs within the central track 151A1 defined by raised projections 151A2 and 151A3 formed along the outer surface of the flexible banding structure 152A; and a double-apertured buckling device 152D for use in coupling the free ends 152B and 152C of the tension strap 152A, as shown in FIGS. 78A, 78B and 78C, to provide the desired degree of tension when the plastic banding assembly 152 is wrapped about a communication tower 10M.

As shown in FIG. 79A, during installation, the plastic banding assembly 152 is wrapped around the circumference of communication tower 10M where panel security is required. Thereafter, the plastic banding assembly 151 is sized and cut to proper length to provide free end overlap (e.g. 6-10 inches).

As shown in FIG. 79A, free ends of the flexible plastic banding structure 151 are brought into proximity of each other so that the tension strap 152A, retained within the central track 151A1, and retained beneath the projections 151A2 and 151A3, as shown in FIGS. 78A and 78B. Then, as shown in FIG. 79B, the free ends of the tension strap, 152B and 152C are buckled together using a strap buckling device 152D, and after tightening operations by pulling the free ends and resetting the buckle, the free ends of the plastic banding structure 151A' overlap, as shown in FIG. 79C, and the required degree of tension generated around the shroud panels around the communication tower 10M.

To release tension in the banding system, the strap buckle 152D is unbuckled to release the tension in the strap and allow the plastic banding to return to its relaxed state, and thereafter the communication tower panel security device 150 can be removed for antenna bay servicing and the like.
Construction and Implementation of the Systems and Devices of the Present Invention Components used to make the plastic banding/tubing assemblies, and connecting/tensioning assemblies, for each of the above illustrative embodiments of the present invention described above can be fabricated from suitable plastic materials that offer the strength required for the purposes at hand while being substantially transparent to electromagnetic radiation in the frequency bands of operation of the communication towers, about which the communication tower panel security devices are installed.

Materials selection is important to functionality during installation and operation just as it is to longevity when exposed to the elements including freeze thaw cycles, strong mechanical loads and UV exposure from the solar radiation. The tubing used to encircle the CCT must remain flexible at cold temperatures and retain axial strength at high temperatures. The elastic properties of the tubing should be such to prevent permanent (plastic) deformation thus maintaining original shape and size in the unloaded condition. The tubing must also exhibit suitable abrasion resistance properties as CCTs often include a rope halyard for supporting a flag from the tower top. Daily side to side rubbing of the halyard can lead to premature wear in the tubing. Thermoset polyurethane is a natural choice for excellent abrasion resistance, strength, flexibility and long term dimensional stability. Other components made of plastic are likely to be milled or turned to final size or created using casting, injection molded or 3D printing techniques. Possible materials for these components include but are not limited to polycarbonate (i.e. Lexan), acetal (i.e. Delrin), nylon, polyethylene (such as UHMW or HDPE), ABS and polyurethane. Each of these materials exhibit varying degrees of strength, impact resistance, temperature performance and manufacturability. Preference is given to non-metals for RF transparency. However, if metals are to be used, they are likely to be made of corrosion resistant aluminum, stainless steel, coated steel, etc. Metals have the advantage of high strength-to-volume ratios, readily available in a variety of forms, and can be stamped, formed, machined, injected, cast, etc and even 3D-printed.

Features and Benefits of the Communication Tower Panel Security Devices of the Illustrative Embodiments of the Present Invention In addition to safely securing the shroud panels to a communication tower, the communication tower panel security device of the present invention provides a number of other benefits including: (i) smooth surfaces which will not snag, or rip a flag mounted on a flagpole structure on top of the cell tower, cause entanglement with flag lanyards; (ii) completely radio-transparent construction that does not alter or perturb the radiation field generated from the underlying radio antennas supported on the mast structure, supporting the shroud cover panels; and (iii) readily installed, removed and reinstalled as needed for access to the arrays and other interior-mounted components.

By virtue of the present invention, the communication tower panel security devices described and taught herein are capable of generating forces sufficient necessary to hold tower panels securely in place around a cell communication towers, with and without flag pole structures, while making installation and servicing of communication towers and such devices at high elevations, much simpler, faster, and safer.

The illustrative embodiments disclose improved communication tower panel security devices and methods of installing the same on communication towers of various diameters and designs. It is understood, however, that the panel banding device of the illustrative embodiment may be modified in a variety of ways which will become readily apparent to those skilled in the art of having the benefit of the novel teachings disclosed herein. All such modifications and variations of the illustrative embodiments thereof shall be deemed to be within the scope of the Claims appended hereto.

What is claimed is:

1. A communication tower panel security device for use in securing a plurality of radio-transparent cover panels covering an antenna service bay of a communication tower, said communication tower panel security device comprising:
   a length of flexible plastic tubing having a first end and a second end;
   a length of flexible cord passing through said length of plastic tubing and having a first end and a second end, wherein said length of flexible plastic tubing and said length of flexible cord form a flexible plastic tubing and cord assembly; and
   a connecting/tensioning assembly for interconnecting the first and second ends of said length of flexible plastic tubing wrapping around the circumference of said antenna service bay and securely retaining said radio-transparent cover panels in place under tension, during expected weather conditions;
   wherein said connecting/tensioning assembly further comprises:
   (A) an end connector module having a head portion and a first connector portion for connecting to the first end of said length of flexible cord, and also the to first end of said length of flexible plastic tubing,
   wherein said length of flexible cord and said length of plastic tubing are capable of surrounding the circumference of said antenna service bay of said communication tower;
   (B) a pair of flexible side panels, wherein each said flexible side panel has a first end and a second end;
   (C) a first end module having (i) an exterior connection channel for releasably receiving the head portion of said end connector module, (ii) a first pair of side panel supports for supporting the first ends of said pair of flexible side panels, (iii) a first cord input port in communication with a first cord output port, (iv) at least a first pulley, and (v) a first internal cord passageway extending between said first cord input port and said first cord output port and along which said at least first pulley is mounted;

(D) a second end module having (i) a central passageway for passage of said flexible plastic tubing, (ii) a second pair of side panel supports for supporting the second ends of said pair of flexible side panels, (iii) a first cord retaining mechanism for retaining said flexible cord, and (iv) a first excess cord windup fixture for winding up excess flexible cord; and (E) a sliding module having
  (i) a first upper surface,
  (ii) a second connector portion for connecting to the second end of said length of flexible plastic tubing,
  (iii) a first central bore formed through said second connector portion and extending through said sliding module and allowing for the passage of the free end of the flexible cord through said sliding module and exiting from a central output port aligned with said first central bore,
  (iv) a second cord input port in communication with a second cord output port,
  (v) at least a second pulley,
  (vi) a second cord retaining mechanism mounted on said first upper surface for retaining said flexible cord,
  (vii) a pair of side panel supports for slidably supporting said sliding module between said pair of flexible side panels,
  (viii) a second internal cord passageway extending between the second cord input and output ports in said sliding module, and along which said at least a second pulley is mounted, and
  (ix) a second excess cord windup fixture for winding up excess cord after a selected portion of the flexible cord is retained in said first cord retaining mechanism;

wherein the free end of said flexible cord is passed through said first central bore of said sliding module and into the first cord input port of said first end module and along said first internal cord passageway and about said at least a first pulley and then out the first cord output port of said first end module and into the second cord input port of said sliding module, and along said second internal cord passageway and about said at least a second pulley, and then out said second cord output port and releasably retained in said second cord retaining mechanism on said sliding module; and wherein any excess flexible cord extending beyond said second cord retaining mechanism can be wrapped about said first and second cord excess windup fixtures and then the free end of the flexible cord securely retained in said first cord retaining mechanism supported on said second end module.

2. The communication tower panel security device of claim 1, in combination with said communication tower.

3. The communication tower panel security device of claim 1, wherein said connecting/tensioning assembly allows the degree of tension along said communication tower panel security device to be manually adjusted by tensioning said length of flexible cord, without the use of tools.

4. The communication tower panel security device of claim 1, wherein said flexible plastic tubing and cord assembly prevents fraying, ripping or abrasion of a flag and lanyards mounted on the top portion of said communication tower using a truck assembly.

5. The communication tower security device of claim 1, wherein said communication tower is a cellular communication tower.

6. The communication tower security device of claim 5, wherein said sliding module comprises:
  a frame portion; and
  wherein said second connector portion includes a first barbed connector extending from said frame portion and having an outer surface with barbs for engaging with said second end of the length of plastic tubing;
  wherein said second pair of side panel supports support said pair of flexible side panels, and allow said sliding module to slide up and down the spaced apart parallel pair of flexible side panels during flexible cord tensioning and un-tightening operations.

7. The communication tower security device of claim 1, wherein said at least a first pulley comprises a first set of pulleys including a first pulley and a second pulley;
  wherein said at least a second pulley comprises a second set of pulleys including a third pulley and a fourth pulley;
  wherein said first end module further comprises a third cord input port and a third cord output port; and
  wherein said sliding module further comprises a fourth cord input port and a fourth cord output port;
  wherein the flexible cord runs out said first central bore of said sliding module and into said first cord input port of said first end module, around said first pulley, to gain the mechanical advantage of said first pulley, then the flexible cord runs out said first chord output port.

8. The communication tower security device of claim 7, wherein one free end of the flexible cord extends long said flexible plastic tubing, and travels the length of the flexible plastic tubing and enters into said first central bore in said sliding module; thereafter, the flexible cord passes through said sliding module and travels an internal path through said first central bore and out the central cord exit, and travels between said flexible side panels and into the first cord input port and around the first pulley and exits the first cord output port and travels between the flexible side panels and enters the second input port of said sliding module, then around the second pulley and exits the second cord output port, and travels between said flexible side panels to the third cord input port in said first end module and travels around the third pulley and exits the third cord output port and travels between said flexible side panels and enters the fourth cord input port of said sliding module and travels around the fourth pulley and then finally exits the fourth cord output port of said sliding module, and the excess length of flexible cord is pulled outwardly along its path by the installer until the desired cord tension is created within said flexible plastic tubing and cord assembly and about said communication tower, so that adequate forces are created around said flexible plastic tubing and cord assembly installed about the circumference of said communication tower.

9. The communication tower security device of claim 7, wherein after the installer has tightened the flexible cord using said connecting/tensioning assembly, the flexible cord is pulled up and retained into the pathway traveling through said second cord retaining mechanism on the first upper surface of said sliding module, and any excess flexible cord extending beyond said second cord retaining mechanism is wrapped about said first and second cord excess windup fixtures, and the free end of the flexible cord is finally securely retained in said first cord retaining mechanism supported on said second end module.

10. The communication tower security device of claim 1, wherein said side panel support in said second end module, closest to said communication tower, allows the free end of the inner flexible side panel to freely slide in said side panel support when said communication tower security device is being installed thereabout so that said pair of flexible side panels can flex and adapt to the curvature of said communication tower.

11. The communication tower security device of claim 1, wherein said first end module has an exterior side wall surface provided with a slight degree of curvature so that the side wall surface closely adapts and fits against the curved surfaces of said radio-transparent cover panels, against which said communication tower security device is mounted.

12. The communication tower security device of claim 1, wherein said second end module comprises:
   a frame portion supporting said central passageway and allowing the passage of said flexible plastic tubing and cord assembly to freely pass therethough during normal operations;
   a second upper surface for supporting said first excess cord windup fixture; and
   a narrow planar exterior mounting surface facing said radio-transparent cover panel, for mounting thereagainst during installation;
   wherein said second pair of side panel supports comprise a second pair of side panel support channels for supporting the second ends of said flexible side panels, respectively, with the innermost end of the flexible side panel to freely slide within said side support channel so that said flexible side panels can bend together, and adapt to the surface curvature of said radio-transparent cover panels, against which said communication tower security device is mounted; and
   wherein said second cord retaining mechanism is realized by spaced apart clips between which the end of the wound up flexible cord can be pressed by the installer and retained therein.

13. The communication tower security device of claim 1, wherein said end connector module comprises:
   a body portion formed from first and second end connector halves, having an internal post structure, about which to tie one free end of the flexible cord used in constructing said communication tower security device;
   wherein said first connector portion includes a second barbed connector having barbed surface for securely receiving the first end of the flexible plastic tubing once pushed and slid thereover, once the flexible cord has been cut to the appropriate length during installation, and further secured using a fastening device;
   a second central bore for receiving the first end of said flexible cord;
   said head portion disposed at its distal end, and having substantially block-like geometry and fitting within said exterior connection channel of said first end module; and
   a connector engaging channel disposed between the head portion and said second barbed connector.

14. A communication tower panel security device for surrounding the circumference of the communication tower and securing the cover panels supported thereon, said communication tower panel security device comprising:
   a first end module having a connector channel, a first set of cord input and output ports, and containing a first set of pulleys;
   a second end module;
   a sliding module containing a second set of pulleys;
   a pair of flexible side panels;
   wherein said pair of flexible side panels are supported in a parallel relationship between said first end module and said second end module to form a connecting/tensioning framework, along which said sliding module is slidably mounted so as to freely slide between said first end module and said second end module;
   an end connector having a head portion adapted to slide into and be received by said connector channel formed in said first end module;
   a length of flexible cord encased in a length of flexible plastic tubing and having a first end connected to said end connector, and wrapping about the circumference of said communication tower, and passing through said sliding module and being routed through said first end module and about said first set of pulleys, and into said sliding module and about said second set of pulleys, so as to gain the mechanical advantage thereof when tensioning said flexible cord encased in said flexible plastic tubing; and
   a first cord retaining mechanism provided on said sliding module for retaining the free end of said flexible cord.

15. The communication tower panel security device of claim 14, which further comprises a first excess cord windup fixture provided on said sliding module and a second excess cord windup fixture provided on said second end module.

16. The communication tower panel security device of claim 14, which further comprises a second cord retaining mechanism provided on said second end module for retaining the free end of said flexible cord after excess flexible cord has been wound up around said first and second excess cord windup fixtures.

* * * * *